US012793739B1

(12) United States Patent
Maximo

(10) Patent No.: US 12,793,739 B1
(45) Date of Patent: Nov. 10, 2026

(54) APPLICATION PROGRAMMING INTERFACE TO STORE INTERPOLATION ALGORITHMS FOR VIDEOS

(71) Applicant: NVIDIA Corporation, Santa Clara, CA (US)

(72) Inventor: André de Almeida Maximo, Rio de Janeiro (BR)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 18/961,401

(22) Filed: Nov. 26, 2024

(51) Int. Cl.
*G11B 27/00* (2006.01)
*G06T 1/20* (2006.01)
*G11B 27/031* (2006.01)
*H04N 19/423* (2014.01)

(52) U.S. Cl.
CPC .............. *G11B 27/031* (2013.01); *G06T 1/20* (2013.01); *H04N 19/423* (2014.11)

(58) Field of Classification Search
CPC ....... G11B 27/00; G11B 27/031; G11B 27/02; G06T 1/20
USPC ......................... 386/248, 239, 278, 280, 282
See application file for complete search history.

(56) References Cited

U.S. PATENT DOCUMENTS 6,529,638 B1 3/2003 Westerman
10,893,229 B1 1/2021 Moore et al.
2002/0065952 A1 5/2002 Sullivan et al.
2005/0270600 A1* 12/2005 Ito ........................ H04N 1/6019 358/518
2008/0152313 A1 6/2008 Sakurai et al.
2009/0086813 A1 4/2009 Belyaev et al.
2013/0120439 A1 5/2013 Harris et al.
2013/0239056 A1 9/2013 Ubillos et al.
2013/0254417 A1 9/2013 Nicholls
2015/0271530 A1* 9/2015 Xie .................... H04N 21/6547 375/240.16
2018/0293965 A1 10/2018 Vembu et al.
2020/0219431 A1 7/2020 Lee et al.
2022/0038654 A1* 2/2022 Reda ...................... H04N 7/014
2022/0116653 A1 4/2022 Luo et al.
2022/0197651 A1 6/2022 Kumar et al.
2022/0335976 A1 10/2022 Pearce
2023/0206383 A1 6/2023 Szerszen et al.
2023/0298123 A1 9/2023 Alla et al.
2025/0005929 A1 1/2025 Bonsor-Matthews
2025/0193423 A1 6/2025 Li et al.

OTHER PUBLICATIONS

Jiri Medlen, What is API, and what can you use it for?, (Year: 2023).*

(Continued)

*Primary Examiner* — Daquan Zhao
(74) *Attorney, Agent, or Firm* — Davis Wright Tremaine LLP

(57) ABSTRACT

Apparatuses, systems, and methods to modify compressed videos. In at least one embodiment, a processor includes circuitry to perform one or more instructions to cause one or more identifiers of one or more videos and one or more indications of one or more pixel interpolation algorithms to be stored.

20 Claims, 37 Drawing Sheets

(56) References Cited

OTHER PUBLICATIONS

Society of Automotive Engineers on-Road Automated Vehicle Standards Committee, "Taxonomy and Definitions for Terms Related to Driving Automation Systems for on-Road Motor Vehicles," Standard No. J3016-201609, issued Jan. 2014, revised Sep. 2016, 30 pages.
Society of Automotive Engineers on-Road Automated Vehicle Standards Committee "Taxonomy and Definitions for Terms Related to Driving Automation Systems for on-Road Motor Vehicles", Standard No. J3016-201806, dated Jun. 15, 2018, 35 pages.
International Organization for Standardization, "Road vehicles—Functional safety," ISO Standard 26262, https://www.iso.org/obp/ui/#iso:std:iso:26262:-1:ed-1:v1:en, Nov. 11, 2011, 35 pages.
International Electrotechnical Commission, "Functional safety of electrical/electronic/programmable electronic safety-related systems," IEC Standard 61508-1, Apr. 2014, 23 pages.
IEEE "IEEE Standard for Floating-Point Arithmetic", Microprocessor Standards Committee of the IEEE Computer Society, IEEE Std 754-2008, dated Jun. 12, 2008, 70 pages.

* cited by examiner

APPLICATION PROGRAMMING INTERFACE TO STORE INTERPOLATION ALGORITHMS FOR VIDEOS

TECHNICAL FIELD

Apparatuses, systems, and methods to modify compressed videos. In at least one embodiment, a processor includes circuitry to perform one or more instructions to cause one or more identifiers of one or more videos and one or more indications of one or more pixel interpolation algorithms to be stored.

BACKGROUND

Current software for editing compressed videos, such as adding motion blur to an object, typically involves decompressing video segments in CPU memory, transferring them to GPU memory for pixel modifications, and then recompressing said video. This multi-step process increases risks of errors and slows down performance.

DETAILED DESCRIPTION

In the following description, numerous specific details are set forth to provide a more thorough understanding of at least one embodiment. However, it will be apparent to one skilled in the art that the inventive concepts may be practiced without one or more of these specific details.

Systems, methods, and apparatuses for performing APIs to read pixel data from and write pixel data to one or more frames of a compressed video while said compressed video is stored in GPU memory in compressed form. In at least one embodiment, said compressed video is stored in GPU memory (e.g., global memory) and a specified range of compressed video frames is decompressed into temporary storage (e.g., L2 cache on a GPU) to be read and modified using a plurality of APIs. In at least one embodiment, modified frames are recompressed and written back to said GPU memory from said temporary storage.

In at least one embodiment, a processor comprises one or more circuits to perform an application programming interface (API) to cause information to be stored and to store an indication of one or more decompression algorithms to decompress said information. In at least one embodiment, a processor comprises one or more circuits to perform an API to cause one or more identifiers of one or more videos and one or more indications of one or more pixel interpolation algorithms to be stored. In at least one embodiment, a processor comprises one or more circuits to perform an API to indicate one or more decompression algorithms to be used to access one or more frames of one or more videos. In at least one embodiment, a processor comprises one or more circuits to perform an API to perform interpolation of two or more pixels of one or more video frames based, at least in part, on one or more frame identifiers of said one or more video frames. In at least one embodiment, a processor comprises one or more circuits to perform an API to indicate one or more properties of one or more pixels based, at least in part, on one or more identifiers of one or more video frames containing said one or more pixels. In at least one embodiment, a processor comprises one or more circuits to perform an API to modify one or more properties of one or more pixels based, at least in part, on one or more identifiers of one or more video frames containing said one or more pixels.

Figure 1:
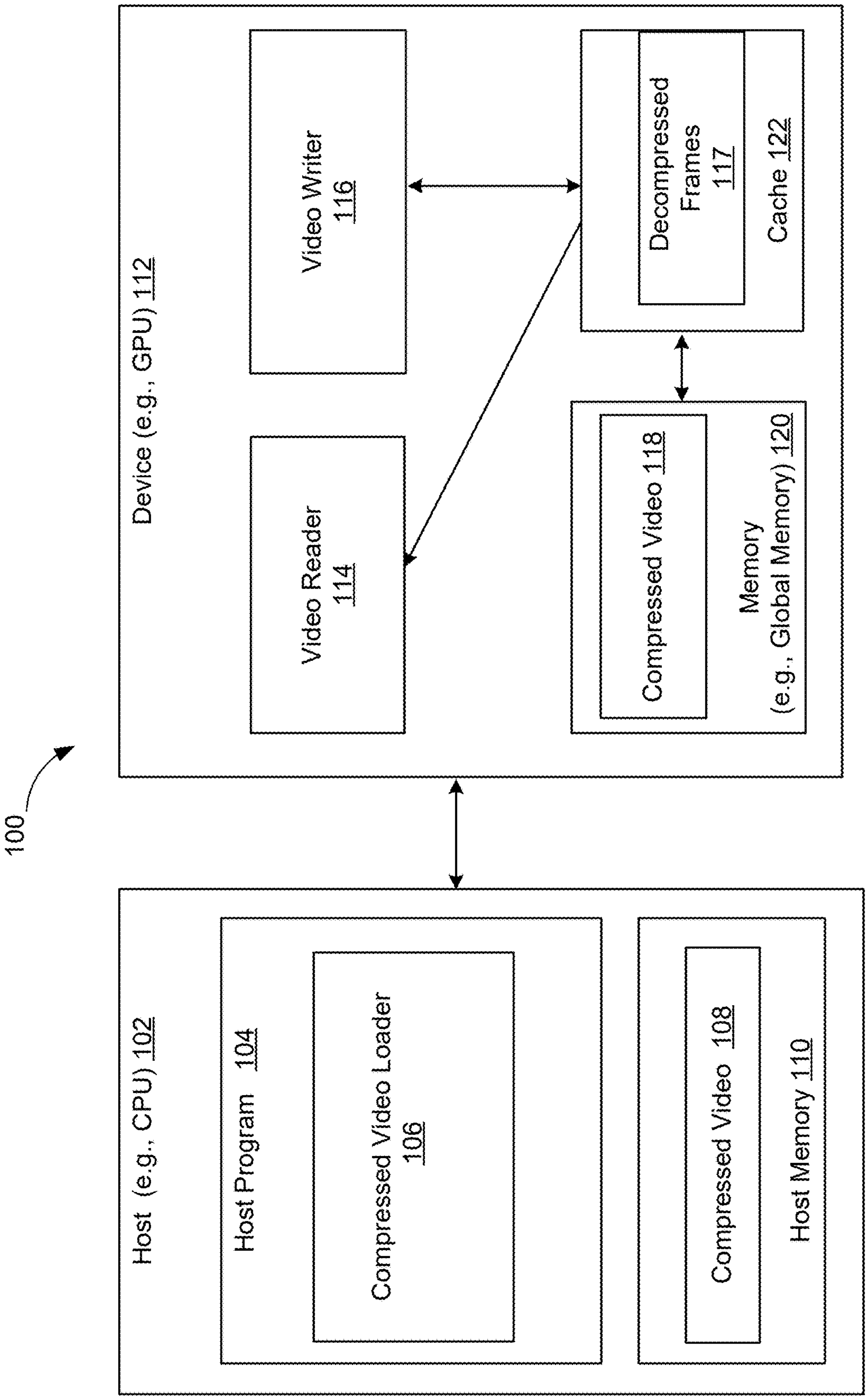
FIG. 1 illustrates a system for editing compressed video stored in GPU memory in accordance with at least one embodiment.

FIG. 1 illustrates a system 100 for editing compressed video 108 stored in GPU memory in accordance with at least one embodiment. In at least one embodiment, system 100 illustrates a setup where video a host program 104 (e.g., video editing software) is performed on a host 102. In at least one embodiment, host 102, which could be a central processing unit (CPU), such as a CPU 2632 as described in connection with FIG. 26. In at least one embodiment, host program 104 is a video editing software, which is performed on host 102. In at least one embodiment, device 112 is a GPU, such as those described in connection with FIG. 21C.

In at least one embodiment, host 102 performs overall control and logic of a video editing process, such as applying user commands and overseeing workflows. In at least one embodiment, host 102 determines what video frames need to be processed and what operations should be applied, while device 112 performs said actual modifications to video data. In at least one embodiment, host 102 sends instructions to device 112, which performs video processing tasks using its high-throughput processing capabilities. In at least one embodiment, this division of work ensures that video editing tasks can be performed efficiently, as host 102 manages high-level operations and coordination, while device 112 performs computationally intensive video processing.

In at least one embodiment, system 100 improves upon existing software used for editing compressed video 108. In at least one embodiment, existing software involves several inefficient steps. In at least one embodiment, first, a portion of compressed video 108 is decompressed in host memory 110. In at least one embodiment, next, this decompressed video is uploaded to GPU memory where pixel modifications are made. In at least one embodiment, after edits are applied, said video is recompressed. In at least one embodiment, this multi-step process increases chances of errors, such as timing mismatches between CPU and GPU, or loss of quality due to multiple compressions and decompressions.

In at least one embodiment, system 100 allows editing of compressed video 118 stored in GPU memory while compressed video 118 is stored in GPU memory. In at least one embodiment, this is achieved through a plurality of software components, such as compressed video loader 106, video reader 114, and video writer 116.

In at least one embodiment, compressed video loader 106 is a host function, instruction, or an API, which is performed to allocate memory on device 112 to store a compressed video in memory 120 of device 112. In at least one embodiment, said memory 120 can include global memory, shared memory, or other types of memory.

In at least one embodiment, when a user interacts with an editing software and selects a frame or range of frames within a compressed video 118 via a user interface, said user's action triggers a command within said editing software, specifying said compressed video and a frame range to be edited. In at least one embodiment, this command is passed to device 112, where said device's CUDA driver takes control of said processing. In at least one embodiment, said CUDA driver corresponds to CUDA driver 3307 at described in connection with FIG. 33.

In at least one embodiment, said CUDA driver identifies said required frame range using metadata associated with compressed video 118 stored in memory 120. In at least one embodiment, using this metadata, said CUDA driver fetches only said specified compressed frames from said memory 120. In at least one embodiment, these frames are then decompressed on device 112 GPU using dedicated decompression hardware based on a decompression algorithm as part of said metadata associated with compressed video. In at least one embodiment, said decompressed frames (e.g., decompressed frames 117) are stored temporarily in a cache 122 of device 112. In at least one embodiment, cache 122 can be one of a plurality of caches on device 112. In at least one embodiment, cache 122 is a L1 cache, such as L1 cache 2148 as described in connection with 21. In at least one embodiment, cache 122 is a L2 cache, such as L2 cache 2121 as described in connection with 21.

In at least one embodiment, decompressed frames 117 remain transient, existing only in cache 122 for a duration when these frames are being edited. In at least one embodiment, decompressed frames 117 in cache 122 can be rendered and displayed to a user within an editing software's interface. In at least one embodiment, said user can then perform various modifications, such as adjusting brightness, contrast, or adding visual effects. In at least one embodiment, these modifications are applied directly to cache-resident decompressed frames 117. In at least one embodiment, when device 112 decompresses a selected range of frames, it decompresses one or more key frames within said range first. In at least one embodiment, key frames serve as reference points that allow predicted frames (e.g., P-frames and B-frames) to be decompressed efficiently.

In at least one embodiment, both video reader 114 and video writer 116 are implemented as kernel programs that are performed on device 112 to provide core functionality for reading from and writing to compressed video 118 stored in memory 120 via cache 122. In at least one embodiment, these kernel programs can interact directly with specialized hardware, such as NVDEC for decompression. In at least one embodiment, video reader 114 is used to access compressed video 118. In at least one embodiment, when invoked, video reader 114 uses a specified frame range and uses this information to locate necessary frames. In at least one embodiment, video reader 114 can cause a CUDA driver to decompress compressed video frames in said specified range directly into cache 122. In at least one embodiment, video reader 114 accesses decompressed frames using one or more GPU-based video texture objects.

In at least one embodiment, video writer 116 facilitates modifications of video frames. In at least one embodiment, after selected frames are decompressed and stored in cache 122, video writer 116 applies said desired changes directly to said decompressed frames, such as decompressed frames 117. In at least one embodiment, video writer 116 performs these modifications using one or more GPU-based video surface objects, which allow pixel-level access to decompressed frames. In at least one embodiment, once modifications are complete, video writer invokes GPU's NVENC hardware encoder to recompress said modified frames, which are then written back to GPU memory (such as memory 120), replacing original compressed data.

In at least one embodiment, at least one feature described in connection with FIG. 1 is implemented using at least one feature of any system(s) and/or process(es) depicted in and/or described in connection with FIGS. 2-43. In at least one embodiment, at least one feature described in connection with FIG. 2B is used to implement at least a portion of any system(s) and/or process(es) depicted in and/or described with respect to FIGS. 2-34.

Figure 2A:
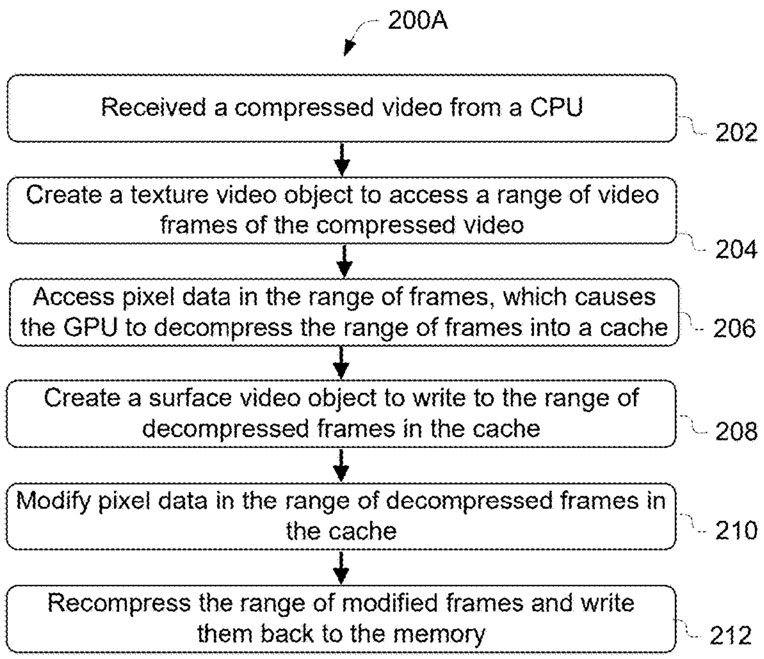
FIG. 2A is a flowchart diagram illustrating a process of modifying a compressed video while said video is stored in GPU memory in accordance with an embodiment.
Figure 2B:
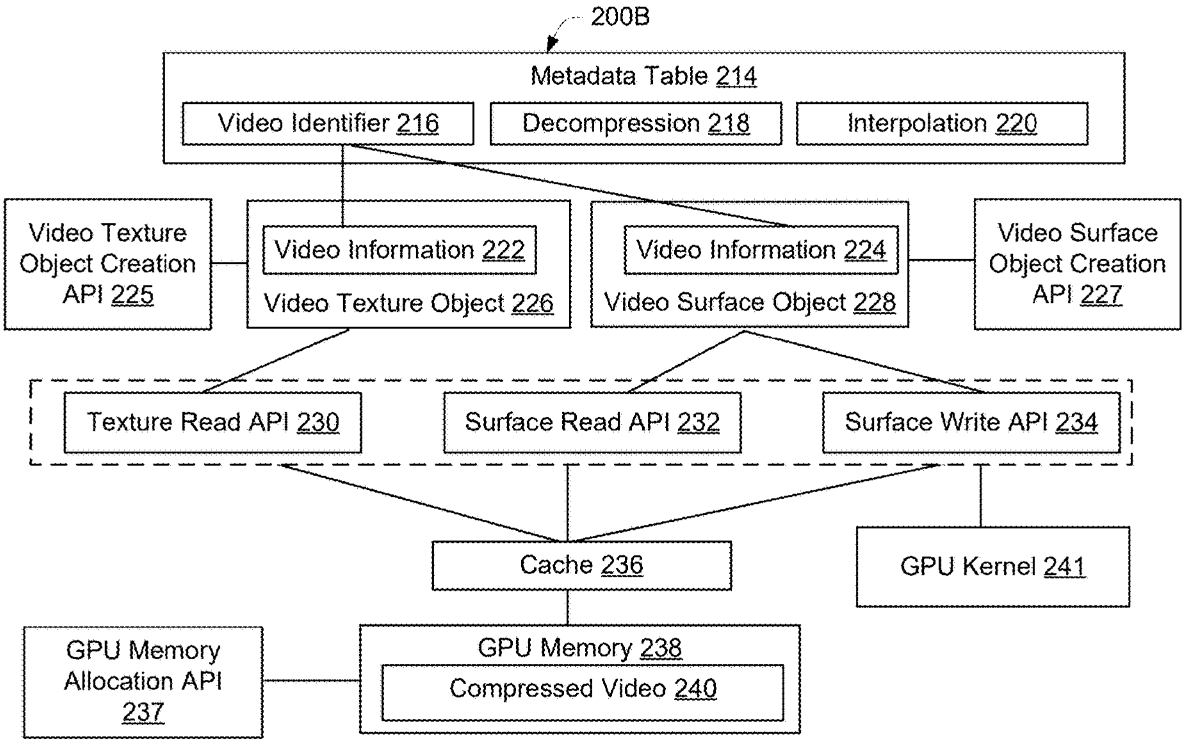
FIG. 2B is a block diagram illustrating an overview of a system that connects multiple APIs for reading from and writing to a compressed video in accordance with at least one embodiment.

FIG. 2A is a flowchart diagram illustrating a process 200A of modifying a compressed video while said video is stored in GPU memory in accordance with an embodiment. In at least one embodiment, a processor such as device 112 as described in connection with FIG. 1 performs process 200A.

In at least one embodiment, at step 202, said processor receives a compressed video from a CPU, such as host 102 as described in connection with FIG. 1. In at least one embodiment, prior to receiving said compressed video, said CPU invokes an API to allocate memory to store said compressed video on said processor. In at least one embodiment, said API (e.g., cudaMallocVideoArray( )) allocates a CUDA array in GPU memory with parameters such as video resolution, codec type, and frame range. In at least one embodiment, said frame range ensures memory allocation aligns with a number of frames to be stored. In at least one embodiment, by allowing this granularity, said API facilitates efficient memory usage, which is critical for handling large videos. In at least one embodiment, said codec type represents a compression algorithm of said compressed video. In at least one embodiment, this parameter is stored as part of metadata of said compressed video and is used to decompress said compressed video by other APIs. In at least one embodiment, said compressed video is stored in pre-allocated GPU memory together with its associated metadata, which includes a compression algorithm.

In at least one embodiment, at step 204, said processor creates a texture video object to access a range of frames from said compressed video. In at least one embodiment, said API (e.g., cudaCreateVideoTextureObject( )) is used to define said texture video object, which allows read-only access to said compressed video. In at least one embodiment, said API uses a resource descriptor linked to said allocated CUDA array and a texture descriptor to configure access parameters. In at least one embodiment, said API includes a frame range parameter, which allows a texture video object to be created to access a range of frames from a compressed video.

In at least one embodiment, at step 206, said processor accesses pixel data from said range of frames specified by said range parameter of a texture video object. In at least one embodiment, said processor invokes an API (e.g., videoTex2D( )) to fetch pixel data from said range of video frames. In at least one embodiment, said API invocation causes said processor to decompress said range of compressed frames into cache. In at least one embodiment, said API performs targeted access to pixels in a specific location within a specific frame within said range of decompressed frames. In at least one embodiment, said API triggers a GPU's decoding hardware to decompress only specified frames and temporarily store said decompressed data in a cache.

In at least one embodiment, at step 208, said processor uses an API to create a surface video object to write pixel data to said range of decompressed frames in a cache. In at least one embodiment, said API (e.g., cudaCreateVideoSurfaceObject( )) is used to define said surface video object, which enables write access to decompressed frames. In at least one embodiment, s said API uses a resource descriptor similar to that in said texture video object but configures it for modification instead of read-only access. In at least one embodiment, frame parameters in said resource descriptor define a range of frames accessible for editing, ensuring that modifications are confined to said selected portion of said video.

In at least one embodiment, at step 210, said processor uses an API to modify pixel data within said decompressed frames. In at least one embodiment, said API (e.g., videosurface2Dwrite( )) is used within a kernel to write new pixel data to specified frames. In at least one embodiment, said API accepts parameters (e.g., x, y, and frame Index), enabling precise edits to individual pixels within a frame. In at least one embodiment, by using frame parameters, said API ensures that edits are applied only to intended frames, leaving other decompressed frames unaffected. In at least one embodiment, changes to one or more decompressed frames are stored temporarily in a cache.

In at least one embodiment, at step 212, said processor recompress said range of modified frames, and write said recompressed modified frames back to GPU memory to overwrite corresponding portions of said original compressed video.

In at least one embodiment, at least one feature described in connection with FIG. 2A is implemented using at least one feature of any system(s) and/or process(es) depicted in and/or described in connection with FIGS. 1 and 3-43. In at least one embodiment, at least one feature described in connection with FIG. 2B is used to implement at least a portion of any system(s) and/or process(es) depicted in and/or described with respect to FIGS. 1 and 3-34.

FIG. 2B is a block diagram illustrating an overview of a system 200B that connects multiple APIs for reading from and writing to a compressed video in accordance with at least one embodiment. In at least one embodiment, FIG. 2B demonstrates relationships between said APIs, metadata, and GPU resources necessary for efficient video processing and editing.

In at least one embodiment, system 200B includes a metadata table 214, which serves as a centralized repository for storing essential information about compressed video data. In at least one embodiment, said metadata table 214 contains entries such as a video identifier 216, a corresponding decompression algorithm 218, and corresponding interpolation settings 220. In at least one embodiment, said video identifier 216 acts as a unique reference to a specific compressed video, enabling access to its corresponding data. In at least one embodiment, video identifier 216 can be automatically generated by a GPU or can be an address of GPU memory that stores compressed video data. In at least one embodiment, decompression algorithm 218 specifies a method required to decompress video frames (e.g., H.264 or VP9), while interpolation settings 220 define a pixel sampling method to be used (e.g., bilinear or nearest-neighbor).

In at least one embodiment, said metadata table 214 is created and populated by an API, such as a video surface or texture creation API, during initialization or resource allocation. In at least one embodiment, said metadata table 214 is managed by a GPU driver, which ensures said table remains synchronized with said compressed video data stored in GPU memory 238. In at least one embodiment, said metadata table 214 resides in GPU-accessible memory, enabling rapid lookups by APIs such as said texture read API 230, surface read API 232, or surface write API 234 during video operations.

In at least one embodiment, said video information 222 and 224 represent resource descriptors that provide metadata for identifying and accessing video content. In at least one embodiment, video information 222 is associated with a video texture object 226, and video information 224 is associated with a video surface object 228. In at least one embodiment, video texture object 226 is created by video texture object creation API 225, which binds GPU resources for processing videos to video texture object 226. In at least one embodiment, video texture object 226 is used by said texture read API 230 to fetch pixel data efficiently. In at least one embodiment, video surface object 228 is created by video surface object creation API 227, which binds GPU resources for processing videos to video surface object 228.

In at least one embodiment, video surface object 228 is utilized by said surface read API 232 to retrieve pixel data (e.g., properties of pixels) and by surface write API 234 to write pixel data to a specific frame of said video. In at least one embodiment, texture read API 230, surface read API 232, and surface write API 234 provide operations for indirectly interacting with compressed video 240 stored in GPU memory 238 via a cache 236. In at least one embodiment, GPU memory 238 is allocated by GPU memory allocation API 237, which specifies a number of frames in a compressed video to be stored and a size in bytes of said compressed video.

In at least one embodiment, a range of compressed frames in compressed video 240 is decompressed into a cache 236 during API operations, enabling access to individual frames or pixel data. In at least one embodiment, said cache 236 temporarily stores decompressed frame data. In at least one embodiment, said range of frames to be decompressed is determined by a range parameter associated with video texture object 226 and video surface object 228. In at least one embodiment, each of texture read API 230, surface read API 232, and surface write API 234 takes either video texture object 226 or video surface object 228 as an input parameter, and therefore can access said range of frames associated with either video texture object 226 or video surface object 228.

In at least one embodiment, when one of texture read API 230, surface read API 232, and surface write API 234 accesses compressed video 240, a GPU decompresses a range of frames in compressed video 240, which is compressed using formats that rely on keyframes and interframes. In at least one embodiment, a GPU driver dynamically manages cache 236, allocating memory for decompressed frames based on a specified range. In at least one embodiment, if a new range of frames is requested, previously decompressed frames may be evicted from cache 236 to make room for new decompressed data. In at least one embodiment, this dynamic management allows APIs to handle operations on large or high-resolution video files without exceeding available memory limits, while keeping compressed video 240 in GPU memory.

In at least one embodiment, texture read API 230 is used to fetch interpolated pixel values from a decompressed video frame based on input texture coordinates. In at least one embodiment, surface read API 232 is used to retrieve pixel properties from a specified location in a decompressed frame using video surface object 228, while said surface write API 234 is used to modify pixel data at a specified location within said frame.

In at least one embodiment, a GPU kernel 241 utilizes these APIs to perform operations such as video editing, rendering, or processing. In at least one embodiment, GPU kernel 241 may invoke said APIs 230, 232, and 234 with input parameters that specify pixel locations, frame indices, and/or pixel data for reading or writing operations. In at least one embodiment, by leveraging said metadata table 214, system 200B ensures that said APIs access appropriate decompression algorithms, interpolation methods, and resource descriptors for efficient video manipulation.

In at least one embodiment, at least one feature described in connection with FIG. 2B is implemented using at least one feature of any system(s) and/or process(es) depicted in and/or described in connection with FIGS. 1 and 3-43. In at least one embodiment, at least one feature described in connection with FIG. 2B is used to implement at least a portion of any system(s) and/or process(es) depicted in and/or described with respect to FIGS. 1 and 3-34.

Figure 3:
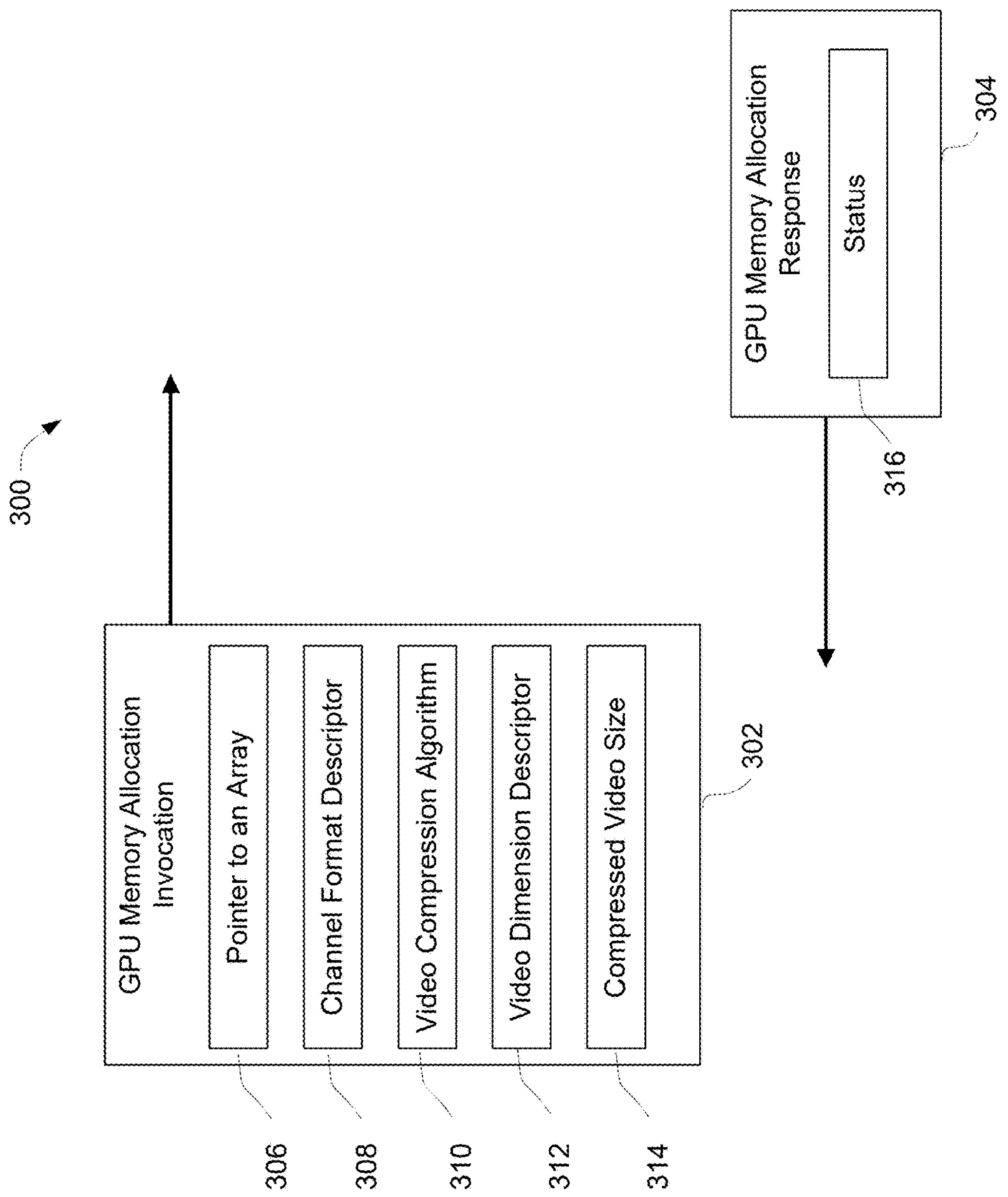
FIG. 3 is a block diagram illustrating a GPU memory allocation operation (operation) in accordance with at least one embodiment.

FIG. 3 is a block diagram illustrating a GPU memory allocation operation 300 ("operation 300") in accordance with at least one embodiment. In at least one embodiment, operation 300 includes one or more computational operations that cause a processor (e.g., a GPU or CPU) to perform an API to allocate memory in GPU memory to store a compressed video and associated metadata.

In at least one embodiment, operation 300 includes a GPU memory allocation invocation 302 ("invocation 302") and a GPU memory allocation 304 ("response 304"). In at least one embodiment, invocation 302 is a function call initiated by one or more software programs, such as one or more kernels performed by a GPU. In at least one embodiment, said function call invokes an instruction/API to allocate GPU memory to store compressed video data and metadata. In at least one embodiment, invocation 302 specifies a plurality of parameters 306-314. In at least one embodiment, invocation 302 specifies a pointer to an array 306 as an input parameter. In at least one embodiment, this pointer represents a reference to an array where a compressed video and metadata are stored. In at least one embodiment, invocation 302 specifies a channel format descriptor 308 as an additional input parameter. In at least one embodiment, this channel format descriptor indicates a format of said video data, such as RGBA with 8-bit channels. In at least one embodiment, invocation 302 specifies a video compression algorithm 310 as an additional input parameter. In at least one embodiment, this video compression algorithm 310 indicates a codec used to compress said video, such as H.264, H.265, or AV1, enabling a GPU to interpret and decompress said compressed video correctly. In at least one embodiment, invocation 302 specifies a video dimension descriptor as an additional input parameter. In at least one embodiment, this video dimension descriptor 312 defines a width and height of video frames, as well as a temporal range (e.g., start and end frames) of said compressed video data. In at least one embodiment, invocation 302 specifies a compressed video size 314 as an additional input parameter. In at least one embodiment, this compressed video size represents a total memory size (in bytes) of said compressed video, ensuring efficient memory allocation.

In at least one embodiment, response 304 includes a status 316 as an output. In at least one embodiment, this status is a code or value that indicates whether said memory allocation was successfully performed. In at least one embodiment, a value of 0 indicates that said memory allocation operation was successfully performed. In at least one embodiment, a non-zero value indicates an error, such as insufficient GPU memory or invalid input parameters.

In at least one embodiment, at least one feature described in connection with FIG. 3 is implemented using at least one feature of any system(s) and/or process(es) depicted in and/or described in connection with FIGS. 1-2 and 4-34. In at least one embodiment, at least one feature described in connection with FIG. 3 is used to implement at least a portion of any system(s) and/or process(es) depicted in and/or described with respect to FIGS. 1-2 and 4-34.

Figure 4:
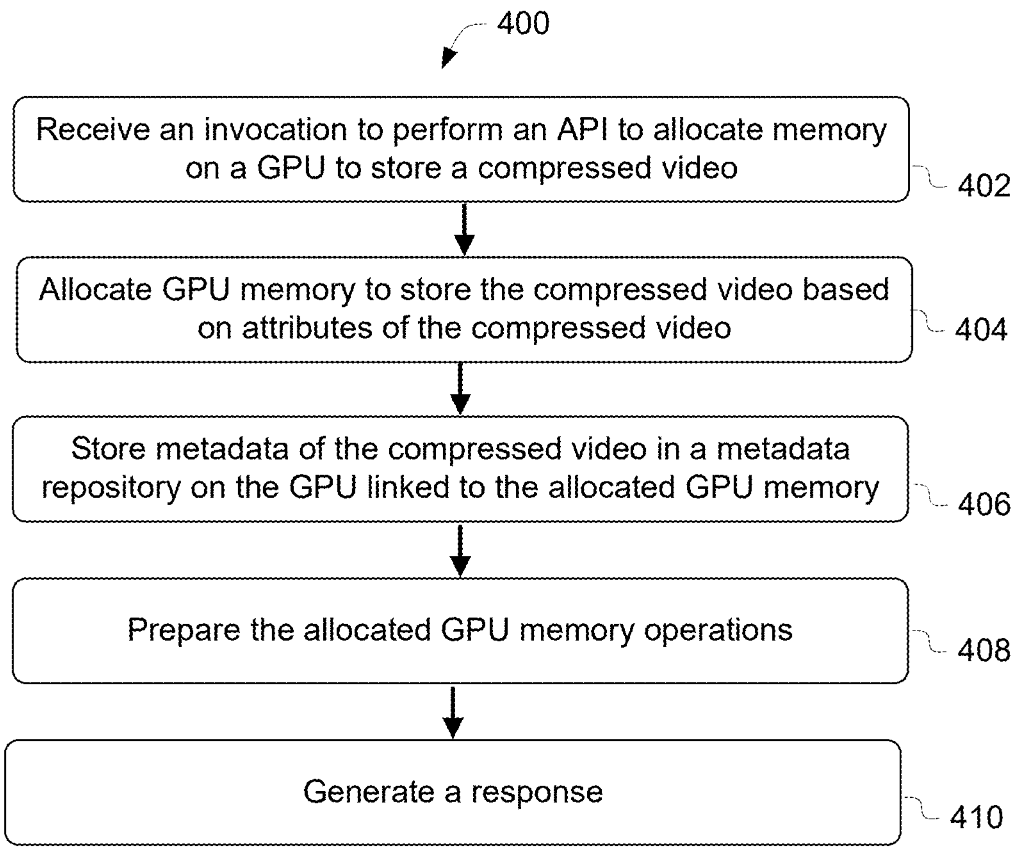
FIG. 4 illustrates a process for allocating memory on a GPU to store a compressed video.

FIG. 4 illustrates a process 400 for allocating memory on a GPU to store a compressed video. In at least one embodiment, process 400 is performed by a processor such as a GPU.

In at least one embodiment, at step 402, said GPU receives an invocation to perform an API to allocate memory on said GPU to store a compressed video. In at least one embodiment, said invocation is received from a host program, such as compressed video loader 106 as described in connection with FIG. 1. In at least one embodiment, said invocation includes input parameters that specify a least a portion of metadata of said compressed video. In at least one embodiment, said metadata includes a video ID, which is a unique identifier for said compressed video. In at least one embodiment, said video ID can be generated internally by said API or said GPU memory. In at least one embodiment, said video ID can be a reference, handle, or a pointer to said compressed video, where said reference, handle, or pointer acts as a proxy for a video identifier. In at least one embodiment, said metadata further includes a compression algorithm, which is an indicator of a codec used for compression, which can be used by subsequent APIs calls to decompress said compressed video. In at least one embodiment, said metadata includes a width and height of each video frame, and a total number of frames of said compressed video.

In at least one embodiment, at step 404, said GPU allocates memory based on at least a portion of said metadata. In at least one embodiment, said allocation is performed in global memory on said GPU to store said compressed video. In at least one embodiment, said portion of metadata includes attributes of said compressed video, such as video dimensions, data format, and compressed size. In at least one embodiment, a size of memory to be allocated is calculated using these attributes to ensure sufficient space is allocated to accommodate all frames of said compressed video. In at least one embodiment, internal memory management mechanisms of said GPU initialize said allocated memory, clearing or setting default values to ensure readiness for data storage. In at least one embodiment, said memory is mapped for efficient data transfers between said host (CPU) and device (GPU), accounting for alignment constraints and optimizing host-to-device communication. In at least one embodiment, said GPU partitions said allocated memory into chunks corresponding to individual video frames, enabling efficient access during decompression or processing. In at least one embodiment, a memory layout is further optimized for handling compressed data, ensuring compatibility with decompression algorithms and alignment with GPU caching requirements.

In at least one embodiment, at step 406, said GPU stores said metadata of said compressed video in a metadata repository. In at least one embodiment, said metadata repository is a data structure on said GPU that stores and manages metadata for compressed videos. In at least one embodiment, said metadata repository links said metadata to allocated GPU memory, enabling subsequent APIs to access this information for operations such as decompressing videos stored in said allocated GPU memory re-specifying attributes. In at least one embodiment, said repository may be implemented as a table in GPU memory or dedicated registers to ensures efficient metadata access to minimize latency and processing overhead. In at least one embodiment, said metadata table stores information (e.g., a pointer) identifying said allocated GPU memory and a decompression algorithm used to decompress compressed video to be stored in said GPU memory. In at least one embodiment, said metadata is stored in said metadata repository when said API is performed. In at least one embodiment, said metadata repository is located in said allocated GPU memory.

In at least one embodiment, at step 408, said GPU prepares allocated GPU memory for subsequent operations. In at least one embodiment, said preparation involves initializing memory and optimizing it for video decompression and processing tasks. In at least one embodiment, this preparation includes clearing memory regions or setting default values to avoid residual data artifacts. In at least one embodiment, said GPU optimizes a memory layout for efficient access during video decompression and processing, aligning memory to hardware-specific requirements and organizing it to facilitate parallel operations.

In at least one embodiment, at step 410, said CPU generates a response to said API call. Said response includes a success or failure code and a pointer to said allocated memory. In at least one embodiment, a success code confirms that said memory was allocated correctly, while a failure code provides details about said issue, such as invalid input parameters or insufficient GPU memory. In at least one embodiment, said response also includes a pointer to said allocated memory, which serves as a reference for subsequent operations. In at least one embodiment, this pointer allows a software program, such as a video editing program, to access said allocated GPU memory directly for tasks such as transferring compressed video data, decompressing frames, or rendering.

In at least one embodiment, said compressed video can be stored in said allocated GPU memory through a process that leverages a processor comprising one or more circuits to perform another API. In at least one embodiment, said compressed video data is transferred from a host system (e.g., CPU memory) to said allocated GPU memory using a direct memory transfer operation such as cudaMemcpyToArray( ) In at least one embodiment, said transfer operation ensures that said data is placed in said allocated memory in an optimized layout. In at least one embodiment, along with storing compressed video data, said transfer API also stores metadata about said video in said allocated memory or a linked metadata repository.

In at least one embodiment, said processor stores an indication of decompression algorithm in said metadata. In at least one embodiment, said indication, such as a codec type (e.g., H.264 or VP9), can be used to decompress said compressed video. In at least one embodiment, by associating said decompression algorithm with said stored video data, said processor eliminates a need for a programmer to re-specify this information in subsequent API calls.

In at least one embodiment, at least one feature described in connection with FIG. 4 is implemented using at least one feature of any system(s) and/or process(es) depicted in and/or described in connection with FIGS. 1-3 and 5-34. In at least one embodiment, at least one feature described in connection with FIG. 4 is used to implement at least a portion of any system(s) and/or process(es) depicted in and/or described with respect to FIGS. 1-3 and 5-34.

Figure 5:
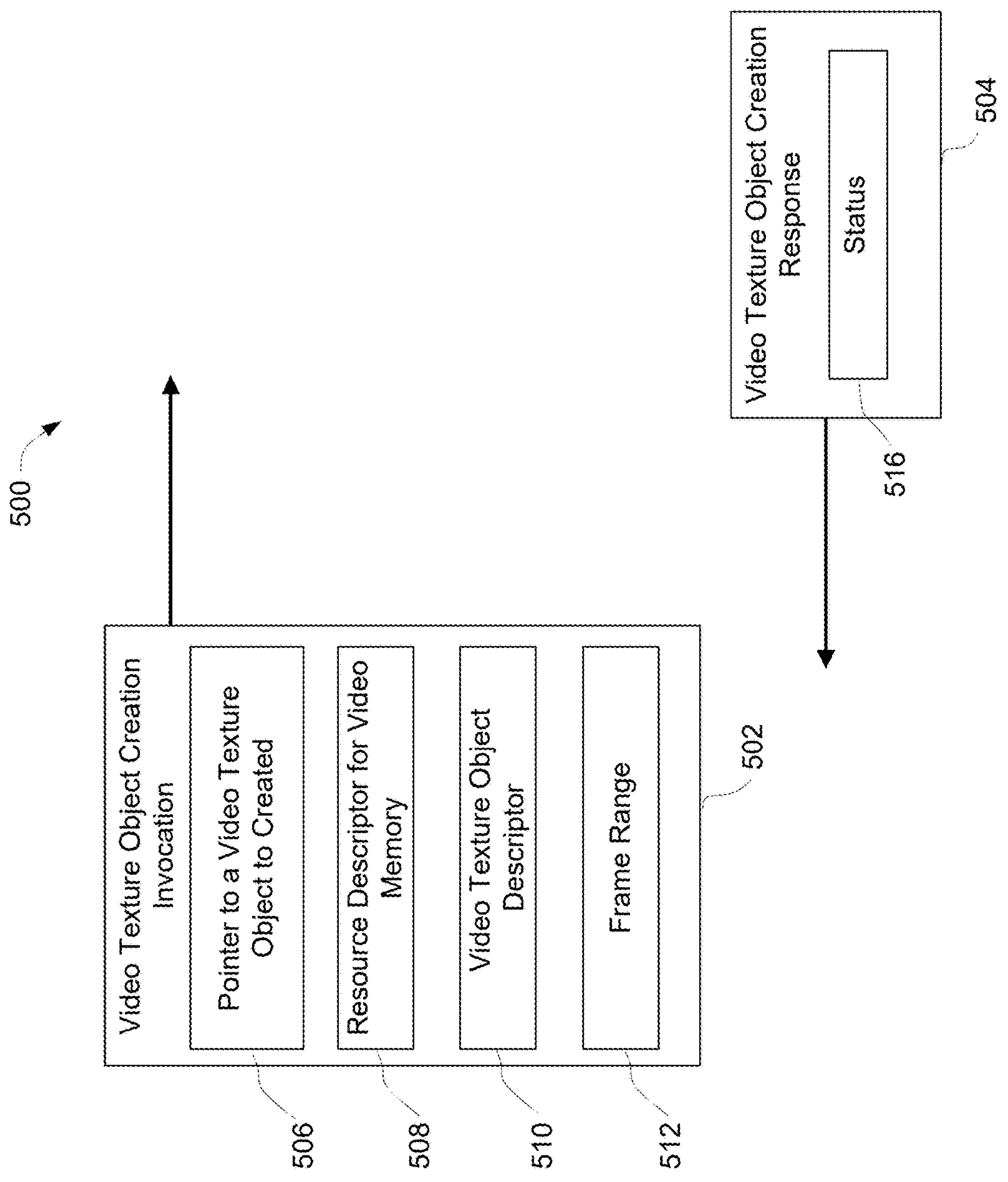
FIG. 5 is a block diagram illustrating a video texture object creation operation ("operation") in accordance with at least one embodiment.

FIG. 5 is a block diagram illustrating a video texture object creation operation 500 ("operation 500") in accordance with at least one embodiment. In at least one embodiment, operation 500 includes one or more computational operations that cause a processor to create a texture object for accessing video data in GPU memory and configuring interpolation settings for pixel sampling.

In at least one embodiment, operation 500 includes a video texture object creation invocation 502 ("invocation 502") and a video texture object creation response 504 ("response 504"). In at least one embodiment, invocation 502 is a function call initiated by one or more software programs, such as kernel functions executed by GPUs. In at least one embodiment, said function call invokes an instruction/API to configure and create a texture object for video data. In at least one embodiment, said instruction, when performed, causes a processor to bind video memory, define filtering and addressing properties, and specify interpolation algorithms.

In at least one embodiment, said API binds video memory to a texture video object to be created by said API by linking an allocated memory region containing a compressed video with that object's configuration. In at least one embodiment, said binding is performed via a resource descriptor, which specifies details such as a memory type (e.g., 2D array), memory address, and video data layout. In at least one embodiment, a GPU or another processor passes this descriptor to a GPU driver, which creates an internal mapping between said memory and said video texture object. In at least one embodiment, said binding process involves configuring said GPU driver to associate a specified memory region with a texture video object. In at least one embodiment, said GPU driver validates said resource descriptor and updates internal metadata tables to maintain a relationship between said memory and said video texture object to ensure any subsequent operation involving said texture video object references a correct memory resource without requiring manual intervention. In at least one embodiment, said binding enables a GPU kernel to use a texture video object to access and process video data using GPU-based features such as sampling and interpolation.

In at least one embodiment, invocation 502 takes a plurality of input parameters 506-512. In at least one embodiment, said parameters includes a pointer to a texture video object 506, which provides a reference for a texture video object to be created, allowing subsequent API calls to interact with or use said object. In at least one embodiment, said parameters includes a resource descriptor for video memory 508, which defines said location and type of video memory associated with said texture video object, such as a 2D CUDA array, and ensures that said created texture video object is correctly mapped to GPU memory allocated for a compressed video. In at least one embodiment, said parameters includes a texture video object descriptor 510, includes properties such as filter modes, addressing modes, and coordinate normalization. In at least one embodiment, said property of filtering modes specifies interpolation algorithms (e.g., bilinear, nearest neighbor) for pixel sampling. In at least one embodiment, said property of addressing modes configures behavior for out-of-bound coordinates (e.g., clamp, wrap). In at least one embodiment, said property of coordinate normalization indicates whether texture coordinates are normalized or unnormalized. In at least one embodiment, said parameters includes a frame range 512, which defines a subset of video frames to be associated with said texture video object, including start and end frames and spatial dimensions such as width and height.

In at least one embodiment, said range parameter enables precise and efficient access to segments of a video. In at least one embodiment, compressed videos uses temporal compression techniques, which store information across frames in a way that reduces redundancy, where not every frame is self-contained. In at least one embodiment, for example, key frames, also known as I-frames, are fully encoded and contain all information needed to reconstruct an image, while most other frames, such as predicted frames (P-frames) and bidirectional frames (B-frames), rely on data from adjacent frames to be fully decoded. In at least one embodiment, accessing a specific range of frames ensures that all necessary data, including dependent frames and their associated key frames, is available for proper decoding. In at least one embodiment, said range parameter acts as a sliding window over a compressed video to allow a program (e.g., a GPU kernel) to incrementally access small, manageable portions of a compressed video, moving said window as needed to load subsequent ranges. In at least one embodiment, for example, a video editing application can se said sliding window to load only frames required for a particular scene, freeing up memory and allowing said program to operate more efficiently. In at least one embodiment, a video editing application can continuously access a compressed video sequentially one range of frame at a time. In at least one embodiment, However, a video editing application can skip frames, enabling applications to jump directly to specific scenes or frames. In at least one embodiment, additionally, ranges can be accessed non-continuously or out of order.

In at least one embodiment, said API causes video identifiers and pixel interpolation algorithm indications to be stored and linked with each other. In at least one embodiment, pixel interpolation is fundamental to tasks such as scaling, resizing, or transforming video frames to match display or processing requirements. In at least one embodiment, said API automates a process of associating specific interpolation algorithms with corresponding videos, ensuring that each video's unique processing needs are met without requiring manual intervention.

In at least one embodiment, while there are multiple methods for interpolation, such as bilinear interpolation, nearest-neighbor selection, and more advanced techniques, some APIs provide no information in a parameter to indicate a desired interpolation algorithm, which causes these APIs to be unable to determine or enforce an appropriate interpolation method, leading to inefficiencies and inconsistencies in video processing workflows. In at least one embodiment, said API described in FIG. 5 can cause both an identifier of a video and an indication of said interpolation algorithm to be stored and associated with each other such that said video can be accessed using said indicated pixel interpolation method. In at least one embodiment, when another API is called to interpolate pixels of a frame, that API uses an identifier of said video to query a table and retrieve a corresponding interpolation method.

In at least one embodiment, response 504 includes a status 516, which is a code or value indicating whether said instruction was successfully performed. In at least one embodiment, a success status confirms said texture object was created and associated with GPU memory, while a failure status indicates errors such as invalid parameters or insufficient GPU resources.

In at least one embodiment, at least one feature described in connection with FIG. 5 is implemented using at least one feature of any system(s) and/or process(es) depicted in and/or described in connection with FIGS. 1-4 and 6-34. In at least one embodiment, at least one feature described in connection with FIG. 5 is used to implement at least a portion of any system(s) and/or process(es) depicted in and/or described with respect to FIGS. 1-4 and 6-34.

Figure 6:
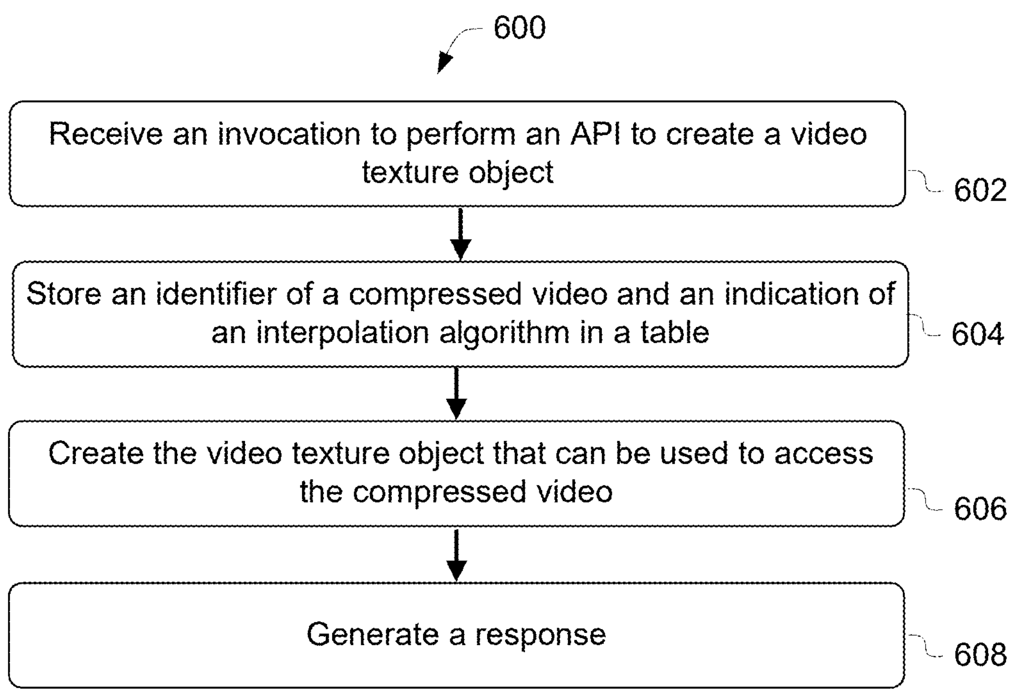
FIG. 6 is a flowchart diagram illustrating a process of creating a video texture object in accordance with at least one embodiment.

FIG. 6 is a flowchart diagram illustrating a process 600 of creating a video texture object in accordance with at least one embodiment. In at least one embodiment, process 600 is performed at least in part on a computer system such as those described elsewhere in this disclosure. In at least one embodiment, process 600 is performed by a GPU.

In at least one embodiment, at step 602, said processor receives an invocation to perform an API to create a video texture object. In at least one embodiment, said invocation can be initiated from within a GPU kernel, such as video reader 114 as described in connection with FIG. 1. In at least one embodiment, this invocation includes, as input parameters, a video identifier that uniquely identifies a compressed video stored in GPU memory and an indication of an interpolation algorithm to apply when processing frames of said video. In at least one embodiment, said interpolation algorithm may include techniques such as bilinear interpolation, nearest-neighbor interpolation, or other pixel processing algorithms.

In at least one embodiment, at step 604, said processor stores said video identifier and said indication of said interpolation algorithm in a metadata table managed by a GPU driver. In at least one embodiment, said metadata table links said video identifier to said interpolation algorithm, enabling other APIs to retrieve this information for processing video frames. In at least one embodiment, said texture video object to be created acts as a logical handle or reference that links said compressed video stored in GPU memory to said interpolation algorithm stored in said metadata table. In at least one embodiment, said texture video object allows other APIs to access and process said video efficiently using a correct interpolation algorithm. In at least one embodiment, when another API is involved, a reference, point, or handle of a video texture object is passed as an input parameter. In at least one embodiment, said GPU driver can retrieve a video identifier of a compressed video and an associated interpolation algorithm stored during creation of said texture video object.

In at least one embodiment, at step 606, said processor creates said video texture object. In at least one embodiment, said video texture object is a GPU-managed construct that provides efficient access to video data stored in GPU memory. In at least one embodiment, a texture video object encapsulates video attributes such as dimensions, data format, and memory layout, while leveraging GPU texture units for optimized sampling and interpolation. In at least one embodiment, a video texture object specifies how pixels are interpolated, supporting algorithms like bilinear or nearest-neighbor interpolation, and defines addressing modes to handle out-of-bound coordinates, such as clamping or wrapping. In at least one embodiment, a texture video object simplifies access to video frames by linking compressed video memory to CUDA kernels, enabling operations like frame sampling, scaling, and filtering. In at least one embodiment, a texture video object minimizes overhead by using parallel GPU hardware.

In at least one embodiment, at step 608, said processor generates a response indicating a result of said operation. In at least one embodiment, if said API successfully creates said video texture object, said response includes an indication of success and may provide a reference to said video texture object for use in subsequent API calls. In at least one embodiment, if said API fails, said response includes error information indicating a reason for failure, such as invalid parameters or metadata storage issues.

In at least one embodiment, at least one feature described in connection with FIG. 6 is implemented using at least one feature of any system(s) and/or process(es) depicted in and/or described in connection with FIGS. 1-5 and 7-34. In at least one embodiment, at least one feature described in connection with FIG. 6 is used to implement at least a portion of any system(s) and/or process(es) depicted in and/or described with respect to FIGS. 1-5 and 7-34.

Figure 7:
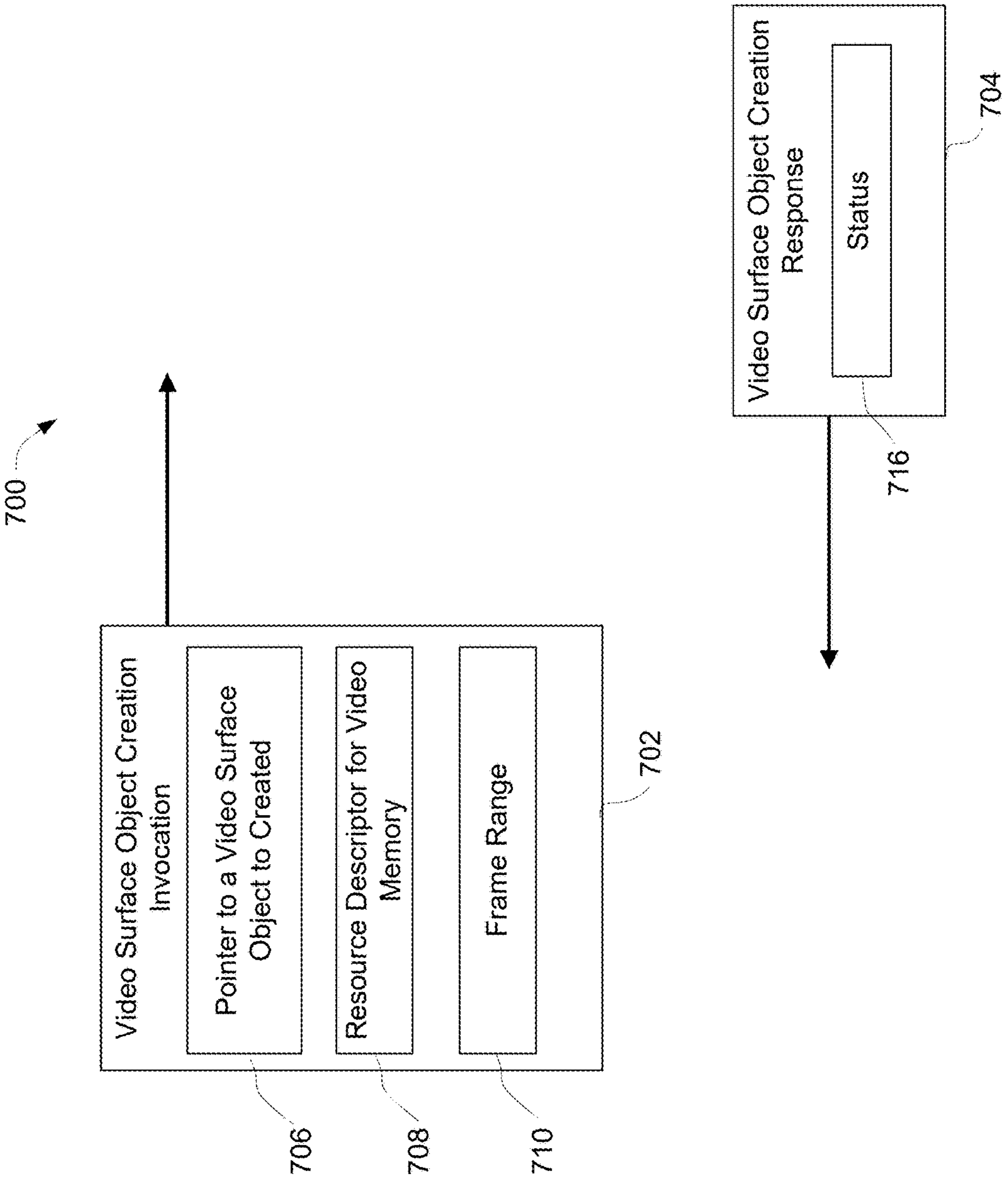
FIG. 7 is a block diagram illustrating a video surface object creation operation ("operation") in accordance with at least one embodiment.

FIG. 7 is a block diagram illustrating a video surface object creation operation 700 ("operation 700") in accordance with at least one embodiment. In at least one embodiment, operation 700 includes one or more computational operations that cause a processor to create a video surface object linking compressed video data stored in GPU memory with specific metadata such as a frame range, a memory descriptor, and a decompression algorithm.

In at least one embodiment, operation 700 includes a video surface object creation invocation 702 ("invocation 702") and a video surface object creation response 704 ("response 704"). In at least one embodiment, invocation 702 is a function call initiated by one or more software programs, such as applications or kernel functions executed on GPUs. In at least one embodiment, said function call invokes an instruction/API to create a video surface object. In at least one embodiment, said instruction, when performed, causes a processor to associate an identifier of a compressed video with a decompression algorithm indicated in a resource descriptor.

In at least one embodiment, invocation 702 includes a plurality of parameters 706-710. In at least one embodiment, said parameters include a pointer or a handle 706 that references a video surface object to be created. In at least one embodiment, this pointer is returned for future use in accessing and managing said video surface object. In at least one embodiment, said parameters include a resource descriptor 708 for video memory, which specifies details about GPU memory storage for storing a compressed video, such as its type, layout, or address. In at least one embodiment, said parameters include a frame range 710, which defines start and end frames to be associated with said video surface object. In at least one embodiment, this parameter allows selective operations on specific segments of a compressed video stored in GPU memory described by resource descriptor 708.

In at least one embodiment, response 704 includes a status 716 as output of said invocation. In at least one embodiment, status 716 is a code, value, or other information indicating whether said video surface object creation operation was successfully performed. In at least one embodiment, for example, a value of 0 or true may indicate successful creation, while a value of 1 or false may indicate an error or failure in creating said video surface object.

In at least one embodiment, at least one feature described in connection with FIG. 7 is implemented using at least one feature of any system(s) and/or process(es) depicted in and/or described in connection with FIGS. 1-6 and 8-34. In at least one embodiment, at least one feature described in connection with FIG. 7 is used to implement at least a portion of any system(s) and/or process(es) depicted in and/or described with respect to FIGS. 1-6 and 8-34.

Figure 8:
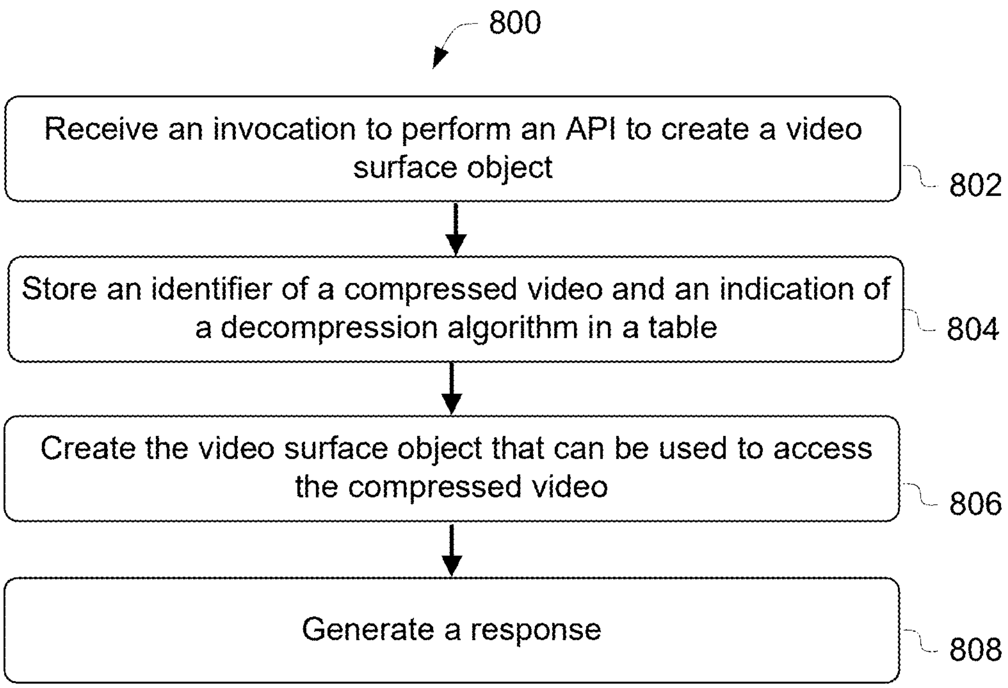
FIG. 8 is a flowchart diagram illustrating a process of creating a video surface object in accordance with at least one embodiment.

FIG. 8 is a flowchart diagram illustrating a process 800 of creating a video surface object in accordance with at least one embodiment. In at least one embodiment, process 800 is performed at least in part on a computer system such as those described elsewhere in this disclosure. In at least one embodiment, process 800 is performed by a GPU.

In at least one embodiment, at step 802, said processor receives an invocation to perform an API to create a video surface object. In at least one embodiment, said invocation can be initiated from within a GPU kernel, such as video reader 114 and/or video writer 116 as described in connection with FIG. 1. In at least one embodiment, this invocation includes input parameters, such as a video identifier that uniquely identifies a compressed video in GPU memory and an indication of a decompression algorithm to be applied to frames of said video. In at least one embodiment, said video identifier can be a reference, handle, or a pointer to said compressed video. In at least one embodiment, said video identifier a piece of information can be automatically generated by said GPU.

In at least one embodiment, at step 804, said processor stores said video identifier and said indication of said decompression algorithm in a metadata table managed by a GPU driver. In at least one embodiment, said metadata table links said video identifier to said decompression algorithm, enabling subsequent APIs to retrieve this information for decompressing and processing video frames.

In at least one embodiment, at step 806, said processor creates said video surface object. In at least one embodiment, said video surface object acts as a logical handle or reference that links said compressed video stored in GPU memory to metadata stored in a metadata table managed by a GPU driver. In at least one embodiment, this object enables efficient access to and processing of said video using a specified decompression algorithm by one or more other APIs. In at least one embodiment, when said API is invoked to create a video surface object, said invocation takes as input a resource descriptor, which serves as an indirect reference to a compressed video stored in GPU memory. In at least one embodiment, when another API uses said video surface object to access a compressed video, said other API treats said video surface object as an identifier of said compressed video (e.g., an address or pointer to GPU memory where said compressed video is stored). In at least one embodiment, said other API queries said metadata table using said video surface object to determine a decompression algorithm associated with said compressed video, which is then used to decompress said video.

In at least one embodiment, at step 808, said processor generates a response indicating a result of said API invocation. In at least one embodiment, said response includes a status indicator. For example, a status of 0 or true may indicate successful creation of said video surface object, while a status of 1 or false may indicate an error or failure in creating said object.

In at least one embodiment, at least one feature described in connection with FIG. 8 is implemented using at least one feature of any system(s) and/or process(es) depicted in and/or described in connection with FIGS. 1-7 and 9-34. In at least one embodiment, at least one feature described in connection with FIG. 8 is used to implement at least a portion of any system(s) and/or process(es) depicted in and/or described with respect to FIGS. 1-7 and 9-34.

Figure 9:
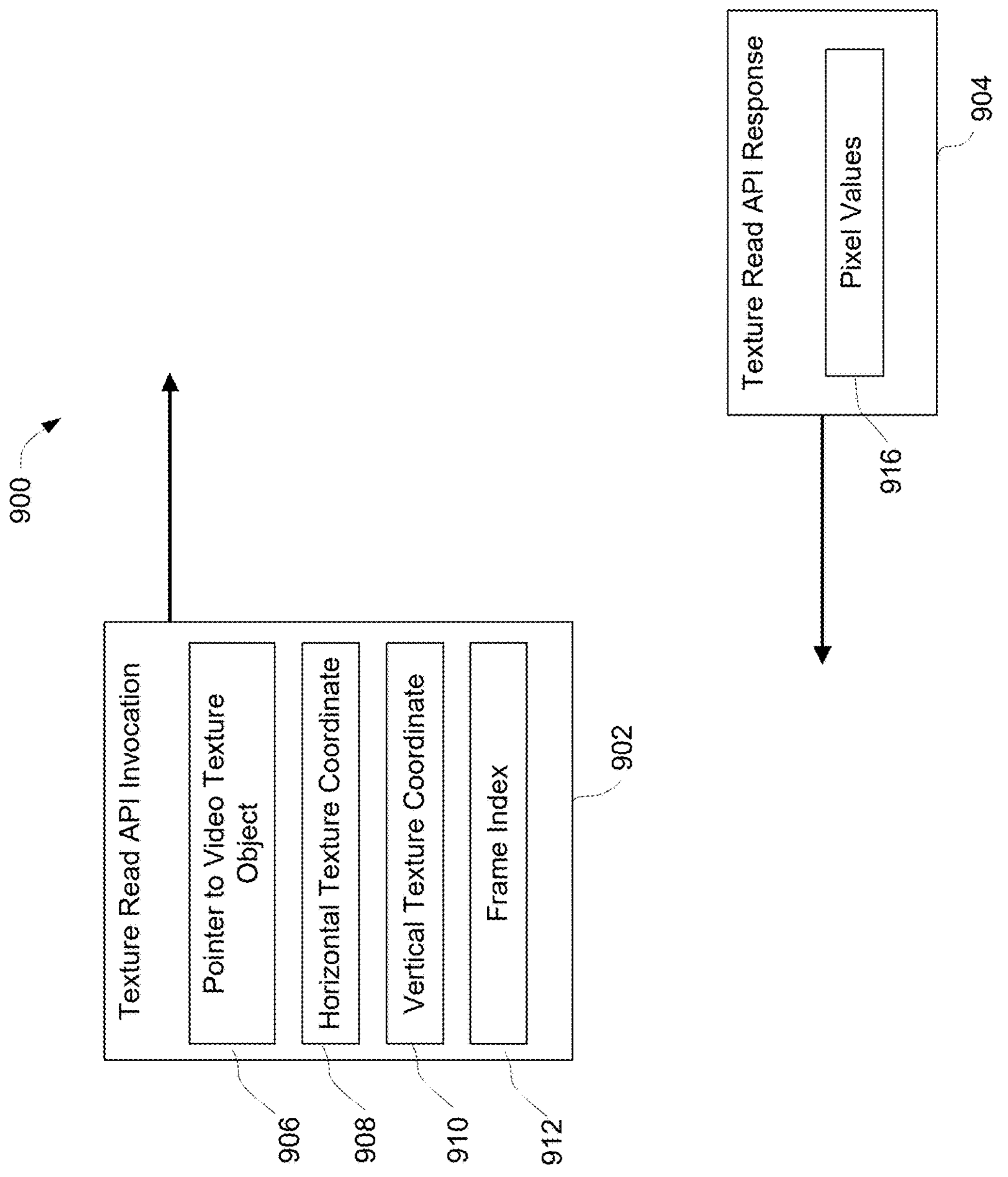
FIG. 9 is a block diagram illustrating a texture read operation ("operation") in accordance with at least one embodiment.

FIG. 9 is a block diagram illustrating a texture read operation 900 ("operation 900") in accordance with at least one embodiment. In at least one embodiment, operation 900 includes one or more computational operations that cause a processor (e.g., a GPU) to fetch pixel data from a specified video frame using specified texture coordinates and to perform interpolation of two more pixels of said pixel data.

In at least one embodiment, operation 900 includes a texture read API invocation 902 ("invocation 902") and a texture read API response 904 ("response 904"). In at least one embodiment, invocation 902 is a function call initiated by one or more software programs, such as kernel functions executed by GPUs or other parallel processing units. In at least one embodiment, said function call invokes an instruction to fetch pixel data from a selected video frame. In at least one embodiment, said instruction, when performed, causes a processor to access pixel data at specified coordinates within a particular video frame and perform interpolation of two or more pixels of said selected video frame.

In at least one embodiment, invocation 902 takes a plurality of parameters 906-910. In at least one embodiment, said parameter includes a pointer to a video texture object 906, which is reference to a video texture object. In at least one embodiment, said video texture object contains metadata and resource mappings necessary to locate said video frame data in GPU memory. In at least one embodiment, said video texture object serves as a logical abstraction that encapsulates metadata and resource mappings necessary to efficiently access and process video frame data stored in GPU memory. In at least one embodiment, this metadata includes details such as a unique video identifier, a range of frames associated with said video texture object, a decompression algorithm for compressed video formats, and interpolation settings such as bilinear or nearest-neighbor methods for pixel sampling. In at least one embodiment, this metadata also describes a video format, such as RGBA or YUV, to ensure proper interpretation of pixel values. In at least one embodiment, said video texture object contains resource mappings that define how video data is organized and accessed. In at least one embodiment, resource mappings include a memory layout, an exact memory address where a compressed video is stored, and links to resource descriptors specifying memory type and accessibility settings.

In at least one embodiment, said parameters of invocation 902 includes a horizontal texture coordinate 908, which specifies a x-coordinate in a selected frame from which to fetch pixel data. In at least one embodiment, this value can be normalized (e.g., in a range [0, 1]) or unnormalized (e.g., specified in texels). In at least one embodiment, said parameters of invocation 902 includes a vertical texture coordinate 910, which specifies a y-coordinate in said selected frame from which to fetch pixel data. In at least one embodiment, like said horizontal coordinate, this vertical coordinate can also be normalized or unnormalized. In at least one embodiment, said parameters of invocation 902 includes a frame index (optional): although not explicitly shown in said diagram, some implementations of said API may include a frame index 912 to indicate a specific frame within a video batch from which to fetch pixel data.

In at least one embodiment, response 904 includes pixel values 916 read from a location specified by horizontal texture coordinate 908 and vertical texture coordinate 910 on a frame indicated by frame index 912. In at least one embodiment, returned pixel values 916 includes information about color and intensity of one or more pixels, enabling video editing or processing applications to analyze or manipulate that portion of said video frame.

In at least one embodiment, at least one feature described in connection with FIG. 9 is implemented using at least one feature of any system(s) and/or process(es) depicted in and/or described in connection with FIGS. 1-8 and 10-34. In at least one embodiment, at least one feature described in connection with FIG. 9 is used to implement at least a portion of any system(s) and/or process(es) depicted in and/or described with respect to FIGS. 1-8 and 10-34.

Figure 10:
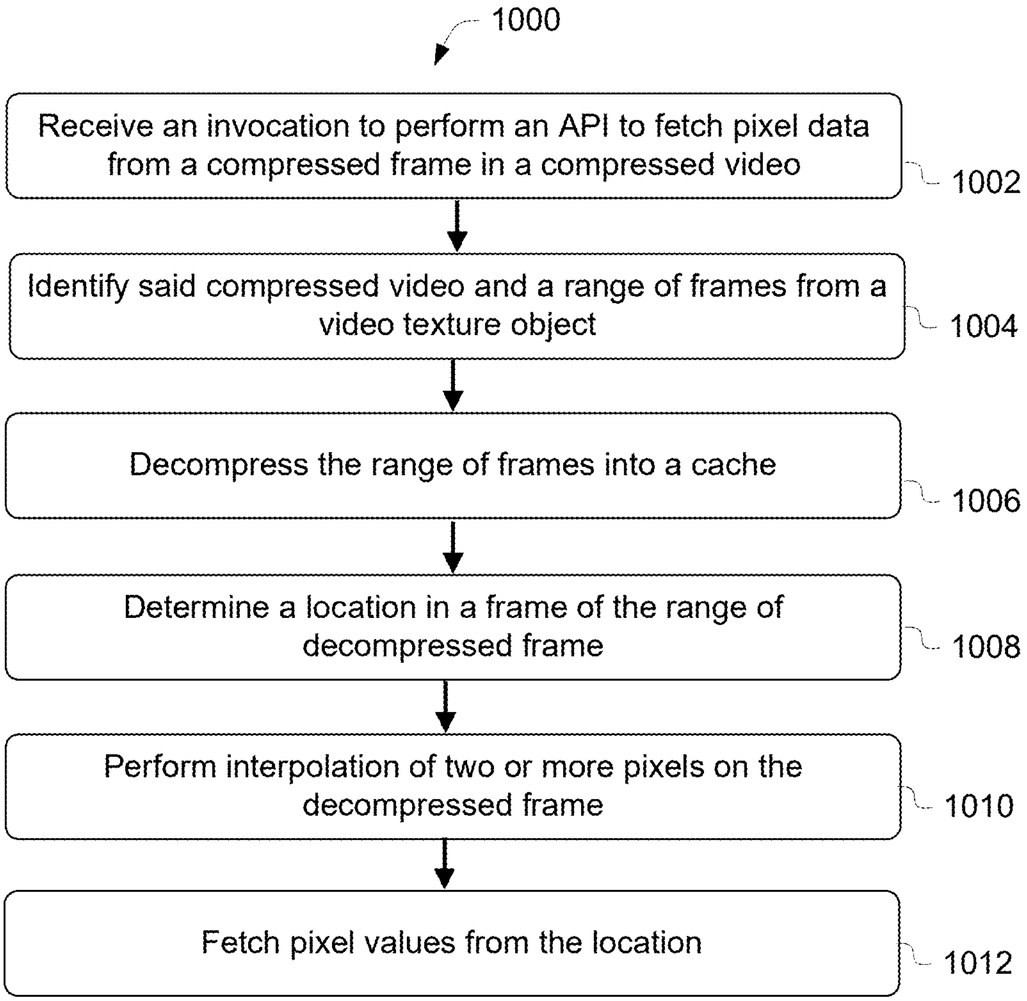
FIG. 10 is a flowchart diagram illustrating a process for fetching pixel data from a compressed frame in a compressed video in accordance with at least one embodiment.

FIG. 10 is a flowchart diagram illustrating a process 1000 for fetching pixel data from a compressed frame in a compressed video in accordance with at least one embodiment. In at least one embodiment, process 1000 is performed at least in part on a computer system such as those described elsewhere in this disclosure. In at least one embodiment, process 1000 is performed by a processor such as a GPU.

In at least one embodiment, at step 1002, said processor receives an invocation to perform an API to fetch pixel data from a compressed frame in a compressed video. In at least one embodiment, this invocation includes input parameters such as a pointer to a video texture object, horizontal and vertical texture coordinates, and a frame index specifying a frame of said compressed video.

In at least one embodiment, at step 1004, said processor identifies said compressed video and a range of frames associated said video texture object. In at least one embodiment, said video texture object contains metadata and resource mappings that allow said processor to locate video data stored in GPU memory and determine a range of frames accessible via said API.

In at least one embodiment, at step 1006, said processor decompresses said identified range of frames into a cache. In at least one embodiment, a decompression algorithm specified in said video texture object is applied to said compressed video data to convert each of said ranges of frames into a usable, decompressed format.

In at least one embodiment, at step 1008, said processor determines a location within said decompressed frame based on a horizontal and vertical texture coordinates provided in said invocation. In at least one embodiment, these coordinates specify an exact pixel or region of interest within said compressed frame, which has been decompressed.

In at least one embodiment, at step 1010, said processor performs interpolation of two or more pixels in said decompressed frame if said texture coordinates do not align precisely with texel centers, for example, when said specified texture coordinates fall between discrete texels (texture elements) in said decompressed frame. In at least one embodiment, a texel is a pixel in a different context. In at least one embodiment, while a texel is an individual element of a texture stored in memory, a pixel is a smallest individual point of color in a digital image displayed on a screen. In at least one embodiment, said interpolation algorithm (e.g., bilinear or nearest-neighbor interpolation) specified during creation of said video texture object is applied to calculate interpolated pixel values. In at least one embodiment, said interpolation algorithm to be used is determined based on metadata stored that match said video texture object. In at least one embodiment, if said metadata does not specify an interpolation algorithm, a default method for sampling pixel values can be used. In at least one embodiment, said interpolation process occurs directly on said decompressed frame data stored in a GPU cache or shared memory. In at least one embodiment, said processor uses decompressed pixel data as input for interpolation computations.

In at least one embodiment, at step 1012, said processor fetches pixel values from said computed location in said decompressed frame. In at least one embodiment, said fetched pixel values are then returned as an output of said API for further processing by a GPU kernel.

In at least one embodiment, at least one feature described in connection with FIG. 10 is implemented using at least one feature of any system(s) and/or process(es) depicted in and/or described in connection with FIGS. 1-9 and 11-34. In at least one embodiment, at least one feature described in connection with FIG. 10 is used to implement at least a portion of any system(s) and/or process(es) depicted in and/or described with respect to FIGS. 1-9 and 11-34.

Figure 11:
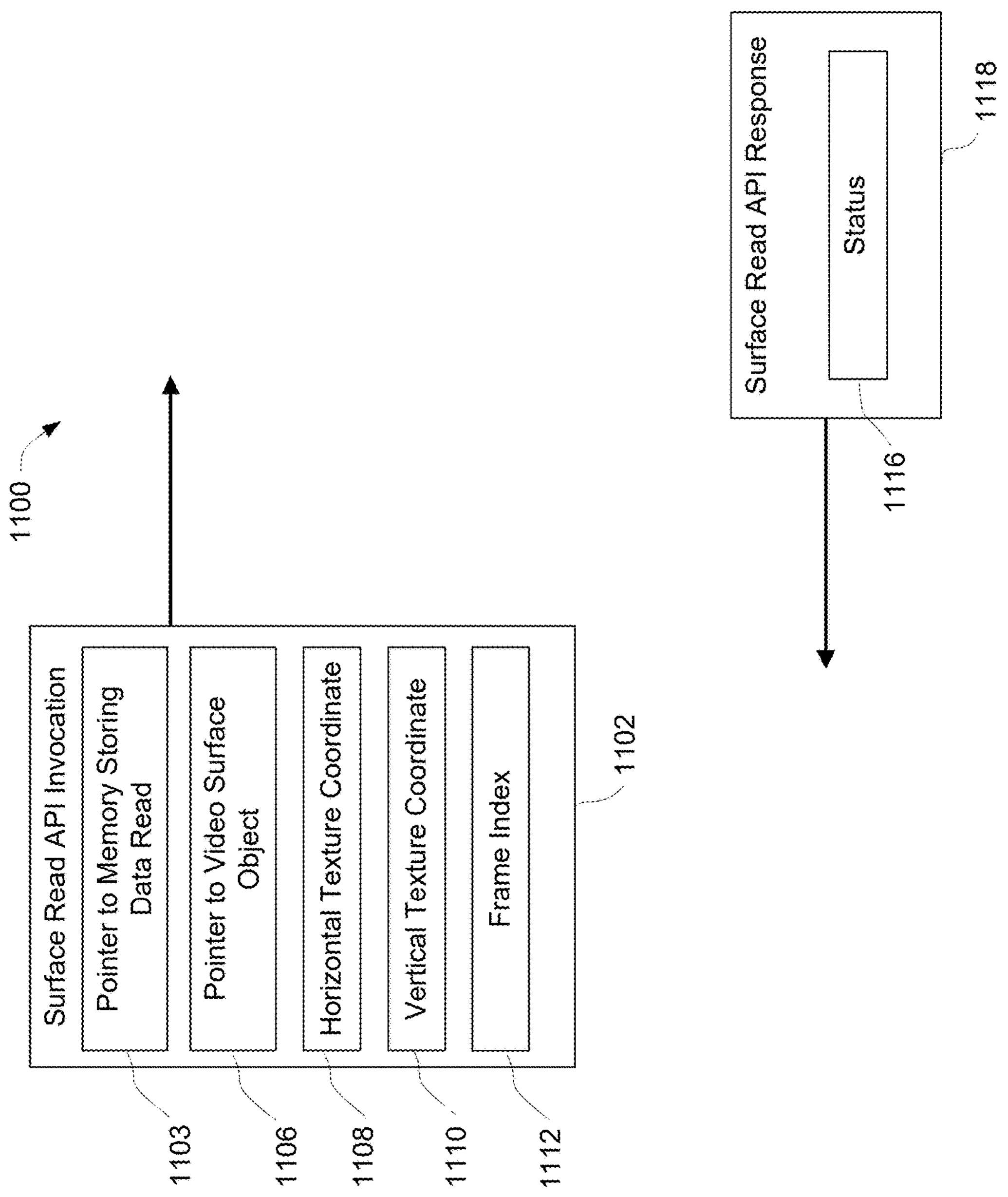
FIG. 11 is a block diagram illustrating a surface read operation ("operation") in accordance with at least one embodiment.

FIG. 11 is a block diagram illustrating a surface read operation 1100 ("operation 1100") in accordance with at least one embodiment. In at least one embodiment, operation 1100 includes one or more computational operations that cause a processor (e.g., a GPU) to read pixel data from a specified video frame stored in GPU memory and return said result to memory specified by said caller.

In at least one embodiment, operation 1100 includes a surface read API invocation 1102 ("invocation 1102") and a surface read API response 1118 ("response 1118"). In at least one embodiment, invocation 1102 is a function call initiated by software programs, such as video editing or rendering applications, to access pixel data at specified coordinates in a selected frame of a video. In at least one embodiment, said function call invokes said surface read API to instruction to retrieve properties of one or more pixels at specified coordinates on a selected frame from a range of frames of a compressed video stored in GPU memory. In at least one embodiment, said retrieved properties describe visual characteristics of one or more pixels, such as its color values, intensity, or other relevant attributes. In at least one embodiment, this information is used to perform video editing tasks, such as adjusting colors or brightness of a particular video frame. In at least one embodiment, retrieving properties of pixels is also referred as to indicating properties of pixels.

In at least one embodiment, invocation 1102 takes a plurality of parameters 1103-1112. In at least one embodiment, said parameters include a pointer to memory storing data read 1103, which is a reference to a memory location where fetched property data will be stored. In at least one embodiment, said parameters include a pointer to a video surface object 1106, which is a reference to an object linking video data stored in GPU memory to metadata and decompression algorithms required for processing. In at least one embodiment, said parameters include a horizontal texture coordinate 1108, which specifies an x-coordinate in a selected frame from which to read property data of pixels. In at least one embodiment, this value can be normalized (e.g., in a range [0, 1]) or unnormalized (e.g., given in texels). In at least one embodiment, said parameters include a vertical texture coordinate 1110, which specifies said y-coordinate in said selected frame. In at least one embodiment, like said horizontal coordinate, this vertical coordinate can also be normalized or unnormalized. In at least one embodiment, said parameters include a frame index 1112, which indicates said specific frame within said video to be accessed.

In at least one embodiment, response 1118 includes a status 1116 as output. In at least one embodiment, status 1116 is a code, value, or other information that indicates whether said surface read operation was successfully performed. In at least one embodiment, for example, a status value of 0 may indicate success, while a non-zero status value may indicate errors, such as invalid parameters or inaccessible memory.

In at least one embodiment, at least one feature described in connection with FIG. 11 is implemented using at least one feature of any system(s) and/or process(es) depicted in and/or described in connection with FIGS. 1-10 and 12-34. In at least one embodiment, at least one feature described in connection with FIG. 11 is used to implement at least a portion of any system(s) and/or process(es) depicted in and/or described with respect to FIGS. 1-10 and 12-34.

Figure 12:
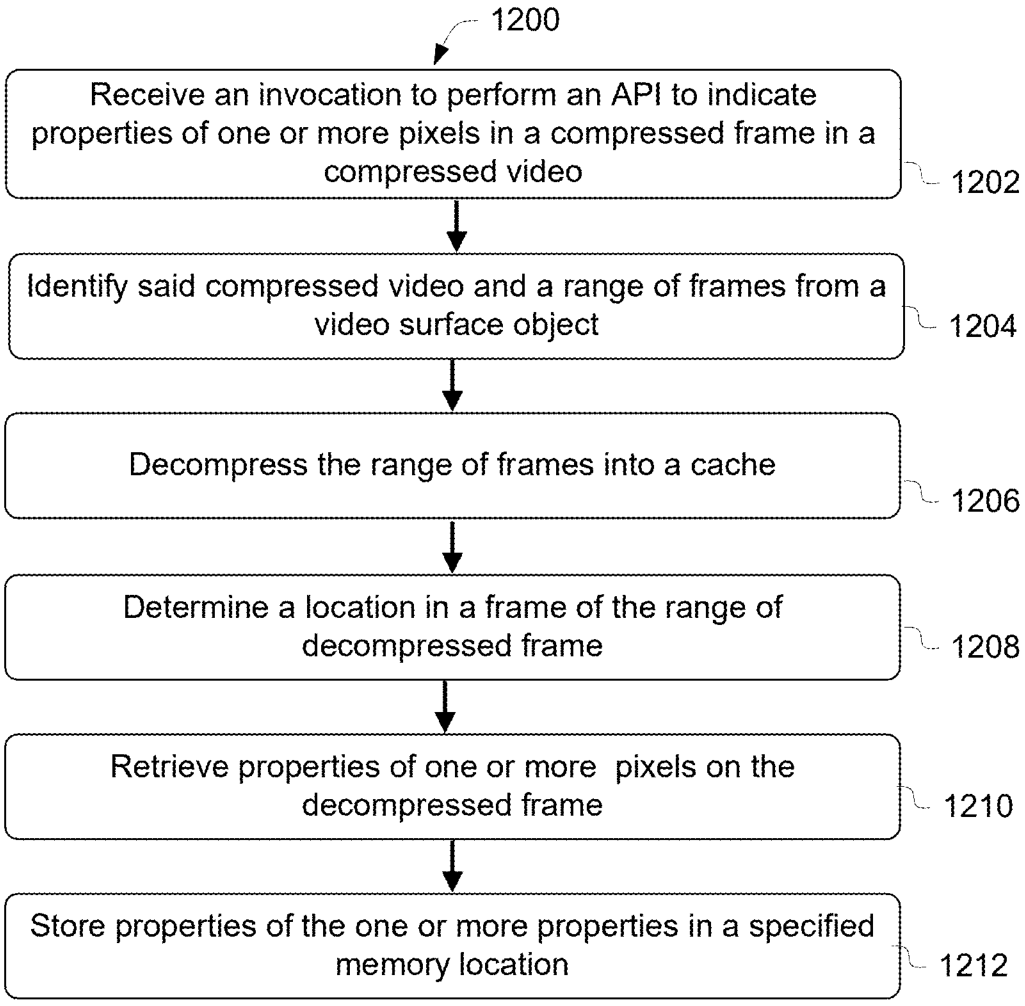
FIG. 12 is a flowchart diagram illustrating a process for indicating properties of one or more pixels in a compressed frame in a compressed video in accordance with at least one embodiment.

FIG. 12 is a flowchart diagram illustrating a process 1200 for indicating properties of one or more pixels in a compressed frame in a compressed video in accordance with at least one embodiment. In at least one embodiment, process 1200 is performed at least in part on a computer system such as those described elsewhere in this disclosure. In at least one embodiment, process 1200 is performed by a processor such as a GPU.

In at least one embodiment, at step 1202, said processor receives an invocation to perform an API to indicate properties of one or more pixels in a compressed a compressed frame in a compressed video. In at least one embodiment, this invocation includes input parameters such as a pointer to a video surface object, horizontal and vertical texture coordinates, and a frame index specifying said frame of said compressed video.

In at least one embodiment, at step 1204, said processor identifies said compressed video and a range of frames associated with said video surface object. In at least one embodiment, said video surface object contains metadata and resource mappings that allow said processor to locate said video data stored in GPU memory and determine said range of frames accessible via said API.

In at least one embodiment, at step 1206, said processor decompresses said identified range of frames into a cache. In at least one embodiment, a decompression algorithm specified in said video surface object is applied to said compressed video data to convert said range of frames into a usable, decompressed format.

In at least one embodiment, at step 1208, said processor determines a location within said decompressed frame based on said horizontal and vertical texture coordinates provided in said invocation. In at least one embodiment, these coordinates specify an exact pixel or region of interest within said decompressed frame.

In at least one embodiment, at step 1210, said processor retrieves said properties of one or more pixels from said decompressed frame. In at least one embodiment, these properties include attributes such as color, intensity, or transparency, which describe said visual characteristics of said pixel or pixels in said decompressed frame.

In at least one embodiment, at step 1212, said processor stores said properties of said one or more pixels in a specified memory location. In at least one embodiment, this memory location is provided as an input parameter in said API invocation, enabling efficient transfer of said pixel properties for further processing or analysis.

In at least one embodiment, at least one feature described in connection with FIG. 12 is implemented using at least one feature of any system(s) and/or process(es) depicted in and/or described in connection with FIGS. 1-11 and 13-34. In at least one embodiment, at least one feature described in connection with FIG. 12 is used to implement at least a portion of any system(s) and/or process(es) depicted in and/or described with respect to FIGS. 1-11 and 13-34.

Figure 13:
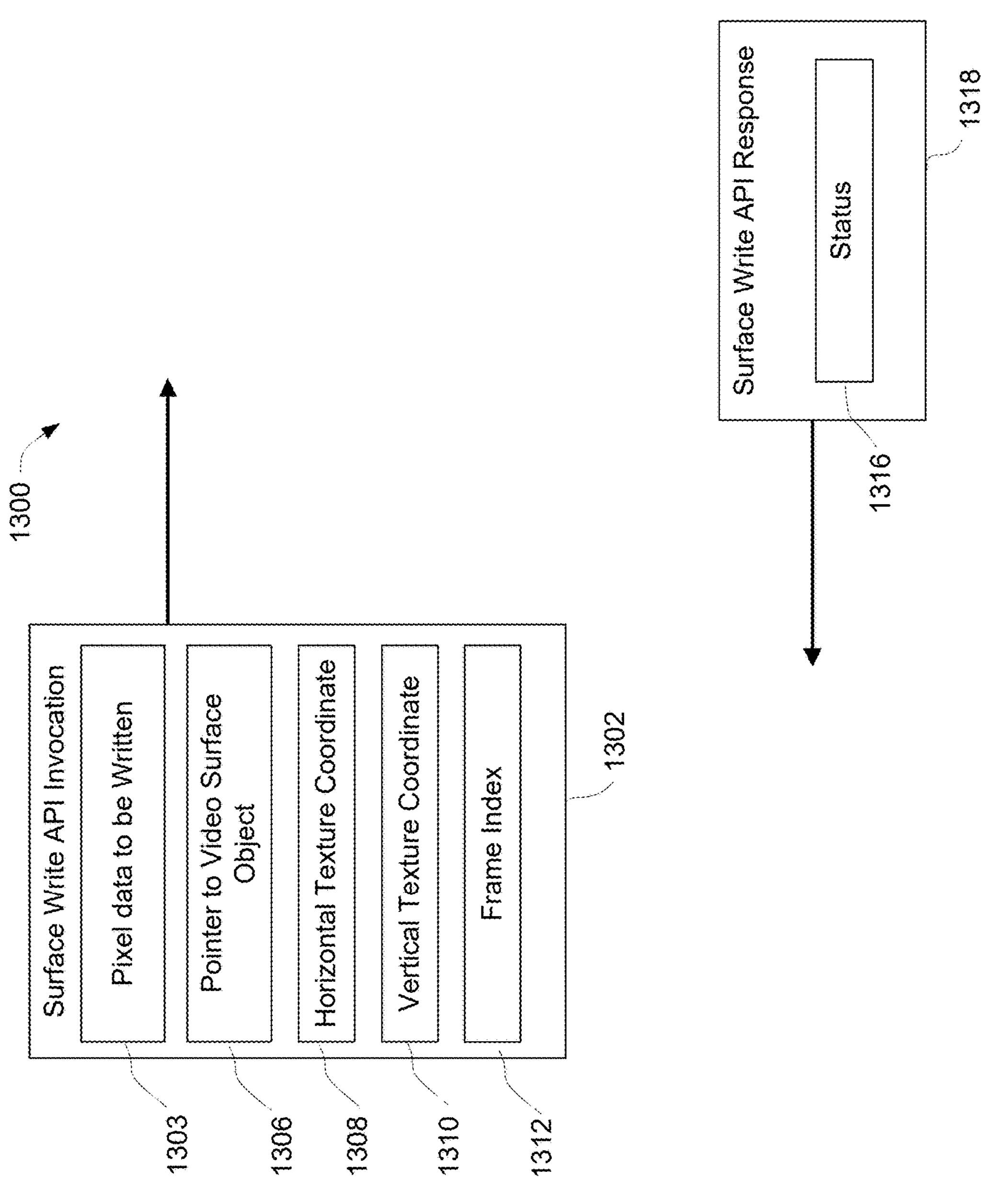
FIG. 13 is a block diagram illustrating a surface write operation ("operation") in accordance with at least one embodiment.

FIG. 13 is a block diagram illustrating a surface write operation 1300 ("operation 1300") in accordance with at least one embodiment. In at least one embodiment, operation 1300 includes one or more computational operations that cause a processor (e.g., a GPU) to write pixel data to a specified location in a selected video frame stored in GPU memory.

In at least one embodiment, operation 1300 includes a surface write API invocation 1302 ("invocation 1302") and a surface write API response 1118 ("response 1118"). In at least one embodiment, invocation 1302 is a function call initiated by one or more software programs, such as rendering or editing applications, to write pixel data to a specified location in a selected video frame. In at least one embodiment, said function call invokes an instruction to locate said video surface object, access said corresponding video frame, and write said pixel data to said specified coordinates on a selected frame.

In at least one embodiment, invocation 1302 takes a plurality of parameters 1303-1312. In at least one embodiment, said parameters include pixel data to be written 1303, which specifies said pixel value (e.g., color, intensity) that will be written to said video frame. In at least one embodiment, said parameters include a pointer to a video surface object 1306, which is a reference to an object that provides access to said compressed video data stored in GPU memory and links it to associated metadata and decompression algorithms. In at least one embodiment, said parameters include a horizontal texture coordinate 1308, which specifies said x-coordinate in said selected video frame where said pixel data will be written. In at least one embodiment, this value can be normalized (e.g., in a range [0, 1]) or unnormalized (e.g., specified in texels). In at least one embodiment, said parameters include a vertical texture coordinate 1310, which specifies said y-coordinate in said selected video frame where said pixel data will be written. In at least one embodiment, like said horizontal coordinate, this vertical coordinate can also be normalized or unnormalized. In at least one embodiment, said parameters include a frame index 1312, which indicates said specific frame in said video where said pixel data will be written.

In at least one embodiment, response 1318 includes a status 1316 as output. In at least one embodiment, status 1316 is a code, value, or other information that indicates whether said surface write operation was successfully performed. For example, a status value of 0 may indicate success, while a non-zero status value may indicate errors such as invalid texture coordinates, inaccessible video surface objects, or memory conflicts.

In at least one embodiment, at least one feature described in connection with FIG. 13 is implemented using at least one feature of any system(s) and/or process(es) depicted in and/or described in connection with FIGS. 1-12 and 14-34. In at least one embodiment, at least one feature described in connection with FIG. 13 is used to implement at least a portion of any system(s) and/or process(es) depicted in and/or described with respect to FIGS. 1-12 and 14-34.

Figure 14:
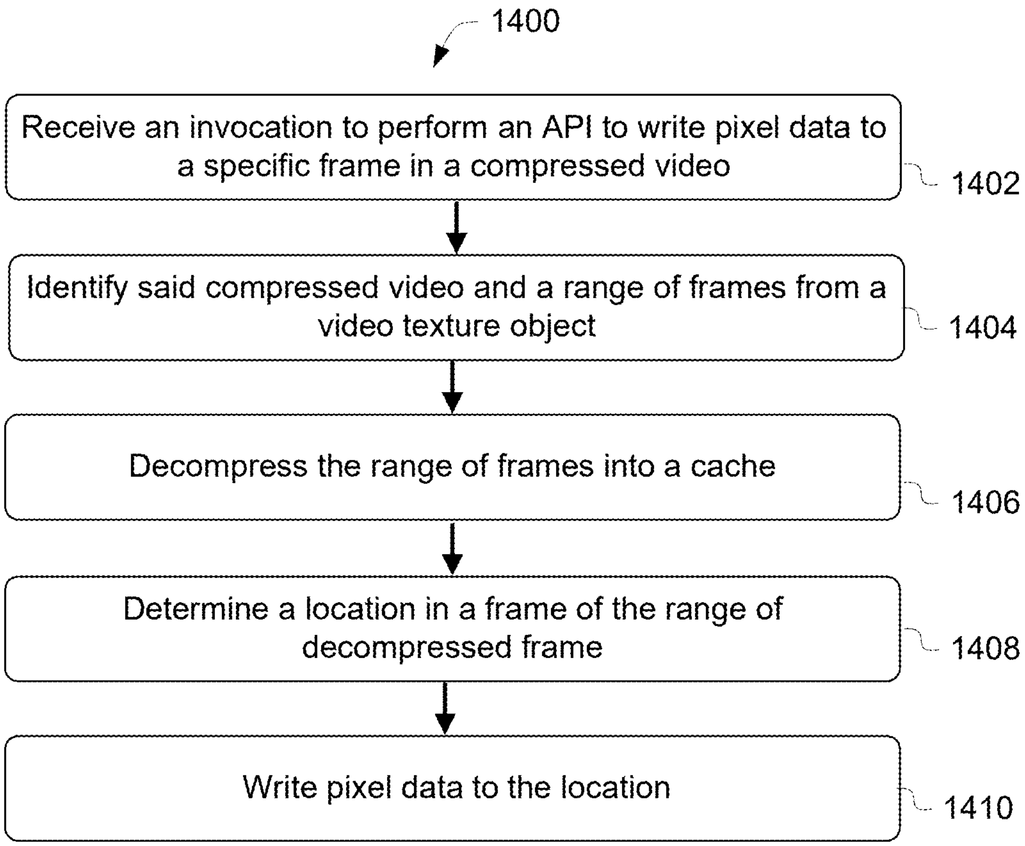
FIG. 14 is a flowchart diagram illustrating a process for writing pixel data to a specific frame in a compressed video in accordance with at least one embodiment.

FIG. 14 is a flowchart diagram illustrating a process 1400 for writing pixel data to a specific frame in a compressed video in accordance with at least one embodiment. In at least one embodiment, process 1400 is performed at least in part on a computer system such as those described elsewhere in this disclosure. In at least one embodiment, process 1400 is performed by a processor such as a GPU.

In at least one embodiment, at step 1402, said processor receives an invocation to perform an API to write pixel data to a specific frame in a compressed video. In at least one embodiment, said invocation includes input parameters such as pixel data to be written, a pointer to a video texture object, horizontal and vertical texture coordinates, and a frame index specifying said frame in said compressed video.

In at least one embodiment, at step 1404, said processor identifies said compressed video and a range of frames associated with said video texture object. In at least one embodiment, said video texture object contains metadata and resource mappings that allow said processor to locate said video data stored in GPU memory and determine said range of frames accessible via said API.

In at least one embodiment, at step 1406, said processor decompresses said identified range of frames into a cache. In at least one embodiment, a decompression algorithm specified in said video texture object is applied to said compressed video data to convert said range of frames into a usable, decompressed format.

In at least one embodiment, at step 1408, said processor determines a location within said decompressed frame based on said horizontal and vertical texture coordinates provided in said invocation. In at least one embodiment, said coordinates specify said exact pixel or region of interest within said compressed frame that has been decompressed.

In at least one embodiment, at step 1410, said processor writes said provided pixel data to said determined location within said decompressed frame. In at least one embodiment, said step modifies said pixel values at said specified coordinates to reflect said data provided in said API invocation.

In at least one embodiment, at least one feature described in connection with FIG. 14 is implemented using at least one feature of any system(s) and/or process(es) depicted in and/or described in connection with FIGS. 1-13 and 15-34. In at least one embodiment, at least one feature described in connection with FIG. 14 is used to implement at least a portion of any system(s) and/or process(es) depicted in and/or described with respect to FIGS. 1-13 and 15-34.

Figure 15:
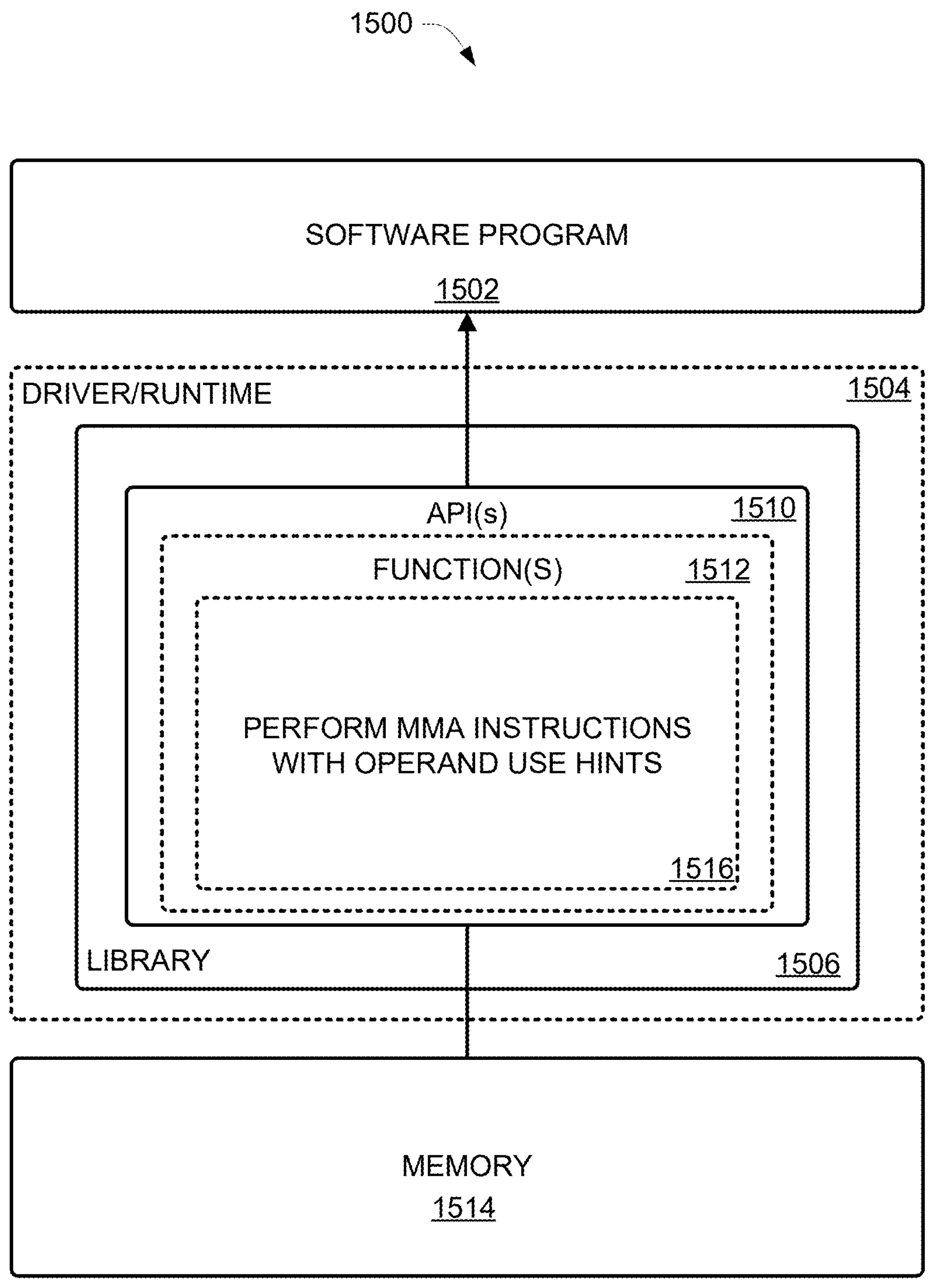
FIG. 15 is a block diagram illustrating a driver and/or runtime comprising one or more libraries to provide one or more application programming interfaces (APIs), in accordance with at least one embodiment.

FIG. 15 is a block diagram 1500 illustrating a driver and/or runtime comprising one or more libraries to provide one or more application programming interfaces (APIs), in accordance with at least one embodiment. In at least one embodiment, a software program 1502 is a software module stored on a processor, such as those described in FIG. 1. In at least one embodiment, software program 1502 comprises one or more software modules. In at least one embodiment, software program 1502 is a collection of software code, commands, instructions, or other sequences of text to instruct a computing device to perform one or more computational operations and/or invoke one or more other sets of instructions, such as one or more APIs 1510 or one or more API functions 1512, to be executed. In at least one embodiment, a software program is a compiler.

In at least one embodiment, one or more APIs 1510 are sets of software instructions that, if executed, cause one or more processors to perform one or more computational operations. In at least one embodiment, one or more APIs 1510 are distributed or otherwise provided as a part of one or more libraries 1506, runtimes 1504, drivers, and/or any other grouping of software and/or executable code further described herein. In at least one embodiment, one or more APIs 1510 perform one or more computational operations in response to invocation by software program 1502. In at least one embodiment, functionality provided by one or more APIs 1510 includes one or more software functions 1512, such as those usable to accelerate one or more portions of software program 1502 using one or more parallel processing units (PPUs), such as graphics processing units (GPUs).

In at least one embodiment, one or more APIs 1510 are hardware interfaces to one or more circuits to perform one or more computational operations. In at least one embodiment, one or more APIs 1510 described herein are implemented as one or more circuits to perform one or more techniques described in conjunction with FIGS. 1-14. In at least one embodiment, software program 1502 comprises instructions that, if executed, cause one or more hardware devices and/or circuits to perform one or more techniques described above in conjunction with FIGS. 1-20.

In at least one embodiment, software program 1502, such as user-implemented software programs, utilizes one or more APIs 1510 to perform various computing operations, such as memory reservation, matrix multiplication, arithmetic operations, or any computing operation performed by parallel processing units (PPUs), such as graphics processing units (GPUs), as further described herein. In at least one embodiment, one or more APIs 1510 provide a set of callable functions 1512, referred to herein as APIs, API functions, and/or functions, that individually perform one or more computing operations, such as computing operations related to parallel computing.

In at least one embodiment, software programs 1502 interacts or otherwise communicates with one or more APIs 1510 to perform one or more computing operations using one or more PPUs, such as GPUs. In at least one embodiment, said computing operations comprise at least one or more groups of computing operations to be accelerated by execution at least in part by said PPUs. In at least one embodiment, software program 1502 interacts with one or more APIs 1510 to facilitate parallel computing using a remote or local interface.

In at least one embodiment, an interface is software instructions that, if executed, provide access to one or more functions 1512 provided by one or more APIs 1510. In at least one embodiment, software program 1502 uses a local interface when a software developer compiles said software program in conjunction with one or more libraries 1506 that comprise or otherwise provide access to one or more APIs 1510. In at least one embodiment, software program 1502 is compiled statically in conjunction with pre-compiled libraries 1506 or uncompiled source code comprising instructions to perform one or more APIs 1510. In at least one embodiment, software program 1502 is compiled dynamically and said one or more software programs utilize a linker to link to one or more pre-compiled libraries 1506 comprising one or more APIs 1510.

In at least one embodiment, a software program 1502 uses a remote interface when a software developer executes a software program that utilizes or otherwise communicates with a library 1506 comprising one or more APIs 1510 over a network or other remote communication medium. In at least one embodiment, one or more libraries 1506 comprising one or more APIs 1510 are to be performed by a remote computing service, such as a computing resource services provider. In another embodiment, one or more libraries 1506 comprising one or more APIs 1510 are to be performed by any other computing host providing said one or more APIs 1510 to software program 1502.

In at least one embodiment, software programs 1502 utilizes one or more APIs 1510 to allocate and otherwise manage memory to be used by software program 1502. In at least one embodiment, software program 1502 utilizes one or more APIs 1510 to allocate and otherwise manage memory to be used by one or more portions of software program 1502 that are to be accelerated using one or more PPUs, such as GPUs or any other accelerator or processor further described herein. In at least one embodiment, software program 1502 selects one or more portions of one or more neural networks to deactivate during training of said one or more neural networks based, at least in part, on whether said one or more portions would be used after training of said one or more neural networks.

In at least one embodiment, each of one or more APIs 1510 is an API to facilitate parallel computing. In at least one embodiment, each of one or more API 1510 is any other API further described herein. In at least one embodiment, each of one or more APIs 1510 is provided by a driver and/or runtime 1504. In at least one embodiment, each of one or more API 1510 is provided by a CUDA user-mode driver. In at least one embodiment, each of one or more APIs 1510 is provided by a CUDA runtime. In at least one embodiment, a driver is data values and software instructions that, if executed, perform or otherwise facilitate operation of one or more functions 1512 of one of one or more APIs 1510 during load and execution of one or more portions of software program 1502. In at least one embodiment, a runtime 1504 is data values and software instructions that, if executed, perform or otherwise facilitate operation of one or more functions 1512 of one of one or more APIs 1510 during execution of software program 1502. In at least one embodiment, software program 1502 utilizes one or more APIs 1510 implemented or otherwise provided by a driver and/or runtime 1504 to perform combined arithmetic operations by said software program 1502 during execution by one or more PPUs, such as GPUs.

In at least one embodiment, software program 1502 utilizes one or more APIs 1510 provided by a driver and/or runtime 1504 to perform combine arithmetic operations of one or more PPUs, such as GPUs. In at least one embodiment, one or more APIs 1510 provide combined arithmetic operations through a driver and/or runtime 1504, as described above. In at least one embodiment, software program 1502 utilizes one or more APIs 1510 provided by a driver and/or runtime 1504 to allocate or otherwise reserve one or more blocks of memory 1514 of one or more PPUs, such as GPUs. In at least one embodiment, software program 1502 utilizes one or more APIs 1510 provided by a driver and/or runtime 1504 to allocate or otherwise reserve blocks of memory. In at least one embodiment, one or more APIs 1510 are to perform combined arithmetic operations, as described herein in conjunction with any FIGS. 1-14.

In at least one embodiment, block diagram 1500 depicts a processor, comprising one or more circuits to perform one or more software programs to combine two or more application programming interfaces (APIs) into a single API. In at least one embodiment, block diagram 1500 depicts a system, comprising one or more processors to perform one or more software programs to combine two or more application programming interfaces (APIs) into a single API. In at least one embodiment, an API is used to identify one or more expected software outputs to be used to compare with one or more other software outputs to be generated by software.

In at least one embodiment, some or all of processes described herein (or any other processes described, or variations and/or combinations of those processes) may be performed under control of one or more computer systems configured with executable instructions and/or other data and may be implemented as executable instructions executing collectively on processor 100 or a combination of a plurality of processors 100. In at least one embodiment, executable instructions and/or other data may be stored on a non-transitory computer-readable storage medium (e.g., a computer program persistently stored on magnetic, optical, or flash media).

Figure 16:
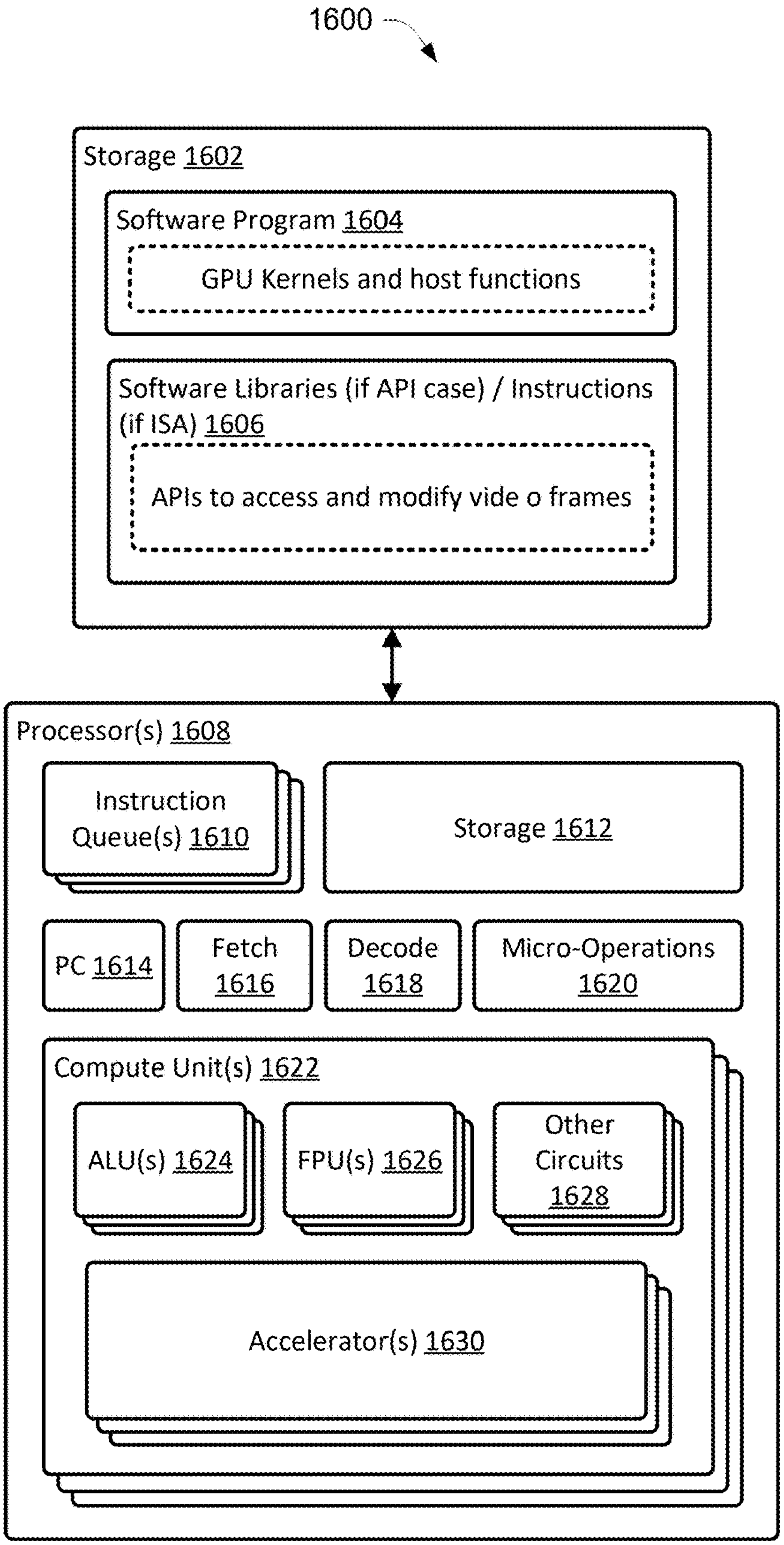
FIG. 16 illustrates an example of a system 1600 that can include software and hardware to perform a plurality of APIs to access or modify one or more frames in a compressed video or otherwise perform any of the operations described herein, according to at least one embodiment.

FIG. 16 illustrates an example of a system 1600 that can include software and hardware to perform a plurality of APIs to access or modify one or more frames in a compressed video or otherwise perform any of the operations described herein, according to at least one embodiment. System 1600 can include storage 1602 and processor(s) 1608. Storage 1602 can include, for example, memory, cache, or other storage described further herein. Storage 1602 can be separate from processor(s) 1608, or storage 1602 can be included in processor(s) 1608 (e.g., in storage 1612). In at least one embodiment, software program 1604 and/or software libraries (or instructions) 1606 can be stored in memory, cache, or other storage and provided to processor(s) 1608 to cause one or more circuits of processor(s) 1608 to perform operations described herein. In at least one embodiment, software program 1604 and/or software libraries (or instructions) 1606 can be integrated into one or more circuits of processor(s) 1608. Software program 1604, which can be used to perform any of the operations described herein, may be stored on storage 1602.

In at least one embodiment, software program 1604 can include one or more software modules. In at least one embodiment, said one or more software modules can include one or more GPU kernels and one or more host functions. In at least one embodiment, as used in any implementation described herein, unless otherwise clear from context or stated explicitly to contrary, a module refers to any combination of software logic, firmware logic, hardware logic, and/or circuitry configured to provide functionality described herein. In at least one embodiment, software is embodied as a software package, code and/or instruction set or instructions, and "hardware," as used in any implementation described herein, includes, for example, singly or in any combination, hardwired circuitry, programmable circuitry, state machine circuitry, fixed function circuitry, execution unit circuitry, and/or firmware that stores instructions performed by programmable circuitry. In at least one embodiment, modules are, collectively or individually, embodied as circuitry that forms part of a larger system, for example, an integrated circuit (IC), system on-chip (SoC), and so forth. In at least one embodiment, a module performs one or more processes in connection with any suitable processing unit and/or combination of processing units, such as one or more CPUs, GPUs, GPGPUs, PPUs, and/or variations thereof including those further described herein.

In at least one embodiment, software program 1604 can include a collection of software code, commands, instructions, or other sequences of text to instruct a computing device to perform one or more computational operations and/or invoke one or more other sets of instructions, such as API(s) or API function(s) or Instruction Set Architecture (ISA) level instructions, to be executed or otherwise performed. In at least one embodiment, said APIs, when performed, cause a processor to access and modify video frames in a compressed video. Instructions (e.g., hardware instructions) or microcode can involve ISA level instructions, which can include native ISA instructions or non-native ISA instructions. Software program 1604 and/or software libraries (or instructions) 1606 (e.g., one or more modules) can be distributed among multiple processors that communicate over a bus, network, by writing to shared memory, and/or any suitable communication process such as those described herein.

In at least one embodiment, system 1600 can include one or more software libraries 1606 that can, for example, provide one or more APIs and/or ISA instructions. In at least one embodiment, one or more APIs and/or ISA instructions can be used to cause information to be stored and to store an indication of one or more decompression algorithms to decompress said information, to cause one or more identifiers of one or more videos and one or more indications of one or more pixel interpolation algorithms to be stored, to indicate one or more decompression algorithms to be used to access one or more frames of one or more videos, to perform interpolation of two or more pixels of one or more video frames based, at least in part, on one or more frame identifiers of said one or more video frames, to indicate one or more properties of one or more pixels based, at least in part, on one or more identifiers of one or more video frames containing said one or more pixels, and to modify one or more properties of one or more pixels based, at least in part, on one or more identifiers of one or more video frames containing said one or more pixels. In at least one embodiment, one or more software libraries 1606 can be included in drivers and/or runtimes. In at least one embodiment, software libraries 1606 (e.g., including one or more APIs and/or ISA instructions) can include sets of software instructions that, if executed or otherwise performed, cause processor(s) 1608 to perform one or more computational operations, such as any of the operations described herein. In at least one embodiment, one or more APIs and/or ISA instructions can be distributed or otherwise provided as a part of one or more software libraries 1606, runtimes, drivers, and/or any other grouping of software and/or executable code further described herein. In at least one embodiment, one or more APIs and/or ISA instructions can perform one or more computational operations in response to invocation by software program 1604.

Processor(s) 1608 may include any number of processors and any suitable processing unit and/or combination of processing units, such as, but not limited to, central processing units ("CPUs"), graphics processing units ("GPUs"), or other processors (including accelerators, field programmable gate arrays (FPGAs), graphics processors, parallel processors, GPGPUs, DPUs, and/or variations thereof including those further described herein), including any processors described herein, such as, but not limited to, processors in FIGS. 18-30. In at least one embodiment, processor(s) 1608 can retrieve or fetch instructions (e.g., one or more APIs and/or ISA instructions) from storage 1602 using, for example, instruction fetch 1616 (e.g., for an Instruction Fetch stage). In at least one embodiment, said instructions can include instructions to cause information to be stored and to store an indication of one or more decompression algorithms to decompress said information. In at least one embodiment, said instructions can include instructions to cause one or more identifiers of one or more videos and one or more indications of one or more pixel interpolation algorithms to be stored. In at least one embodiment, said instructions can include instructions to indicate one or more decompression algorithms to be used to access one or more frames of one or more videos. In at least one embodiment, said instructions can include instructions to perform interpolation of two or more pixels of one or more video frames based, at least in part, on one or more frame identifiers of said one or more video frames. In at least one embodiment, said instructions can include instructions to indicate one or more properties of one or more pixels based, at least in part, on one or more identifiers of one or more video frames containing said one or more pixels. In at least one embodiment, said instructions can include instructions to modify one or more properties of one or more pixels based, at least in part, on one or more identifiers of one or more video frames containing said one or more pixels. In at least one embodiment, processor(s) 1608 can include storage 1612 and instruction queue 1610 to store and queue instructions fetched from storage 1602. In at least one embodiment, fetched instructions can be decoded by decode 1618 to determine what operation should be performed by processor(s) 1608 (e.g., in an Instruction Decode stage). In at least one embodiment, processor(s) 1608 can fetch additional operands (data) that may be used for instructions, and operands can be stored, e.g., in registers or storage 1612. In at least one embodiment, micro-operations 1620 can perform operations on data stored in one or more registers or storage 1612. For example, each step of instructions fetched by processor(s) 1608 can be decomposed during execution so processor(s) 1608 can execute instructions in steps through a series of micro-operations 1620. In at least one embodiment, program counter (PC) 1614 can hold an address for a next instruction and can be updated to point to the next instruction to be executed by processor(s) 1608.

In at least one embodiment, processor(s) 1608 can perform instructions (e.g., in an Execution stage). For example, processor(s) 1608 can perform an operation specified by the instructions, such as an arithmetic operation, a logical operation, or a data transfer. In at least one embodiment, compute unit(s) 1622 can execute instructions to perform any of the operations described herein. In at least one embodiment, compute unit(s) can include ALU(s) 1624 (Arithmetic Logic Units), which may be used for performing arithmetic and logical operations. In at least one embodiment, compute unit(s) can include FPU(s) (Floating Point Units) 1626, which may be used for performing floating-point calculations. In at least one embodiment, other circuits 1628 can be used to perform other operations, such as vector and/or scalar operations. In at least one embodiment, accelerator(s) 1630 can include one or more matrix multiplication accelerators, one or more parallel processing units (PPUs), such as GPUs, or any other accelerator or processor further described herein. In at least one embodiment, software program 1604 can utilize one or more APIs and/or ISA instructions to perform various computing operations with accelerator(s) 1630, such as matrix multiplication, arithmetic operations, or any other computing operation further described herein. In at least one embodiment, one or more computing operations using accelerator(s) 1630 can include at least one or more groups of computing operations to be accelerated by execution at least in part by accelerator(s) 1630, including to cause information to be stored and to store an indication of one or more decompression algorithms to decompress said information, to cause one or more identifiers of one or more videos and one or more indications of one or more pixel interpolation algorithms to be stored, to store an indication of one or more decompression algorithms to decompress said information, to indicate one or more decompression algorithms to be used to access one or more frames of one or more videos, to perform interpolation of two or more pixels of one or more video frames based, at least in part, on one or more frame identifiers of said one or more video frames, to indicate one or more properties of one or more pixels based, at least in part, on one or more identifiers of one or more video frames containing said one or more pixels, to modify one or more properties of one or more pixels based, at least in part, on one or more identifiers of one or more video frames containing said one or more pixels.

In at least one embodiment, system 1600 can be used to perform one or more instructions that include functions or operations, such as those described in connection with FIGS. 1-15. In at least one embodiment, system 1600 comprising one or more processors causes one or more circuits to cause information to be stored and to store an indication of one or more decompression algorithms to decompress said information, to cause one or more identifiers of one or more videos and one or more indications of one or more pixel interpolation algorithms to be stored, to store an indication of one or more decompression algorithms to decompress said information, to indicate one or more decompression algorithms to be used to access one or more frames of one or more videos, to perform interpolation of two or more pixels of one or more video frames based, at least in part, on one or more frame identifiers of said one or more video frames, to indicate one or more properties of one or more pixels based, at least in part, on one or more identifiers of one or more video frames containing said one or more pixels, to modify one or more properties of one or more pixels based, at least in part, on one or more identifiers of one or more video frames containing said one or more pixels, and/or otherwise perform operations described herein. In at least one embodiment, system 1600 is included in and/or otherwise includes systems illustrated in FIGS. 1-15 to cause one or more circuits to cause information to be stored and to store an indication of one or more decompression algorithms to decompress said information, to cause one or more identifiers of one or more videos and one or more indications of one or more pixel interpolation algorithms to be stored, to store an indication of one or more decompression algorithms to decompress said information, to indicate one or more decompression algorithms to be used to access one or more frames of one or more videos, to perform interpolation of two or more pixels of one or more video frames based, at least in part, on one or more frame identifiers of said one or more video frames, to indicate one or more properties of one or more pixels based, at least in part, on one or more identifiers of one or more video frames containing said one or more pixels, to modify one or more properties of one or more pixels based, at least in part, on one or more identifiers of one or more video frames containing said one or more pixels, and/or otherwise perform operations described herein. In at least one embodiment, system 1600 includes one or more hardware illustrated in FIGS. 16-35, such as to cause information to be stored and to store an indication of one or more decompression algorithms to decompress said information, to cause one or more identifiers of one or more videos and one or more indications of one or more pixel interpolation algorithms to be stored, to store an indication of one or more decompression algorithms to decompress said information, to indicate one or more decompression algorithms to be used to access one or more frames of one or more videos, to perform interpolation of two or more pixels of one or more video frames based, at least in part, on one or more frame identifiers of said one or more video frames, to indicate one or more properties of one or more pixels based, at least in part, on one or more identifiers of one or more video frames containing said one or more pixels, to modify one or more properties of one or more pixels based, at least in part, on one or more identifiers of one or more video frames containing said one or more pixels, and/or otherwise perform operations described herein.

Data Center

Figure 17:
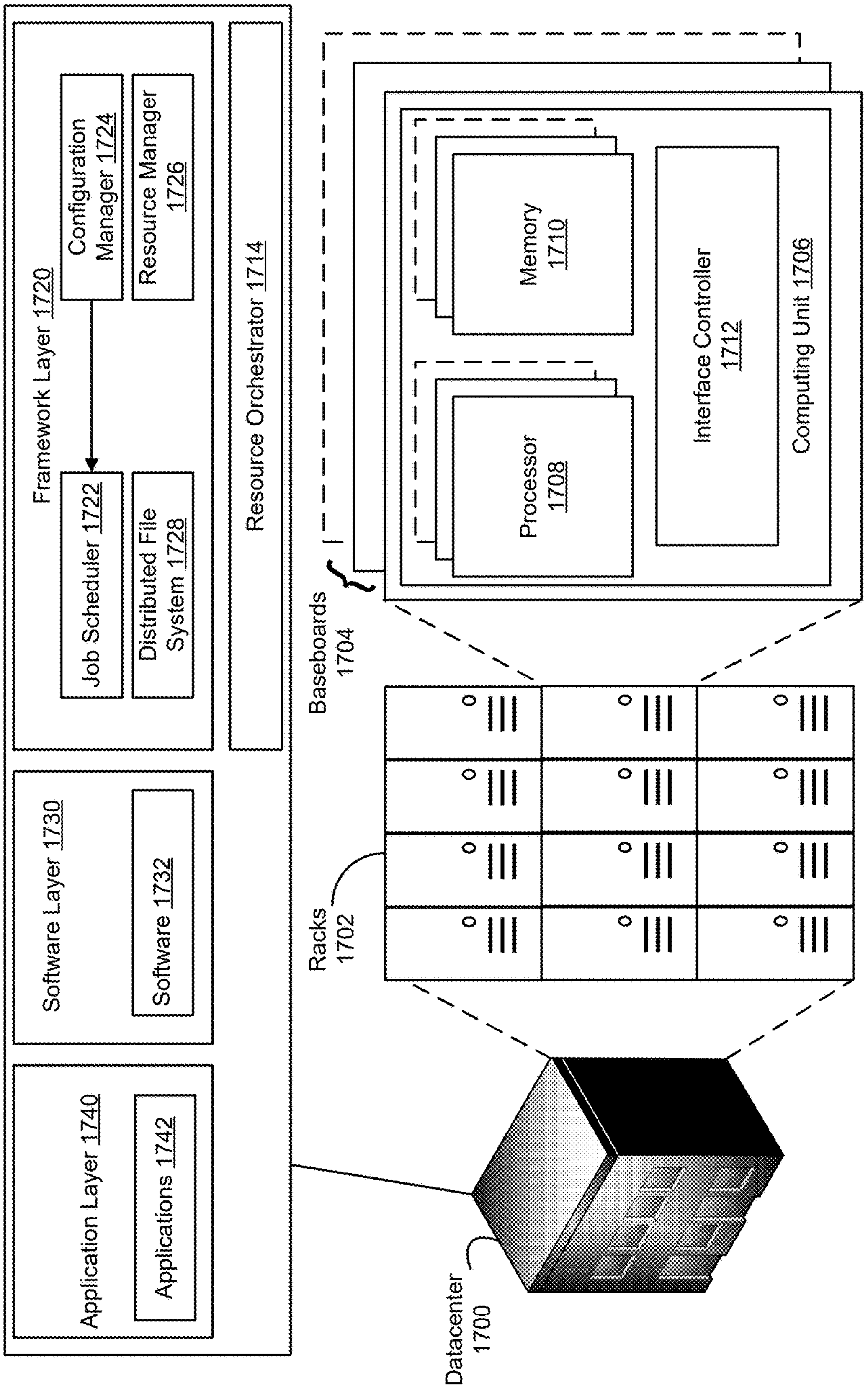
FIG. 17 illustrates an example data center system, in accordance with at least one embodiment.

FIG. 17 illustrates an example data center 1700, in accordance with at least one embodiment. Data center 1700 may include one or more rooms having racks 1702 and auxiliary equipment used to house one or more racks 1702 and one or more baseboards 1704. Rack 1702 can include one or more baseboards 1704. Rack 1702 can include a housing that receives and supports individual baseboards 1704. Operational aspects of rack 1702 may be regulated at a rack level, corresponding to a group of baseboards 1704, or at a baseboard level, corresponding to individual baseboards 1704, among other options. Rack 1702 or baseboards 1704 can have particularly selected maximum operating parameters, such as, but not limited to, power consumption, operating frequencies, and others. Data center 1700 can be supported by various cooling systems, such as, but not limited to, cooling towers, cooling loops, pumps, and other support systems. Cooling systems may include sensors and controllers to monitor and managing cooling properties for racks 1702. Baseboards 1704 within racks 1702 can get operational power from one or more power distribution units (PDUs; not shown). PDUs may be arranged within racks 1702, for example between racks 1702 including baseboards 1704, or within racks 1702 that also house baseboards 1704.

Racks 1702 and baseboards 1704 can include sub-systems, modules, add-in cards, and other semiconductor components. Baseboards 1704 can include one or more computing units 1706 that can include one or more processors 1708, one or more memory 1710, and an interface controller 1712. Computing units 1706 may include any number of processors, such as, but not limited to, central processing units ("CPUs"), graphics processing units ("GPUs"), or other processors (including accelerators, field programmable gate arrays (FPGAs), graphics processors, etc.), including any processors described herein, such as, but not limited to, processors in FIGS. 18-30. Computing units 1706 can include one or more memory storage devices 1710 (e.g., dynamic read-only memory, solid state storage or disk drives), as well as network input/output ("NW I/O") devices, network switches, virtual machines ("VMs"), power modules, and cooling modules, etc. One or more computing units 1706 may be a server having one or more of above-mentioned computing resources.

Computing units 1706 can include separate groupings of computing units housed within one or more racks (not shown), or many racks housed in data centers at various geographical locations (also not shown). Separate groupings of computing units may include grouped compute, network, memory or storage resources that may be configured or allocated to support one or more workloads. Several computing units (e.g., including CPUs and/or other processors) may be grouped within one or more racks to provide compute resources to support one or more workloads. A resource orchestrator 1714 may configure or otherwise control one or more computing units 1706 or groups of computing units. Resource orchestrator 1714 may include a software design infrastructure ("SDI") management entity for data center 1700. Resource orchestrator 1714 may include hardware, software or some combination thereof.

Data center 1700 can include any one of or any combination of a framework layer 1720, a software layer 1730 and an application layer 1740. As shown in FIG. 17, framework layer 1720 includes a job scheduler 1722, a configuration manager 1724, a resource manager 1726 and a distributed file system 1728. Framework layer 1720 may include a framework to support software 1732 of software layer 1730 and/or one or more application(s) 1742 of application layer 1740. Software 1732 or application(s) 1742 may respectively include web-based service software or applications, such as, but not limited to, those provided by Amazon Web Services, Google Cloud and Microsoft Azure. Framework layer 1720 may be a type of free and open-source software web application framework such as, but not limited to, Apache Spark™ (hereinafter "Spark") that may utilize distributed file system 1728 for large-scale data processing (e.g., "big data"). Job scheduler 1722 may include a Spark driver to facilitate scheduling of workloads supported by various layers of data center 1700. Configuration manager 1724 may be capable of configuring different layers such as, but not limited to, software layer 1730 and framework layer 1720 including Spark and distributed file system 1728 for supporting large-scale data processing. Resource manager 1726 may be capable of managing clustered or grouped computing units 1706 mapped to or allocated for support of distributed file system 1728 and job scheduler 1722. Resource manager 1726 may coordinate with resource orchestrator 1714 to manage these mapped or allocated computing resources.

Software 1732 can be included in software layer 1730 and may include software used by at least portions of a computing unit 1706, one or more computing units 1706, groups of computing units 1706, and/or distributed file system 1728 of framework layer 1720. One or more types of software may include, but are not limited to, Internet web page search software, e-mail virus scan software, database software, and streaming video content software.

Application(s) 1742 can be included in application layer 1740 and may include one or more types of applications used by at least portions of a computing unit 1706, one or more computing units 1706, groups of computing units 1706, and/or distributed file system 1728 of framework layer 1720. One or more types of applications may include, but are not limited to, any number of a genomics application, a cognitive compute, application and a machine learning application, including training or inferencing software, machine learning framework software (e.g., PyTorch, TensorFlow, Caffe, etc.) or other machine learning applications used in conjunction with one or more embodiments.

Any of configuration manager 1724, resource manager 1726, and resource orchestrator 1714 may implement any number and type of self-modifying actions based on any amount and type of data acquired in any technically feasible fashion. Self-modifying actions may relieve a data center operator of data center 1700 from making possibly bad configuration decisions and possibly avoiding underutilized and/or poor performing portions of a data center.

Data center 1700 may include tools, services, software or other resources to train one or more machine learning models or predict or infer information using one or more machine learning models in accordance with one or more embodiments described herein. For example, a machine learning model may be trained by calculating weight parameters in accordance with a neural network architecture using software and computing resources described above with respect to data center 1700. Trained machine learning models corresponding to one or more neural networks may be used to infer or predict information using resources described above with respect to data center 1700 by using weight parameters calculated through one or more training techniques described herein.

Data center 1700 may use CPUs, application-specific integrated circuits (ASICs), GPUs, FPGAs, or other hardware (e.g., embodiments in FIGS. 18-30) to perform some or all of processes and techniques described elsewhere herein, such as, but not limited to, training and/or inferencing using above-described resources. Moreover, one or more software and/or hardware resources described above may be configured as a service to allow users to train or performing inferencing of information, such as, but not limited to, image recognition, speech recognition, or other artificial intelligence services.

In at least one embodiment, processor 1708 can include one of the processors below and/or comprises one or more circuits to cause information to be stored and to store an indication of one or more decompression algorithms to decompress said information, to cause one or more identifiers of one or more videos and one or more indications of one or more pixel interpolation algorithms to be stored, to indicate one or more decompression algorithms to be used to access one or more frames of one or more videos, to perform interpolation of two or more pixels of one or more video frames based, at least in part, on one or more frame identifiers of said one or more video frames, to indicate one or more properties of one or more pixels based, at least in part, on one or more identifiers of one or more video frames containing said one or more pixels, and to modify one or more properties of one or more pixels based, at least in part, on one or more identifiers of one or more video frames containing said one or more pixels or otherwise perform any of the operations described above or elsewhere herein. In at least one embodiment, processor 1708 is configured by software 1732 to cause information to be stored and to store an indication of one or more decompression algorithms to decompress said information, to cause one or more identifiers of one or more videos and one or more indications of one or more pixel interpolation algorithms to be stored, to indicate one or more decompression algorithms to be used to access one or more frames of one or more videos, to perform interpolation of two or more pixels of one or more video frames based, at least in part, on one or more frame identifiers of said one or more video frames, to indicate one or more properties of one or more pixels based, at least in part, on one or more identifiers of one or more video frames containing said one or more pixels, and to modify one or more properties of one or more pixels based, at least in part, on one or more identifiers of one or more video frames containing said one or more pixels or otherwise perform any of the operations described above or elsewhere herein. Data center 1700 may use logic, CPUs, application-specific integrated circuits (ASICs), GPUs, FPGAs, or other hardware (e.g., embodiments in FIGS. 18-30) to perform any of the operations described above or elsewhere herein.

Processors

Figure 35A:
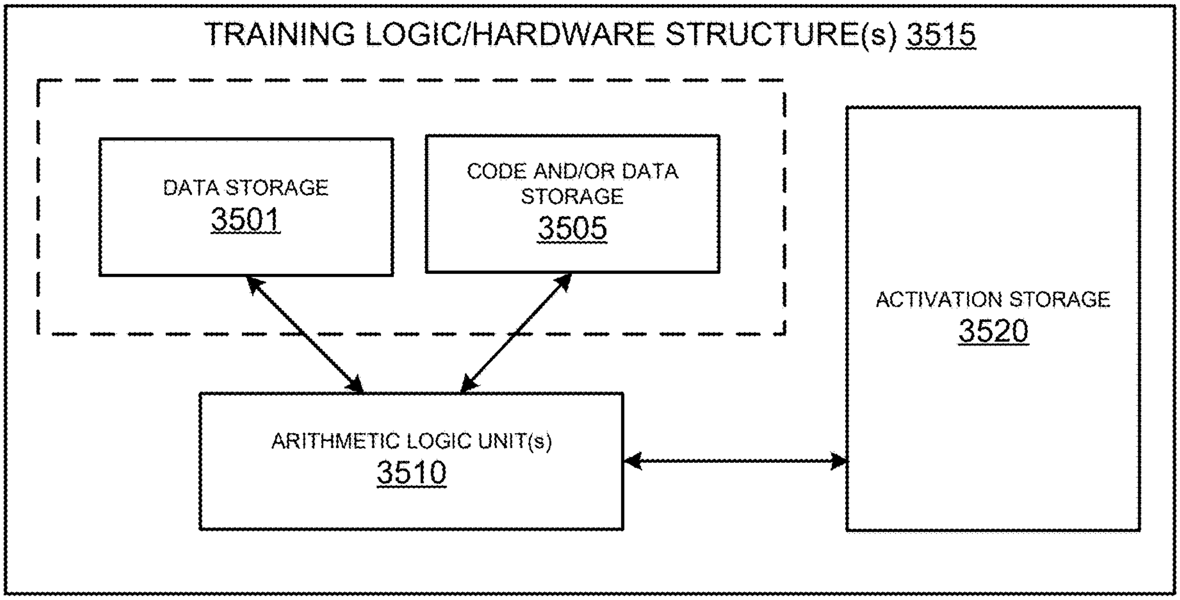
FIG. 35A illustrates inference and/or training logic, in accordance with at least one embodiment.
Figure 35B:
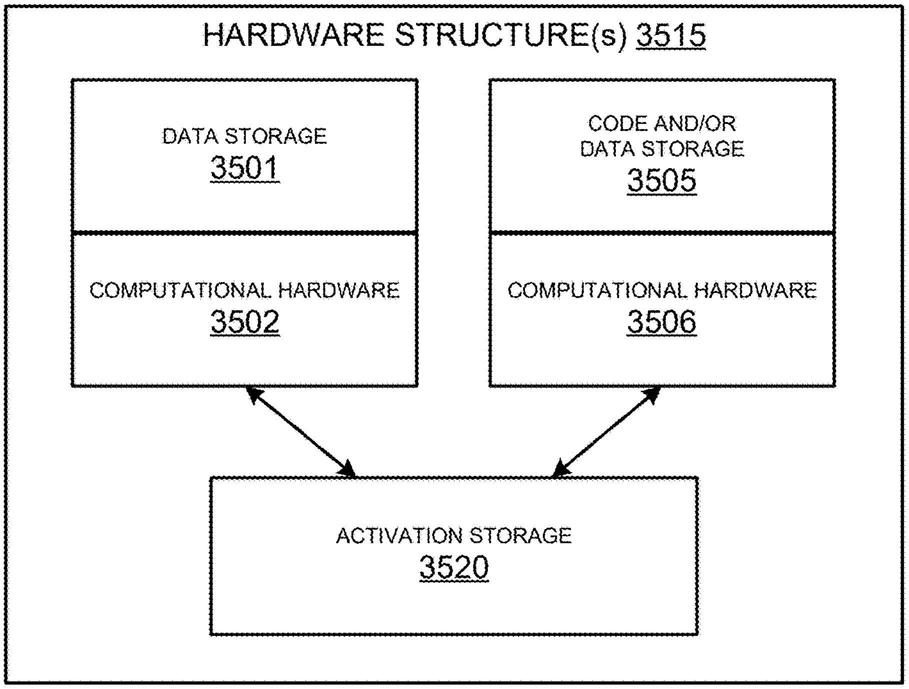
FIG. 35B illustrates inference and/or training logic, in accordance with at least one embodiment.

The following FIGURES set forth, without limitation, example processors and processing systems that can be used to cause information to be stored and to store an indication of one or more decompression algorithms to decompress said information, to cause one or more identifiers of one or more videos and one or more indications of one or more pixel interpolation algorithms to be stored, to indicate one or more decompression algorithms to be used to access one or more frames of one or more videos, to perform interpolation of two or more pixels of one or more video frames based, at least in part, on one or more frame identifiers of said one or more video frames, to indicate one or more properties of one or more pixels based, at least in part, on one or more identifiers of one or more video frames containing said one or more pixels, and to modify one or more properties of one or more pixels based, at least in part, on one or more identifiers of one or more video frames containing said one or more pixels, or otherwise perform some or all of processes, operations and/or and techniques described elsewhere herein. Example processors and processing systems can be configured by software to cause information to be stored and to store an indication of one or more decompression algorithms to decompress said information, to cause one or more identifiers of one or more videos and one or more indications of one or more pixel interpolation algorithms to be stored, to indicate one or more decompression algorithms to be used to access one or more frames of one or more videos, to perform interpolation of two or more pixels of one or more video frames based, at least in part, on one or more frame identifiers of said one or more video frames, to indicate one or more properties of one or more pixels based, at least in part, on one or more identifiers of one or more video frames containing said one or more pixels, and to modify one or more properties of one or more pixels based, at least in part, on one or more identifiers of one or more video frames containing said one or more pixels or otherwise perform any of the operations described above or elsewhere herein or otherwise perform any of the operations described above or elsewhere herein. Processors and processing systems can include logic, central processing units (CPUs), application-specific integrated circuits (ASICs), graphics processing units (GPUs), field programmable arrays (FPGAs), XPUs (i.e., any compute architecture that best fits the need of an application) or other hardware (e.g., embodiments in FIGS. 18-30) to perform any of the operations described above, below, or elsewhere herein. Processors and/or processing systems described herein can include one or more circuits that can be used to cause information to be stored and to store an indication of one or more decompression algorithms to decompress said information, to cause one or more identifiers of one or more videos and one or more indications of one or more pixel interpolation algorithms to be stored, to indicate one or more decompression algorithms to be used to access one or more frames of one or more videos, to perform interpolation of two or more pixels of one or more video frames based, at least in part, on one or more frame identifiers of said one or more video frames, to indicate one or more properties of one or more pixels based, at least in part, on one or more identifiers of one or more video frames containing said one or more pixels, and to modify one or more properties of one or more pixels based, at least in part, on one or more identifiers of one or more video frames containing said one or more pixels or otherwise perform any of the operations described above or elsewhere herein or otherwise perform any of the operations described above or elsewhere herein. As used herein, one or more circuits can be configured by software to cause information to be stored and to store an indication of one or more decompression algorithms to decompress said information, to cause one or more identifiers of one or more videos and one or more indications of one or more pixel interpolation algorithms to be stored, to indicate one or more decompression algorithms to be used to access one or more frames of one or more videos, to perform interpolation of two or more pixels of one or more video frames based, at least in part, on one or more frame identifiers of said one or more video frames, to indicate one or more properties of one or more pixels based, at least in part, on one or more identifiers of one or more video frames containing said one or more pixels, and to modify one or more properties of one or more pixels based, at least in part, on one or more identifiers of one or more video frames containing said one or more pixels or otherwise perform any of the operations described above or elsewhere herein or otherwise perform any of the operations described above or elsewhere herein. FIGS. 35A and 35B illustrate logic 3515 which, as described elsewhere herein, can be used in one or more devices to perform operations such as, but not limited to, those discussed herein in accordance with at least one embodiment. Logic can refer, for example, to any combination of software logic, hardware logic, and/or firmware logic to provide functionality and/or operations described herein, wherein logic may be, collectively or individually, embodied as circuitry that forms part of a larger system, for example, an integrated circuit (IC), an application-specific integrated circuit (ASIC), a field programmable array (FPGA), system-on-chip (SoC), or one or processors (e.g., CPU, GPU).

Figure 18:
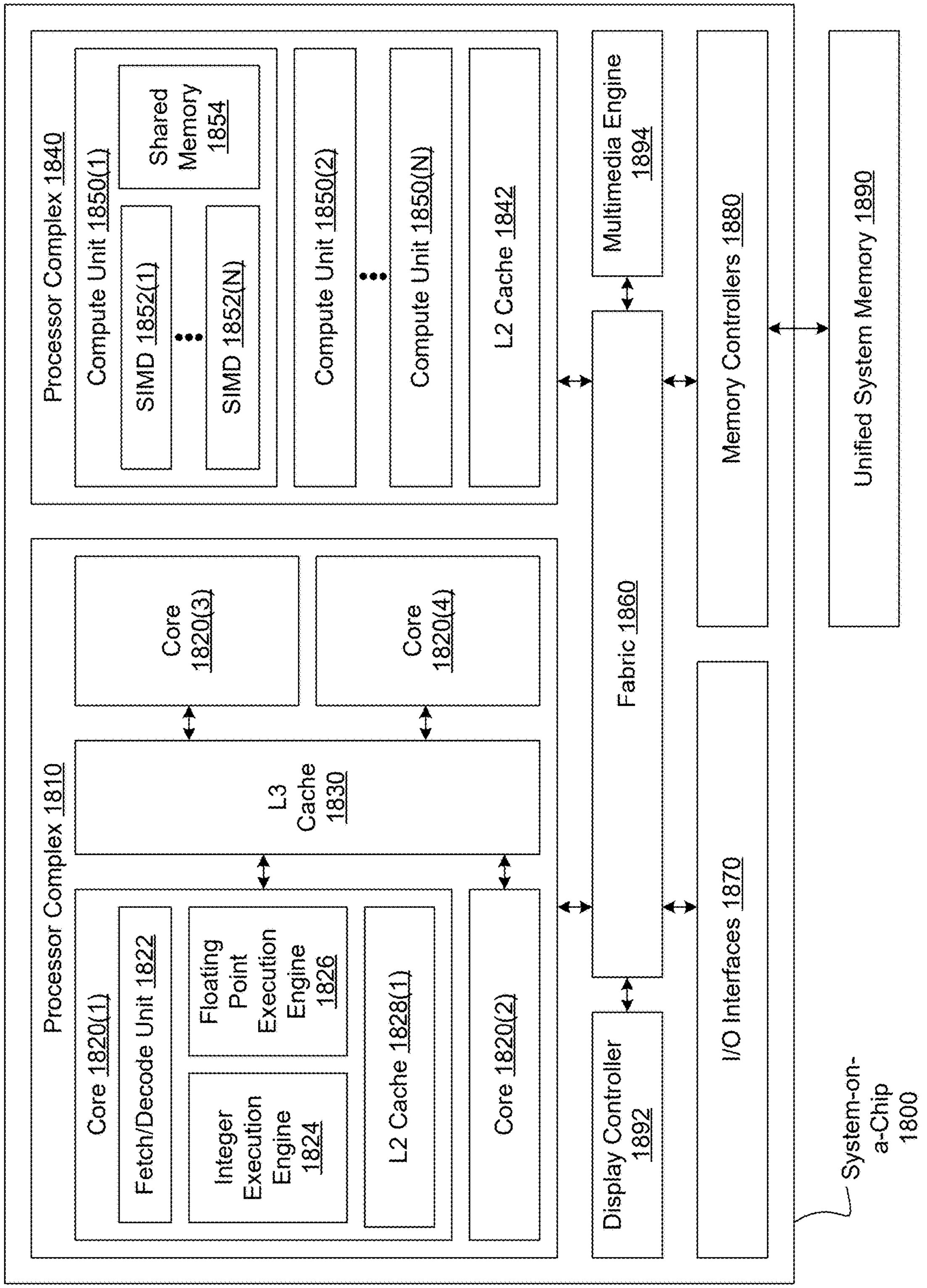
FIG. 18 illustrates a system-on-a-chip (SOC), in accordance with at least one embodiment.

FIG. 18 illustrates a processor which is a system-on-a-chip (SOC) 1800 (which may be referred to as system-on-chip, a superchip, or another name), in accordance with at least one embodiment. SOC 1800 can include processor complex 1810 and processor complex 1840. SOC 1800 can include any number of processor complexes 1810 and/or processor complexes 1840 that may include any number of processors that are described herein, such as, but not limited to, those in FIGS. 18-30, in any combination. For example, processor 1810 may include a central processing unit (CPU), and processor 1840 may include a graphics processor. Alternatively, processor 1810 may include a graphics processor, and processor 1840 may include a graphics processor. SOC 1800 may include any number of display controllers 1892, any number of multimedia engines 1894, any number of I/O Interfaces 1870, any number of memory controllers 1880, and any number of fabrics 1860 in any combination. For explanatory purposes, multiple instances of like objects are denoted herein with reference numbers identifying the object and parenthetical numbers identifying the instance where needed. SOC 1800 can include a processor from Broadcom in Palo Alto, CA.

Processor complex 1810 can include a CPU, processor complex 1840 can include a GPU, and SOC 1800 can include a processing unit that integrates 1810 and 1840 onto a single chip. Some tasks may be assigned to processor complex 1810 and other tasks may be assigned to processor complex 1840. Processor complex 1810 can be configured to execute main control software associated with SOC 1800, such as, but not limited to, an operating system. Processor complex 1810 can be the master processor of SOC 1800, controlling and coordinating operations of other processors. Processor complex 1810 can issue commands that control the operation of processor complex 1840 to perform some or all of the operations described herein. Processor complex 1810 can be configured to execute host executable code derived from CUDA or other source code (e.g., HIP source code), and processor complex 1840 can be configured to execute device executable code derived from CUDA or other source code in order to perform any of the operations described herein.

Processor complex 1810 can include cores 1820(1)-1820(4) and a cache (e.g., L3 cache) 1830 to store information to perform operations described herein. Processor complex 1810 may include any number of cores 1820 and any number and type of caches in any combination. Cores 1820 can be configured to execute instructions of a particular instruction set architecture ("ISA") to perform some or all of the operations described herein. Each core 1820 can include a CPU core. Core 1820(1)-1820(4) can be referred to as a computing units or compute units. SOC 1800 can include any number of processor complexes 1810, fabric 1860, I/O interfaces 1870, and memory controllers 1880.

Each core 1820 can include a fetch/decode unit 1822, an integer execution engine 1824, a floating point execution engine 1826, and an L2 cache 1828. Fetch/decode unit 1822 can fetch instructions to perform some or all of the operations described herein (such as, but not limited to, an API that is compiled into instructions) and decode such instructions, generate micro-operations, and dispatch separate micro-instructions to integer execution engine 1824 and/or floating point execution engine 1826. Fetch/decode unit 1822 can concurrently dispatch one micro-instruction to integer execution engine 1824 and another micro-instruction to floating point execution engine 1826. Integer execution engine 1824 can execute integer and memory operations. Floating point engine 1826 can execute floating point and vector operations. Fetch-decode unit 1822 can dispatch micro-instructions to one or more execution engines that replaces both integer execution engine 1824 and floating point execution engine 1826.

Each core 1820(*i*), where i is an integer representing a particular instance of core 1820, may access L2 cache 1828(*i*) included in core 1820(*i*). Each core 1820 included in core complex 1810(*j*), where j is an integer representing a particular instance of core complex 1810, can be connected to other cores 1820 included in core complex 1810(*j*) via L3 cache 1830(*j*) included in core complex 1810(*j*). Cores 1820 included in core complex 1810(*j*), where j is an integer representing a particular instance of core complex 1810, can access all of L3 cache 1830(*j*) included in core complex 1810(*j*). L3 cache 1830 may include any number of slices.

Processor complex 1840 can be a graphics complex that can be configured to perform compute operations (e.g., compute operations involved in operations described herein) in a highly-parallel fashion. Processor complex 1840 can be configured to execute graphics pipeline operations such as, but not limited to, draw commands, pixel operations, geometric computations, and other operations associated with rendering an image to a display. Processor complex 1840 can be configured to execute operations unrelated to graphics, such as, but not limited to, neural network training and/or simulations. Processor complex 1840 can be configured to execute both operations related to graphics and operations unrelated to graphics.

Processor complex 1840 can include any number of compute units 1850(1)-1850(N), where N is any integer greater than 1, and an L2 cache 1842. Compute units 1850 can share L2 cache 1842, which may store information to be used to perform some or all of the operations described herein. L2 cache 1842 can be partitioned. Processor complex 1840 can include any number of compute units 1850 and any number (including zero) and type of caches. Processor complex 1840 can include any amount of dedicated graphics hardware.

Each compute unit 1850 can include any number of SIMD units 1852(1)-1852(N), where N is any integer greater than 1, and a shared memory 1854. Each SIMD unit 1852 can implement a SIMD architecture and can be configured to some or all of the operations described herein, in parallel. Each compute unit 1850 may execute any number of thread blocks, but each thread block can execute on a single compute unit 1850, although in some embodiments a thread block can execute on multiple compute units. A thread block can include any number of threads of execution. A workgroup can be a thread block. Each SIMD unit 1852 can execute a group of threads. A group of threads (e.g., 16 threads), which can also be referred to as a warp, or subgroup, or wavefront (e.g., as used by AMD and Intel), where each thread in the warp, wave, subgroup, or wavefront can belong to a single thread block and is configured to process a different set of data based on a single set of instructions. Predication can be used to disable one or more threads in a warp, subgroup, or wavefront. A lane can be a thread. A work item can be a thread, such as, but not limited to, e.g., with OpenCL. Different warps, subgroups, or wavefronts in a thread block may synchronize together and communicate via shared memory 1854. Each compute unit 1850 can include one or more thread block clusters, where a thread block cluster can enable programmatic control of locality at a granularity larger than a single thread block of a single streaming multiprocessor (SM). Thread block clusters (also referred to as "clusters") can enable multiple thread blocks running concurrently across streaming multiprocessors to synchronize and collaboratively fetch, exchange, or otherwise use data. In at least one embodiment, streaming multiprocessors ("SMs") can be referred to streaming microprocessors, stream processors ("SPs"), stream processing units ("SPUs"), compute units ("CUs"), execution units ("EUs"), and/or slices, where a slice in this context can refer to a portion of processing resources in a processing unit (e.g., 16 cores, a ray tracing unit, a thread director or scheduler).

Fabric 1860 can be a system interconnect that facilitates data and control transmissions across processor complex 1810, processor complex 1840, I/O interfaces 1870, memory controllers 1880, display controller 1892, and multimedia engine 1894, e.g., to perform some or all of the operations described herein. SOC 1800 may include any amount and type of system interconnect in addition to or instead of fabric 1860 that facilitates data and control transmissions across any number and type of directly or indirectly linked components that may be internal or external to SOC 1800. I/O interfaces 1870 can be representative of any number and type of I/O interfaces (e.g., PCI, PCI-Extended ("PCI-X"), PCIe, gigabit Ethernet ("GBE"), USB, etc.). Various types of peripheral devices can be coupled to I/O interfaces 1870. Peripheral devices that can be coupled to I/O interfaces 1870 may include keyboards, mice, printers, scanners, joysticks or other types of game controllers, media recording devices, external storage devices, network interface cards, and so forth.

Display controller 1892 may display images on one or more display device(s), such as, but not limited to, a liquid crystal display ("LCD") device. Multimedia engine 1894 can include any amount and type of circuitry that is related to multimedia, such as, but not limited to, a video decoder, a video encoder, an image signal processor, etc. Memory controllers 1880 may facilitate data transfers between SOC 1800 and a unified system memory 1890. Processor complex 1810 and processor complex 1840 may share unified system memory 1890. Unified system memory 1890 can include various types of memory devices, including dynamic random access memory (DRAM) or graphics random access memory, such as, but not limited to, synchronous graphics random access memory (SGRAM), including graphics double data rate (GDDR) memory. Unified system memory 1890 may include 3D stacked memory, including but not limited to high bandwidth memory (HBM), HBM2e, or HDM3.

SOC 1800 may implement a memory subsystem that includes any amount and type of memory controllers 1880 and memory devices (e.g., shared memory 1854) that may be dedicated to one component or shared among multiple components in order to perform any of the operations described herein. SOC 1800 can implement a cache subsystem that includes one or more cache memories (e.g., L2 caches 1828, L3 cache 1830, and L2 cache 1842) that may each be private to or shared between any number of components (e.g., cores 1820, core complex 1810, SIMD units 1852, compute units 1850, and processor complex 1840).

In at least one embodiment, SOC 1800 can include one or more circuits to cause information to be stored and to store an indication of one or more decompression algorithms to decompress said information, to cause one or more identifiers of one or more videos and one or more indications of one or more pixel interpolation algorithms to be stored, to indicate one or more decompression algorithms to be used to access one or more frames of one or more videos, to perform interpolation of two or more pixels of one or more video frames based, at least in part, on one or more frame identifiers of said one or more video frames, to indicate one or more properties of one or more pixels based, at least in part, on one or more identifiers of one or more video frames containing said one or more pixels, and to modify one or more properties of one or more pixels based, at least in part, on one or more identifiers of one or more video frames containing said one or more pixels or otherwise perform any of the operations described above or elsewhere herein or otherwise perform any of the operations described above or elsewhere herein. One or more circuits can be configured by software to cause information to be stored and to store an indication of one or more decompression algorithms to decompress said information, to cause one or more identifiers of one or more videos and one or more indications of one or more pixel interpolation algorithms to be stored, to indicate one or more decompression algorithms to be used to access one or more frames of one or more videos, to perform interpolation of two or more pixels of one or more video frames based, at least in part, on one or more frame identifiers of said one or more video frames, to indicate one or more properties of one or more pixels based, at least in part, on one or more identifiers of one or more video frames containing said one or more pixels, and to modify one or more properties of one or more pixels based, at least in part, on one or more identifiers of one or more video frames containing said one or more pixels or otherwise perform any of the operations described above or elsewhere herein or otherwise perform any of the operations described above or elsewhere herein.

Figure 19A:
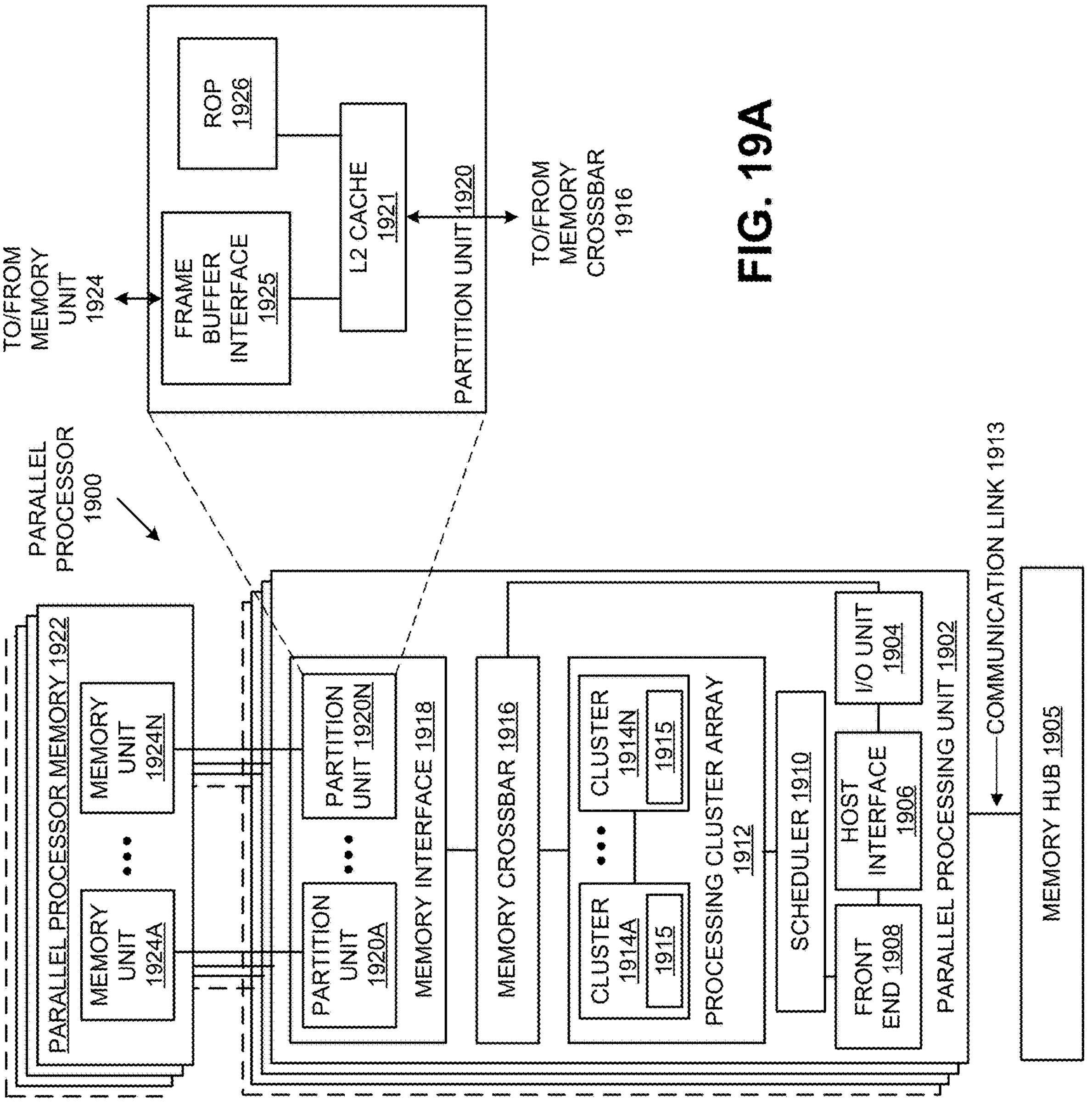
FIG. 19A illustrates a parallel processor, in accordance with at least one embodiment.

FIG. 19A illustrates a parallel processor 1900, in accordance with at least one embodiment. Parallel processor 1900 may be implemented using one or more circuits and may be referred to as a programmable processor (e.g., a CPU and/or GPU), logic, an application specific integrated circuit (ASIC), a field programmable gate array (FPGA) or other hardware (e.g., embodiments in FIGS. 18-30) to perform any of the operations described above or elsewhere herein.

Parallel processor 1900 can include a parallel processing unit 1902 to perform any of the operations described above or elsewhere herein. Parallel processing unit 1902 can include an I/O unit 1904 that enables communication with other devices, including other instances of parallel processing unit 1902. I/O unit 1904 may be directly connected to other devices. I/O unit 1904 may connect with other devices via use of a hub or switch interface, such as, but not limited to, a memory hub 1905. Connections between memory hub 1905 and I/O unit 1904 can form a communication link 1913. I/O unit 1904 may connect with a host interface 1906 and a memory crossbar 1916, where host interface 1906 receives commands directed to performing processing operations and memory crossbar 1916 receives commands directed to performing memory operations.

When host interface 1906 receives a command buffer via I/O unit 1904, host interface 1906 can direct work operations to perform those commands to a front end 1908. Front end 1908 can couple with a scheduler 1910 (which may be referred to as a sequencer), which is configured to distribute commands or other work items to a processing cluster array 1912. Scheduler 1910 can ensure that processing cluster array 1912 is properly configured and in a valid state before tasks may be distributed to a cluster of processing cluster array 1912. Scheduler 1910 may be implemented via firmware logic executing on a microcontroller. Microcontroller-implemented scheduler 1910 can be configurable to perform complex scheduling and work distribution operations at coarse and fine granularity, enabling rapid preemption and context switching of threads executing on processing array 1912. Host software can prove workloads for scheduling on processing cluster array 1912 via one of multiple graphics processing paths. Workloads can then be automatically distributed across processing array cluster 1912 by scheduler 1910 logic within a microcontroller including scheduler 1910.

Processing cluster array 1912 can perform any of the operations described above or elsewhere herein and can include up to "N" processing clusters (e.g., cluster 1914A, cluster 1914B, through cluster 1914N), where "N" represents a positive integer (which may be a different integer "N" than used in other FIGURES). Each cluster 1914A-1914N of processing cluster array 1912 can execute a large number of concurrent threads. Scheduler 1910 can allocate work to clusters 1914A-1914N of processing cluster array 1912 using various scheduling and/or work distribution algorithms, which may vary depending on workload arising for each type of program or computation. Scheduling can be handled dynamically by scheduler 1910, or can be assisted in part by compiler logic during compilation of program logic configured for execution by processing cluster array 1912. Different clusters 1914A-1914N of processing cluster array 1912 can be allocated for processing different types of programs or for performing different types of computations.

Processing cluster array 1912 can be configured to perform various types of parallel processing operations, such as, but not limited to, any of the operations described above or elsewhere herein. Processing cluster array 1912 can be configured to perform general-purpose parallel compute operations. For example, processing cluster array 1912 can include logic to execute processing tasks including filtering of video and/or audio data, performing modeling operations, including physics operations, and performing data transformations.

Processing cluster array 1912 can be configured to perform parallel graphics processing operations. Processing cluster array 1912 can include additional logic to support execution of such graphics processing operations, including but not limited to, texture sampling logic to perform texture operations, as well as tessellation logic and other vertex processing logic. Processing cluster array 1912 can be configured to execute graphics processing related shader programs such as, but not limited to, vertex shaders, tessellation shaders, geometry shaders, and pixel shaders. Parallel processing unit 1902 can transfer data from system memory via I/O unit 1904 for processing. During processing, transferred data can be stored to on-chip memory (e.g., parallel processor memory 1922) during processing, then written back to system memory.

When parallel processing unit 1902 is used to perform graphics processing, scheduler 1910 can be configured to divide a processing workload into approximately equal sized tasks, to better enable distribution of graphics processing operations to multiple clusters 1914A-1914N of processing cluster array 1912. Portions of processing cluster array 1912 can be configured to perform different types of processing. For example, a first portion may be configured to perform vertex shading and topology generation, a second portion may be configured to perform tessellation and geometry shading, and a third portion may be configured to perform pixel shading or other screen space operations, to produce a rendered image for display. Intermediate data produced by one or more of clusters 1914A-1914N may be stored in buffers to allow intermediate data to be transmitted between clusters 1914A-1914N for further processing.

Processing cluster array 1912 can receive processing tasks to be executed via scheduler 1910, which receives commands defining processing tasks from front end 1908. Processing tasks can include indices of data to be processed, e.g., surface (patch) data, primitive data, vertex data, and/or pixel data, as well as state parameters and commands defining how data is to be processed (e.g., what program is to be executed). Scheduler 1910 may be configured to fetch indices corresponding to tasks or may receive indices from front end 1908. Front end 1908 can be configured to ensure processing cluster array 1912 is configured to a valid state before a workload specified by incoming command buffers (e.g., batch-buffers, push buffers, etc.) is initiated.

Each of one or more instances of parallel processing unit 1902 can couple with a parallel processor memory 1922 to perform any of the operations described above or elsewhere herein. Parallel processor memory 1922 can be accessed via memory crossbar 1916, which can receive memory requests from processing cluster array 1912 as well as I/O unit 1904. Memory crossbar 1916 can access parallel processor memory 1922 via a memory interface 1918. Memory interface 1918 can include multiple partition units (e.g., partition unit 1920A, partition unit 1920B, through partition unit 1920N) that can each couple to a portion (e.g., memory unit) of parallel processor memory 1922. A number of partition units 1920A-1920N can be configured to be equal to a number of memory units, such that a first partition unit 1920A has a corresponding first memory unit 1924A, a second partition unit 1920B has a corresponding memory unit 1924B, and an N-th partition unit 1920N has a corresponding N-th memory unit 1924N. A number of partition units 1920A-1920N may not be equal to a number of memory units.

Memory units 1924A-1924N can include various types of memory devices, including dynamic random access memory (DRAM) or graphics random access memory, such as, but not limited to, synchronous graphics random access memory (SGRAM), including graphics double data rate (GDDR) memory. Memory units 1924A-1924N may also include 3D stacked memory, including but not limited to high bandwidth memory (HBM), HBM2e, or HDM3. Render targets, such as, but not limited to, frame buffers or texture maps may be stored across memory units 1924A-1924N, allowing partition units 1920A-1920N to write portions of each render target in parallel to efficiently use available bandwidth of parallel processor memory 1922. A local instance of parallel processor memory 1922 may be excluded in favor of a unified memory design that utilizes system memory in conjunction with local cache memory.

Any one of clusters 1914A-1914N of processing cluster array 1912 can process data that will be written to any of memory units 1924A-1924N within parallel processor memory 1922. Memory crossbar 1916 can be configured to transfer an output of each cluster 1914A-1914N to any partition unit 1920A-1920N or to another cluster 1914A-1914N, which can perform additional processing operations on an output. Each cluster 1914A-1914N can communicate with memory interface 1918 through memory crossbar 1916 to read from or write to various external memory devices. Memory crossbar 1916 can have a connection to memory interface 1918 to communicate with I/O unit 1904, as well as a connection to a local instance of parallel processor memory 1922, enabling processing units within different processing clusters 1914A-1914N to communicate with system memory or other memory that is not local to parallel processing unit 1902. Memory crossbar 1916 can use virtual channels to separate traffic streams between clusters 1914A-1914N and partition units 1920A-1920N.

Multiple instances of parallel processing unit 1902 can be provided on a single add-in card, or multiple add-in cards can be interconnected. Different instances of parallel processing unit 1902 can be configured to interoperate even if different instances have different numbers of processing cores, different amounts of local parallel processor memory, and/or other configuration differences. For example, some instances of parallel processing unit 1902 can include higher precision floating point units relative to other instances. Systems incorporating one or more instances of parallel processing unit 1902 or parallel processor 1900 can be implemented in a variety of configurations and form factors, including but not limited to desktop, laptop, or handheld personal computers, servers, workstations, game consoles, and/or embedded systems.

FIG. 19A further includes a block diagram of a partition unit 1920, in accordance with at least one embodiment. Partition unit 1920 is an instance of one of partition units 1920A-1920N of FIG. 19A. Partition unit 1920 can include an L2 cache 1921, a frame buffer interface 1925, and a ROP 1926 (raster operations unit). L2 cache 1921 can be a read/write cache that is configured to perform load and store operations received from memory crossbar 1916 and ROP 1926. Read misses and urgent write-back requests can be output by L2 cache 1921 to frame buffer interface 1925 for processing. Updates can also be sent to a frame buffer via frame buffer interface 1925 for processing. Frame buffer interface 1925 may interface with one of memory units in parallel processor memory, such as, but not limited to, memory units 1924A-1924N (shown as 1924) of FIG. 19A (e.g., within parallel processor memory 1922).

ROP 1926 can be a processing unit that performs raster operations such as, but not limited to, stencil, z test, blending, etc. ROP 1926 can then output processed graphics data that is stored in graphics memory. ROP 1926 can include compression logic to compress depth or color data that is written to memory and decompress depth or color data that is read from memory. Compression logic can be lossless compression logic that makes use of one or more of multiple compression algorithms. A type of compression that is performed by ROP 1926 can vary based on statistical characteristics of data to be compressed. For example, delta color compression is performed on depth and color data on a per-tile basis.

ROP 1926 can be included within each processing cluster (e.g., cluster 1914A-1914N of FIG. 19A) instead of within partition unit 1920. Read and write requests for pixel data may be transmitted over memory crossbar 1916 instead of pixel fragment data. Processed graphics data may be displayed on a display routed for further processing by processor(s), or routed for further processing by one of processing entities within parallel processor 1900 of FIG. 19A.

In at least one embodiment, parallel processor 1900 can include one or more circuits to cause information to be stored and to store an indication of one or more decompression algorithms to decompress said information, to cause one or more identifiers of one or more videos and one or more indications of one or more pixel interpolation algorithms to be stored, to indicate one or more decompression algorithms to be used to access one or more frames of one or more videos, to perform interpolation of two or more pixels of one or more video frames based, at least in part, on one or more frame identifiers of said one or more video frames, to indicate one or more properties of one or more pixels based, at least in part, on one or more identifiers of one or more video frames containing said one or more pixels, and to modify one or more properties of one or more pixels based, at least in part, on one or more identifiers of one or more video frames containing said one or more pixels or otherwise perform any of the operations described above or elsewhere herein or otherwise perform any of the operations described above or elsewhere herein. One or more circuits can be configured by software to cause information to be stored and to store an indication of one or more decompression algorithms to decompress said information, to cause one or more identifiers of one or more videos and one or more indications of one or more pixel interpolation algorithms to be stored, to indicate one or more decompression algorithms to be used to access one or more frames of one or more videos, to perform interpolation of two or more pixels of one or more video frames based, at least in part, on one or more frame identifiers of said one or more video frames, to indicate one or more properties of one or more pixels based, at least in part, on one or more identifiers of one or more video frames containing said one or more pixels, and to modify one or more properties of one or more pixels based, at least in part, on one or more identifiers of one or more video frames containing said one or more pixels or otherwise perform any of the operations described above or elsewhere herein or otherwise perform any of the operations described above or elsewhere herein.

Figure 19C:
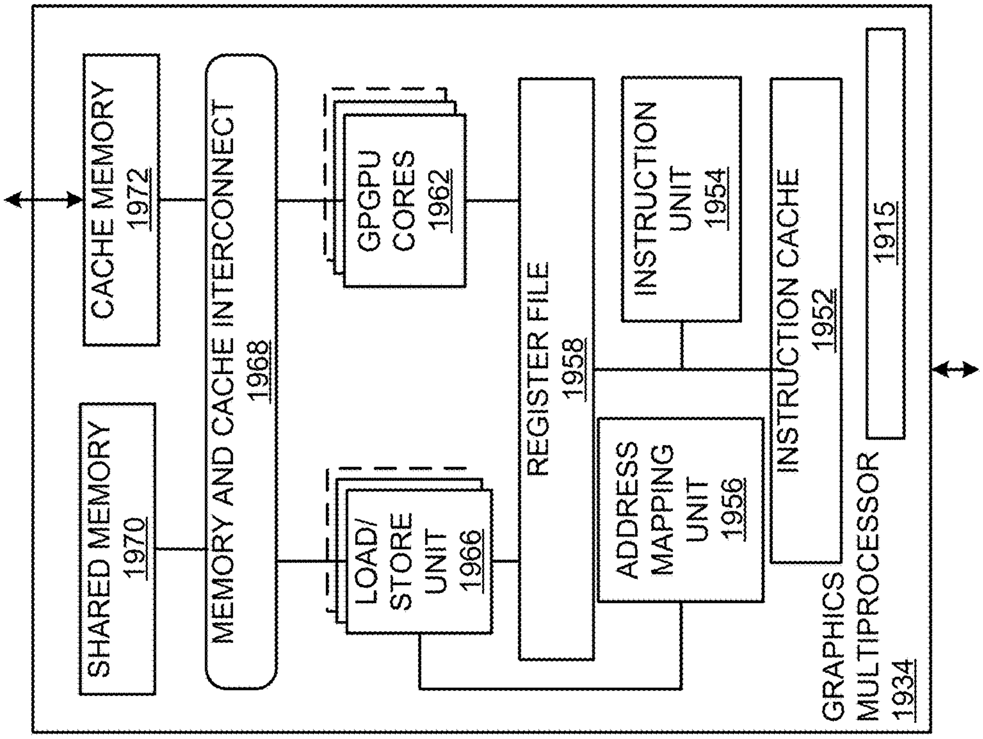
FIG. 19C illustrates a graphics multiprocessor, in accordance with at least one embodiment.
Figure 19B:
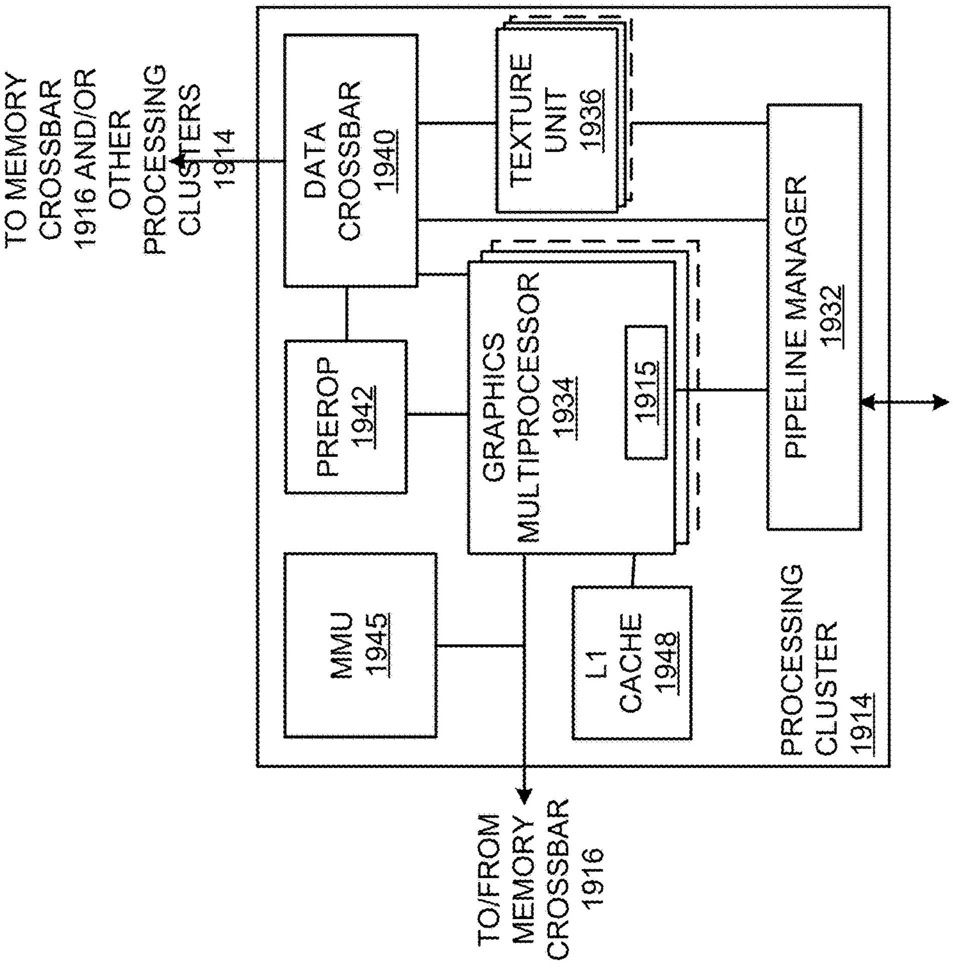
FIG. 19B illustrates a processing cluster, in accordance with at least one embodiment.

FIG. 19B includes a block diagram of a processing cluster 1914 within a parallel processing unit, in accordance with at least one embodiment. A processing cluster can be an instance of one of processing clusters 1914A-1914N of FIG. 19A that can be used to perform any of the operations described above or elsewhere herein. Processing cluster 1914 can be configured to execute many threads in parallel, where "thread" refers to an instance of a particular program executing on a particular set of input data. Single-instruction, multiple-data (SIMD) instruction issue techniques can be used to support parallel execution of a large number of threads without providing multiple independent instruction units. Single-instruction, multiple-thread (SIMT) techniques may be used to support parallel execution of a large number of generally synchronized threads, using a common instruction unit configured to issue instructions to a set of processing engines within each one of processing clusters.

Operation of processing cluster 1914 can be controlled via a pipeline manager 1932 that distributes processing tasks to SIMT parallel processors. Pipeline manager 1932 can receive instructions from scheduler 1910 of FIG. 19A and manages execution of those instructions via a graphics multiprocessor 1934 and/or a texture unit 1936. Graphics multiprocessor 1934 may be an example instance of a SIMT parallel processor. However, various types of SIMT parallel processors of differing architectures may be included within processing cluster 1914. One or more instances of graphics multiprocessor 1934 can be included within a processing cluster 1914. Graphics multiprocessor 1934 can process data and a data crossbar 1940 can be used to distribute processed data to one of multiple possible destinations, including other shader units. Pipeline manager 1932 can facilitate distribution of processed data by specifying destinations for processed data to be distributed via data crossbar 1940.

Each graphics multiprocessor 1934 within processing cluster 1914 can include an identical set of functional execution logic (e.g., arithmetic logic units, load-store units, etc.) to perform computations for any of the operations described above or elsewhere herein. Functional execution logic can be configured in a pipelined manner in which new instructions can be issued before previous instructions may be complete. Functional execution logic can support a variety of operations including integer and floating point arithmetic, comparison operations, Boolean operations, bit-shifting, and computation of various algebraic functions. Same functional-unit hardware can be leveraged to perform different operations and any combination of functional units may be present.

Instructions transmitted to processing cluster 1914 may constitute a thread, which can also be referred to as a warp, subgroup, wave, or a wavefront. A set of threads executing across a set of parallel processing engines can be referred to as a thread group. A thread group can execute a common program on different input data. Each thread within a thread group can be assigned to a different processing engine within a graphics multiprocessor 1934. A thread group may include fewer threads than a number of processing engines within graphics multiprocessor 1934. When a thread group includes fewer threads than a number of processing engines, one or more of processing engines may be idle during cycles in which that thread group is being processed. A thread group may also include more threads than a number of processing engines within graphics multiprocessor 1934. When a thread group includes more threads than number of processing engines within graphics multiprocessor 1934, processing can be performed over consecutive clock cycles. Multiple thread groups can be executed concurrently on a graphics multiprocessor 1934.

Graphics multiprocessor 1934 includes an internal cache memory to perform load and store operations, such as, but not limited to, any of the operations described above or elsewhere herein. Graphics multiprocessor 1934 can forego an internal cache and use a cache memory (e.g., L1 cache 1948) within processing cluster 1914. Each graphics multiprocessor 1934 may also have access to L2 caches within partition units (e.g., partition units 1920A-1920N of FIG. 19A) that can be shared among all processing clusters 1914 and may be used to transfer data between threads. Graphics multiprocessor 1934 may also access off-chip global memory, which can include one or more of local parallel processor memory and/or system memory. Any memory external to parallel processing unit 1902 may be used as global memory. Processing cluster 1914 can include multiple instances of graphics multiprocessor 1934 and can share common instructions and data, which may be stored in L1 cache 1948.

Each processing cluster 1914 may include an MMU 1945 (memory management unit) that can be configured to map virtual addresses into physical addresses. One or more instances of MMU 1945 may reside within memory interface 1918 of FIG. 19A. MMU 1945 can include a set of page table entries (PTEs) used to map a virtual address to a physical address of a tile and optionally a cache line index.

MMU 1945 may include address translation lookaside buffers (TLB) or caches that may reside within graphics multiprocessor 1934 or L1 1948 cache or processing cluster 1914. A physical address can be processed to distribute surface data access locally to allow for efficient request interleaving among partition units. A cache line index may be used to determine whether a request for a cache line is a hit or miss.

A processing cluster 1914 may be configured such that each graphics multiprocessor 1934 is coupled to a texture unit 1936 for performing texture mapping operations, e.g., determining texture sample positions, reading texture data, and filtering texture data. Texture data can be read from an internal texture L1 cache (not shown) or from an L1 cache within graphics multiprocessor 1934 and can be fetched from an L2 cache, local parallel processor memory, or system memory, as needed. Each graphics multiprocessor 1934 can output processed tasks to data crossbar 1940 to provide processed task to another processing cluster 1914 for further processing or to store processed task in an L2 cache, local parallel processor memory, or system memory via memory crossbar 1916. A preROP 1942 (pre-raster operations unit) can be configured to receive data from graphics multiprocessor 1934, and direct data to ROP units, which may be located with partition units as described herein (e.g., partition units 1920A-1920N of FIG. 19A). PreROP 1942 unit can perform optimizations for color blending, organizing pixel color data, and performing address translations.

In at least one embodiment, processing cluster 1914 can include one or more circuits to cause information to be stored and to store an indication of one or more decompression algorithms to decompress said information, to cause one or more identifiers of one or more videos and one or more indications of one or more pixel interpolation algorithms to be stored, to indicate one or more decompression algorithms to be used to access one or more frames of one or more videos, to perform interpolation of two or more pixels of one or more video frames based, at least in part, on one or more frame identifiers of said one or more video frames, to indicate one or more properties of one or more pixels based, at least in part, on one or more identifiers of one or more video frames containing said one or more pixels, and to modify one or more properties of one or more pixels based, at least in part, on one or more identifiers of one or more video frames containing said one or more pixels or otherwise perform any of the operations described above or elsewhere herein or otherwise perform any of the operations described above or elsewhere herein. One or more circuits can be configured by software to cause information to be stored and to store an indication of one or more decompression algorithms to decompress said information, to cause one or more identifiers of one or more videos and one or more indications of one or more pixel interpolation algorithms to be stored, to indicate one or more decompression algorithms to be used to access one or more frames of one or more videos, to perform interpolation of two or more pixels of one or more video frames based, at least in part, on one or more frame identifiers of said one or more video frames, to indicate one or more properties of one or more pixels based, at least in part, on one or more identifiers of one or more video frames containing said one or more pixels, and to modify one or more properties of one or more pixels based, at least in part, on one or more identifiers of one or more video frames containing said one or more pixels or otherwise perform any of the operations described above or elsewhere herein or otherwise perform any of the operations described above or elsewhere herein.

FIG. 19C shows a graphics multiprocessor 1934, in accordance with at least one embodiment, e.g., to perform any of the operations described above or elsewhere herein. Graphics multiprocessor 1934 can couple with pipeline manager 1932 of processing cluster 1914. Graphics multiprocessor 1934 can include an execution pipeline including but not limited to an instruction cache 1952 (that, e.g., can store instructions, such as, not limited to compiled API instructions), an instruction unit 1954, an address mapping unit 1956, a register file 1958, one or more general purpose graphics processing unit (GPGPU) cores 1962, and one or more load/store units 1966, where one or more load/store units 1966 can perform load/store operations to load/store instructions corresponding to performing an operation. GPGPU cores 1962 and load/store units 1966 can be coupled with cache memory 1972 and shared memory 1970 via a memory and cache interconnect 1968. GPGPU cores 1962 can be part of an SoC such as, but not limited to, part of integrated circuit 1800 in FIG. 18.

Instruction cache 1952 can receive a stream of instructions (e.g., to perform any of the operations described above or elsewhere herein) to execute from pipeline manager 1932. Instructions can be cached in instruction cache 1952 and dispatched for execution by an instruction unit 1954. Instruction unit 1954 can dispatch instructions as thread groups (e.g., warps, subgroups, wavefronts, or waves), with each thread of thread group assigned to a different execution unit within GPGPU cores 1962. An instruction can access any of a local, shared, or global address space by specifying an address within a unified address space. Address mapping unit 1956 can be used to translate addresses in a unified address space into a distinct memory address that can be accessed by load/store units 1966.

Register file 1958 can provide a set of registers for functional units of graphics multiprocessor 1934. Register file 1958 may provide temporary storage for operands connected to data paths of functional units (e.g., GPGPU cores 1962, load/store units 1966) of graphics multiprocessor 1934. Register file 1958 may be divided between each of functional units such that each functional unit is allocated a dedicated portion of register file 1958. Register file 1958 can be divided between different warps (which may be referred to as wavefronts, subgroups, and/or waves or threads) being executed by graphics multiprocessor 1934.

GPGPU cores 1962 can each include floating point units (FPUs) and/or integer arithmetic logic units (ALUs) that can be used to execute instructions of graphics multiprocessor 1934. GPGPU cores 1962 can be similar in architecture or can differ in architecture. A first portion of GPGPU cores 1962 can include a single precision FPU and an integer ALU while a second portion of GPGPU cores include a double precision FPU. FPUs can implement IEEE 754-2008 standard floating point arithmetic or enable variable precision floating point arithmetic. Graphics multiprocessor 1934 can additionally include one or more fixed function or special function units to perform specific functions such as, but not limited to, copy rectangle or pixel blending operations. One or more of GPGPU cores 1962 can also include fixed or special function logic.

GPGPU cores 1962 can include SIMD logic capable of performing a single instruction on multiple sets of data. GPGPU cores 1962 can physically execute SIMD4, SIMD8, and SIMD16 instructions and logically execute SIMD1, SIMD2, and SIMD32 instructions. SIMD instructions for GPGPU cores can be generated at compile time by a shader compiler or automatically generated when executing programs written and compiled for single program multiple data (SPMD) or SIMT architectures. Multiple threads of a program can be configured for an SIMT execution model that can be executed via a single SIMD instruction. For example, eight SIMT threads that perform same or similar operations can be executed in parallel via a single SIMD8 logic unit.

Memory and cache interconnect 1968 can include an interconnect network that connects each functional unit of graphics multiprocessor 1934 to register file 1958 and to shared memory 1970. Memory and cache interconnect 1968 may be a crossbar interconnect that allows load/store unit 1966 to implement load and store operations between shared memory 1970 and register file 1958. register file 1958 can operate at a same frequency as GPGPU cores 1962, thus data transfer between GPGPU cores 1962 and register file 1958 can have very low latency. Shared memory 1970 can be used to enable communication between threads that execute on functional units within graphics multiprocessor 1934. Cache memory 1972 can be used as a data cache for example, to cache texture data communicated between functional units and texture unit 1936. Shared memory 1970 can also be used as a program managed cache. Threads executing on GPGPU cores 1962 can programmatically store data within shared memory in addition to automatically cached data that is stored within cache memory 1972.

A parallel processor or GPGPU as described herein may be communicatively coupled to host/processor cores to accelerate graphics operations, machine-learning operations, pattern analysis operations, and various general purpose GPU (GPGPU) functions. A GPU may be communicatively coupled to host processor/cores over a bus or other interconnect (e.g., a high-speed interconnect such as, but not limited to, PCIe or NVLink). An SoC may include a parallel processor or GPGPU as described herein, where said parallel processor or said GPGPU is performed on said SoC. A GPU may be integrated on a package or chip as cores and communicatively coupled to cores over an internal processor bus/interconnect internal to a package or chip. Regardless a manner in which a GPU is connected, processor cores may allocate work to such GPU in a form of sequences of commands/instructions contained in a work descriptor. GPU then may use dedicated circuitry/logic for efficiently processing these commands/instructions to perform any of the operations described above or elsewhere herein.

In at least one embodiment, graphics multiprocessor 1934 can include one or more circuits to cause information to be stored and to store an indication of one or more decompression algorithms to decompress said information, to cause one or more identifiers of one or more videos and one or more indications of one or more pixel interpolation algorithms to be stored, to indicate one or more decompression algorithms to be used to access one or more frames of one or more videos, to perform interpolation of two or more pixels of one or more video frames based, at least in part, on one or more frame identifiers of said one or more video frames, to indicate one or more properties of one or more pixels based, at least in part, on one or more identifiers of one or more video frames containing said one or more pixels, and to modify one or more properties of one or more pixels based, at least in part, on one or more identifiers of one or more video frames containing said one or more pixels or otherwise perform any of the operations described above or elsewhere herein or otherwise perform any of the operations described above or elsewhere herein. One or more circuits can be configured by software to cause information to be stored and to store an indication of one or more decompression algorithms to decompress said information, to cause one or more identifiers of one or more videos and one or more indications of one or more pixel interpolation algorithms to be stored, to indicate one or more decompression algorithms to be used to access one or more frames of one or more videos, to perform interpolation of two or more pixels of one or more video frames based, at least in part, on one or more frame identifiers of said one or more video frames, to indicate one or more properties of one or more pixels based, at least in part, on one or more identifiers of one or more video frames containing said one or more pixels, and to modify one or more properties of one or more pixels based, at least in part, on one or more identifiers of one or more video frames containing said one or more pixels or otherwise perform any of the operations described above or elsewhere herein or otherwise perform any of the operations described above or elsewhere herein.

Figure 20:
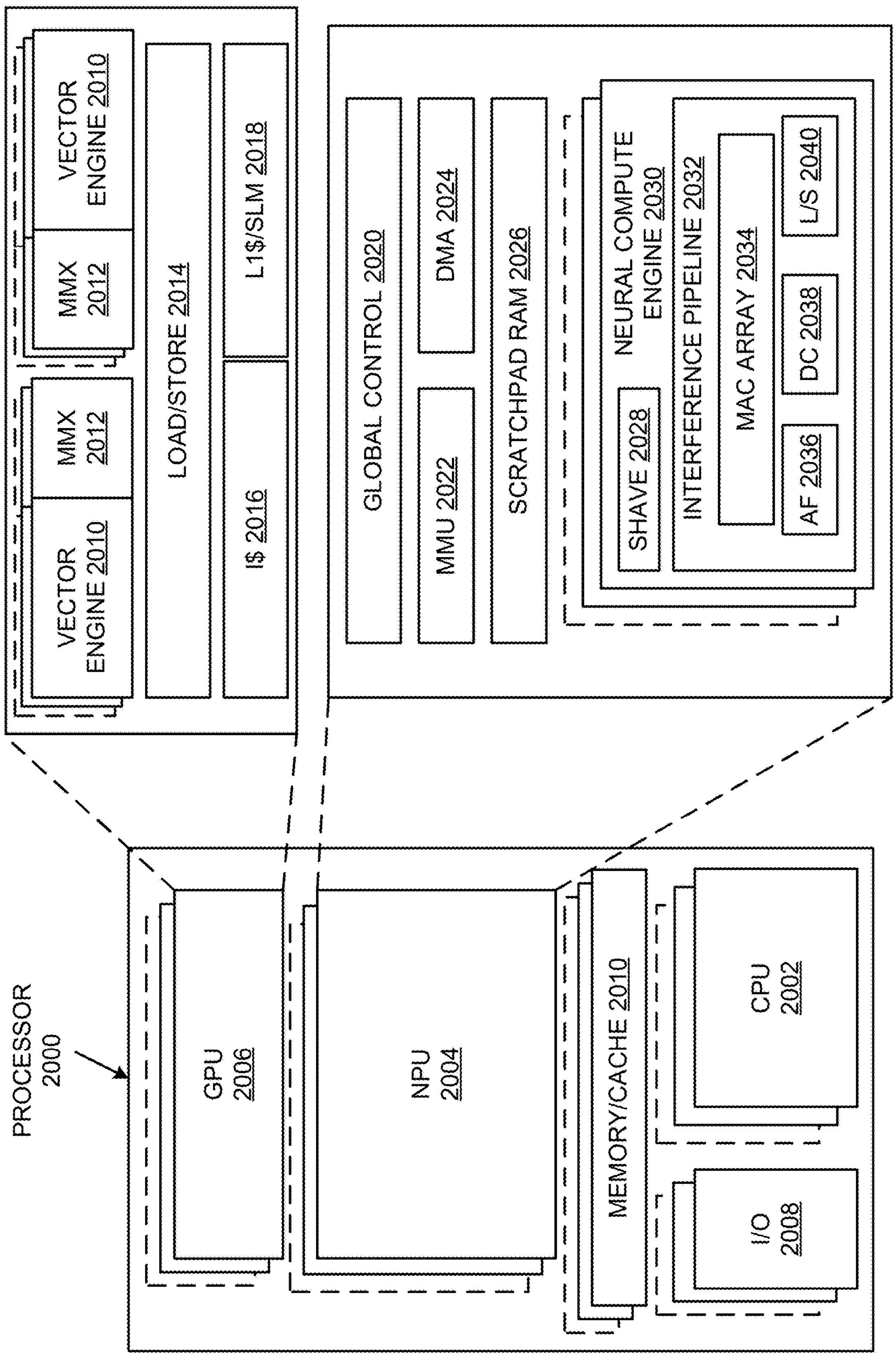
FIG. 20 illustrates an accelerator processor, in accordance with at least one embodiment.

FIG. 20 shows a processor 2000, in accordance with at least one embodiment. Processor 2000 can include a processor with hybrid architecture (e.g., Lunar Lake or Meteor Lake) from Intel Corporation in Santa Clara, CA or another processor that shares at least some of the components described herein. Processor 2000 can include one or more Central Processing Unit(s) (CPU 2002), one or more Graphics Processing Unit(s) (GPU 2006), and/or one or more Neural Processing Unit(s) (NPU 2008) that can be, e.g., a dedicated AI accelerator that offloads artificial intelligence (AI) workloads from CPU 2002 and GPU 2006. Processor 2000 can use instructions that, if executed cause processor 2000 and/or any of its components to perform some or all of processes and techniques described elsewhere herein. Processor 2000 may include any number of memory and cache units 2010 to facilitate processing amongst different components of processor 2000. Memory and cache 2010 on processor 2000 may include one or more levels of cache (e.g., L1, L2, L3, and/or last-level cache) and high-bandwidth memory (e.g., HBM2e or HBM3) in any combination. With respect to processor 2000 and any of its components described above or elsewhere herein, one or more of APIs described herein can, for example, get compiled into instructions, which may be fetched by instruction fetch logic or equivalents, decoded by a processor decoder or equivalents, scheduled (e.g., in order or out of order) for execution by a scheduler or equivalents, executed by execution logic or equivalents, reordered, and then retired by retirement logic or equivalents. API(s) (and/or compiled instructions including API(s)) can be stored in any storage outside or inside of processor 2000 (e.g., in cache and/or memory). A result of API(s) can then be stored in storage within or outside of processor 2000, including registers, DRAM, flash, SRAM, cache, or other memory. One or more of APIs described herein can include a call.

Processor 2000 can include compute engines as CPUs 2002 and can include any number of cores, such as, but not limited to, up to 16 cores/22 threads. Cores in CPU 2002 can include P-cores (Performance), E-cores (Efficient) & LP-E cores (Low-power Efficient). Performance-cores can be used for low latency single-threaded, compute-intensive workloads, while Efficient-cores can be used for multi-threaded, less compute-intensive workloads. Low-power Efficient cores can be used for scalable multithreaded performance and offloading background tasks. P-cores can be used for single & limited threading performance, whereas E- and LP-E cores can be used for multi-threaded throughput and power efficiency.

GPU 2006 can include any number of graphics engines, such as, but not limited to, Intel® Arc™ graphics engines (Xe LPG) with 8 Xe cores (up to 128 Execution Units or EUs). As shown in FIG. 20, GPU 2006 can include vector engines 2010 and matrix engines 2012, that, for example, can run FP, INT, and matrix operation tasks all at the same time or separately or in batches. GPU 2006 can include a load/store unit 2014, as well as other memory, such as, but not limited to, an instruction cache (I$) 2016 and L1 cache/subsystem local memory (SLM) 2018 that can, e.g., store instructions to perform any of the operations described above or elsewhere herein.

NPU 2004 can include one or more Intel® AI Boost built-in neural processing unit(s) (NPUs). NPU 2004 can be enumerated to a host processor as an integrated PCIe device. NPU 2004 can include one or more (e.g., two) Neural Compute Engine (NCE) tiles 2030. Each tile can be configured with any combination of, but not limited to, (e.g., 2000) Multiply Accumulate (MAC) Engines 2034, a Post Processing Engine (not shown), a AI DSP Processor (not shown), and memory (2 MB of dedicated SRAM) per tile as shown in FIG. 20. For general compute needs, Neural Compute Engines 2030 can include interference pipeline 2032, activation function (AF) 2036, data conversion 2038, load/store 2040, and Streaming Hybrid Architecture Vector Engines (SHAVE) 2028 for high performance parallel computing, which can include DMA (Direct Memory Access) engines 2024 to shuttle data between system memory DRAM (Dynamic Random Access Memory) 2026 and a software managed cache. Built-in device MMU (Memory Management Unit) 2022 plus IOMMU (Input-Output Memory Management Unit) (not shown) can support multiple simultaneous hardware contexts and provide security isolation between execution contexts as per MCDM (Microsoft Compute Driver Model) architecture. Processor 2000 can also include a media unit (not shown) that is included on or separately from XCDs or other components of processor 2000 to enable video playback and video processing of compressed or non-compressed data, such using HEVC, AV1, VP9 and AVC HW accelerated decode support and HEVC, VP9 and AVC HW accelerated encode support.

A Intel® Thread Director, which includes firmware that is built into processor 2000, can prioritize and manage distribution of workloads, sending tasks to optimized cores. For example, Thread Director can tie P-cores, E-cores and/or LP-E cores (described above) together with task-scheduling capabilities and ability to send less-demanding tasks to E-cores or LP-E cores. Intel® Deep Learning Boost (Intel® DL Boost) (not shown) can provide built in AI acceleration for training and inference workloads, and may include VNNI (for CPU) and DP4a (for GPU) instruction set support. This instruction set may be optimized with OpenVINO™ Toolkit and oneAPI to accelerate INT8 inferencing. A software stack, e.g., as described elsewhere herein, can be used to enable AI inference using OpenVINO™ toolkit. Processor 2000 can be configured to execute an application program, such as, but not limited to, a CUDA program.

In at least one embodiment, processor 2000 can include one or more circuits to cause information to be stored and to store an indication of one or more decompression algorithms to decompress said information, to cause one or more identifiers of one or more videos and one or more indications of one or more pixel interpolation algorithms to be stored, to indicate one or more decompression algorithms to be used to access one or more frames of one or more videos, to perform interpolation of two or more pixels of one or more video frames based, at least in part, on one or more frame identifiers of said one or more video frames, to indicate one or more properties of one or more pixels based, at least in part, on one or more identifiers of one or more video frames containing said one or more pixels, and to modify one or more properties of one or more pixels based, at least in part, on one or more identifiers of one or more video frames containing said one or more pixels or otherwise perform any of the operations described above or elsewhere herein or otherwise perform any of the operations described above or elsewhere herein. One or more circuits can be configured by software to cause information to be stored and to store an indication of one or more decompression algorithms to decompress said information, to cause one or more identifiers of one or more videos and one or more indications of one or more pixel interpolation algorithms to be stored, to indicate one or more decompression algorithms to be used to access one or more frames of one or more videos, to perform interpolation of two or more pixels of one or more video frames based, at least in part, on one or more frame identifiers of said one or more video frames, to indicate one or more properties of one or more pixels based, at least in part, on one or more identifiers of one or more video frames containing said one or more pixels, and to modify one or more properties of one or more pixels based, at least in part, on one or more identifiers of one or more video frames containing said one or more pixels or otherwise perform any of the operations described above or elsewhere herein or otherwise perform any of the operations described above or elsewhere herein.

Processor 2000 can alternatively include a processor based on AI Engine Direct architecture from Qualcomm Corporation in Santa Clara, CA or another processor that shares at least some of the components described herein. that may include any number of NPUs, GPUs, CPUs and other related components, such as, but not limited to, NPU 2004 as a Hexagon NPU, GPU 2006 as a Adreno GPU, CPU 2002 as a Kryo or Qualcomm Oryon CPU, as well as a Qualcomm Sensing Hub (not shown) and a memory subsystem 2010, in any combination. Hexagon NPU 2004 can include a power rail a micro-tile inferencing unit, a hardware acceleration unit, a tensor unit, a scalar unit, and a vector unit (all not shown), which can have dedicated memory or share memory (e.g., cache or memory, such HBM3) for, e.g., storing instructions to perform any of the operations described above or elsewhere herein. Adreno GPU 2006 can provide graphics and parallel processing for AI in formats, such as, but not limited to, 32-bit floating point (FP32), 16-bit floating point (FP16), and 8-bit integer (INT8). Kryo or Qualcomm Oryon CPUs 2002 can perform AI workloads, and can handle contextualization for pervasive generative AI applications. CPU 2002 can also include an instruction fetch unit, a rename and retire unit, a memory management unit, a vector execution unit, an integer execution unit, and a load and store unit for processing and instruction management. With respect to processor 2000 and any of its components described above or elsewhere herein, one or more of APIs described herein can, for example, get compiled into instructions, which may be fetched by instruction fetch unit, decoded by a processor decoder or equivalents, scheduled (e.g., in order or out of order) for execution by a scheduler or equivalents, executed by execution logic or equivalents, reordered, and then retired by rename and retire unit. API(s) (and/or compiled instructions including API(s)) can be stored in any storage outside or inside of processor 2000 (e.g., in cache and/or memory). Any number of CPU cores 2002 may be included in any number of CPU cluster(s) that can be coupled to memory and/or cache, such as, but not limited to a shared L2 cache. Memory can be separate or shared, e.g., CPU clusters of CPU cores 2002 can couple to memory subsystem 2010 that can include fabric, system level cache and any number of memory management units that can, for example, read and write memory (e.g., DRAM). Qualcomm Sensing Hub (not shown) includes micro NPUs, a power rail, and traditional sensors (a gyrometer, accelerometer, even a barometer) with voice and data streams. Memory subsystem 2010 can include memory and cache on processor 2000, which may include one or more levels of cache (e.g., L1, L2, L3, and/or last-level cache) and high-bandwidth memory (e.g., HBM2e or HBM3) in any combination, e.g., for storing information and/or instructions to perform any of the operations described above or elsewhere herein. All or some of memory and/or cache in memory subsystem 2010 can be shared or used individually by any one or combinations of components (e.g., GPU 2006, NPU 2004, and CPU 2002) on processor 2000.

Qualcomm AI Engine 2000 may be programmed and controlled with an a software stack to perform some or all of the operations described herein, and include, e.g., a Qualcomm® Neural Processing SDK for inferencing with versions for Android, Linux, and Windows. Developer libraries and services support programming languages, virtual platforms, and compilers. At a lower level of software stack, system software includes basic real-time operating system (RTOS), system interfaces, and drivers. Software stack supports different operating systems, including Android, Windows, Linux, and QNX, and deployment and monitoring infrastructure like Prometheus, Kubernetes, and Docker. For direct cross-platform access to GPU 2006, OpenCL and DirectML may be supported. For CPU 2002, a LLVM compiler infrastructure optimizations enable accelerated and efficient AI inference. With respect to Qualcomm AI Engine 2000 and any of its components described above or elsewhere herein, one or more of APIs described herein can, for example, get compiled into instructions, which may be fetched by instruction fetch logic or equivalents, decoded by a processor decoder or equivalents, scheduled (e.g., in order or out of order) for execution by a scheduler or equivalents, executed by execution logic or equivalents, reordered, and then retired by retirement logic or equivalents. API(s) (and/or compiled instructions including API(s)) can be stored in any storage outside or inside of Qualcomm AI Engine 2000 (e.g., in cache and/or memory). A result of API(s) can then be stored in storage within or outside of Qualcomm AI Engine 2000, including registers, DRAM, flash, SRAM, cache, or other memory.

In at least one embodiment, processor 2000 or Qualcomm AI Engine 2000 can include one or more circuits to cause information to be stored and to store an indication of one or more decompression algorithms to decompress said information, to cause one or more identifiers of one or more videos and one or more indications of one or more pixel interpolation algorithms to be stored, to indicate one or more decompression algorithms to be used to access one or more frames of one or more videos, to perform interpolation of two or more pixels of one or more video frames based, at least in part, on one or more frame identifiers of said one or more video frames, to indicate one or more properties of one or more pixels based, at least in part, on one or more identifiers of one or more video frames containing said one or more pixels, and to modify one or more properties of one or more pixels based, at least in part, on one or more identifiers of one or more video frames containing said one or more pixels or otherwise perform any of the operations described above or elsewhere herein or otherwise perform any of the operations described above or elsewhere herein. One or more circuits can be configured by software to cause information to be stored and to store an indication of one or more decompression algorithms to decompress said information, to cause one or more identifiers of one or more videos and one or more indications of one or more pixel interpolation algorithms to be stored, to indicate one or more decompression algorithms to be used to access one or more frames of one or more videos, to perform interpolation of two or more pixels of one or more video frames based, at least in part, on one or more frame identifiers of said one or more video frames, to indicate one or more properties of one or more pixels based, at least in part, on one or more identifiers of one or more video frames containing said one or more pixels, and to modify one or more properties of one or more pixels based, at least in part, on one or more identifiers of one or more video frames containing said one or more pixels or otherwise perform any of the operations described above or elsewhere herein or otherwise perform any of the operations described above or elsewhere herein.

Figure 21B:
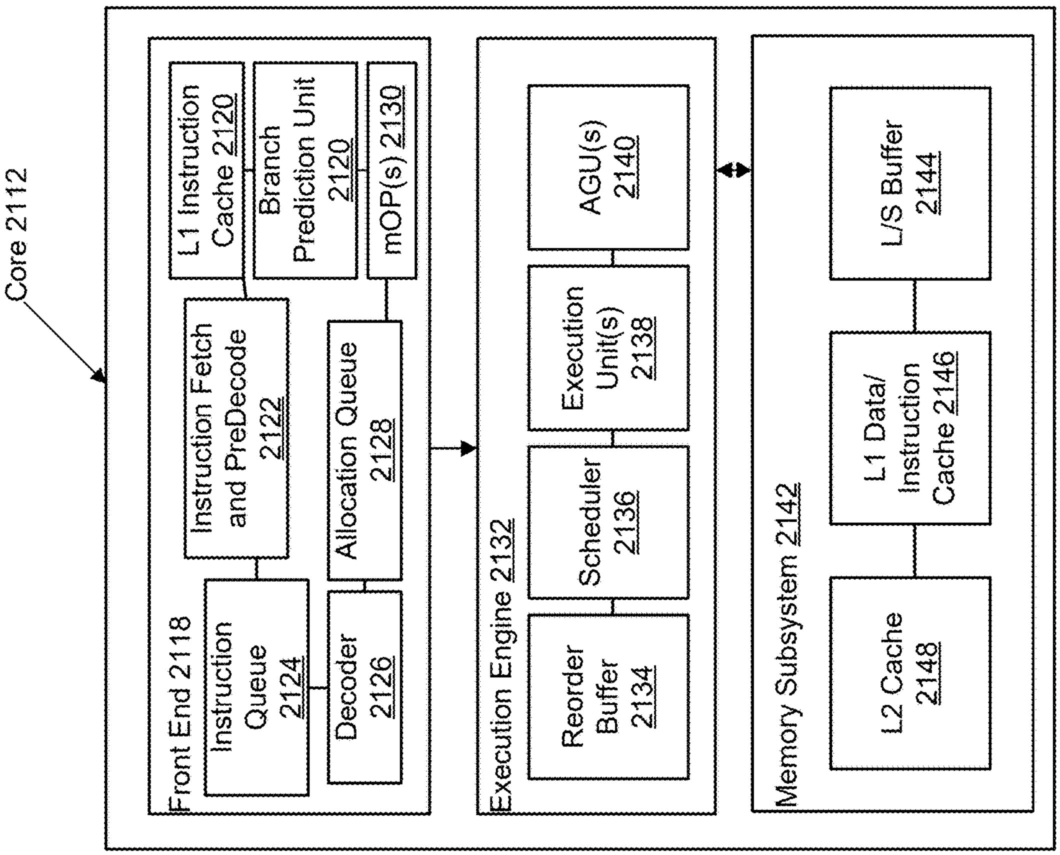
FIG. 21B illustrates a core of the central processing unit in FIG. 21A, in accordance with at least one embodiment.
Figure 21A:
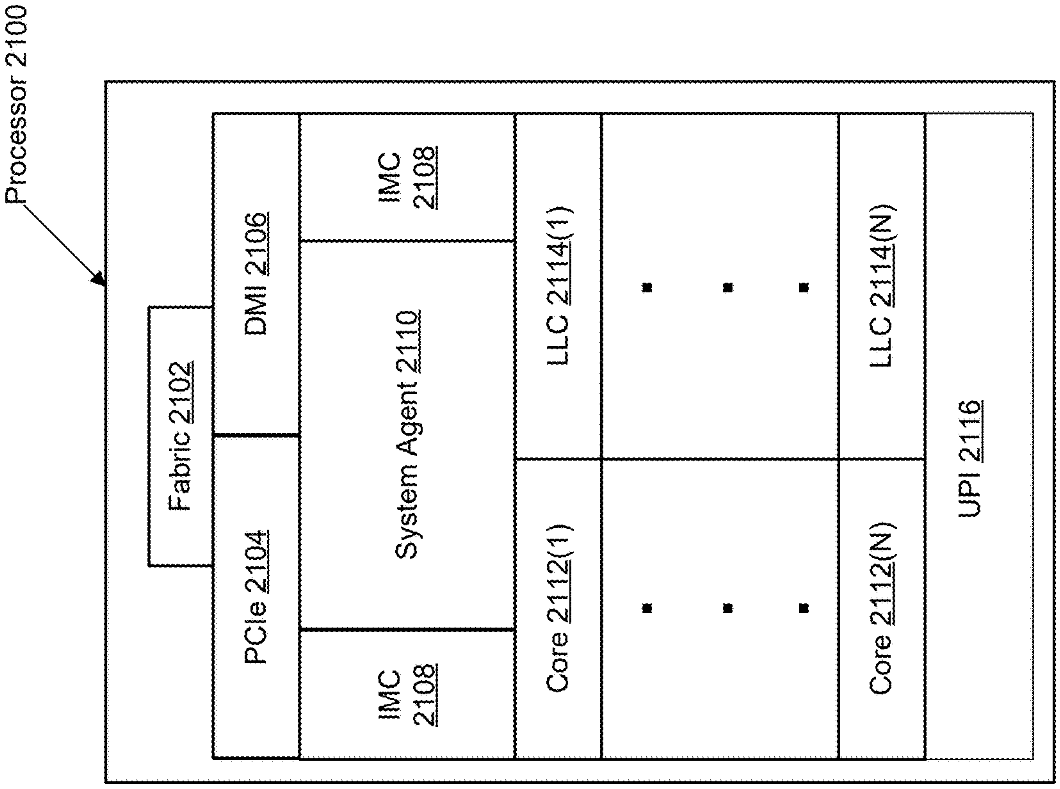
FIG. 21A illustrates a central processing unit, in accordance with at least one embodiment.

FIG. 21A illustrates a processor 2100, in accordance with at least one embodiment. Processor 2100 can include an processor with scalable family from Intel Corporation in Santa Clara, CA or another processor that shares at least some of the components described herein. Processor 2100 can include one or more cores 2112(1)-2112(N), where N is any integer greater than 1 that can perform the operations described elsewhere herein. Cores 2112(1)-2112(N) can be interlinked together using ring and/or mesh interconnects. With a mesh interconnects architecture, an array of vertical and horizontal communication paths may allow traversal from one core to another 2112(1)-2112(N) through a shortest path (hop on vertical path to correct row, and hop across horizontal path to correct column). For mesh interconnects, a die can house cores 2112(1)-2112(N) and can include a grid of converged mesh stops (CMS) that may be associated (e.g., 1:1) with cores 2112(1)-2112(N). Each core can be associated with one lower level cache (LLC) slice 2114(1)-2114(N), or cores 2112(1)-2112(N) can share cache, e.g., lower level cache. LLCs 2114(1)-2114(N) can be inclusive by incorporating blocks in higher level cache (e.g., L2 cache) or non-inclusive (having blocks that may be not present in higher level cache). Each core and LLC slice can include a Caching and Home Agent (CHA) (not shown) that can maintain cache coherency by providing scalability of resources across mesh interconnects for Intel® Ultra Path Interconnect (Intel® UPI 2116) cache coherency functionality. UPI 2116 can provide a coherent interconnect for scalable systems and can allow for multiple processors to share a single shared address space through links, such as, but not limited to, two or three UPI links per processor.

Processor 2100 can also include System Agent 2110 that can house and/or perform various functionalities, such as, but not limited to, memory management, display functions, and/or input/output (I/O) functions. For example, processor 2100 can include one or more integrated memory controller(s) (IMC) 2108. IMC 2108 can control and manage memory, such as, but not limited to, different memory types e.g., DDR ram, like DDR4 or others described elsewhere herein. System Agent 2110 can include a display controller (not shown) to support display(s). System Agent 2110 can also incorporate PCIe 2104 (e.g., up to 20 lanes of PCIe), e.g., that can connect with an external dedicated graphics hookup over DMI bus (e.g., Intel's DMI 3.0 bus) 2106. System Agent 2110 can include an Image Processing Unit (IPU) (not shown) which incorporates an image signal processor (ISP) on-die. Fabric 2102 can provide scalability for connecting to other nodes (e.g., processors, such as processor 2100), and can, for example, be used with Cornelis Networks, an element of Intel® Scalable System Framework, that delivers the performance for high performance computing (HPC) workloads and the ability to scale to tens of thousands of nodes.

FIG. 21B illustrates components within core 2112, in accordance with at least one embodiment. Core 2112 can include front-end 2118, back-end or execution engine 2132, and memory subsystem 2142. Front-end 2118 can provide execution engine 2132 with operations (e.g., operations described elsewhere herein) by decoding instructions stored in memory. For example, front-end 2118 can include a micro-operations (μOps) cache path and/or a legacy path, along with branch prediction unit 2121 that can determine paths instructions. A legacy path for instructions may include fetching variable-length (e.g., x86) instructions from L1 instruction cache 2120 with instruction fetch and predecode 2122, queuing the instructions in instruction queue 2124, and decoding instructions using decoder 2126 into u Ops that can be provided to allocation queue 2128. Alternatively, a μOPs cache path may include a cache containing already decoded μOps (μOps 2130) that can be sent to allocation queue 2128. Allocation queue 2128 can perform as an interface between front-end 2118 and execution engine 2132, and can provide instructions to execution engine 2132. One or more of API(s) described herein can, for example, get compiled into instructions that can be stored, processed, and executed by front-end 2118, execution engine 2132, and stored in memory subsystem 2142.

Execution engine 2132 can receive micro-operations into reorder buffer 2134, which can register allocation, rename, and retire μOPs. From reorder buffer, OPs can be sent to scheduler 2136 that can be connected one or more different execution units 2138, which can be connected to address generation unit (AGU) 2140. Execution units 2138 can perform, e.g., basic arithmetic logic unit (ALU) operations, multiplication, division, and/or more complex operations, such as, but not limited to, various vector operations. Scheduler 2136 may manage queuing μOPs for one or more of execution units 2138 depending, e.g., on operations needed to be performed.

Memory subsystem 2142 can process load and store requests as well as ordering operations. For example, μOPs may relate to memory access (e.g. load and store), and those can be sent on dedicated scheduler ports that can perform those memory operations. Store and load operations, for example, can be sent to load and store buffer(s) 2144. Memory subsystem 2142 can also include shared or separate L1 data and instruction cache 2146, as well as L2 cache 2148 that can be used and shared by L1 data and instruction cache 2146. As described above for FIG. 21A, each core 2112 can be connected to a slice of a third level of cache (e.g., LLC 2114) that can be shared by all core 2112.

In at least one embodiment, processor 2100 can include one or more circuits to cause information to be stored and to store an indication of one or more decompression algorithms to decompress said information, to cause one or more identifiers of one or more videos and one or more indications of one or more pixel interpolation algorithms to be stored, to indicate one or more decompression algorithms to be used to access one or more frames of one or more videos, to perform interpolation of two or more pixels of one or more video frames based, at least in part, on one or more frame identifiers of said one or more video frames, to indicate one or more properties of one or more pixels based, at least in part, on one or more identifiers of one or more video frames containing said one or more pixels, and to modify one or more properties of one or more pixels based, at least in part, on one or more identifiers of one or more video frames containing said one or more pixels or otherwise perform any of the operations described above or elsewhere herein or otherwise perform any of the operations described above or elsewhere herein. One or more circuits can be configured by software to cause information to be stored and to store an indication of one or more decompression algorithms to decompress said information, to cause one or more identifiers of one or more videos and one or more indications of one or more pixel interpolation algorithms to be stored, to indicate one or more decompression algorithms to be used to access one or more frames of one or more videos, to perform interpolation of two or more pixels of one or more video frames based, at least in part, on one or more frame identifiers of said one or more video frames, to indicate one or more properties of one or more pixels based, at least in part, on one or more identifiers of one or more video frames containing said one or more pixels, and to modify one or more properties of one or more pixels based, at least in part, on one or more identifiers of one or more video frames containing said one or more pixels or otherwise perform any of the operations described above or elsewhere herein or otherwise perform any of the operations described above or elsewhere herein.

Figure 22:
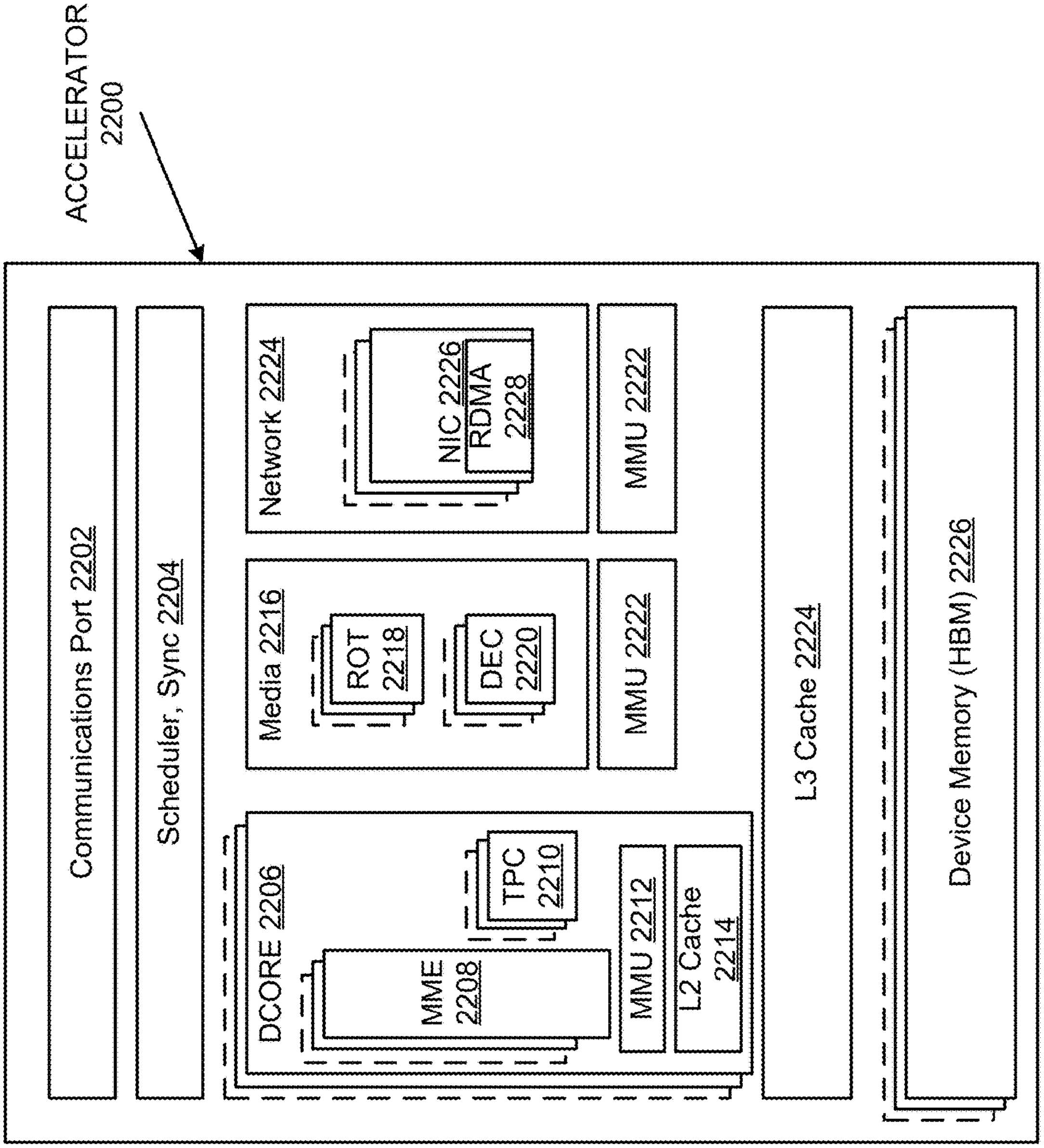
FIG. 22 illustrates another accelerator processor, in accordance with at least one embodiment.

FIG. 22 illustrates an AI accelerator 2200, in accordance with at least one embodiment. Processor 2200 can include a processor with AI accelerator architecture from Intel Corporation in Santa Clara, CA or another processor that shares at least some of the components described herein. AI accelerator 2200 may use instructions that, if executed by AI accelerator 2200, cause AI accelerator 2200 to perform some or all of processes and techniques described elsewhere herein. For example, with respect to AI accelerator 2200 and any of its components described above or elsewhere herein, one or more of APIs described herein can, for example, get compiled into instructions, which may be fetched by instruction fetch logic or equivalents, decoded by a processor decoder or equivalents, scheduled (e.g., in order or out of order) for execution by a scheduler or equivalents, executed by execution logic or equivalents, reordered, and then retired by retirement logic or equivalents. API(s) (and/or compiled instructions including API(s)) can be stored in any storage outside or inside of AI accelerator 2200 (e.g., in cache and/or memory). A result of API(s) can then be stored in storage within or outside of AI accelerator 2200, including registers, DRAM, flash, SRAM, cache, or other memory. AI accelerator 2200 may include one or more compute dies that can include homogeneous or heterogeneous processors. Compute dies may include one or more central processing units (CPU), one or more graphics processing units (GPU), or combinations of both.

In at least one embodiment, compute dies may include compute engines to perform AI computations. In at least one embodiment, AI accelerator 2200 compute dies may be split into any number of (e.g., four) clusters that may be referred to as a DCORE (Deep Learning Core) 2206 and contain any number of Matrix Multiplication Engines (MMEs) 2208, Tensor Processor Cores (TPCs) 2210, memory management unit 2212, and L2 Cache 2214, in any combination. MME(s) 2208 can perform operations that use Matrix Multiplication, like fully connected layers, convolutions and batched-General Matrix Multiplications (GEMMs). MMEs 2208 may be equipped with Multiply-Accumulate Units (MACs) (not shown) that, for example, may perform General Matrix Multiplication (GEMM) operations, such as, but not limited to, an AxB multiplication that involves generating tensor C[NxM] from two input tensors, A [NxK] and B[KxN]. MME(s) 2208 may be programmed with array dimensions, locations, data types, and various execution operands. MME(s) 2208 can retrieve tensors A and B from memory, pulling them into its streaming buffers for matrix multiplication to be performed in parallel by MACs. MME(s) 2208 may push tensor C back to memory upon completion. TPC(s) 2210 may include any number of scalar units for performing scalar operations, any number of vector units for performing vector operations, any number of register files or local memory units (e.g., a vector local memory), and load and store components for instructions, which can be coupled to memory or cache (e.g., HBM, L3 cache and/or L2 cache) (all not shown). TPCs can support different types of parallel processing, e.g., Very Long Instruction Word (VLIW) Single-Instruction Multiple-Data (SIMD) that supports data types, such as, but not limited to, FP32, BF16, FP16 & FP8 (both E4M3 and E5M2), UINT32, INT32, UINT16, INT16, UINT8 and INT8 datatypes. Any number of compute dies may be connected through an interconnect. An interconnect that can connect compute dies can be over an interposer bridge that, e.g., is transparent to software.

Memory on AI Accelerator 2200 may include one or more levels of cache (e.g., L1, L2, L3, and/or last-level cache) and high-bandwidth memory (e.g., HBM2e or HBM3) in any combination. Memory and/or cache systems can be unified or separate. Compute dies of AI accelerator 2200 may include on-die memory that includes one or more levels (e.g., two-levels) of cache. On-die SRAM or other memory described elsewhere herein can be used as a uniformly accessible last-level cache (L3) or split to slices of L2 cache that may be accessible to groups of MMEs 2208 and TPCs 2210. Using on-die memory as L2 or L3 cache can be fully configurable by software, which dynamically may decide per I/O tensor its optimal cache allocation. AI Accelerator 2200 may include one or more Memory Management Units (MMUs) 2222 for managing memory, such as allowing AI accelerator 2200 memory subsystem to operate in a virtual space when accessing VRAM.

AI accelerator 2200 may include a communications port (e.g., a PCIe Gen5 X16 port) 2202 for communicating with a host and Scheduling and Synchronization Unit 2204. AI accelerator 2200 may include Media Unit 2216 that may include any number or combinations of Media Decoder Engines (DECs) 2220 and Rotator Engines (ROT) 2218. AI accelerator 2200 may include a network unit 2224 that may include any number or combinations of network ports 2226 and accompanied RDMA Engine(s) 2228, L2 Cache, and memory (e.g., HBM2e or HBM3) stacks. AI accelerator 2200 can incorporate a programmable Control Path entity (not shown) to manage parallel and efficient execution of various engines. Control Path can include Submission Queues (SQs) that may be issued by runtime system, Completion Queues (CQs) that may be used for job completion reporting, a Programmable Scheduling Mechanism that may be utilized for task scheduling, a Programmable Hardware Synchronization Mechanism or 'Sync Manager (SM)' that may be used for hardware synchronization, a Programmable Interrupt Service Mechanism or 'Interrupt Manager (INTR)' that can enable passing of asynchronous events to drivers.

AI accelerator 2200 may include media decoding units that support Video Formats, such as, but not limited to, HEVC, Progressive H.264, SVC base layer, MVC, VP9, JPEG, Progressive JPEG. AI accelerator 2200 may support post processing of decoded media streams, such as, but not limited to, image down-scaling (resizing an image), vertical and horizontal scaling at different scaling ratios, Image up-scaling, Image cropping, bilinear scaling, and Lancos scaling. AI accelerator 2200 may implement two post processing channels per decoder unit, one with scalar (up and down) and one just to output the original image. AI accelerator 2200 may include a hardware rotator engine that performs the following transformations of an input image: 2D rotation, 3D rotation, Projection, distorting and undistorting images, resampling input data at user-defined coordinates, and rescaling.

RDMA 2228 over Converged Ethernet on AI accelerator 2200 may enable scaling from a single node (i.e., a single AI Accelerator 2200 to hundreds or thousands of nodes or AI Accelerators 2200). NW Subsystem 2224 can include an Intel® Gaudi® Communication Library (IGCL), a master conductor that orchestrates data movement, and a programable scheduling mechanism that can enable smooth activation of engines while maintaining task dependencies. A accelerator networking sub-system can include Gigabit Ethernet NIC ports 2226, a Layer2 MAC (not shown), and RDMA Engines 2228. AI Accelerator 2200 can include Aggregation Engines for performing summing activities. All engines in processor 2200 can operate in parallel, e.g., MME(s) 2208, TPC(s) 2210 and NIC(s) 2226 can all work at the same time. There can be dependency between operations running on different engines, e.g., output of one engine can be used as input of another engine, and/or MME, TPC and NIC can be scheduled to run in parallel. When one engine has completed its executing operation, another engine can be scheduled to start working on the next operation (immediately upon readiness of its inputs).

AI Accelerator 2200 can be operated and controlled using software layer 2228 that may include low-level components, such as, but not limited to, a graph compiler, an automatic kernel fuser and a library of precompiled kernels, as well as integration to AI ecosystems, such as, but not limited to, PyTorch, DeepSpeed, Hugging Face, vLLM, Ray and more, or as described elsewhere herein with respect to software and programming platforms. Software layer 2228 may include implementations of algorithms, such as, but not limited to, Paged Attention, Flash Attention and more. Software layer 2228 may generate optimized binary code that implements a given model topology, such as, but not limited to, performing operator fusion, data layout management, parallelization, pipelining and memory management, and graph-level optimizations.

In at least one embodiment, AI accelerator 2200 can include one or more circuits to cause information to be stored and to store an indication of one or more decompression algorithms to decompress said information, to cause one or more identifiers of one or more videos and one or more indications of one or more pixel interpolation algorithms to be stored, to indicate one or more decompression algorithms to be used to access one or more frames of one or more videos, to perform interpolation of two or more pixels of one or more video frames based, at least in part, on one or more frame identifiers of said one or more video frames, to indicate one or more properties of one or more pixels based, at least in part, on one or more identifiers of one or more video frames containing said one or more pixels, and to modify one or more properties of one or more pixels based, at least in part, on one or more identifiers of one or more video frames containing said one or more pixels or otherwise perform any of the operations described above or elsewhere herein or otherwise perform any of the operations described above or elsewhere herein. One or more circuits can be configured by software to cause information to be stored and to store an indication of one or more decompression algorithms to decompress said information, to cause one or more identifiers of one or more videos and one or more indications of one or more pixel interpolation algorithms to be stored, to indicate one or more decompression algorithms to be used to access one or more frames of one or more videos, to perform interpolation of two or more pixels of one or more video frames based, at least in part, on one or more frame identifiers of said one or more video frames, to indicate one or more properties of one or more pixels based, at least in part, on one or more identifiers of one or more video frames containing said one or more pixels, and to modify one or more properties of one or more pixels based, at least in part, on one or more identifiers of one or more video frames containing said one or more pixels or otherwise perform any of the operations described above or elsewhere herein or otherwise perform any of the operations described above or elsewhere herein.

Figure 23:
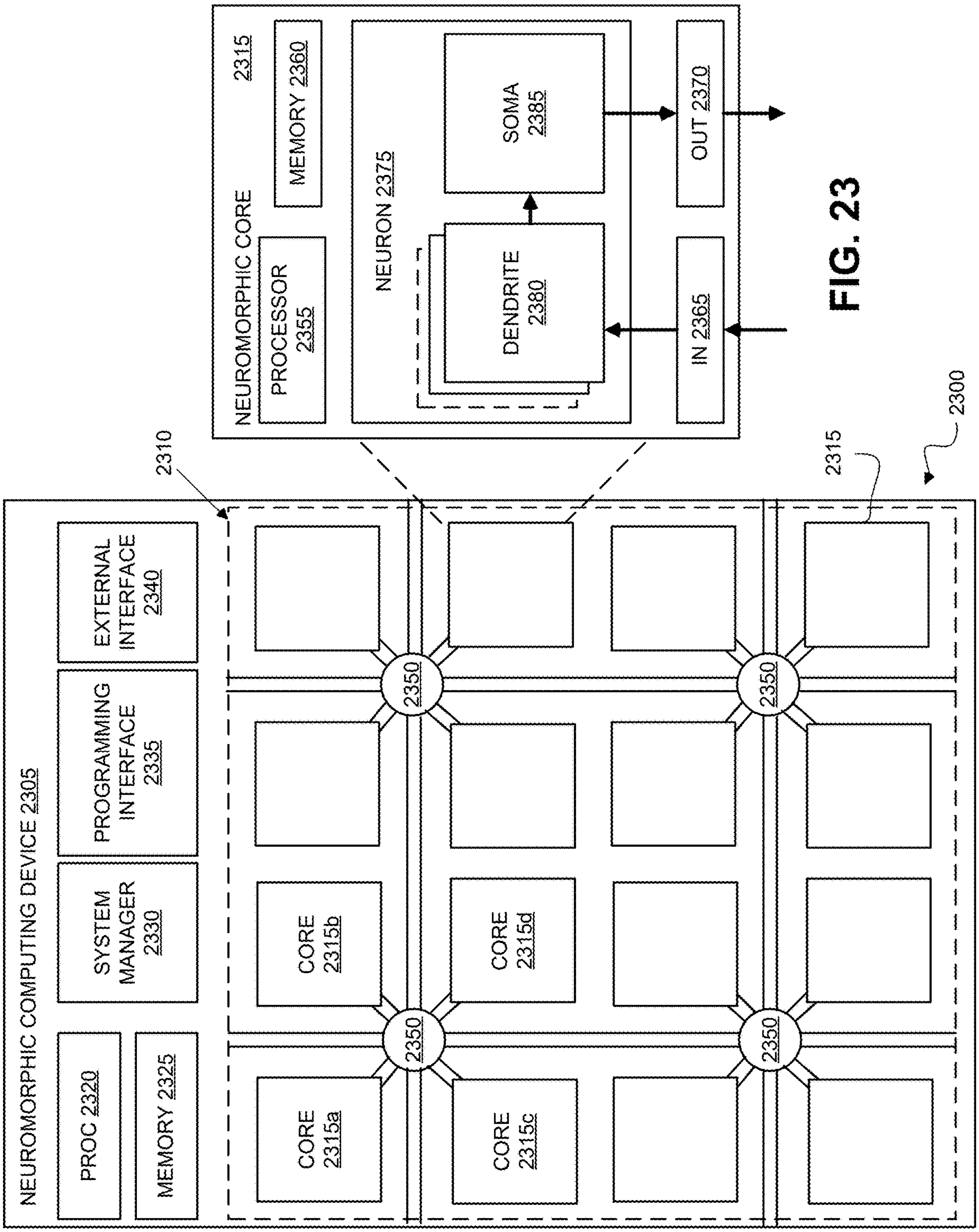
FIG. 23 illustrates a neuromorphic processor, in accordance with at least one embodiment.

A neuromorphic computing system is described that adopts a multicore architecture where each core houses computing elements including neurons, synapses with on-chip learning capability, and local memory to store synaptic weights and routing tables. FIG. 23 is a simplified block diagram 2300 illustrating an example of at least a portion of such a neuromorphic computing device 2305, in accordance with at least one embodiment. Neuromorphic computing device 2305 can include a neuromorphic processor from Intel Corporation in Santa Clara, CA or another processor that shares at least some of the components described herein. As shown in this example, a device 2305 may be provided with a network 2310 of multiple neural network cores interconnected by an on-device network such that multiple different connections may be potentially defined between cores. For instance, a network 2310 of spiking neural network cores may be provided in device 2305 and may each communicate via short packetized spike messages sent from core to core over network channels. Each core (e.g., 2315) may possess processing and memory resources and logic to implement some number of primitive nonlinear temporal computing elements, such as, but not limited to, multiple (e.g., 1000+) distinct artificial neurons (referred to herein as "neurons"). For instance, each core may be capable of concurrently implementing multiple neurons such that neuromorphic cores may implement many multiples of neurons using device 2305. With respect to neuromorphic computing device 2305 and any of its components described above or elsewhere herein, one or more of APIs or equivalents described herein can, for example, get compiled into instructions or equivalents, which may be fetched by instruction fetch logic or equivalents, decoded by a processor decoder or equivalents, scheduled (e.g., in order or out of order) for execution by a scheduler or equivalents, executed by execution logic or equivalents, reordered, and then retired by retirement logic or equivalents. API(s) (and/or compiled instructions including API(s)) can be stored in any storage outside or inside of neuromorphic computing device 2305 (e.g., in cache and/or memory). A result of API(s) can then be stored in storage within or outside of neuromorphic computing device 2305, including registers, DRAM, flash, SRAM, cache, or other memory equivalents.

Continuing with the example of FIG. 23, neuromorphic computing device 2305 may additionally include processor 2320 and system memory 2325 to implement one or more components to manage and provide functionality of neuromorphic computing device 2305. For instance, system manager 2330 may be provided to manage global attributes and operations of neuromorphic computing device 2305 (e.g., attributes affecting network of cores 2310, multiple cores in network 2310, interconnections of neuromorphic computing device 2305 with other devices, manage access to global system memory 2325, among other potential examples). In one example, system manager 2330 may manage the definition and provisioning of a specific routing tables to various routers in network 2310, orchestration of a network definition and attributes (e.g., weights, decay rates, etc.) to be applied in network 2310, core synchronization and time multiplexing management, routing of inputs to appropriate cores, among other potential functions.

As another example, neuromorphic computing device 2305 may additionally include programming interface 2335 through which a user or system may specify a neural network definition to be applied (e.g., through a routing table and individual neuron properties) and implemented by mesh 2310 of neuromorphic cores. A software-based programming tool may be provided with or separate from neuromorphic computing device 2305 through which a user may provide a definition for a particular neural network to be implemented using network 2310 of neuromorphic cores. Programming interface 2335 may take an input of a programmer to then generate corresponding routing tables and populate local memory of individual neuromorphic cores (e.g., 2315) with specified parameters to implement a corresponding, customized network of artificial neurons implemented by neuromorphic cores 2315.

In some cases, neuromorphic computing device 2305 may advantageously interface with and interoperate with other devices, including general purpose computing devices, to realize certain applications and use cases. Accordingly, external interface logic 2340 may be provided in some cases to communicate (e.g., over one or more defined communication protocols) with one or more other devices. An external interface 2340 may be utilized to accept input data from another device or external memory controller acting as a source of input data. External interface 2340 may be additionally or alternatively utilized to allow results or output of computations of a neural network implemented using neuromorphic computing device 2305 to be provided to another device (e.g., another general purpose processor implementing a machine learning algorithm) to realize additional applications and enhancements, among other examples.

As shown in FIG. 23, network 2310 of multiple neural network cores interconnected by an on-device network is shown illustrating a portion of a network fabric interconnecting multiple neuromorphic cores (e.g., 2315*a-d*). For instance, a number of neuromorphic cores (e.g., 2315*a-d*) may be provided in a mesh, with each core being interconnected by a network including a number of routers (e.g., 2350). In one implementation, each neuromorphic core (e.g., 2315*a-d*) may be connected to a single one of routers (e.g., 2350) and routers may be connected to at least one other router (as shown at 2310 in FIG. 23). As an example, in one particular implementation, four neuromorphic cores (e.g., 2315*a-d*) may be connected to a single router (e.g., 2350) and each of routers 2350 may be connected to two or more other routers to form a manycore mesh, allowing each neuromorphic core to interconnect with each other neuromorphic core in neuromorphic computing device 2305. Moreover, as each neuromorphic core may be configured to implement multiple distinct neurons, router network of neuromorphic computing device 2305 may similarly enable connections, or artificial synapses (or, simply, "synapses"), to be defined between any two of potentially many (e.g., 30,000+) neurons defined using network of neuromorphic cores 2310 provided in neuromorphic computing device 2305.

FIG. 23 shows a block diagram illustrating internal components of one example implementation of neuromorphic core 2315. In one example, a single neuromorphic core may implement some number of neurons (e.g. 1024) that share architectural resources of neuromorphic core 2315 in a time-multiplexed manner. In one example, each neuromorphic core 2315 may include processor block 2355 capable of performing arithmetic functions and routing in connection with the realization of a digitally implemented artificial neuron, such as, but not limited to, explained herein. Each neuromorphic core 2315 may additionally provide local memory in which a routing table may be stored and accessed for a neural network, accumulated potential of each soma of each neuron implemented using core 2315 may be tracked, parameters of each neuron implemented by core May 2315 be recorded, among other data and usage. Components, or architectural resources, of neuromorphic core 2315 may further include input interface 2365 to accept input spike messages generated by other neurons on other neuromorphic cores and output interface 2370 to send spike messages to other neuromorphic cores over mesh network 2310. In some instances, routing logic for neuromorphic core 2315 may be at least partially implemented using output interface 2370. Further, in some cases, core (e.g., 2315) may implement multiple neurons within an example SNN and some of these neurons may be interconnected. In such instances, spike messages sent between neurons hosted on core 2315 may forego communication over routing fabric of neuromorphic computing device 2305 and may instead by managed locally at particular neuromorphic core 2315.

Each neuromorphic core may additionally include logic to implement, for each neuron 2375, artificial dendrite 2380 and artificial soma 2385 (referred to herein, simply, as "dendrite" and "soma" respectively). Dendrite 2380 may be a hardware-implemented process that receives spikes from network 2310. Soma 2385 may be a hardware-implemented process that receives each dendrite's accumulated neurotransmitter amounts for the current time and evolves each dendrite and soma's potential state to generate outgoing spike messages at the appropriate times. Dendrite 2380 may be defined for each connection receiving inputs from another source (e.g., another neuron). In one implementation, dendrite process 2380 may receive and handle spike messages as they serially arrive in time-multiplexed fashion from network 2310. As spikes are received, neuron's activation (tracked using soma 2385 (and local memory 2360)) may increase. When neuron's activation exceeds a threshold set for neuron 2375, neuron 2375 may generate a spike message that is propagated to a fixed set of fanout neurons via output interface 2370. Network distributes spike messages to all destination neurons, and in response those neurons, in turn, may update their activations in a transient, time-dependent manner, and so on, potentially causing the activation of some of these destination neurons to also surpass corresponding thresholds and trigger further spike messages, as in real biological neural networks.

As noted above, neuromorphic computing device 2305 may reliably implement a spike-based model of neural computation. Such models may also be referred to as Spiking Neural Networks (SNNs). In addition to neuronal and synaptic state, SNNs also incorporate the concept of time. For instance, in an SNN, communication occurs over event-driven action potentials, or spikes, that convey no explicit information other than the spike time as well as an implicit source and destination neuron pair corresponding to the transmission of the spike. Computation occurs in each neuron as a result of the dynamic, nonlinear integration of weighted spike input. In some implementations, recurrence and dynamic feedback may be incorporated within an SNN computational model. Further, a variety of network connectivity models may be adopted to model various real world networks or relationships, including fully connected (all-to-all) networks, feed-forward trees, fully random projections, "small world" networks, among other examples. A homogeneous, two-dimensional network of neuromorphic cores, such as, but not limited to, shown in the example of FIG. 23 may advantageously supports all of these network models. As some or all cores of neuromorphic computing device 2305 may be connected, some or all neurons defined in cores may be therefore also fully connected through some number of router hops. Neuromorphic computing device 2305 may further include fully configurable routing tables to define a variety of different neural networks by allowing each core's neurons to distribute their spikes to any number of cores in mesh 2310 to realize fully arbitrary connectivity graphs.

In an improved implementation of a system capable of supporting SNNs, such as, but not limited to, a very large scale integration (VLSI) hardware device illustrated in the example of FIG. 23, high speed and reliable circuits may be provided to implement SNNs to model information processing algorithms as employed by a brain, but in a more programmable manner. For instance, while a biological brain can only implement a specific set of defined behaviors, as conditioned by years of development, a neuromorphic processor device may provide a capability to rapidly reprogram all neural parameters. Accordingly, a single neuromorphic processor may be utilized to realize a broader range of behaviors than those provided by a single slice of biological brain tissue. This distinction may be realized by adopting a neuromorphic processor with neuromorphic design realizations that differ markedly from those of neural circuits found in nature.

As an example, a neuromorphic processor may utilize time-multiplexed computation in both a spike communication network and neuron machinery of neuromorphic computing device 2305 to implement SNNs. Accordingly, physical circuitry of neuromorphic computing device 2305 may be shared among many neurons to realize higher neuron density. With time multiplexing, a network can connect N cores with O(N) total wiring length, whereas discrete point-to-point wiring would scale as $O(N^2)$, realizing a significant reduction in wiring resources to accommodate planar and non-plastic VLSI wiring technologies, among other examples. In neuromorphic cores, time multiplexing may be implemented through dense memory allocation, for instance, using Static Random Access Memory (SRAM), with shared buses, address decoding logic, and other multiplexed logic elements. State of each neuron may be stored in processor's memory, with data describing each neuron state including state of each neuron's collective synapses, all currents and voltages over its membrane, among other example information (such as, but not limited to, configuration and other information).

A neuromorphic processor may adopt a "digital" implementation that diverts from other processors adopting more "analog" or "isomorphic" neuromorphic approaches. For instance, a digital implementation may implement integration of synaptic current using digital adder and multiplier circuits, as opposed to analog isomorphic neuromorphic approaches that accumulate charge on capacitors in an electrically analogous manner to how neurons accumulate synaptic charge on their lipid membranes. Accumulated synaptic charge may be stored, for instance, for each neuron in local memory of a corresponding core. Further, at an architectural level of an example digital neuromorphic processor, reliable and deterministic operation may be realized by synchronizing time across a network of cores such that any two executions of a design, given same initial conditions and configuration, will produce identical results. Asynchrony may be preserved at a circuit level to allow individual cores to operate as fast and freely as possible, while maintaining determinism at a system level. Accordingly, a notion of time as a temporal variable may be abstracted away in neural computations, separating it from a "wall clock" time that the hardware utilized to perform the computation. Accordingly, in some implementation, a time synchronization mechanism may be provided that globally synchronizes neuromorphic cores at discrete time intervals. A synchronization mechanism allows neural computation to complete as fast as circuitry allows, with a divergence between run time and biological time that a neuromorphic system models.

In operation, neuromorphic computing device 2305 may begin in an idle state with all neuromorphic cores inactive. As each core asynchronously cycles through its neurons, it generates spike messages that a mesh interconnect routes to appropriate destination cores containing all destination neurons. Implementation of multiple neurons on a single neuromorphic core may be time-multiplexed, and a time step may be defined in which all spikes involving multiple neurons may be processed and considered using shared resources of a corresponding core. As each core finishes servicing its neurons for a respective time step, cores may, in some implementations, communicate (e.g., using a handshake) with neighboring cores using synchronization messages to flush a mesh of all spike messages in flight, allowing cores to safely determine that all spikes have been serviced for a time step. At that point all cores may be considered synchronized, allowing them to advance their time step and return to an initial state and begin a next time step.

Given this context, and as introduced above, a device (e.g., 2305) implementing a mesh 2310 of interconnected neuromorphic cores may be provided, with core 2315 implementing potentially multiple artificial neurons capable of being interconnected to implement an SNN. Each neuromorphic core (e.g., 2315) may provide two loosely coupled asynchronous processes: an input dendrite process (e.g., 2380) that receives spikes from network 2310 and applies them to an appropriate destination dendrite compartments at the appropriate future times, and output soma process (e.g., 2385) that receives each dendrite compartment's accumulated neurotransmitter amounts for the current time and evolves each dendrite and soma's membrane potential state, generating outgoing spike messages at appropriate times (e.g., when a threshold potential of a soma has been reached). Note that, from a biological perspective, dendrite and soma names used here only approximate a role of these functions and should not be interpreted too literally.

In at least one embodiment, neuromorphic computing device 2305 can include one or more circuits to cause information to be stored and to store an indication of one or more decompression algorithms to decompress said information, to cause one or more identifiers of one or more videos and one or more indications of one or more pixel interpolation algorithms to be stored, to indicate one or more decompression algorithms to be used to access one or more frames of one or more videos, to perform interpolation of two or more pixels of one or more video frames based, at least in part, on one or more frame identifiers of said one or more video frames, to indicate one or more properties of one or more pixels based, at least in part, on one or more identifiers of one or more video frames containing said one or more pixels, and to modify one or more properties of one or more pixels based, at least in part, on one or more identifiers of one or more video frames containing said one or more pixels or otherwise perform any of the operations described above or elsewhere herein or otherwise perform any of the operations described above or elsewhere herein. One or more circuits can be configured by software to cause information to be stored and to store an indication of one or more decompression algorithms to decompress said information, to cause one or more identifiers of one or more videos and one or more indications of one or more pixel interpolation algorithms to be stored, to indicate one or more decompression algorithms to be used to access one or more frames of one or more videos, to perform interpolation of two or more pixels of one or more video frames based, at least in part, on one or more frame identifiers of said one or more video frames, to indicate one or more properties of one or more pixels based, at least in part, on one or more identifiers of one or more video frames containing said one or more pixels, and to modify one or more properties of one or more pixels based, at least in part, on one or more identifiers of one or more video frames containing said one or more pixels or otherwise perform any of the operations described above or elsewhere herein or otherwise perform any of the operations described above or elsewhere herein.

Figure 24:
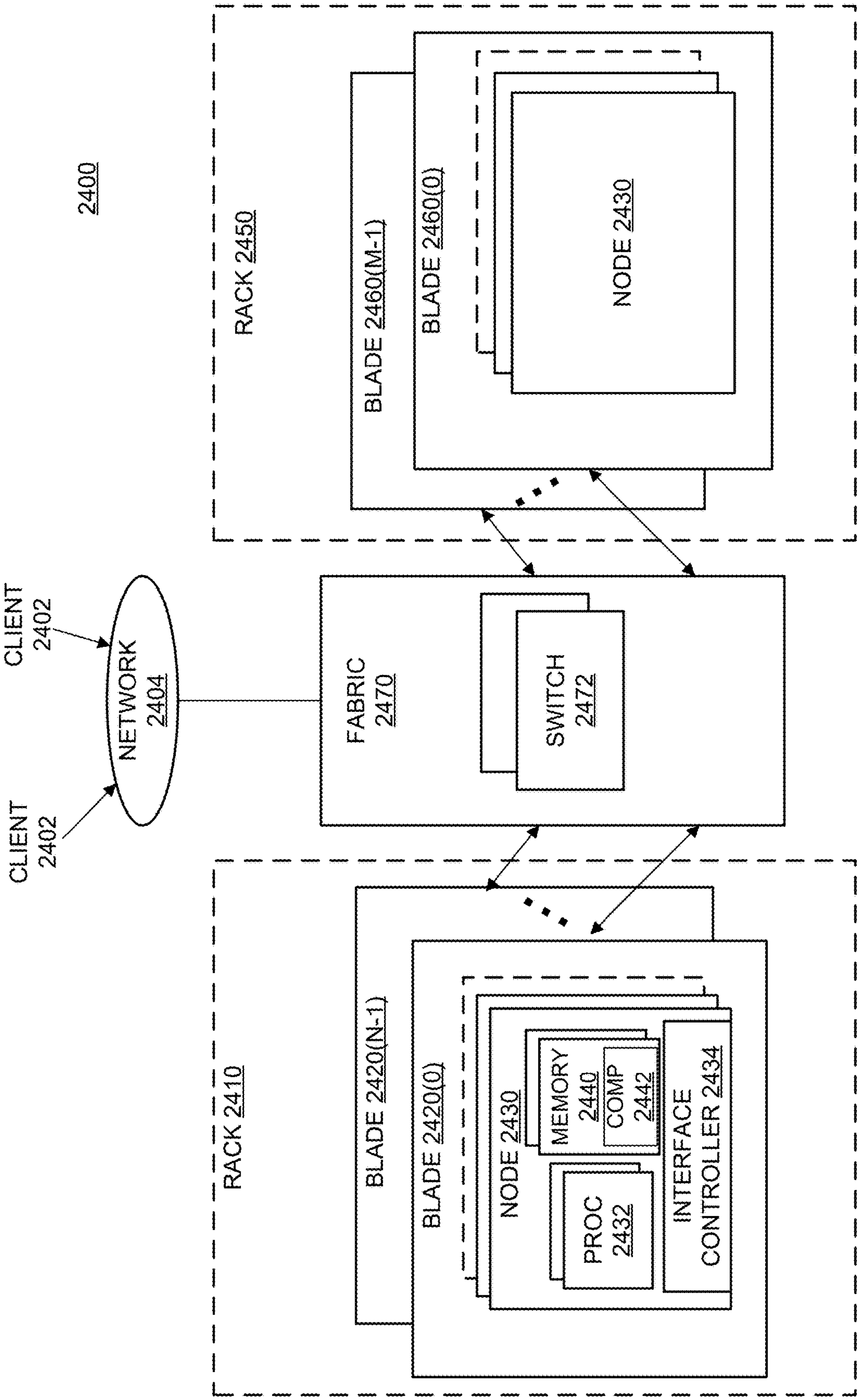
FIG. 24 illustrates a supercomputer, in accordance with at least one embodiment.

FIG. 24 is a block diagram of an embodiment of a multi-node network in which remote memory computation can be implemented, in accordance with any embodiment. System 2400 may represent a network of nodes described herein that can, e.g., be used to perform some or all of the operations described herein. System 2400 can represent a data center. System 2400 may represent a server farm. System 2400 may represent a data cloud or a processing cloud. System 2400 can represent a supercomputer. System 24 may include tens, hundreds, or thousands of nodes. Nodes of system 2400 may include processors, such as, but not limited to, central processing units (CPUs), graphics processing units (GPUs), or any combination of processors described herein, such as, but not limited to, other processors in FIGS. 18-30. With respect to any of processors in system 2400 and any of its components described above or elsewhere herein, one or more of APIs or equivalents described herein can, for example, get compiled into instructions or equivalents, which may be fetched by instruction fetch logic or equivalents, decoded by a processor decoder or equivalents, scheduled (e.g., in order or out of order) for execution by a scheduler or equivalents, executed by execution logic or equivalents, reordered, and then retired by retirement logic or equivalents. API(s) (and/or compiled instructions including API(s)) can be stored in any storage outside or inside of a processor or node (e.g., in cache and/or memory). A result of API(s) can then be stored in storage within or outside of a processor or node, including registers, DRAM, flash, SRAM, cache, or other memory equivalents. System 2400 may include over nine thousand nodes, with each node including two Intel Xeon Max processors, six Intel Max series GPUs and a unified memory architecture, such as, but not limited to, that used in Intel Aurora Supercomputer from Intel Corporation in Santa Clara, CA or another supercomputer that shares at least some of the components described herein.

One or more clients 2402 make requests over network 2404 to system 2400. Network 2404 represents one or more local networks, or wide area networks, or a combination. Clients 2402 can be human or machine clients, which generate requests for execution of operations by system 2400. System 2400 executes applications or data computation tasks requested by clients 2402.

System 2400 can include one or more racks, which represent structural and interconnect resources to house and interconnect multiple computation nodes. Rack 2410 can include multiple nodes 2430. Rack 2410 may host multiple blade components 2420(0) to 2420(N−1), where N is an integer greater than or equal to 2. Hosting can refer to providing power, structural or mechanical support, and interconnection. Blades 2420(0) to 2420(N−1) can refer to computing resources on printed circuit boards (PCBs), where a PCB houses hardware components for one or more nodes 2430. Blades 2420(0) to 2420(N−1) may or may not include a chassis or housing or other "box" other than that provided by rack 2410. Blades 2420(0) to 2420(N−1) may include housing with exposed connector to connect into rack 2410. System 2400 may or may not include rack 2410, and each blade (e.g., 2420(0)) can include a chassis or housing that can stack or otherwise reside in close proximity to other blades and allow interconnection of nodes 2430. System 2400 may include 10,624 compute blades, which include 63,744 Intel Max Series GPUs and 21,248 Intel Xeon Max CPUs across 166 racks.

System 2400 can include fabric 2470, which represents one or more interconnectors for nodes 2430. Fabric 2470 can include multiple switches 2472 or routers or other hardware to route signals among nodes 2430. Additionally, fabric 2470 can couple system 2400 to network 2404 for access by clients 2402. In addition to routing equipment, fabric 2470 can be considered to include cables or ports or other hardware equipment to couples nodes 2430 together. Fabric 2470 can have one or more associated protocols to manage routing of signals through system 2400. A protocol or protocols is at least partly dependent on hardware equipment used in system 2400.

As illustrated, rack 2410 can include N blades (e.g., 2420(0) to 2420(N−1)). In addition to rack 2410, system 2400 can include rack 2450. As illustrated, rack 2450 may include M blades (e.g., 2460(0) to 2460(M−1)). M is not necessarily the same as N; thus, it will be understood that various different hardware equipment components could be used, and coupled together into system 2400 over fabric 2470. Blades 2460(0) to 2460(M−1) can be the same or similar to blades 2420(0) to 2420(N−1). Nodes 2430 can be any type of node as described herein, and may not be necessarily all the same type of node. System 2400 is not limited to being homogenous, nor is it limited to not being homogenous.

A node in blade 2420(0) is illustrated in detail. However, other nodes in system 2400 can be the same or similar. At least some nodes 2430 may be computation nodes, with processor 2432 and memory 2440. A computation node refers to a node with processing resources (e.g., one or more processors) that executes an operating system and can receive and process one or more tasks. At least some nodes 2430 can include storage server nodes with a server as processing resources 2432 and memory 2440. A storage server refers to a node with more storage resources than a computation node, and rather than having processors for execution of tasks, a storage server includes processing resources to manage access to storage nodes within a storage server.

Node 2430 can include interface controller 2434, which can represent logic to control access by node 2430 to fabric 2470. Logic can include hardware resources to interconnect to physical interconnection hardware. Logic can include software or firmware logic to manage interconnection. Interface controller 2434 can include a host fabric interface, which can include a fabric interface in accordance with any embodiment described herein.

Node 2430 may include memory subsystem 2440. Memory 2440 can include memory computation resources (comp) 2442, which represent one or more capabilities by memory 2440 to perform memory computations. System 2400 enables remote memory operations, such as, but not limited to, the operations described elsewhere herein. Thus, nodes 2430 can request memory computations by remote nodes, where data for computation remains local to an executing node instead of being sent over fabric 2470 or instead of being sent from memory to a fabric interface. In response to execution of memory computation, executing node can provide a result to a requesting node.

Processor 2432 can include one or more separate processors. Each separate processor can include a single processing unit, a multicore processing unit, or a combination. A processing unit can include a primary processor such as, but not limited to, a CPU (central processing unit), a peripheral processor such as, but not limited to, a GPU (graphics processing unit), or a combination. Memory 2440 can be or include memory devices and a memory controller.

Reference to memory devices can apply to different memory types. Memory devices generally refer to volatile memory technologies. Volatile memory is memory whose state (and therefore data stored on it) is indeterminate if power is interrupted. Nonvolatile memory refers to memory whose state is determinate even if power is interrupted. Dynamic volatile memory can refresh data stored in a device to maintain state. One example of dynamic volatile memory includes DRAM (dynamic random access memory), or some variant such as, but not limited to, synchronous DRAM (SDRAM). A memory subsystem as described herein may be compatible with a number of memory technologies, such as, but not limited to, DDR3 (dual data rate version 3, original release by JEDEC (Joint Electronic Device Engineering Council) on Jun. 27, 2007, currently on release 21), DDR4 (DDR version 4, initial specification published in September 2012 by JEDEC), DDR4E (DDR version 4, extended, currently in discussion by JEDEC), LPDDR3 (low power DDR version 3, JESD209-3B, August 2013 by JEDEC), LPDDR4 (LOW POWER DOUBLE DATA RATE (LPDDR) version 4, JESD209-4, originally published by JEDEC in August 2014), WIO2 (Wide I/O 2 (WideI02), JESD229-2, originally published by JEDEC in August 2014), HBM (HIGH BANDWIDTH MEMORY DRAM, JESD235, originally published by JEDEC in October 2013), DDR5 (DDR version 5, currently in discussion by JEDEC), LPDDR5 (currently in discussion by JEDEC), HBM2 (HBM version 2), currently in discussion by JEDEC), or others or combinations of memory technologies, and technologies based on derivatives or extensions of such specifications.

In addition to, or alternatively to, volatile memory, in one embodiment, reference to memory devices can refer to a nonvolatile memory device whose state is determinate even if power is interrupted. In one embodiment, nonvolatile memory device is a block addressable memory device, such as, but not limited to, NAND or NOR technologies. Thus, a memory device can also include a future generation nonvolatile devices, such as, but not limited to, a three dimensional crosspoint (3DXP) memory device, other byte addressable nonvolatile memory devices, or memory devices that use chalcogenide phase change material (e.g., chalcogenide glass). In one embodiment, a memory device can be or include multi-threshold level NAND flash memory, NOR flash memory, single or multi-level phase change memory (PCM) or phase change memory with a switch (PCMS), a resistive memory, nanowire memory, ferroelectric transistor random access memory (FeTRAM), magnetoresistive random access memory (MRAM) memory that incorporates memristor technology, or spin transfer torque (STT)-MRAM, or a combination of any of the above, or other memory.

In at least one embodiment, system 2400 can include one or more circuits to cause information to be stored and to store an indication of one or more decompression algorithms to decompress said information, to cause one or more identifiers of one or more videos and one or more indications of one or more pixel interpolation algorithms to be stored, to indicate one or more decompression algorithms to be used to access one or more frames of one or more videos, to perform interpolation of two or more pixels of one or more video frames based, at least in part, on one or more frame identifiers of said one or more video frames, to indicate one or more properties of one or more pixels based, at least in part, on one or more identifiers of one or more video frames containing said one or more pixels, and to modify one or more properties of one or more pixels based, at least in part, on one or more identifiers of one or more video frames containing said one or more pixels or otherwise perform any of the operations described above or elsewhere herein or otherwise perform any of the operations described above or elsewhere herein. One or more circuits can be configured by software to cause information to be stored and to store an indication of one or more decompression algorithms to decompress said information, to cause one or more identifiers of one or more videos and one or more indications of one or more pixel interpolation algorithms to be stored, to indicate one or more decompression algorithms to be used to access one or more frames of one or more videos, to perform interpolation of two or more pixels of one or more video frames based, at least in part, on one or more frame identifiers of said one or more video frames, to indicate one or more properties of one or more pixels based, at least in part, on one or more identifiers of one or more video frames containing said one or more pixels, and to modify one or more properties of one or more pixels based, at least in part, on one or more identifiers of one or more video frames containing said one or more pixels or otherwise perform any of the operations described above or elsewhere herein or otherwise perform any of the operations described above or elsewhere herein.

Figure 25:
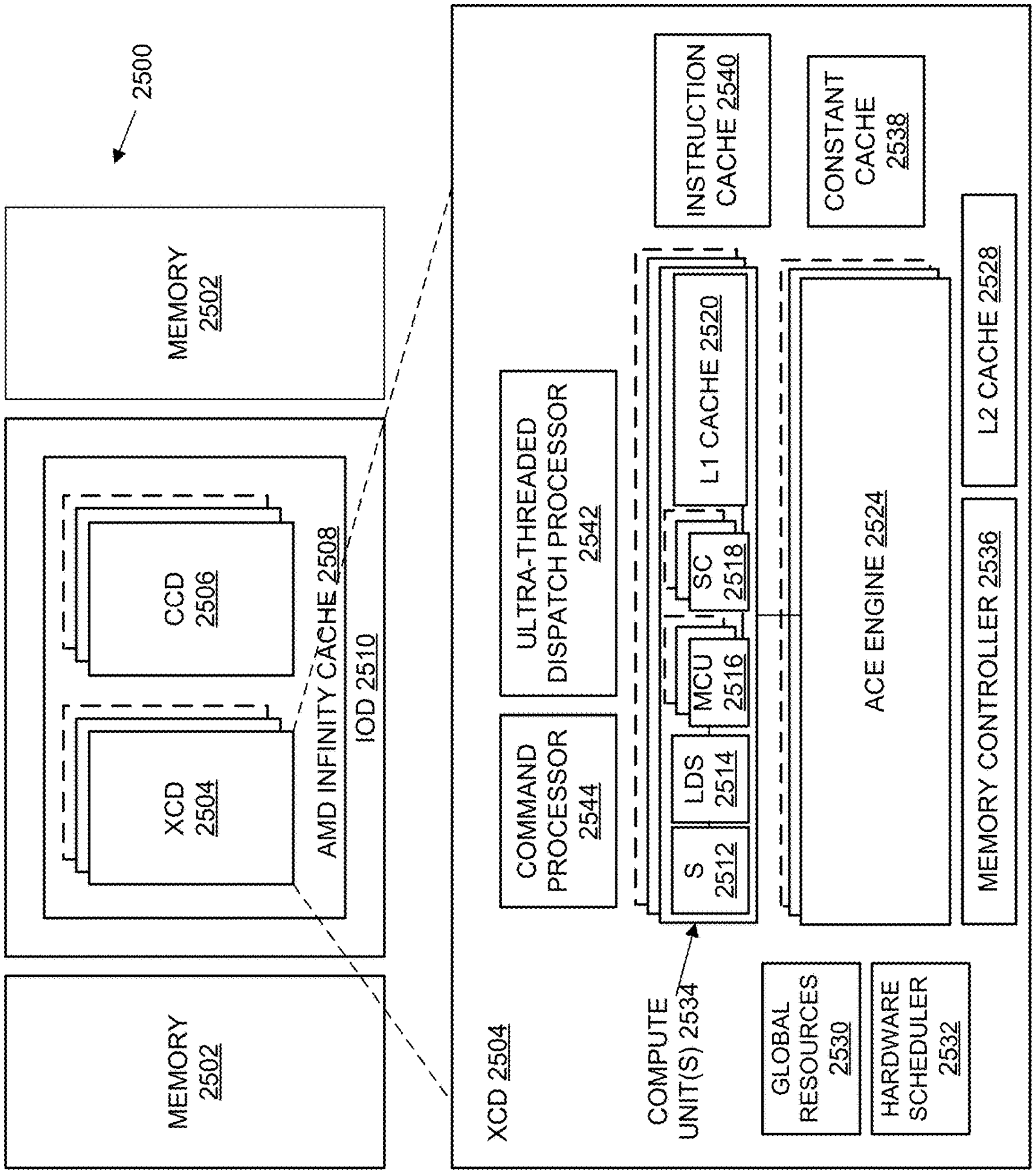
FIG. 25 illustrates another accelerator processor, in accordance with at least one embodiment.

FIG. 25 illustrates accelerated processing unit 2500, in accordance with at least one embodiment. Accelerated processing unit 2500 can include a processor based on CDNA architecture from AMD Corporation in Santa Clara, CA or another processor that shares at least some of the components described herein. Accelerated processing unit 2500 can include one or more accelerator complex dies (XCDs) 2504 for performing operations described elsewhere herein, such as, but not limited to, graphics processing and/or parallel processing as well as computations with instruction-level parallelism, including support for a broad range of precisions (INT8, FP8, BF16, FP16, TF32, FP32, and FP64) and sparse matrix data (i.e. sparsity). XCDs may, in some instances, be referred to as Graphics Compute Dies (GCDs). Accelerated processing unit 2500 can include one or more complex compute dies (CCDs) 2506 for performing operations described elsewhere herein, such as, but not limited to, those operations performed by host processors. CCDs may, in some instances, be referred to as core complexes or CCXs, such as, but not limited to, CCXs used in AMD Ryzen processors. XCDs and CCDs can share any type of cache or memory (e.g., one or more memory units 2502), or have cache or memory allocated to each XCD or CCD or groups of XCDs or CCDs. For example, on-package AMD Infinity Fabric connects XCDs and CCD into shared AMD Infinity Cache 2508 and, in some embodiments, high-bandwidth memory (e.g., HMB3). Accelerated processing unit 2500 can include an AMD MI300a processor that includes three CPU chiplets (or CCDs) and six accelerator chiplets (XCDs) on top of four input-output dies (IODs) that may be layered on a piece of silicon that links them together (e.g., via AMD Infinity Fabric) to eight stacks of high-bandwidth DRAM that ring a superchip. An AMD MI300x processor substitutes CCDs for two more XCDs, for an accelerator-only system.

Accelerated processing unit 2500 can include one or more input/output (I/O) interfaces. For example, XCDs 2504 and CCDs 2506 can be together on one or more input-output dies (IODs) 2510 that can include one or more I/O interfaces. IODs 2510 can include of any number and type of I/O interfaces (e.g., PCI, PCI-Extended ("PCI-X"), PCIe, gigabit Ethernet ("GBE"), USB, etc.). Various types of peripheral devices can be coupled to I/O interfaces 2570. I/O interfaces from IODs 2510 can also be used for connected one or more accelerated processing units 2500, e.g., in a server architecture.

Accelerated processing unit 2500 can include one or more memory units 2502 for storing instructions and other information used to perform operations described elsewhere herein. Memory units 2502 can include any volatile memory, such as, but not limited to, memory types described elsewhere herein and can include, e.g., high-bandwidth memory (e.g., HMB3) or high-bandwidth DRAM. Memory associated with accelerated processing unit 2500 (e.g., memory units 2502) can include system memory that can be used, for example, for commands, instructions and constants, and inputs and outputs. Memory units 2502 can also include device memory that can be used as storage and, for example, for commands, instructions and constants, and inputs and outputs, as return buffer(s) and for private data. Memory units 2502 can be linked to one or more IODs 2510. In at least on embodiment, L1 cache 2520 starts a memory hierarchy that includes shared L2 cache 2528, e.g., within XCDs. AMD Infinity Cache™, which is a last level cache (LLC) located on an active I/O die (IOD). CCDs 2506 and XCDs 2504 may have separate or shared memory. AMD Infinity Architecture and AMD Infinity Fabric™ technology can enable coherent, high-throughput unification of GPU and CPU chiplet technologies (e.g., XCDs, CCDs, and/or CCXs) with memory (e.g., stacked HBM3 memory) in single devices and across multi-device platforms.

As shown in FIG. 25, an XCD 2504 can include a shared set of global resources 2530, which can include hardware scheduler 2532 and Asynchronous Compute Engines (ACE) 2524 that send tasks (e.g., compute shader workgroups) to Compute Units (CUs or cores) 2534. ACEs 2524 (e.g., four) can be each associated with CUs 2534 (e.g., 40 CUs), and some of CUs 2534 can be disabled for yield management. CUs 2534 can have dedicated cache or share cache (e.g., L2 cache) 2528 that may be used to coalesce all memory traffic for a die. CUs 2534 can include threaded and parallel processor cores including instruction fetching and scheduling with Scheduler(S) 2512, matrix core unit (MCU) 2516 and shader core (SC) 2518 (e.g., execution units for scalar, vector and matrix data types), as well as load/store pipelines with an L1 cache 2520 and Local Data Share (LDS) 2514. Local data share can include, for example, a scratch RAM with built-in arithmetic capabilities that allow data to be shared between threads in a workgroup. An instruction cache 2540 (e.g., for storing and providing instructions for performing operations described elsewhere herein) and a constant cache 2538 can be connected to one or more CUs and can be shared between two CUs. Matrix cores 2516 can process a variety of data types, such as, but not limited to, INT8, FP8, FP16, BF16 and TF32 data types. Accelerated processing unit 2500 can include compute units 2534 that may be arranged in an array format, e.g., as a data-parallel-processor (DPP) array. Ultra-threaded dispatch processor 2542 can communicate with compute units 2534, and command processor 2544 can read commands that a host has written to memory-mapped registers in a system-memory address space (not shown). Command processor 2544 can send hardware-generated interrupts to a host processor (e.g., a CCD) when a command is completed. Memory controller 2536 can also have direct access to all device memory and host-specified areas of system memory. To satisfy read and write requests, memory controller 2536 can perform functions of a direct-memory access (DMA) controller, including computing memory-address offsets based on a format of requested data in memory. For example, one or more of APIs described herein can, for example, get compiled into instructions that can be stored in instruction cache 2540 and then fetched by instruction fetch logic in processor 2540, decoded by a processor decoder or equivalents, scheduled (e.g., in order or out of order) for execution by a scheduler or equivalents, executed by execution logic or equivalents, reordered, and then retired by retirement logic or equivalents. API(s) (and/or compiled instructions including API(s)) can be stored in any storage outside or inside of processor 2500 (e.g., in cache and/or memory). A result of API(s) can then be stored in storage within or outside of processor 2500, including registers, DRAM, flash, SRAM, cache, or other memory equivalents.

An application can include a program running on a host processor (e.g., a CCD) and programs, called kernels, running on one or more XCDs. Programs can be controlled by host commands that set internal base-address and other configuration registers, specify a data domain on which accelerated processing unit 2500 can operate, invalidate and flush caches on accelerated processing unit 2500, and cause accelerated processing unit 2500 to begin execution of a program. Kernels can be referred to as programs executed by accelerated processing unit 2500. A kernel can be executed independently on every work item, or as groups of work-items that can be referred to as a wavefront, which can execute a kernel on all work-items in a group (e.g., 64) in one pass. Compute units 2534 can include a scalar arithmetic logic unit (ALU), which can operates on one value per wavefront (common to all work items), a vector ALU, which can operate on unique values per work-item, a local data share 2514, which can allow work-items within a workgroup to communicate and share data, a scalar memory (not shown), which can transfer data between scalar general-purpose registers (SGPRs) and memory through a cache, and vector memory, which can transfer data between vector general-purpose registers (VGPRs) and memory, including sampling texture maps. Kernel control flow can be handled using scalar ALU instructions, which can includes if/else, branches and looping. Scalar ALU (SALU) and memory instructions can work on an entire wavefront and operate on one or more SGPRs. Vector memory and ALU instructions can operate on all work-items in a wavefront at one time.

In at least one embodiment, accelerated processing unit 2500 can include one or more circuits to cause information to be stored and to store an indication of one or more decompression algorithms to decompress said information, to cause one or more identifiers of one or more videos and one or more indications of one or more pixel interpolation algorithms to be stored, to indicate one or more decompression algorithms to be used to access one or more frames of one or more videos, to perform interpolation of two or more pixels of one or more video frames based, at least in part, on one or more frame identifiers of said one or more video frames, to indicate one or more properties of one or more pixels based, at least in part, on one or more identifiers of one or more video frames containing said one or more pixels, and to modify one or more properties of one or more pixels based, at least in part, on one or more identifiers of one or more video frames containing said one or more pixels or otherwise perform any of the operations described above or elsewhere herein or otherwise perform any of the operations described above or elsewhere herein. One or more circuits can be configured by software to cause information to be stored and to store an indication of one or more decompression algorithms to decompress said information, to cause one or more identifiers of one or more videos and one or more indications of one or more pixel interpolation algorithms to be stored, to indicate one or more decompression algorithms to be used to access one or more frames of one or more videos, to perform interpolation of two or more pixels of one or more video frames based, at least in part, on one or more frame identifiers of said one or more video frames, to indicate one or more properties of one or more pixels based, at least in part, on one or more identifiers of one or more video frames containing said one or more pixels, and to modify one or more properties of one or more pixels based, at least in part, on one or more identifiers of one or more video frames containing said one or more pixels or otherwise perform any of the operations described above or elsewhere herein or otherwise perform any of the operations described above or elsewhere herein.

Figure 26:
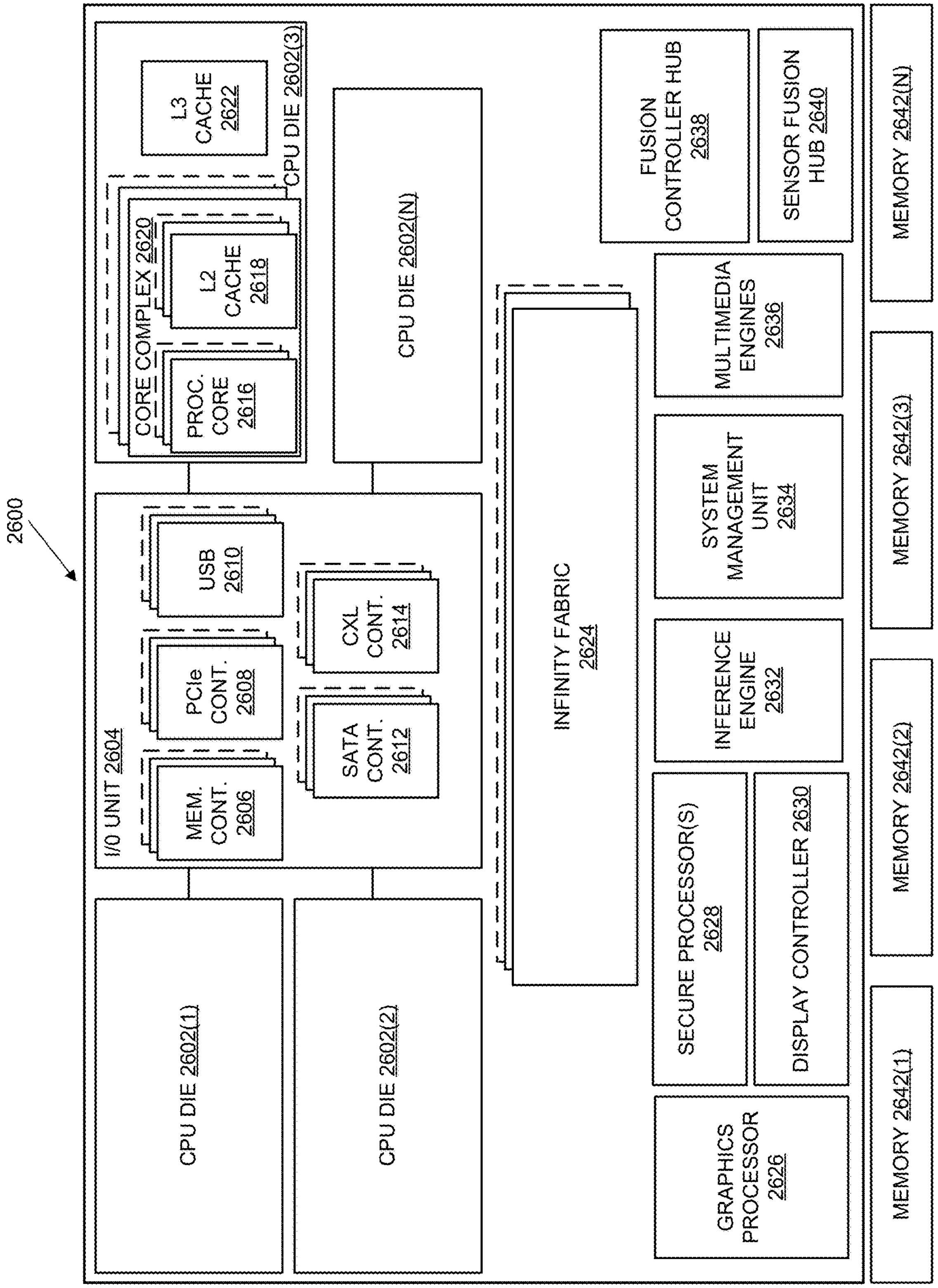
FIG. 26 illustrates another processor, in accordance with at least one embodiment.

FIG. 26 illustrates a processor 2600, such as, but not limited to, a processor based on a Zen architecture (such as, e.g., Zen 1, 2, 3, 4, 5 or other) from AMD Corporation in Santa Clara, CA or another processor that shares at least some of the components described herein. Processor 2600 includes one or more CPU dies 2602(1)-2602(N), where N is any integer greater than 1. CPU die 2602 can include any number of processor cores 2616 (e.g., to perform any of the operations described elsewhere herein) and any number of cache memories (e.g., to store instructions and other information to perform any of the operations described elsewhere herein), in any combination. For example, L2 Cache units 2618 can be coupled to processor core(s) 2616, which can share and/or couple individually to L2 Cache units 2618. Processor cores 2616 can couple to L3 cache 2622 individually and/or share L3 Cache, which can be a lowest level cache (LLC) 2622 for access to data and other information used by processor cores 2616. One or more processor cores 2616 and one or more L2 Cache units 2618 can be included in a core complex (CCX) 2620 that can include (e.g., a 32 MB) shared cache (e.g., L3 cache 2622). Core complex 2620 can be fabricated onto a die (CCD or CPU die) 2602. For example, up to 12 core complexes 2620 can be configured into a processor along with 8 CPU dies 2602 to provide up to 96 processor cores 2616 for processor 2600. A 'Zen 4c' core complex 2620, for example, can include up to eight cores 2616 and a shared 16 MB L3 cache 2622. Two of these core complexes 2620 can be combined onto a single CPU die 2602 for 16 cores per die and a total of 32 MB of L3 cache 2622 per die. Up to eight of CPU dies 2602 may be combined with an I/O unit 2604 to provide CPUs with up to 128 processor cores 2616. Up to four 'Zen 4c' dies described above can be combined to provide CPUs with up to 64 processor cores 2616.

Processor 2600 can include a variety of configurations for input/output operations that are described further herein. I/O unit 2604 can include one or more memory controllers 2606 that can manage memory usage (e.g., DDR5 memory) for processor 2600. I/O unit 2604 may include one or more SATA disk controllers for managing storage 2612 and one or more Compute Express Link (CXL™) 1.1+ memory controllers 2614 that can provide CPU-to-device and CPU-to-memory connections and can be flexibly assigned to specific functions at server design time. I/O unit 2604 may include PCIe controller 2608 for connecting peripherals and other components connected to processor 2600. I/O unit 2604 may include USB ports 2610 for connecting to other components separate from processor 2600. CPU dies 2602 can support any number of connections, e.g., one or two connections, to I/O unit 2604. As shown, I/O unit 2604 can include components described further herein, and I/O unit 2604 can be a I/O die that houses several different components. Memory controller 2606, PCIe controller 2608, USB ports 2610, SATA controller 2612, and/or CXL controller 2614 can be integrated anywhere within processor 2600 either separately or in any groups or combinations thereof.

Processor 2600 can include Infinity Fabric 2624 interconnects (which can be similar to or based on PCIe architectures) that can provide connections among CPUs (e.g., CPU dies 2602(1)-2602(N)), graphics processor(s) 2626, inference engine(s) 2632, and other components in a multi-chip architecture, such as secure processor(s) 2628 and I/O unit 2604. One or more AMD Infinity Fabric™ interconnects 2610 can connect to CPU dies 2602(1)-2602(N) and serve as a connection that is used between CPUs. One or more Infinity Fabric connections 2610 can connect each CPU die 2602 to I/O unit 2610.

In at least one embodiment, processor 2600 can include central processing units (CPUs) and other associated hardware and software described above and further herein. Processor 2600 can also include graphics processor(s) 2626. Graphics processor 2626 can be used for image generation and processing, as well as other computations and operations described further herein. Graphics processor 2626 can be based on RDNA 3 or 3.5 architecture from AMD in Santa Clara, CA. Graphics processor 2626 can include graphics compute dies (GCDs) and memory cache dies (MCDs). GCDs can include any number of compute units (CUs) for graphics or other processing, such as operations performed by arithmetic logic units (ALUs) that are described further herein. Graphics processor 2626 can include L2 cache that can be used by compute units. MCDs (not shown) can include any number of memory units and can include cache, such as L3 cache, as well as memory interfaces for coupling to memory, such as memory 2642(1)-(N), where N is an integer. Components within graphics processor 2626 can be connected using various approaches, such as using Infinity Fabric 2624 interconnects outside or within graphics processor 2626.

Inference engine 2632 can provide neural processing capabilities for processor 2600 for computational processes that are used for neural networks, deep learning, and other artificial intelligence-related operations described further herein. Processor 2600 can include secure processor(s) 2628 for managing security of processor 2600, display controller 2630 for controlling displays, a system management unit 2634 for managing and operating some or all of the components on processor 2600, multimedia engines 2636 for audio and video operations, fusion controller hub 2638 for managing USB, SATA and PCIe connections to processor 2600, and sensor fusion hub 2640 for managing sensors, such as accelerometers. Processor 2600 can also include memory 2642(1)-(N), where N is any integer. Memory can include different memory types, such as LPDDR5 and/or DDR5, or others described elsewhere herein.

For performing operations described further herein, processor 2600 can include an execution pipeline including a front-end that can include a cache (e.g., L1 cache) that stores instructions (not shown). Flow of instructions can be modified by a branch predictor. Instructions can be decoded by a decoder, dispatched to a back-end for execution, and renamed. Instruction fetch and decode pipes, for example, can be dispatched to integer or floating point execution operations that can be scheduled by a scheduler and transferred to vector and/or general-purpose registers. Floating point multiplier and/or add operations can be processed, and arithmetic logic units (ALUs) can also be used to perform computations, such as arithmetic and logic operations. Outputs from computation units can be coupled to a load/store queue, which can be connected to cache, such as L1 cache and/or L2 cache.

With respect to processor 2600 and any of its components described above or elsewhere herein, one or more of APIs or equivalents described herein can, for example, get compiled into instructions or equivalents (e.g., AVX-512 instructions based on an SIMD model), which may be fetched by instruction fetch logic or equivalents, decoded by a processor decoder or equivalents, scheduled (e.g., in order or out of order) for execution by a scheduler or equivalents, executed by execution logic or equivalents, reordered, and then retired by retirement logic or equivalents. API(s) (and/or compiled instructions including API(s)) can be stored in any storage outside or inside of processor 2600 (e.g., in cache and/or memory). A result of API(s) can then be stored in storage within or outside of processor 2600, including registers, DRAM, flash, SRAM, cache, or other memory equivalents.

In at least one embodiment, processor 2600 can include one or more circuits to cause information to be stored and to store an indication of one or more decompression algorithms to decompress said information, to cause one or more identifiers of one or more videos and one or more indications of one or more pixel interpolation algorithms to be stored, to indicate one or more decompression algorithms to be used to access one or more frames of one or more videos, to perform interpolation of two or more pixels of one or more video frames based, at least in part, on one or more frame identifiers of said one or more video frames, to indicate one or more properties of one or more pixels based, at least in part, on one or more identifiers of one or more video frames containing said one or more pixels, and to modify one or more properties of one or more pixels based, at least in part, on one or more identifiers of one or more video frames containing said one or more pixels or otherwise perform any of the operations described above or elsewhere herein or otherwise perform any of the operations described above or elsewhere herein. One or more circuits can be configured by software to cause information to be stored and to store an indication of one or more decompression algorithms to decompress said information, to cause one or more identifiers of one or more videos and one or more indications of one or more pixel interpolation algorithms to be stored, to indicate one or more decompression algorithms to be used to access one or more frames of one or more videos, to perform interpolation of two or more pixels of one or more video frames based, at least in part, on one or more frame identifiers of said one or more video frames, to indicate one or more properties of one or more pixels based, at least in part, on one or more identifiers of one or more video frames containing said one or more pixels, and to modify one or more properties of one or more pixels based, at least in part, on one or more identifiers of one or more video frames containing said one or more pixels or otherwise perform any of the operations described above or elsewhere herein or otherwise perform any of the operations described above or elsewhere herein.

Figure 27:
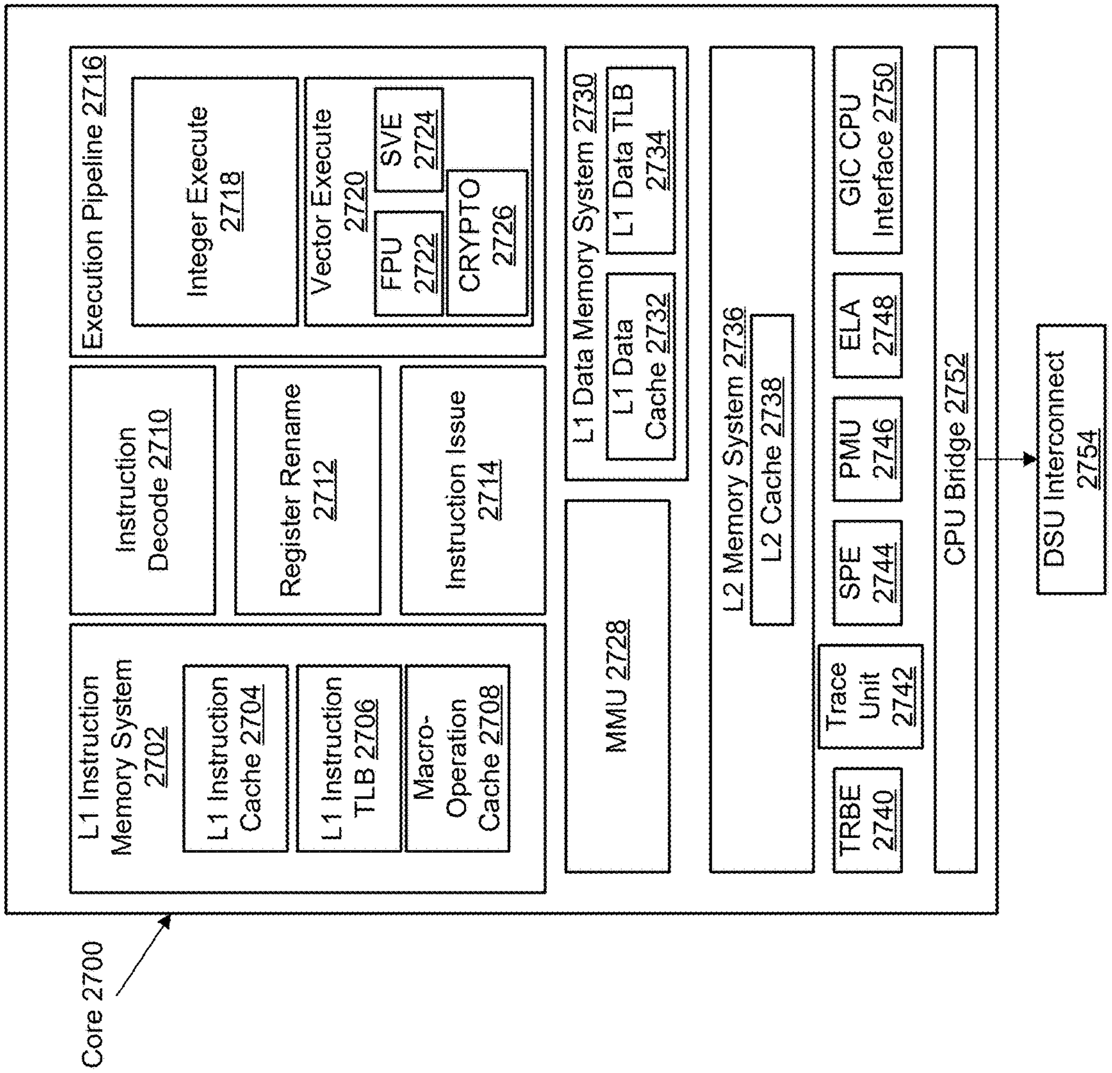
FIG. 27 illustrates another accelerator processor, in accordance with at least one embodiment.

FIG. 27 illustrates an example of a processing core 2700 that may implement Arm architecture (e.g., v9.0-A) or another processor that shares at least some of the components described herein. Neoverse™ V2 core 2700 can be implemented inside a DynamIQ Shared Unit (DSU) cluster via DSU-110 interconnect 2754 for connected one or more cores, e.g., for parallel processing. Neoverse™ V2 core may be implemented as a single core in a DSU cluster that is configured for Direct connect, with or without L3 cache, snoop filter, or Snoop Control Unit (SCU) logic (not shown). Neoverse™ V2 core can include a CPU bridge 2752 that connects core 2700 to DSU-110 interconnect, which can also connect core 2700 to an external memory system and the rest of a system-on-a-chip. L1 instruction memory system 2702 can fetch instructions from an instruction cache 2704 and deliver instructions (e.g., one or more APIs described herein that may be compiled into instructions) to an instruction decode unit 2710, e.g., to perform some or all of operations described above or elsewhere herein. L1 instruction memory system 2702 may include L1 instruction cache 2704, e.g., with 64-byte cache lines, L1 instruction Translation Lookaside Buffer (TLB) 2706, e.g., with native support for 4 KB, 16 KB, 64 KB, and 2 MB page sizes, Macro-Operation Cache (MOP) 2708 (e.g., 1536-entry, 4-way skewed associative L0 MOP cache), which can contain decoded and optimized instructions for higher performance. Instruction decode unit 2710 can decode AArch64 instructions into internal format. Register rename unit 2712 can perform register renaming to facilitate out-of-order execution and dispatches decoded instructions to various issue queues. Instruction issue unit 2714 can control when decoded instructions may be dispatched to execution pipelines, and it can include issue queues for storing instructions pending dispatch to execution pipelines. Integer execution pipeline 2716 can be included in an execution pipeline and include integer execute unit 2718 that can perform arithmetic and logical data processing operations. Vector execute unit 2720 can be included in an execution pipeline and can perform Advanced SIMD and floating-point operations (FPU) 2722, execute Scalable Vector Extension (SVE) and Scalable Vector Extension 2 (SVE2) instructions 2724, and can optionally execute cryptographic instructions (Crypto) 2726. Advanced SIMD can include media and signal processing architecture that adds instructions primarily for audio, video, 3D graphics, image, and speech processing. A floating-point architecture provides support for single-precision and double-precision floating-point operations. L1 data memory system 2730 can execute load and store instructions, as well as service memory coherency requests. L1 data memory system 2730 can include an L1 data cache 2732 and a fully associative L1 data TLB 2734 with native support for 4 KB, 16 KB and 64 KB page sizes and 2 MB and 512 MB block sizes. Memory Management Unit (MMU) 2728 can provide fine-grained memory system control through a set of virtual-to-physical address mappings and memory attributes that can be held in translation tables, which can be saved into TLB 2734 when an address is translated. L2 memory system 2736 can include L2 cache 2738, and it can be connected to DSU-110 2754 through an asynchronous CPU bridge 2752. Neoverse™ V2 core 2700 can support a range of debug, test, and trace options including a trace unit 2742 and a trace buffer 2740, and an Embedded Logic Analyzer (ELA) 2748. Neoverse™ V2 core 2700 can implement Statistical Profiling Extension (SPE) 2744 to provide a statistical view of the performance characteristics of executed instructions that software writers can use to optimize their code for better performance. Performance Monitoring Unit (PMU) 2746 can provide performance monitors that can be configured to gather statistics on operation of each core and memory system. Information can be used for debug and code profiling. Generic Interrupt Controller (GIC) CPU interface 2750, when integrated with an external distributor component, can be a resource for supporting and managing interrupts in a cluster system. In a cluster, there can be one CPU bridge 2752 between each Neoverse™ V2 core 2700 and DSU-110 2754. CPU bridge 2752 can control buffering and synchronization between core 2700 and DSU-1102754. CPU bridge 2752 can be asynchronous to allow different frequency, power, and area implementation points for each core 2700. CPU bridge 2752 can run synchronously without affecting other interfaces such as, but not limited to, debug and trace which can be asynchronous.

In at least one embodiment, core 2700 can include one or more circuits to cause information to be stored and to store an indication of one or more decompression algorithms to decompress said information, to cause one or more identifiers of one or more videos and one or more indications of one or more pixel interpolation algorithms to be stored, to indicate one or more decompression algorithms to be used to access one or more frames of one or more videos, to perform interpolation of two or more pixels of one or more video frames based, at least in part, on one or more frame identifiers of said one or more video frames, to indicate one or more properties of one or more pixels based, at least in part, on one or more identifiers of one or more video frames containing said one or more pixels, and to modify one or more properties of one or more pixels based, at least in part, on one or more identifiers of one or more video frames containing said one or more pixels or otherwise perform any of the operations described above or elsewhere herein or otherwise perform any of the operations described above or elsewhere herein. One or more circuits can be configured by software to cause information to be stored and to store an indication of one or more decompression algorithms to decompress said information, to cause one or more identifiers of one or more videos and one or more indications of one or more pixel interpolation algorithms to be stored, to indicate one or more decompression algorithms to be used to access one or more frames of one or more videos, to perform interpolation of two or more pixels of one or more video frames based, at least in part, on one or more frame identifiers of said one or more video frames, to indicate one or more properties of one or more pixels based, at least in part, on one or more identifiers of one or more video frames containing said one or more pixels, and to modify one or more properties of one or more pixels based, at least in part, on one or more identifiers of one or more video frames containing said one or more pixels or otherwise perform any of the operations described above or elsewhere herein or otherwise perform any of the operations described above or elsewhere herein.

Figure 28:
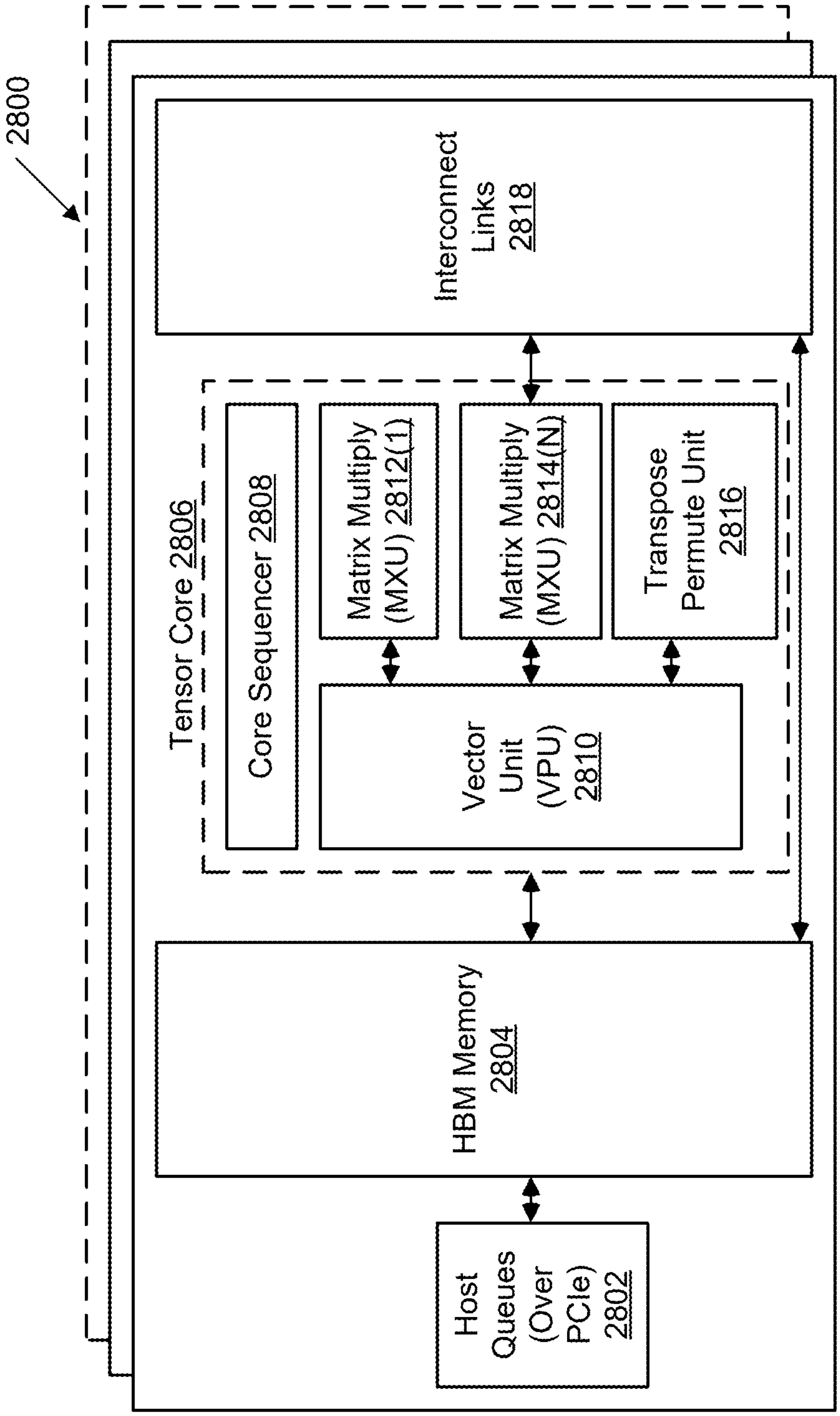
FIG. 28 illustrates a tensor processing unit, in accordance with at least one embodiment.

FIG. 28 illustrates one or more chips including one or more tensor processing units (TPUs) 2800, in accordance with at least one embodiment. TPUs 2800 in FIG. 28 can include application specific integrated circuits (ASICs), e.g., to perform some or all of the operations described above or elsewhere herein, such as, but not limited to, accelerate machine learning workloads performing matrix operations. TPUs 2800 may be ASICs from Alphabet Corporation in Mountain View, CA. Cloud TPU includes a cloud service that makes TPUs available as a scalable resource for processing tasks, such as, but not limited to, machine learning workloads that can run on frameworks such as, but not limited to, TensorFlow, Pytorch, and JAX.

Chip 2800 can include any number of TPUs that can include tensor cores 2806. Tensor core 2806 can include one or more core sequencer 2808, vector processing unit (VPU) 2810, matrix multiply unit (MXU) 2812(A)-2814(N), where N is any integer greater than 1, and a transpose permute unit 2816. Core Sequencer 2808 can fetch (e.g., VLIW (Very Long Instruction Word)) instructions from core's 2806 Instruction Memory (Imem), execute scalar operations using a scalar data memory (Smem) and scalar registers (Sregs) (not shown), and forward vector instructions to Vector Processing Unit (VPU) (2810. Instructions can, for example, launch eight operations: two scalar, two vector ALU, vector load and store, and a pair of slots that queue data to and from matrix multiply and transpose units. VPU 2810 can perform vector operations using a large on-chip vector memory (Vmem), and vector registers (Vregs). VPU 2810 can stream data to and from MXU through decoupling FIFOs. VPU 2810 can collect and distribute data to Vmem via data-level parallelism (2D matrix and vector functional units) and instruction-level parallelism (8 operations per instruction). A large two-dimensional matrix multiply unit (MXU) 2812(A)-2812(N) can, e.g., use a systolic array to reduce area and energy plus large, software-controlled on-chip memories instead of caches. Transpose Reduction Permute Unit 2816 can do (e.g., 128×128) matrix transposes, reductions, and permutations of VPU 2810 lanes. High Bandwidth Memory 2804 can be used for applications on chip, and it can be coupled to host queue(s) 2802, e.g., over PCIe. One or more chips 2800 can be connected together for computing. For example, one or more chips 2800 can be connected as a torus, e.g., a 2D torus. Chip 2800 can also include any number (e.g., four) Inter-Core Interconnect (ICI) links 2818 that can enable direct connections between chips to form a supercomputer.

With respect to any processors in chip 2800 and any of its components described above or elsewhere herein, one or more of APIs or equivalents described herein can, for example, get compiled into instructions or equivalents, which may be fetched by instruction fetch logic or equivalents, decoded by a processor decoder or equivalents, scheduled (e.g., in order or out of order) for execution by a scheduler or equivalents, executed by execution logic or equivalents, reordered, and then retired by retirement logic or equivalents. API(s) (and/or compiled instructions including API(s)) can be stored in any storage outside or inside of any processors in chip 2800 (e.g., in cache and/or memory). A result of API(s) can then be stored in storage within or outside of any processors in chip 2800, including registers, DRAM, flash, SRAM, cache, or other memory equivalents.

In at least one embodiment, chip 2800 can include one or more circuits to cause information to be stored and to store an indication of one or more decompression algorithms to decompress said information, to cause one or more identifiers of one or more videos and one or more indications of one or more pixel interpolation algorithms to be stored, to indicate one or more decompression algorithms to be used to access one or more frames of one or more videos, to perform interpolation of two or more pixels of one or more video frames based, at least in part, on one or more frame identifiers of said one or more video frames, to indicate one or more properties of one or more pixels based, at least in part, on one or more identifiers of one or more video frames containing said one or more pixels, and to modify one or more properties of one or more pixels based, at least in part, on one or more identifiers of one or more video frames containing said one or more pixels or otherwise perform any of the operations described above or elsewhere herein or otherwise perform any of the operations described above or elsewhere herein. One or more circuits can be configured by software to cause information to be stored and to store an indication of one or more decompression algorithms to decompress said information, to cause one or more identifiers of one or more videos and one or more indications of one or more pixel interpolation algorithms to be stored, to indicate one or more decompression algorithms to be used to access one or more frames of one or more videos, to perform interpolation of two or more pixels of one or more video frames based, at least in part, on one or more frame identifiers of said one or more video frames, to indicate one or more properties of one or more pixels based, at least in part, on one or more identifiers of one or more video frames containing said one or more pixels, and to modify one or more properties of one or more pixels based, at least in part, on one or more identifiers of one or more video frames containing said one or more pixels or otherwise perform any of the operations described above or elsewhere herein or otherwise perform any of the operations described above or elsewhere herein.

Figure 29:
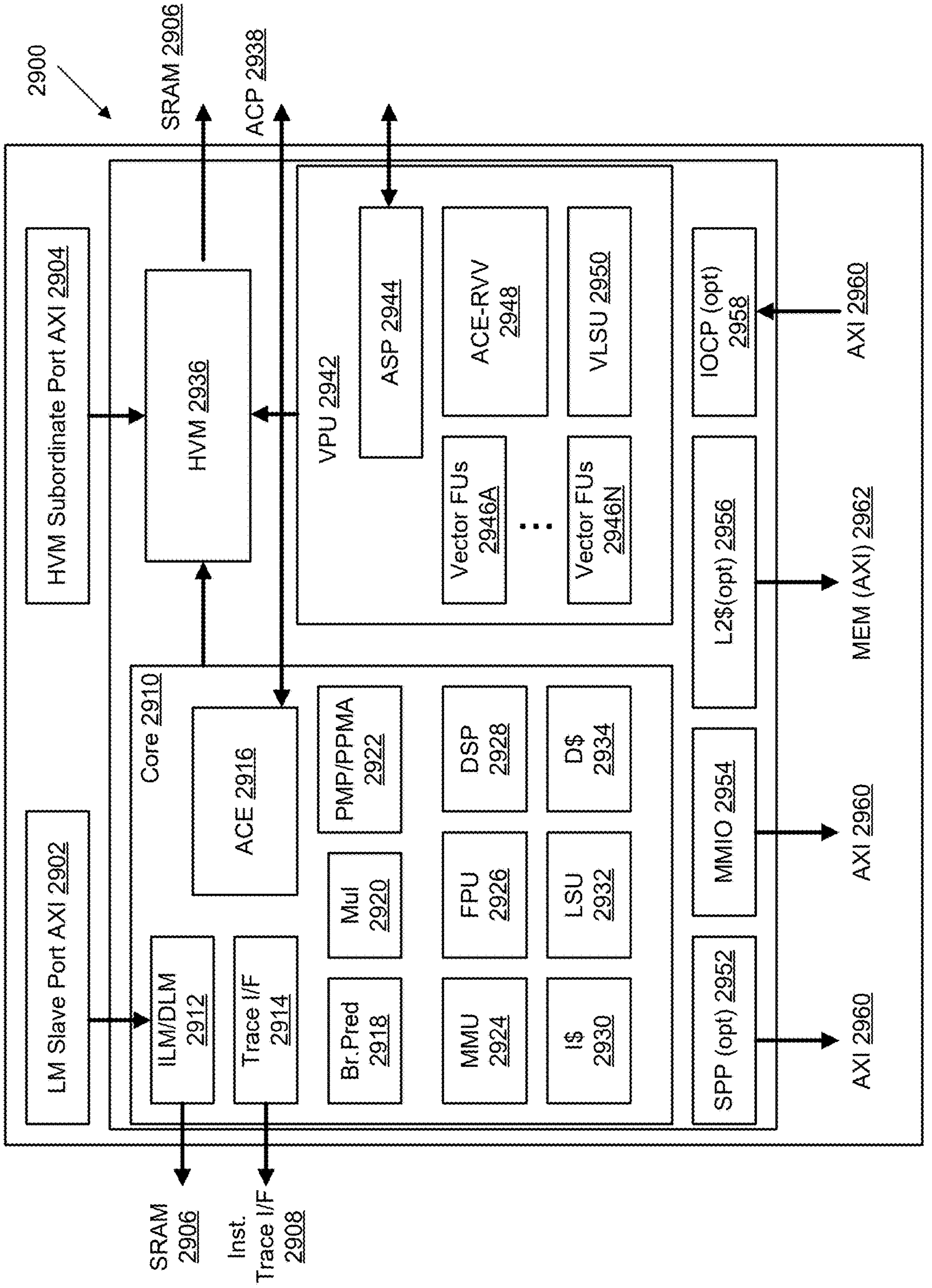
FIG. 29 illustrates a RISC-V-compatible processor, in accordance with at least one embodiment.

FIG. 29 illustrates a vector processor, in accordance with at least one embodiment. Vector processor 2900 may support a RISC-V standard. Vector processor 2900 can include one more cores 2910 (e.g., scalar units) with one or more Vector Processing Units (VPUs) 2942 (e.g., vector units) that can, e.g., perform some or all of the operations described above or elsewhere herein. Core 2910 may include Andes Custom Extension (ACE) 2916 that can be used for communication of customized instructions for processor 2900, for example, via ACP 2938. Core 2910 may include 1-cycle multiplier and 1-cycle instruction/data local memory (ILM/DLM) for increased parallelism by allowing simultaneous instruction fetches and data accesses. Memory management unit (MMU) 2924 may manage system memory and cache, and provide for branch execution, issuance of instruction pairs, L1 instruction/data caches and local memory storage. Core 2910 can include Physical memory protection and programmable physical memory attribute unit (PMP/PPMA) 2922. Core 2910 can include a digital signal processor (DSP) 2928, and a floating-point unit (FPU) 2926 as well as load-store unit (LSU) 2932 to interface with memory hierarchy (D$2934 and I$2930). Core 2910 can include branch prediction unit 2918 and multiplier unit 2920.

Vector processing unit (VPU) 2942 can include one or more vector functional units (FUs) 2946(A)-2946(N) that can be chained together for parallel processing, independent memory paths for RISC-V vector (RVV) load/store via ACE-RVV 2948 and Andes Streaming port (ASP) 2944 load/store, and a vector load/store unit (VLSU) 2950.

Vector processor 2900 can include bus interfaces, such as, but not limited to, L2 cache memory port 2956 for cacheable access, a MMIO port 2954 for non-cacheable access, an input-output coherence Port (IOCP) 2958 for cacheless bus master, local memory access ports for ILM/DLM 2912, which can be coupled to SRAM 2906, and high-bandwidth vector memory (HVM) 2936 access, a shared peripheral port (SPP) 2952 for external peripherals. Other memory ports include LM slave port AXI 2902, HVM subordinate port AXI 2904, MEM (AXI) 2962, and AXI 2960. Trace I/F 2914 can capture, encode, and transmit off-chip via Inst. Trace I/F 2908, e.g., a record of executed processor instructions, which software tools can use to reconstruct the exact execution sequence of a program.

With respect to any processors in processor 2900 and any of its components described above or elsewhere herein, one or more of APIs or equivalents described herein can, for example, get compiled into instructions or equivalents, which may be fetched by instruction fetch logic or equivalents, decoded by a processor decoder or equivalents, scheduled (e.g., in order or out of order) for execution by a scheduler or equivalents, executed by execution logic or equivalents, reordered, and then retired by retirement logic or equivalents. API(s) (and/or compiled instructions including API(s)) can be stored in any storage outside or inside of processor 2900 (e.g., in cache and/or memory). A result of API(s) can then be stored in storage within or outside of processor 2900, including registers, DRAM, flash, SRAM, cache, or other memory equivalents.

In at least one embodiment, vector processor 2900 can include one or more circuits to cause information to be stored and to store an indication of one or more decompression algorithms to decompress said information, to cause one or more identifiers of one or more videos and one or more indications of one or more pixel interpolation algorithms to be stored, to indicate one or more decompression algorithms to be used to access one or more frames of one or more videos, to perform interpolation of two or more pixels of one or more video frames based, at least in part, on one or more frame identifiers of said one or more video frames, to indicate one or more properties of one or more pixels based, at least in part, on one or more identifiers of one or more video frames containing said one or more pixels, and to modify one or more properties of one or more pixels based, at least in part, on one or more identifiers of one or more video frames containing said one or more pixels or otherwise perform any of the operations described above or elsewhere herein or otherwise perform any of the operations described above or elsewhere herein. One or more circuits can be configured by software to cause information to be stored and to store an indication of one or more decompression algorithms to decompress said information, to cause one or more identifiers of one or more videos and one or more indications of one or more pixel interpolation algorithms to be stored, to indicate one or more decompression algorithms to be used to access one or more frames of one or more videos, to perform interpolation of two or more pixels of one or more video frames based, at least in part, on one or more frame identifiers of said one or more video frames, to indicate one or more properties of one or more pixels based, at least in part, on one or more identifiers of one or more video frames containing said one or more pixels, and to modify one or more properties of one or more pixels based, at least in part, on one or more identifiers of one or more video frames containing said one or more pixels or otherwise perform any of the operations described above or elsewhere herein or otherwise perform any of the operations described above or elsewhere herein.

Figure 30A:
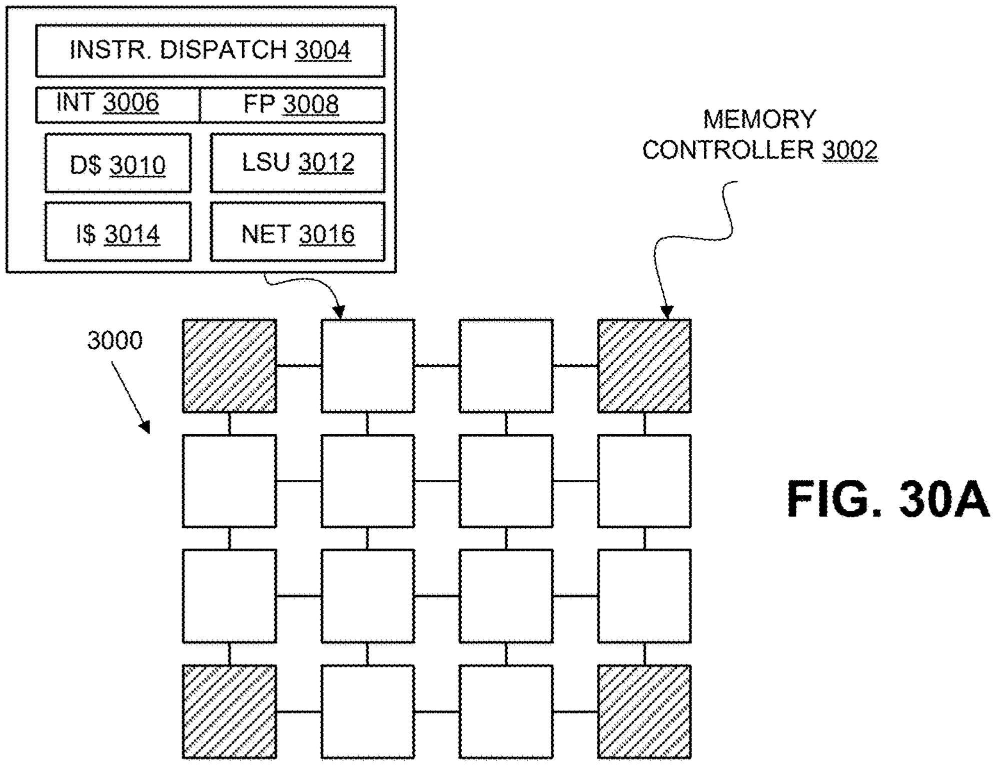
FIGS. 30A and 30B illustrate a language processing unit, in accordance with at least one embodiment.

FIG. 30A illustrates a diagram of an example many-core tiled processor microarchitecture. Many-core tiled processor in FIG. 30A can include a language processing processor. As illustrated in FIG. 30A, each "tile" of a processor architecture is a processing element tied together using a network-on-chip (NoC) that can be used, e.g., to perform some or all of the operations described above or elsewhere herein. For example, each tile may have an instruction dispatch 3004 and an integer (INT) 3006 and floating-point (FP) unit 3008 as well as load-store unit (LSU) 3012 to interface with memory hierarchy (data cache (D$) 3010 and instruction cache (I$) 3014) and network (NET) 3016 interface for communication with other tiles. Some tiles in processor 3000 may include memory controller 3002 for managing and controlling memory, as described further herein. Processor 3000 can have a functional slice architecture. Processor 3000 may be located on an application specific integrated circuit (ASIC), and FIG. 30A may represent a layout of an ASIC. Processor 3000 can include a co-processor that is designed to execute instructions for a predictive model. A predictive model is any model that is configured to make a prediction from input data. A predictive model can use a classifier to make a classification prediction. A predictive model may be a machine learning model such as, but not limited to, a tensor flow model, and processor 3000 is a tensor streaming processor.

Figure 30B:
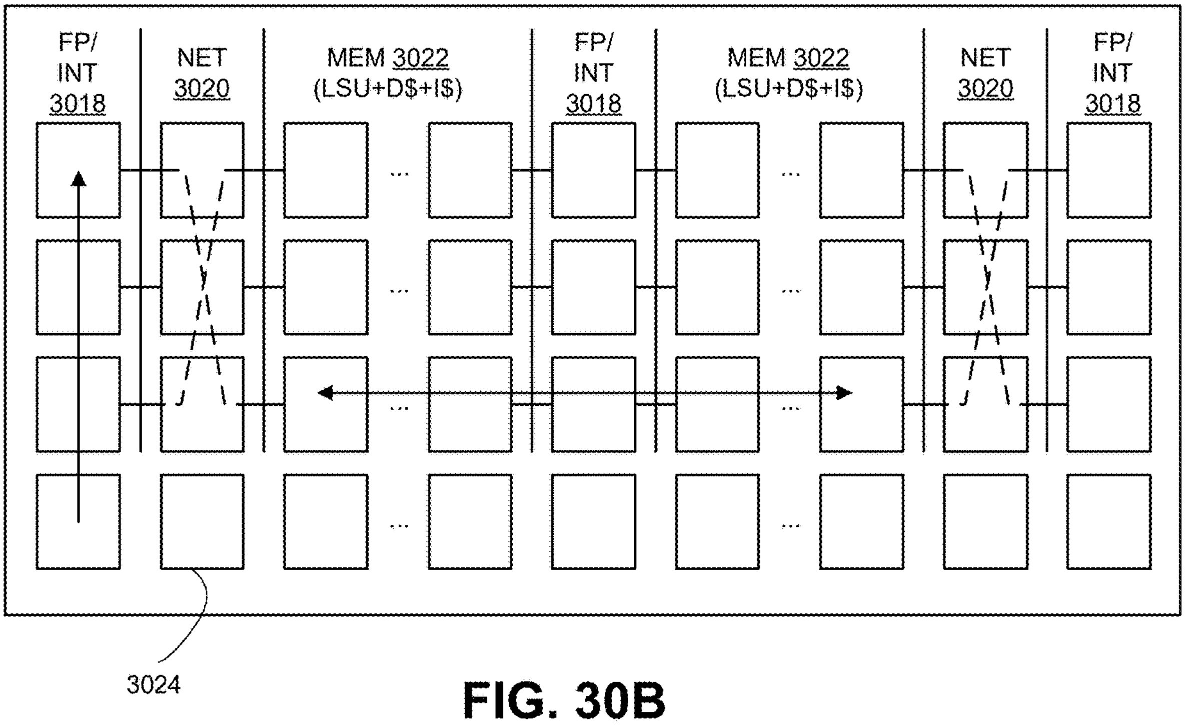

Processor 3000 can employ different microarchitectures, which disaggregates functional units shown in each tile in FIG. 30B. Instead, functional tiles 3024 of processor 3000 may be aggregated into a plurality of functional process units (hereafter referred to as "slices") 3004, each corresponding to a particular function type (e.g., FP/INT 3018, NET 3020, MEM 3022). For example, as illustrated in FIG. 30B, each slice may correspond to a column of functional tiles extending in a north-south direction. In addition, processor 3000 also may include communication lanes to carry data between tiles of different slices, each running horizontally in an east-west direction. Each communication lane may be connected to each of slices 3004 of processor 3000.

Slices 3004 of processor 3000 may each correspond to a different function, and may include arithmetic logic slices (e.g., FP/INT3018), lane switching slices (e.g., NET 3020), and memory slices (e.g., MEM 3022). Arithmetic logic units may execute one or more arithmetic and/or logic operations on data received via communication lanes to generate output data. Examples of arithmetic logic units may be matrix multiplication units and vector multiplication units. Memory slices include memory cells that store data. Memory slices can provide data to other slices through communication lanes. Memory slices can also receive data from other slices through communication lanes. Lane switching slices can configurably route data from one communication lane to any other communication lane. For example, data from a first lane can be provided to a second lane through a lane switching slice. In some embodiments, a lane switching slice can be implemented as a crossbar switch. Each slice 3004 also includes its own instruction queue (not shown) that stores instructions, and an instruction control unit (ICU) to control execution of instructions. Instructions in a given instruction queue may be executed only by tiles in its associated functional slice and may not be executed by other slice(s) of processor 3000.

By arranging tiles of processor 3000 into different functional slices 3004, on-chip instruction and control flow of processor 3000 can be decoupled from data flow. For example, one arrow in FIG. 30B illustrates flow of instructions within processor architecture, in accordance with some embodiments. Another arrow in FIG. 30B illustrates data flow within processor architecture, in accordance with at least one embodiment. As illustrated, instructions and control flow can flow in a first direction across tiles of processor 3000 (e.g., north-south, along a length of functional slices, as shown by the first arrow), while data flows flow in a second direction across tiles of processor 3000 (e.g., east-west, across functional slices, as shown by the second arrow) that is perpendicular to the first direction.

Different functional slices of processor 3000 may correspond to MEM 3022 (memory), VXM (vector execution module), MXM (matrix execution module), NIM (numerical interpretation module), and SXM (switching and permutation module). Each slice may include N tiles that may all be controlled by a same instruction control unit (ICU) (not shown). Each slice may operate completely independently and can only be coordinated using barrier-like synchronization primitives or through a compiler by exploiting "tractable determinism." Each tile of processor 3000 can correspond to an execution unit organized as an xM SIMD tile. For example, each tile of on-chip memory of processor 3000 may be organized to store an L-element vector atomically. As such, a MEM slice having N tiles may work together to store or process a large vector (e.g., having a total of NxM elements).

Tiles in a slice may execute instructions in a "staggered" fashion where instructions may be issued tile-by-tile within a slice over a period of N cycles. Functional slices may be arranged physically on-chip to allow efficient data-flow for pipelined execution across hundreds of cycles for common patterns. Data flows can perform a single "u-turn" (change in direction) corresponding to a single matrix operation before being written back to memory, in some embodiments, a particular data flow may change direction multiple times (due to multiple matrix and vector operations) before resulting data is written back into memory.

When using processor 3000 (e.g., TSP) having a functional slice architecture, TSP compiler (not shown) generates an explicit plan for how processor 3000 can execute a program (e.g., a microprogram). Compiler can specify when each operation will be executed, which functional slices will perform work, and which STREAM registers hold operands. Compiler can maintain a high-fidelity (cycle accurate) model of processor 3000 (e.g., TSP) hardware state so a microprogram can orchestrate data flow.

Processor 3000 (e.g., TSP) can use a Web-hosted compiler that takes as its input a model (e.g., a ML model such as, but not limited to, a TensorFlow model) and emits a proprietary instruction stream targeting processor 3000 (e.g., TSP). Compiler is responsible for coordinating control and data flow of a program, and specifies any instruction-level parallelism by explicitly bundling instructions that can and should execute concurrently so that they may be dispatched together. Primary hardware structure includes an architecturally-visible streaming register file (STREAMs), described in greater detail below, which serves as a conduit through which operands flow from MEM slices (e.g., SRAM) to functional slices and vice versa.

MEM 3022 of processor 3000 can serve as: (1) storage for model parameters, microprograms and data on which they operate, and (2) network-on-chip (NoC) for communicating data operands from MEM to functional slices and computed results back to MEM. In some embodiments, on-chip memory can consumes ~75% of chip area of processor 3000. In some embodiments, due to bandwidth requirements of processor 3000, on-chip memory of MEM tiles may include SRAM, and not DRAM. On-chip memory capacity of processor 3000 can determine (i) number of ML models that can simultaneously reside on-chip, (ii) size of any given model, and (iii) partitioning of large models to fit into multi-chip systems. In some embodiments, MEM system of processor 3000 can provide a plurality of memory slices organized into two different hemispheres (referred to as "MEM WEST" and "MEM EAST", respectively).

Memory slices of each hemisphere may be mirrored, such that slices may be physically numbered {0, . . . . L} in an East hemisphere, and {L, . . . 0} in a West hemisphere, such that memory slice 0 for each hemisphere corresponds to a slice closest to VXM slices between hemispheres, where each hemisphere comprises L slices. Direction of data transfer towards the center of a chip may be referred to as inwards, while data transfer toward the outer (Eastern or Western most) edge of a chip may be referred to as outwards. Although hemispheres of memory of processor 3000 may be referred to as east and west, it is understood that in other embodiments, other names may be used to refer to different hemispheres of memory.

In some embodiments, a streaming register file, referred to as STREAMS, transfers operands and results between SRAM of MEM slices and functional slices of processor 3000. In some embodiments, a plurality of MEM slices (e.g., between 2 and 10 adjacent MEM slices) may be physically organized as a set. Each set of slices may be located between a pair of STREAM register files, such that each slice is able to read or write to STREAM registers in either direction. By placing STREAM register files between sets of MEM slices, a number of cycles needed for data operands to be transmitted across a hemisphere is decreased (e.g., by a factor corresponding to a number of slices per set). A number of slices per set may be configured based upon a distance over which data may be transmitted over a single clock cycle.

With respect to any processors in FIG. 30 and any components described above or elsewhere herein, one or more of APIs or equivalents described herein can, for example, get compiled into instructions or equivalents, which may be fetched by instruction fetch logic or equivalents, decoded by a processor decoder or equivalents, scheduled (e.g., in order or out of order) for execution by a scheduler or equivalents, executed by execution logic or equivalents, reordered, and then retired by retirement logic or equivalents. API(s) (and/or compiled instructions including API(s)) can be stored in any storage outside or inside of processor 3000 (e.g., in cache and/or memory). A result of API(s) can then be stored in storage within or outside of processor 3000, including registers, DRAM, flash, SRAM, cache, or other memory equivalents.

In at least one embodiment, processor 3000 can include one or more circuits to cause information to be stored and to store an indication of one or more decompression algorithms to decompress said information, to cause one or more identifiers of one or more videos and one or more indications of one or more pixel interpolation algorithms to be stored, to indicate one or more decompression algorithms to be used to access one or more frames of one or more videos, to perform interpolation of two or more pixels of one or more video frames based, at least in part, on one or more frame identifiers of said one or more video frames, to indicate one or more properties of one or more pixels based, at least in part, on one or more identifiers of one or more video frames containing said one or more pixels, and to modify one or more properties of one or more pixels based, at least in part, on one or more identifiers of one or more video frames containing said one or more pixels or otherwise perform any of the operations described above or elsewhere herein or otherwise perform any of the operations described above or elsewhere herein. One or more circuits can be configured by software to cause information to be stored and to store an indication of one or more decompression algorithms to decompress said information, to cause one or more identifiers of one or more videos and one or more indications of one or more pixel interpolation algorithms to be stored, to indicate one or more decompression algorithms to be used to access one or more frames of one or more videos, to perform interpolation of two or more pixels of one or more video frames based, at least in part, on one or more frame identifiers of said one or more video frames, to indicate one or more properties of one or more pixels based, at least in part, on one or more identifiers of one or more video frames containing said one or more pixels, and to modify one or more properties of one or more pixels based, at least in part, on one or more identifiers of one or more video frames containing said one or more pixels or otherwise perform any of the operations described above or elsewhere herein or otherwise perform any of the operations described above or elsewhere herein.

Software Constructions

The following FIGURES set forth, without limitation, examples of software constructs for implementing at least one embodiment.

Figure 31:
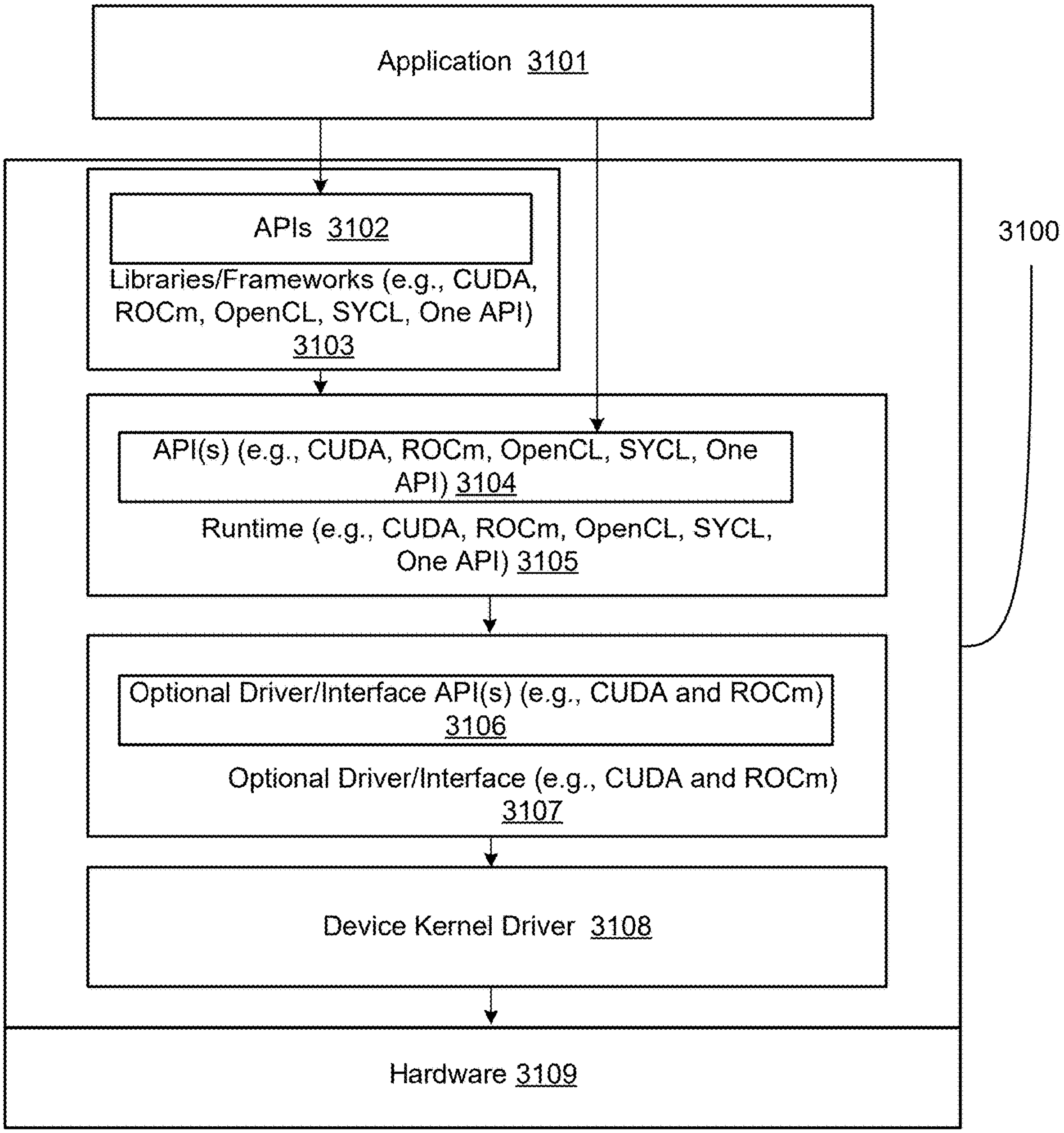
FIG. 31 illustrates a software stack of a programming platform, in accordance with at least one embodiment.

FIG. 31 illustrates a software stack of a programming platform, in accordance with at least one embodiment. A programming platform can include a platform for leveraging hardware on a computing system to accelerate computational tasks. A programming platform may be accessible to software developers through libraries, compiler directives, and/or extensions to programming languages, in at least one embodiment. A programming platform may be CUDA, Radeon Open Compute Platform ("ROCm"), OpenCL (OpenCL™ is developed by Khronos group), SYCL, or Intel oneAPI.

A software stack 3100 of a programming platform can provide an execution environment for an application 3101. Application 3101 may include any computer software capable of being launched on software stack 3100. Application 3101 may include an artificial intelligence ("AI")/machine learning ("ML") application, a high performance computing ("HPC") application, a virtual desktop infrastructure ("VDI"), or a data center workload.

Application 3101 and software stack 3100 run on hardware 3108. Hardware 3108 may include one or more GPUs, CPUs, FPGAs, AI engines, and/or other types of compute devices that support a programming platform. Software stack 3100 may be vendor specific and compatible with only devices from particular vendor(s), such as CUDA, ROCm, OneAPI, OpenCL, or other implementations. Hardware 3108 can include a host connected to one more devices that can be accessed to perform computational tasks via application programming interface ("API") calls. A device within hardware 3108 may include a GPU, FPGA, AI engine, or other compute device (but may also include a CPU) and its memory, as opposed to a host within hardware 3108 that may include a CPU (but may also include a compute device) and its memory, in at least one embodiment. With respect to any hardware 3108 described above or elsewhere herein, one or more of APIs described herein can, for example, get compiled into instructions, which may be fetched by instruction fetch logic, decoded by a processor decoder, scheduled (e.g., in order or out of order) for execution by a scheduler, executed by execution logic, reordered, and then retired by retirement logic. API(s) (and/or compiled instructions including API(s)) can be stored in any storage outside or inside of hardware 3108 (e.g., in cache and/or memory). A result of API(s) can then be stored in storage within or outside of hardware 3108, including registers, DRAM, flash, SRAM, cache, or other memory. One or more of APIs described herein can receive a call. One or more of APIs described herein can communicate with a library or a portion of a library to perform a function described by the call. One or more of APIs described herein can receive a call and communicate with a library or portion of a library to perform a function described by the call.

Software stack 3100 of a programming platform can include a number of libraries 3103, a runtime 3105, an optional driver/interface 3107, and a device kernel driver 3108. Each of libraries 3103 may include data and programming code that can be used by computer programs and leveraged during software development. Libraries 3103 may include pre-written code and subroutines, classes, values, type specifications, configuration data, documentation, help data, and/or message templates. Libraries 3103 can include functions that may be optimized for execution on one or more types of devices. Libraries 3103 may include functions for performing mathematical, deep learning, and/or other types of operations on devices. Libraries 3103 can be associated with corresponding APIs 3102, which may include one or more APIs, that expose functions implemented in libraries 3103. A processor (e.g. CPU, GPU) may perform, call, or otherwise use one or more APIs to prioritize kernels. For example, a first kernel (e.g., parent) can launch a second kernel (e.g., child kernel), and said second kernel can be used by a processor to launch additional kernels (e.g., grandchildren kernels) independent of said first kernel. A processor may perform an API or calls an API from memory to be performed to support dynamic stream priority (e.g., updating priority while a stream is being used to perform operations). For example, when a processor performs said API, it allows a programmer to copy stream priority from one stream to one or more other streams.

Software stack 3100 may include an API to support dynamic stream priority (e.g., updating priority while a stream is being used to perform operations), which can allow a programmer to set priority of a stream at any time after creation. Software stack 3100 can include an API to support dynamic stream priority (e.g., updating priority while the stream is being used to perform operations), which may allow a programmer to obtain current priority of a stream, where the priority is one of a plurality of attributes of a stream. Software stack 3100 can include an API to support dynamic stream priority (e.g., updating priority while the stream is being used to perform operations), which may allow a programmer to obtain current priority of a stream as a single attribute. Software stack 3100 can include an API to support dynamic stream priority (e.g., updating priority while the stream is being used to perform operations), which allows a programmer to launch a kernel to perform operations on a stream at a set priority, which may be different from the stream priority. Software stack 3100 may include an API to indicate whether an object (e.g., a thread synchronization object such as, but not limited to, a barrier) tracks whether all data movement operations for a set of threads operating on a GPU may be complete has a specified state after a specified period of time, where a specified state can be a state indicating that data has been moved and is ready for use, and is specified using an expected parity value as an input to the API.

Software stack 3100 can include one or more APIs to updated kernels. A processor can perform an API or call an API from memory to be performed to update to an existing API is to support context-free kernels, which may allow a programmer to add a kernel node to a graph without a graphics context, so that a graphics context can be dynamically associated with a kernel at runtime. Software stack 3100 may include one or more APIs to allow a programmer to obtain a kernel identifier and a graphics context as separate parameters from a kernel node, so that parameters to be obtained from kernels and from context-free kernels. Software stack 3100 can include one or more APIs to use parallel processor(s), such as, but not limited to, one or more graphics processing units, to launch task graphs (e.g., task graphs) and to execute one or more task graphs (e.g., including one or more programs).

Software stack 3100 may include one or more APIs to associate one or more instructions with one or more memory ordering operations, such as, but not limited to, a fence or membar operation. Instructions can be associated with one or more domains such that a memory ordering operation is executed in association to one or more particular domains without interfering with instructions of other domains. An API can indicate a thread has arrived (e.g., at a thread synchronization barrier), or finished a stage of work in relation to asynchronous data movement operations on a GPU. Software stack 3100 may include one or more to allow programmers to manually indicate an expected transaction count when a thread has finished a stage of work, which can be used to update an object that tracks whether all data movement operations for a set of threads may be complete.

Application 3101 can be written as source code that is compiled into executable code, as discussed in greater detail below in conjunction with FIGS. 32 and 33. Executable code of application 3101 may run, at least in part, on an execution environment provided by software stack 3100. During execution of application 3101, code may be reached that needs to run on a device, as opposed to a host. In such a case, runtime 3105 may be called to load and launch requisite code on a device. Runtime 3105 may include any technically feasible runtime system that is able to support execution of application 3101.

Runtime 3105 can be implemented as one or more runtime libraries associated with corresponding APIs, which are shown as API(s) 3104. One or more of such runtime libraries may include functions for memory management, execution control, device management, error handling, and/or synchronization, among other things. Memory management functions may include functions to allocate, deallocate, and copy device memory, as well as transfer data between host memory and device memory. Execution control functions may include functions to launch a function (sometimes referred to as a "kernel" when a function is a global function callable from a host) on a device and set attribute values in a buffer maintained by a runtime library for a given function to be executed on a device.

Runtime libraries and corresponding API(s) 3104 may be implemented in any technically feasible manner. One (or any number of) API may expose a low-level set of functions for fine-grained control of a device, while another (or any number of) API may expose a higher-level set of such functions. A high-level runtime API may be built on top of a low-level API. One or more of runtime APIs may be language-specific APIs that may be layered on top of a language-independent runtime API.

An optional driver or interface 3107 may be implemented, e.g., for CUDA and ROCm implementations, that are described further below. Optional driver/interface 3107 may be associated with optional driver or interface API(s), such as, but not limited to, CUDA and/or ROCm API(s).

One or more processors disclosed in "processing systems" can perform, access, or otherwise use software stack 3100. For example, system-on-a-chip 1800, parallel processor 1900, graphics multiprocessor 1934, processor 2000, processor 2100, accelerator 2200, neuromorphic processor 2305, supercomputer 2400, acceleration processing unit 2500, processor 2600, processor 2700, tensor processing unit 2800, processor 2900, and language processing unit 3000 can perform, use, call, or otherwise implement (e.g., through accessing a memory) one or more APIs included in software stack 3100.

Device kernel driver 3108 can be configured to facilitate communication with an underlying device. Device kernel driver 3108 may provide low-level functionalities upon which APIs, such as, but not limited to, API(s) 3104, and/or other software relies. Device kernel driver 3108 may be configured to compile intermediate representation ("IR") code into binary code at runtime. For CUDA or other implementations such as, but not limited to, ROCm, OneAPI, or OpenCL, device kernel driver 3108 may compile Parallel Thread Execution ("PTX") IR code that is not hardware specific into binary code for a specific target device at runtime (with caching of compiled binary code), which is also sometimes referred to as "finalizing" code. Doing so may permit finalized code to run on a target device, which may not have existed when source code was originally compiled into PTX code. Alternatively, device source code may be compiled into binary code offline, without requiring device kernel driver 3108 to compile IR code at runtime.

Processors described elsewhere herein, such as, but not limited to, processors in FIGS. 18-30 can include one or more circuits to cause information to be stored and to store an indication of one or more decompression algorithms to decompress said information, to cause one or more identifiers of one or more videos and one or more indications of one or more pixel interpolation algorithms to be stored, to indicate one or more decompression algorithms to be used to access one or more frames of one or more videos, to perform interpolation of two or more pixels of one or more video frames based, at least in part, on one or more frame identifiers of said one or more video frames, to indicate one or more properties of one or more pixels based, at least in part, on one or more identifiers of one or more video frames containing said one or more pixels, and to modify one or more properties of one or more pixels based, at least in part, on one or more identifiers of one or more video frames containing said one or more pixels or otherwise perform any of the operations described above or elsewhere herein or otherwise perform any of the operations described above or elsewhere herein. One or more circuits can be configured by software, e.g., software stack 3100 to cause information to be stored and to store an indication of one or more decompression algorithms to decompress said information, to cause one or more identifiers of one or more videos and one or more indications of one or more pixel interpolation algorithms to be stored, to indicate one or more decompression algorithms to be used to access one or more frames of one or more videos, to perform interpolation of two or more pixels of one or more video frames based, at least in part, on one or more frame identifiers of said one or more video frames, to indicate one or more properties of one or more pixels based, at least in part, on one or more identifiers of one or more video frames containing said one or more pixels, and to modify one or more properties of one or more pixels based, at least in part, on one or more identifiers of one or more video frames containing said one or more pixels or otherwise perform any of the operations described above or elsewhere herein or otherwise perform any of the operations described above or elsewhere herein.

In accordance with at least one embodiment, software stack 3100 of FIG. 31 can be performed in a CUDA implementation. A CUDA software stack 3100, on which an application 3101 may be launched, may include CUDA libraries 3103, a CUDA runtime 3105, a CUDA driver 3107, and a device kernel driver 3108. CUDA software stack 3100 can execute on hardware (e.g., graphics multiprocessor 1934 that may include a GPU that supports CUDA and is developed by NVIDIA Corporation of Santa Clara, CA.

Application 3101, CUDA runtime 3105, and device kernel driver 3108 can perform functionalities that are described above and elsewhere herein. CUDA driver 3107 can include a library (libcuda.so) that may implement a CUDA driver API 3106. Similar to a CUDA runtime API 3104 implemented by a CUDA runtime library (cudart), CUDA driver API 3106 may expose functions for memory management, execution control, device management, error handling, synchronization, and/or graphics interoperability, among other things. CUDA driver API 3106 can differ from CUDA runtime API 3104 in that CUDA runtime API 3104 simplifies device code management by providing implicit initialization, context (analogous to a process) management, and module (analogous to dynamically loaded libraries) management. In contrast to high-level CUDA runtime API 3104, CUDA driver API 3106 can be a low-level API providing more fine-grained control of a device, particularly with respect to contexts and module loading. CUDA driver API 3106 may expose functions for context management that may be not exposed by CUDA runtime API 3104. CUDA driver API 3106 may also be language-independent and support, e.g., OpenCL, in addition to CUDA runtime API 3104. Further, development libraries, including CUDA runtime 3105, may be considered as separate from driver components, including user-mode CUDA driver 3107 and kernel-mode device driver 3108 (also sometimes referred to as a "display" driver).

CUDA libraries 3103 may include mathematical libraries, deep learning libraries, parallel algorithm libraries, and/or signal/image/video processing libraries, which parallel computing applications such as, but not limited to, application 3101 may utilize. CUDA libraries 3103 may include mathematical libraries such as, but not limited to, a cuBLAS library that is an implementation of Basic Linear Algebra Subprograms ("BLAS") for performing linear algebra operations, a cuFFT library for computing fast Fourier transforms ("FFTs"), and a cuRAND library for generating random numbers, among others. CUDA libraries 3103 may include deep learning libraries such as, but not limited to, a cuDNN library of primitives for deep neural networks and a TensorRT platform for high-performance deep learning inference, among others.

In at least one embodiment, processors described elsewhere herein, such as, but not limited to, processors in FIGS. 18-30 can include one or more circuits to cause information to be stored and to store an indication of one or more decompression algorithms to decompress said information, to cause one or more identifiers of one or more videos and one or more indications of one or more pixel interpolation algorithms to be stored, to indicate one or more decompression algorithms to be used to access one or more frames of one or more videos, to perform interpolation of two or more pixels of one or more video frames based, at least in part, on one or more frame identifiers of said one or more video frames, to indicate one or more properties of one or more pixels based, at least in part, on one or more identifiers of one or more video frames containing said one or more pixels, and to modify one or more properties of one or more pixels based, at least in part, on one or more identifiers of one or more video frames containing said one or more pixels or otherwise perform any of the operations described above or elsewhere herein or otherwise perform any of the operations described above or elsewhere herein. One or more circuits can be configured by software, e.g., software stack 3100 to cause information to be stored and to store an indication of one or more decompression algorithms to decompress said information, to cause one or more identifiers of one or more videos and one or more indications of one or more pixel interpolation algorithms to be stored, to indicate one or more decompression algorithms to be used to access one or more frames of one or more videos, to perform interpolation of two or more pixels of one or more video frames based, at least in part, on one or more frame identifiers of said one or more video frames, to indicate one or more properties of one or more pixels based, at least in part, on one or more identifiers of one or more video frames containing said one or more pixels, and to modify one or more properties of one or more pixels based, at least in part, on one or more identifiers of one or more video frames containing said one or more pixels or otherwise perform any of the operations described above or elsewhere herein or otherwise perform any of the operations described above or elsewhere herein.

In accordance with at least one embodiment, software stack 3100 of FIG. 31 can be performed in a ROCm implementation. A ROCm software stack 3100, on which an application 3101 may be launched, includes a language runtime 3103, a system runtime 3105, a thunk 3107, and a ROCm kernel driver 3108. ROCm software stack 3100 executes on hardware 3109, which may include a GPU that supports ROCm and is developed by AMD Corporation of Santa Clara, CA.

Application 3101 may perform similar functionalities as discussed above in conjunction with FIG. 31. In addition, language runtime 3103 and system runtime 3105 may perform similar functionalities as runtime 3105 discussed above in conjunction with FIG. 31. Language runtime 3103 and system runtime 3105 may differ in that system runtime 3105 is a language-independent runtime that implements a ROCr system runtime API 3104 and makes use of a Heterogeneous System Architecture ("HSA") Runtime API. HSA runtime API can include a thin, user-mode API that exposes interfaces to access and interact with an AMD GPU, including functions for memory management, execution control via architected dispatch of kernels, error handling, system and agent information, and runtime initialization and shutdown, among other things. In contrast to system runtime 3105, language runtime 3103 can be an implementation of a language-specific runtime API 3102 layered on top of ROCr system runtime API 3104. Language runtime API may include a Heterogeneous compute Interface for Portability ("HIP") language runtime API, a Heterogeneous Compute Compiler ("HCC") language runtime API, or an OpenCL API, among others. HIP language in particular is an extension of C++ programming language with functionally similar versions of CUDA mechanisms, and a HIP language runtime API may include functions that may be similar to those of CUDA runtime API discussed above in conjunction with FIG. 31, such as, but not limited to, functions for memory management, execution control, device management, error handling, and synchronization, among other things.

Thunk (ROCt) 3107 can be an interface 3106 that can be used to interact with underlying ROCm driver 3108. ROCm driver 3108 can be a ROCK driver, which is a combination of an AMDGPU driver and a HSA kernel driver (amdkfd). AMDGPU driver can be a device kernel driver for GPUs developed by AMD that performs similar functionalities as device kernel driver 3109 discussed above in conjunction with FIG. 31. HSA kernel driver can be a driver permitting different types of processors to share system resources more effectively via hardware features.

Various libraries (not shown) may be included in ROCm software stack 3100 above language runtime 3103 and provide functionality similar to CUDA libraries 3103, discussed above in conjunction with FIG. 31. Various libraries may include mathematical, deep learning, and/or other libraries such as, but not limited to, a hipBLAS library that implements functions similar to those of CUDA cuBLAS, a rocFFT library for computing FFTs that is similar to CUDA cuFFT, among others.

Processors described elsewhere herein, such as, but not limited to, processors in FIGS. 18-30 can include one or more circuits to cause information to be stored and to store an indication of one or more decompression algorithms to decompress said information, to cause one or more identifiers of one or more videos and one or more indications of one or more pixel interpolation algorithms to be stored, to indicate one or more decompression algorithms to be used to access one or more frames of one or more videos, to perform interpolation of two or more pixels of one or more video frames based, at least in part, on one or more frame identifiers of said one or more video frames, to indicate one or more properties of one or more pixels based, at least in part, on one or more identifiers of one or more video frames containing said one or more pixels, and to modify one or more properties of one or more pixels based, at least in part, on one or more identifiers of one or more video frames containing said one or more pixels or otherwise perform any of the operations described above or elsewhere herein or otherwise perform any of the operations described above or elsewhere herein. One or more circuits can be configured by software, e.g., software stack 3100 to cause information to be stored and to store an indication of one or more decompression algorithms to decompress said information, to cause one or more identifiers of one or more videos and one or more indications of one or more pixel interpolation algorithms to be stored, to indicate one or more decompression algorithms to be used to access one or more frames of one or more videos, to perform interpolation of two or more pixels of one or more video frames based, at least in part, on one or more frame identifiers of said one or more video frames, to indicate one or more properties of one or more pixels based, at least in part, on one or more identifiers of one or more video frames containing said one or more pixels, and to modify one or more properties of one or more pixels based, at least in part, on one or more identifiers of one or more video frames containing said one or more pixels or otherwise perform any of the operations described above or elsewhere herein or otherwise perform any of the operations described above or elsewhere herein.

In accordance with at least one embodiment, software stack 3100 of FIG. 31 can be performed in a OpenCL implementation. An OpenCL software stack 3100, on which an application 3101 may be launched, can include an OpenCL framework 3103, an OpenCL runtime 3105, and a driver 3108. OpenCL software stack 3100 may execute on hardware 3109 that is not vendor-specific. As OpenCL is supported by devices developed by different vendors, specific OpenCL drivers may be required to interoperate with hardware from such vendors.

Application 3101, OpenCL runtime 3105, device kernel driver 3108, and hardware 3109 may perform similar functionalities as other implementations of application 3101, runtime 3105, device kernel driver 3108, and hardware 3109, respectively, that are discussed above in conjunction with FIG. 31. Application 3101 can further include an OpenCL kernel (not shown) with code that is to be executed on a device.

OpenCL may define a "platform" that allows a host to control devices connected to a host. An OpenCL framework can provide a platform layer API and a runtime API, shown as platform API 3102 and runtime API 3104. Runtime API 3104 can use contexts to manage execution of kernels on devices. Each identified device may be associated with a respective context, which runtime API 3104 may use to manage command queues, program objects, and kernel objects, share memory objects, among other things, for that device. Platform API 3102 can expose functions that permit device contexts to be used to select and initialize devices, submit work to devices via command queues, and enable data transfer to and from devices, among other things. In addition, OpenCL framework can provide various built-in functions (not shown), including math functions, relational functions, and image processing functions, among others.

A compiler (not shown) can also be included in OpenCL framework 3103. Source code may be compiled offline prior to executing an application or online during execution of an application. In contrast to CUDA and ROCm, OpenCL applications may be compiled online by a compiler that is representative of any number of compilers that may be used to compile source code and/or IR code, such as, but not limited to, Standard Portable Intermediate Representation ("SPIR-V") code, into binary code. Alternatively, OpenCL applications may be compiled offline, prior to execution of such applications.

In at least one embodiment, processors described elsewhere herein, such as, but not limited to, processors in FIGS. 18-30 can include one or more circuits to cause information to be stored and to store an indication of one or more decompression algorithms to decompress said information, to cause one or more identifiers of one or more videos and one or more indications of one or more pixel interpolation algorithms to be stored, to indicate one or more decompression algorithms to be used to access one or more frames of one or more videos, to perform interpolation of two or more pixels of one or more video frames based, at least in part, on one or more frame identifiers of said one or more video frames, to indicate one or more properties of one or more pixels based, at least in part, on one or more identifiers of one or more video frames containing said one or more pixels, and to modify one or more properties of one or more pixels based, at least in part, on one or more identifiers of one or more video frames containing said one or more pixels or otherwise perform any of the operations described above or elsewhere herein or otherwise perform any of the operations described above or elsewhere herein. One or more circuits can be configured by software, e.g., software stack 3100 to cause information to be stored and to store an indication of one or more decompression algorithms to decompress said information, to cause one or more identifiers of one or more videos and one or more indications of one or more pixel interpolation algorithms to be stored, to indicate one or more decompression algorithms to be used to access one or more frames of one or more videos, to perform interpolation of two or more pixels of one or more video frames based, at least in part, on one or more frame identifiers of said one or more video frames, to indicate one or more properties of one or more pixels based, at least in part, on one or more identifiers of one or more video frames containing said one or more pixels, and to modify one or more properties of one or more pixels based, at least in part, on one or more identifiers of one or more video frames containing said one or more pixels or otherwise perform any of the operations described above or elsewhere herein or otherwise perform any of the operations described above or elsewhere herein.

In accordance with at least one embodiment, software can be supported by a programming platform that is configured to support various programming models, middlewares and/or libraries, and frameworks that an application may rely upon. Application may be an AI/ML application implemented using, for example, a deep learning framework such as, but not limited to, MXNet, PyTorch, or TensorFlow, which may rely on libraries such as, but not limited to, cuDNN, NVIDIA Collective Communications Library ("NCCL"), and/or NVIDA Developer Data Loading Library ("DALI") CUDA libraries to provide accelerated computing on underlying hardware.

Programming platform may be one of a CUDA, ROCm, or OpenCL platform described above in conjunction with FIG. 31. Programming platform can support multiple programming models, which may be abstractions of an underlying computing system permitting expressions of algorithms and data structures. Programming models may expose features of underlying hardware in order to improve performance. Programming models may include CUDA, HIP, OpenCL, C++ Accelerated Massive Parallelism ("C++ AMP"), Open Multi-Processing ("OpenMP"), Open Accelerators ("OpenACC"), and/or Vulcan Compute.

Libraries and/or middlewares may provide implementations of abstractions of programming models. Such libraries can include data and programming code that may be used by computer programs and leveraged during software development. Such middlewares can include software that provides services to applications beyond those available from programming platform. Libraries and/or middlewares may include cuBLAS, cuFFT, cuRAND, and other CUDA libraries, or rocBLAS, rocFFT, rocRAND, and other ROCm libraries. In addition, libraries and/or middlewares may include NCCL and ROCm Communication Collectives Library ("RCCL") libraries providing communication routines for GPUs, a MIOpen library for deep learning acceleration, and/or an Eigen library for linear algebra, matrix and vector operations, geometrical transformations, numerical solvers, and related algorithms.

Application frameworks may depend on libraries and/or middlewares. Each of application frameworks can be a software framework used to implement a standard structure of application software. Returning to the AI/ML example discussed above, an AI/ML application may be implemented using a framework such as, but not limited to, Caffe, Caffe2, TensorFlow, Keras, PyTorch, or MxNet deep learning frameworks, for example.

In at least one embodiment, processors described elsewhere herein, such as, but not limited to, processors in FIGS. 18-30 can include one or more circuits to cause information to be stored and to store an indication of one or more decompression algorithms to decompress said information, to cause one or more identifiers of one or more videos and one or more indications of one or more pixel interpolation algorithms to be stored, to indicate one or more decompression algorithms to be used to access one or more frames of one or more videos, to perform interpolation of two or more pixels of one or more video frames based, at least in part, on one or more frame identifiers of said one or more video frames, to indicate one or more properties of one or more pixels based, at least in part, on one or more identifiers of one or more video frames containing said one or more pixels, and to modify one or more properties of one or more pixels based, at least in part, on one or more identifiers of one or more video frames containing said one or more pixels or otherwise perform any of the operations described above or elsewhere herein or otherwise perform any of the operations described above or elsewhere herein. One or more circuits can be configured by software, e.g., programming platforms described herein, to cause information to be stored and to store an indication of one or more decompression algorithms to decompress said information, to cause one or more identifiers of one or more videos and one or more indications of one or more pixel interpolation algorithms to be stored, to indicate one or more decompression algorithms to be used to access one or more frames of one or more videos, to perform interpolation of two or more pixels of one or more video frames based, at least in part, on one or more frame identifiers of said one or more video frames, to indicate one or more properties of one or more pixels based, at least in part, on one or more identifiers of one or more video frames containing said one or more pixels, and to modify one or more properties of one or more pixels based, at least in part, on one or more identifiers of one or more video frames containing said one or more pixels or otherwise perform any of the operations described above or elsewhere herein or otherwise perform any of the operations described above or elsewhere herein.

Figure 32:
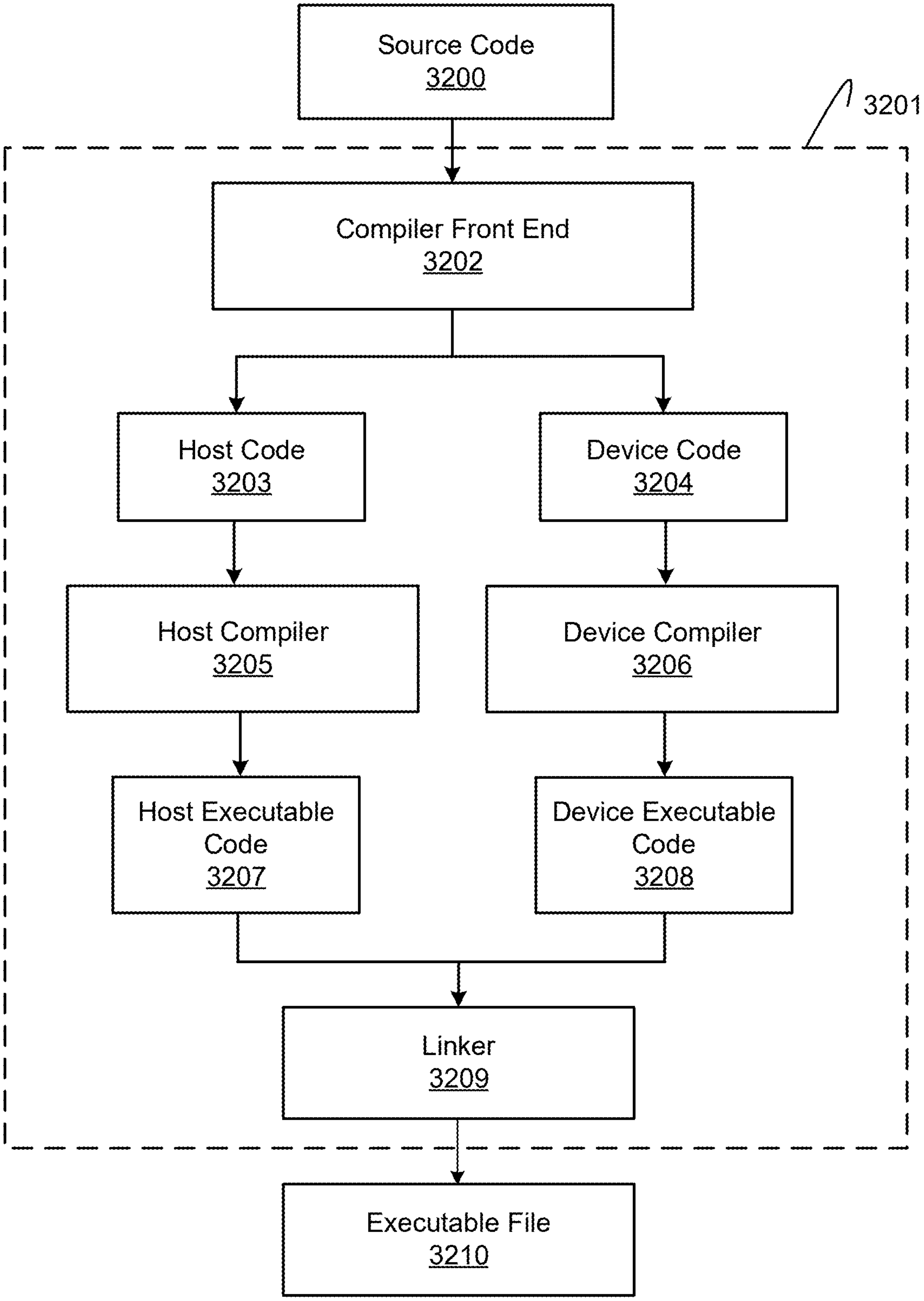
FIG. 32 illustrates software that is supported by a programming platform, in accordance with at least one embodiment.

FIG. 32 illustrates compiling code to execute on one of programming platforms of FIG. 31 described above, in accordance with at least one embodiment. A compiler 3201 is configured to receive source code 3200, compile source code 3200, and output an executable file 3210. Complier 3201 can be configured to convert source code 3200 into host executable code 3207 for execution on a host and device executable code 3208 for execution on a device. Source code 3200 may either be compiled offline prior to execution of an application, or online during execution of an application. Source code 3200 may include code in any programming language supported by compiler 3201, such as, but not limited to, C++, C, Fortran, etc. Source code 3200 may be included in a single-source file having a mixture of host code and device code, with locations of device code being indicated therein. A single-source file may be a .cu file that includes CUDA code or a .hip.cpp file that includes HIP code or a file in another format that includes both host code and device code. Alternatively, source code 3200 may include multiple source code files, rather than a single-source file, into which host code and device code may be separated. Compiler 3201 includes or has access to one or more libraries to recognize a sequence of API calls to perform a single fused API, where a single fused API is a combined API for two or more APIs. In at least one embodiment, compiler 3201 may be an NVIDIA CUDA compiler ("NVCC") for compiling CUDA code in .cu files, or a HCC compiler for compiling HIP code in .hip.cpp files, or other compilers.

Compiler 3201 can be configured to compile source code 3200 into host executable code 3207 for execution on a host and device executable code 3208 for execution on a device.

Compiler 3201 performs operations including parsing source code 3200 into an abstract system tree (AST), performing optimizations, and generating executable code. When source code 3200 includes a single-source file, compiler 3201 may separate device code from host code in such a single-source file, compile device code and host code into device executable code 3208 and host executable code 3207, respectively, and link device executable code 3208 and host executable code 3207 together in a single file.

Compiler 3201 can include a compiler front end 3202, a host compiler 3205, a device compiler 3206, and a linker 3209. Compiler front end 3202 can be configured to separate device code 3204 from host code 3203 in source code 3200. Device code 3204 may be compiled by device compiler 3206 into device executable code 3208, which as described may include binary code or IR code, in at least one embodiment. Separately, host code 3203 may be compiled by host compiler 3205 into host executable code 3207. For NVCC other compilers, such as, but not limited to, those for oneAPI, ROCm, and OpenCL, host compiler 3205 may be a general purpose C/C++ compiler that outputs native object code, while device compiler 3206 may be a Low Level Virtual Machine ("LLVM")-based compiler that forks a LLVM compiler infrastructure and outputs PTX code or binary code. For HCC, both host compiler 3205 and device compiler 3206 may be LLVM-based compilers that output target binary code.

Subsequent to compiling source code 3200 into host executable code 3207 and device executable code 3208, linker 3209 can link host and device executable code 3207 and 3208 together in executable file 3210. Native object code for a host and PTX or binary code for a device may be linked together in an Executable and Linkable Format ("ELF") file, which is a container format used to store object code. Host executable code 3207 and device executable code 3208 may be in any suitable format, such as, but not limited to, binary code and/or IR code. In the case of CUDA, host executable code 3207 may include native object code and device executable code 3208 may include code in PTX intermediate representation, in at least one embodiment. In the case of ROCm, both host executable code 3207 and device executable code 3208 may include target binary code, in at least one embodiment. Other implementations, such as, but not limited to, oneAPI, OpenCL are contemplated and can be performed similarly to the CUDA and ROCm implementations above.

Source code 3200 may be translated prior to compiling source code. Source code is passed through a translation tool (not shown), which translates source code 3200 into translated source code. A compiler 3201 can be used to compile translated source code into host executable code 3207 and device executable code 3208 in a process that is similar to compilation of source code 3200 by compiler 3201 into host executable code 3207 and device executable code 3208, as discussed above in conjunction with FIG. 32.

A translation performed by translation tool can be used to port source code 3200 for execution in a different environment than that in which it was originally intended to run. Translation tool may include a HIP translator that is used to "hipify" CUDA code intended for a CUDA platform into HIP code that can be compiled and executed on a ROCm platform. Translation of source code 3200 may include parsing source code 3200 and converting calls to API(s) provided by one programming model (e.g., CUDA) into corresponding calls to API(s) provided by another programming model (e.g., HIP), as discussed in greater detail below in conjunction with FIG. 33. Returning to the example of hipifying CUDA code, calls to CUDA runtime API, CUDA driver API, and/or CUDA libraries may be converted to corresponding HIP API calls. Automated translations performed by translation tool 3201 may sometimes be incomplete, requiring additional, manual effort to fully port source code 3200.

One or more techniques described herein may utilize other methods of converting one type of code to another type of code to enable interchangeability between different device architectures. In at least one embodiment, an application for one platform (e.g., a CUDA application) can be compiled into code for implementation on another platform (e.g., an AMD processor, Intel processor, or other processor). For example, source code 3200 can include source code for one platform (e.g., CUDA). Compiler 3201 can compile the source 3200 into an executable file 3210 that can be used by another platform (e.g., AMD or Intel). Programming toolkits can allow applications for one platform (e.g., CUDA) to be compiled (e.g., natively) for another platform (e.g., AMD or Intel). For example, a GPGPU programming toolkit can allow for CUDA applications to be natively compiled for AMD GPUs. Programs (e.g., CUDA programs) or its build system do not have to be modified or translated to another language before compiling to code for another platform. A compiler may accept the same command-line options and programming dialect (e.g., CUDA dialect) as another compiler (e.g., nvcc for CUDA), serving as a drop-in replacement to impersonate an installation of a toolkit (e.g., NVIDIA CUDA Toolkit), so existing build tools and scripts (e.g., like cmake) work without further modification. In at least one embodiment, an nvcc-compatible compiler can be used to compile nvcc-dialect CUDA for AMD GPUs, including PTX asm. Implementations of CUDA runtime and driver APIs for AMD GPUs can be used. Libraries (e.g., open source wrapper libraries) can provide APIs, such as "CUDA-X" APIs by delegating to the corresponding ROCm libraries. An example implementation includes SCALE from Spectral Compute in London, England. Instead of providing a new way to write GPGPU software, SCALE allows programs written using the widely-popular CUDA language to be directly compiled for AMD GPUs. Additional implementations can include a Clang compiler that provides a language front-end and tooling infrastructure for languages in the C language family (C, C++, Objective C/C++, OpenCL, CUDA, and RenderScript). In at least one embodiment, compilers described herein, such as, but not limited to compiler 3201, compiler 3205, and/or compiler 3206 can include one or more circuits to compile code (e.g., CUDA, HIP, OpenCL, OneAPI, or others) to cause information to be stored and to store an indication of one or more decompression algorithms to decompress said information, to cause one or more identifiers of one or more videos and one or more indications of one or more pixel interpolation algorithms to be stored, to indicate one or more decompression algorithms to be used to access one or more frames of one or more videos, to perform interpolation of two or more pixels of one or more video frames based, at least in part, on one or more frame identifiers of said one or more video frames, to indicate one or more properties of one or more pixels based, at least in part, on one or more identifiers of one or more video frames containing said one or more pixels, and to modify one or more properties of one or more pixels based, at least in part, on one or more identifiers of one or more video frames containing said one or more pixels or otherwise perform any of the operations described above or elsewhere herein and/or perform any of the operations described above or elsewhere herein.

Figure 33:
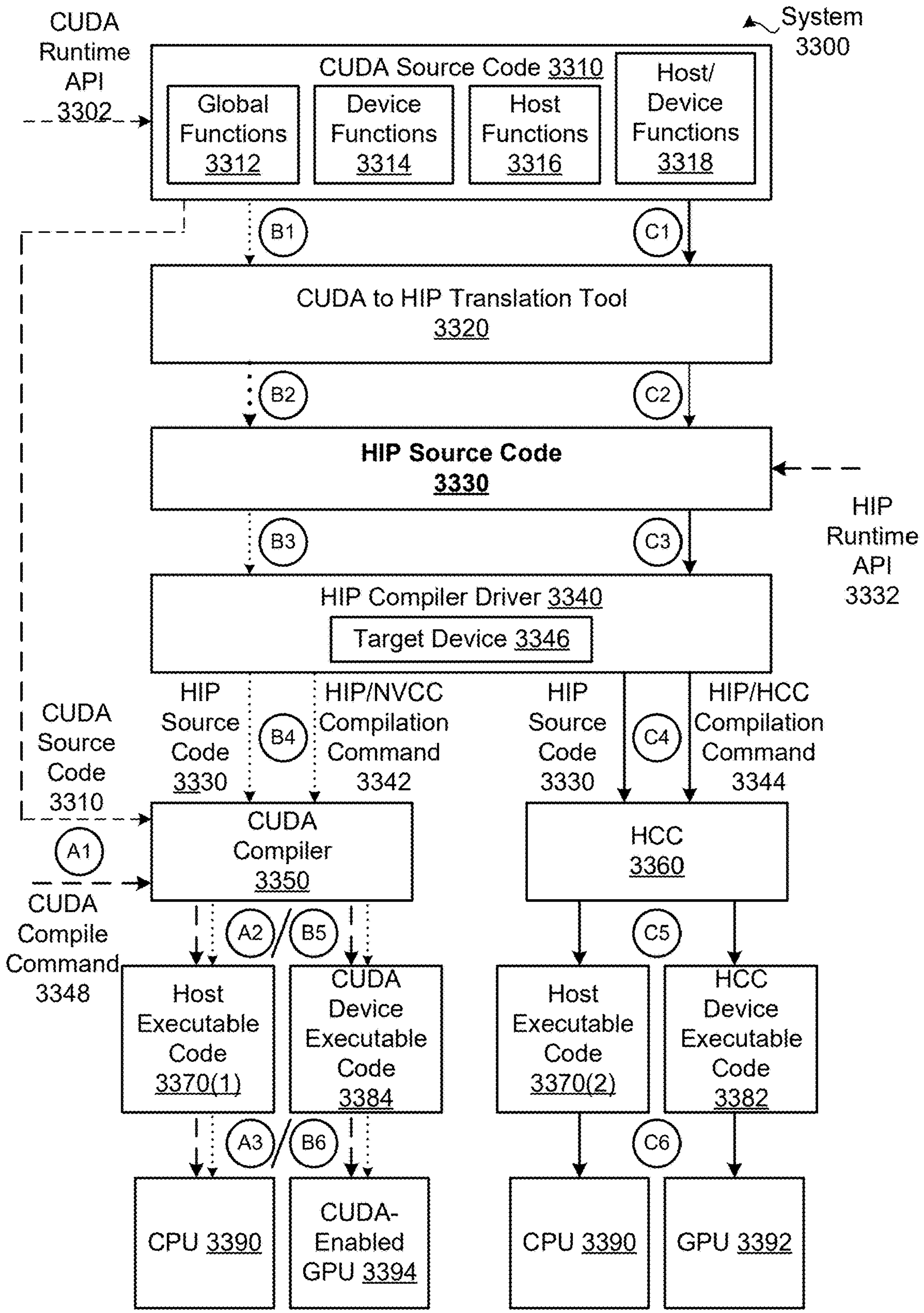
FIG. 33 illustrates compiling code to execute on programming platforms of FIG. 32, in accordance with at least one embodiment.

FIG. 33 illustrates a system 3300 configured to compile and execute CUDA source code 3310 using different types of processing units, in accordance with at least one embodiment. System 3300 includes CUDA source code 3310, a CUDA compiler 3350, host executable code 3370(1), host executable code 3370(2), CUDA device executable code 3384, a CPU 3390, a CUDA-enabled GPU 3394, a GPU 3392, a CUDA to HIP translation tool 3320, HIP source code 3330, a HIP compiler driver 3340, an HCC 3360, and HCC device executable code 3382.

CUDA source code 3310 may be a collection of human-readable code in a CUDA programming language. A CUDA programming language can be an extension of the C++ programming language that includes mechanisms to define device code and distinguish between device code and host code. Device code can include source code that, after compilation, is executable in parallel on a device. A device may be a processor that is optimized for parallel instruction processing, such as, but not limited to, CUDA-enabled GPU 3390, GPU 3392, or another GPGPU, etc. Host code is source code that, after compilation, is executable on a host. A host is a processor that is optimized for sequential instruction processing, such as, but not limited to, CPU 3390.

CUDA source code 3310 can include any number (including zero) of global functions 3312, any number (including zero) of device functions 3314, any number (including zero) of host functions 3316, and any number (including zero) of host/device functions 3318. Global functions 3312, device functions 3314, host functions 3316, and host/device functions 3318 may be mixed in CUDA source code 3310. Each of global functions 3312 may be executable on a device and callable from a host. One or more of global functions 3312 may therefore act as entry points to a device. Each of global functions 3312 can be a kernel. In a technique known as dynamic parallelism, one or more of global functions 3312 can define a kernel that is executable on a device and callable from such a device. A kernel can be executed N (where N is any positive integer) times in parallel by N different threads on a device during execution.

Each of device functions 3314 can be executed on a device and callable from such a device only. Each of host functions 3316 can be executed on a host and callable from such a host only. Each of host/device functions 3316 may define both a host version of a function that is executable on a host and callable from such a host only and a device version of the function that is executable on a device and callable from such a device only.

CUDA source code 3310 may also include any number of calls to any number of functions that may be defined via a CUDA runtime API 3302. CUDA runtime API 3302 may include any number of functions that execute on a host to allocate and deallocate device memory, transfer data between host memory and device memory, manage systems with multiple devices, etc. CUDA source code 3310 may also include any number of calls to any number of functions that may be specified in any number of other CUDA APIs. A CUDA API may be any API that is designed for use by CUDA code. CUDA APIs can include CUDA runtime API 3302, a CUDA driver API, APIs for any number of CUDA libraries, etc, including any API(s) described elsewhere herein. Relative to CUDA runtime API 3302, a CUDA driver API can be a lower-level API but can provide finer-grained control of a device. Examples of CUDA libraries include cuBLAS, cuFFT, cuRAND, cuDNN, etc.

CUDA compiler 3350 may compile input CUDA code (e.g., CUDA source code 3310) to generate host executable code 3370(1) and CUDA device executable code 3384. CUDA compiler 3350 may be, but is not limited to, NVCC. Host executable code 3370(1) can be a compiled version of host code included in input source code that is executable on CPU 3390. CPU 3390 may be any processor that is optimized for sequential instruction processing.

CUDA device executable code 3384 may be a compiled version of device code included in input source code that is executable on CUDA-enabled GPU 3394. CUDA device executable code 3384 may include binary code. CUDA device executable code 3384 can include IR code, such as, but not limited to, PTX code, that is further compiled at runtime into binary code for a specific target device (e.g., CUDA-enabled GPU 3394) by a device driver. CUDA-enabled GPU 3394 may include any processor that is optimized for parallel instruction processing and that supports CUDA. CUDA-enabled GPU 3394 may be developed by NVIDIA Corporation of Santa Clara, CA.

CUDA to HIP translation tool 3320 can be configured to translate CUDA source code 3310 to functionally similar HIP source code 3330. HIP source code 3330 may include a collection of human-readable code in a HIP programming language. HIP code can include human-readable code in a HIP programming language. A HIP programming language can include an extension of the C++ programming language that includes functionally similar versions of CUDA mechanisms to define device code and distinguish between device code and host code. A HIP programming language may include a subset of functionality of a CUDA programming language. For example, a HIP programming language includes mechanism(s) to define global functions 3312, but such a HIP programming language may lack support for dynamic parallelism and therefore global functions 3312 defined in HIP code may be callable from a host only.

HIP source code 3330 may include any number (including zero) of global functions 3312, any number (including zero) of device functions 3314, any number (including zero) of host functions 3316, and any number (including zero) of host/device functions 3318. HIP source code 3330 may also include any number of calls to any number of functions that may be specified in a HIP runtime API 3332. HIP runtime API 3332 may include functionally similar versions of a subset of functions included in CUDA runtime API 3302. HIP source code 3330 may also include any number of calls to any number of functions that may be specified in any number of other HIP APIs. A HIP API may be any API that is designed for use by HIP code and/or ROCm. HIP APIs may include HIP runtime API 3332, a HIP driver API, APIs for any number of HIP libraries, APIs for any number of ROCm libraries, etc.

CUDA to HIP translation tool 3320 can convert each kernel call in CUDA code from a CUDA syntax to a HIP syntax and can convert any number of other CUDA calls in CUDA code to any number of other functionally similar HIP calls. A CUDA call can include a call to a function specified in a CUDA API, and a HIP call can include a call to a function specified in a HIP API. CUDA to HIP translation tool 3320 may convert any number of calls to functions specified in CUDA runtime API 3302 to any number of calls to functions specified in HIP runtime API 3332.

CUDA to HIP translation tool 3320 can include a tool known as hipify-perl that executes a text-based translation process. CUDA to HIP translation tool 3320 can include a tool known as hipify-clang that, relative to hipify-perl, executes a more complex and more robust translation process that involves parsing CUDA code using clang (a compiler front-end) and then translating resulting symbols. Converting CUDA code to HIP code may include modifications (e.g., manual edits) in addition to those performed by CUDA to HIP translation tool 3320.

HIP compiler driver 3340 can include a front end that determines a target device 3346 and then configures a compiler that is compatible with target device 3346 to compile HIP source code 3330. Target device 3346 can include a processor that is optimized for parallel instruction processing. HIP compiler driver 3340 may determine target device 3346 in any technically feasible fashion.

If target device 3346 is compatible with CUDA (e.g., CUDA-enabled GPU 3394), then HIP compiler driver 3340 can generate a HIP/NVCC compilation command 3342. HIP/NVCC compilation command 3342 can configure CUDA compiler 3350 to compile HIP source code 3330 using a HIP to CUDA translation header and a CUDA runtime library. In response to HIP/NVCC compilation command 3342, CUDA compiler 3350 may generate host executable code 3370(1) and CUDA device executable code 3384.

If target device 3346 is not compatible with CUDA, then HIP compiler driver 3340 may generate a HIP/HCC compilation command 3344. HIP/HCC compilation command 3344 can configure HCC 3360 to compile HIP source code 3330 using an HCC header and a HIP/HCC runtime library. In response to HIP/HCC compilation command 3344, HCC 3360 may generate host executable code 3370(2) and HCC device executable code 3382. HCC device executable code 3382 may be a compiled version of device code included in HIP source code 3330 that is executable on GPU 3392. GPU 3392 may be any processor that is optimized for parallel instruction processing, is not compatible with CUDA, and is compatible with HCC. GPU 3392 can be developed by AMD Corporation of Santa Clara, CA. GPU 3392 can include a non-CUDA-enabled GPU 3392.

For explanatory purposes only, three different flows that may be implemented in at least one embodiment to compile CUDA source code 3310 for execution on CPU 3390 and different devices are depicted in FIG. 33. A direct CUDA flow can compile CUDA source code 3310 for execution on CPU 3390 and CUDA-enabled GPU 3394 without translating CUDA source code 3310 to HIP source code 3330. An indirect CUDA flow can translate CUDA source code 3310 to HIP source code 3330 and then compiles HIP source code 3330 for execution on CPU 3390 and CUDA-enabled GPU 3394. A CUDA/HCC flow can translate CUDA source code 3310 to HIP source code 3330 and then can compile HIP source code 3330 for execution on CPU 3390 and GPU 3392.

A direct CUDA flow that may be implemented is depicted via dashed lines and a series of bubbles annotated A1-A3. As depicted with bubble annotated A1, CUDA compiler 3350 can receive CUDA source code 3310 and a CUDA compile command 3348 that can configure CUDA compiler 3350 to compile CUDA source code 3310. CUDA source code 3310 that can be used in a direct CUDA flow can be written in a CUDA programming language that is based on a programming language other than C++ (e.g., C, Fortran, Python, Java, etc.). In response to CUDA compile command 3348, CUDA compiler 3350 can generate host executable code 3370(1) and CUDA device executable code 3384 (depicted with bubble annotated A2). As depicted with bubble annotated A3, host executable code 3370(1) and CUDA device executable code 3384 may be executed on, respectively, CPU 3390 and CUDA-enabled GPU 3394. CUDA device executable code 3384 can include binary code. CUDA device executable code 3384 can include PTX code and can be further compiled into binary code for a specific target device at runtime.

An indirect CUDA flow that may be implemented is depicted via dotted lines and a series of bubbles annotated B1-B6. As depicted with bubble annotated B1, CUDA to HIP translation tool 3320 can receive CUDA source code 3310. As depicted with bubble annotated B2, CUDA to HIP translation tool 3320 can translate CUDA source code 3310 to HIP source code 3330. As depicted with bubble annotated B3, HIP compiler driver 3340 can receive HIP source code 3330 and can determine that target device 3346 is CUDA-enabled.

As depicted with bubble annotated B4, HIP compiler driver 3340 can generate HIP/NVCC compilation command 3342 and can transmit both HIP/NVCC compilation command 3342 and HIP source code 3330 to CUDA compiler 3350. HIP/NVCC compilation command 3342 can configure CUDA compiler 3350 to compile HIP source code 3330 using a HIP to CUDA translation header and a CUDA runtime library. HIP to CUDA translation header can translate any number of mechanisms (e.g., functions) specified in any number of HIP APIs to any number of mechanisms specified in any number of CUDA APIs. CUDA compiler 3350 may use HIP to CUDA translation header in conjunction with a CUDA runtime library corresponding to CUDA runtime API 3302 to generate host executable code 3370(1) and CUDA device executable code 3384. In response to HIP/NVCC compilation command 3342, CUDA compiler 3350 can generate host executable code 3370(1) and CUDA device executable code 3384 (depicted with bubble annotated B5). As depicted with bubble annotated B6, host executable code 3370(1) and CUDA device executable code 3384 may be executed on, respectively, CPU 3390 and CUDA-enabled GPU 3394. CUDA device executable code 3384 can include binary code. CUDA device executable code 3384 can include PTX code and can be further compiled into binary code for a specific target device at runtime.

A CUDA/HCC flow that may be implemented is depicted via solid lines and a series of bubbles annotated C1-C6. As depicted with bubble annotated C1, CUDA to HIP translation tool 3320 can receive CUDA source code 3310. As depicted with bubble annotated C2, CUDA to HIP translation tool 3320 can translate CUDA source code 3310 to HIP source code 3330. As depicted with bubble annotated C3, HIP compiler driver 3340 can receive HIP source code 3330 and can determine that target device 3346 is not CUDA-enabled.

HIP compiler driver 3340 may generate HIP/HCC compilation command 3344 and may transmit both HIP/HCC compilation command 3344 and HIP source code 3330 to HCC 3360 (depicted with bubble annotated C4). HIP/HCC compilation command 3344 can configure HCC 3360 to compile HIP source code 3330 using an HCC header and a HIP/HCC runtime library. HIP/HCC runtime library can correspond to HIP runtime API 3332. HCC header may include any number and type of interoperability mechanisms for HIP and HCC. In response to HIP/HCC compilation command 3344, HCC 3360 can generate host executable code 3370(2) and HCC device executable code 3382 (depicted with bubble annotated C5). As depicted with bubble annotated C6, host executable code 3370(2) and HCC device executable code 3382 may be executed on, respectively, CPU 3390 and GPU 3392.

After CUDA source code 3310 is translated to HIP source code 3330, HIP compiler driver 3340 may subsequently be used to generate executable code for either CUDA-enabled GPU 3394 or GPU 3392 without re-executing CUDA to HIP translation tool 3320. CUDA to HIP translation tool 3320 can translate CUDA source code 3310 to HIP source code 3330 that is then stored in memory. HIP compiler driver 3340 can then configure HCC 3360 to generate host executable code 3370(2) and HCC device executable code 3382 based on HIP source code 3330. In at least one embodiment, HIP compiler driver 3340 subsequently configures CUDA compiler 3350 to generate host executable code 3370(1) and CUDA device executable code 3384 based on stored HIP source code 3330.

An example kernel may be translated by CUDA-to-HIP translation tool 3320 of FIG. 33, in accordance with at least one embodiment. CUDA source code 3310 partitions an overall problem that a given kernel is designed to solve into relatively coarse sub-problems that can independently be solved using thread blocks. Each thread block includes any number of threads. Each sub-problem can be partitioned into relatively fine pieces that can be solved cooperatively in parallel by threads within a thread block. Threads within a thread block can cooperate by sharing data through shared memory and by synchronizing execution to coordinate memory accesses.

CUDA source code 3310 can organize thread blocks associated with a given kernel into a one-dimensional, a two-dimensional, or a three-dimensional grid of thread blocks. Each thread block includes any number of threads, and a grid includes any number of thread blocks.

A kernel can be a function in device code that is defined using a "_global" declaration specifier. The dimension of a grid that executes a kernel for a given kernel call and associated streams may be specified using a CUDA kernel launch syntax. CUDA kernel launch syntax is specified as "KernelName<<<GridSize, BlockSize, SharedMemorySize, Stream>>>(KernelArguments);". An execution configuration syntax can include a "<<< . . . >>>" construct that is inserted between a kernel name ("KernelName") and a parenthesized list of kernel arguments ("KernelArguments"). CUDA kernel launch syntax can include a CUDA launch function syntax instead of an execution configuration syntax.

"GridSize" can be of a type dim3 and specify the dimension and size of a grid. Type dim3 may be a CUDA-defined structure that includes unsigned integers x, y, and z. If z is not specified, then z may default to one. If y is not specified, then y may default to one. The number of thread blocks in a grid can be equal to the product of GridSize.x, GridSize.y, and GridSize.z. "BlockSize" can be of type dim3 and specify the dimension and size of each thread block. The number of threads per thread block may be equal to the product of BlockSize.x, BlockSize.y, and BlockSize.z. Each thread that executes a kernel may be given a unique thread ID that is accessible within the kernel through a built-in variable (e.g., "threadIdx").

With respect to CUDA kernel launch syntax, "SharedMemorySize" may be an optional argument that may specify a number of bytes in a shared memory that is dynamically allocated per thread block for a given kernel call in addition to statically allocated memory. With respect to CUDA kernel launch syntax, SharedMemorySize may default to zero. With respect to CUDA kernel launch syntax, "Stream" may be an optional argument that specifies an associated stream and defaults to zero to specify a default stream. A stream may be a sequence of commands (possibly issued by different host threads) that execute in order. Different streams may execute commands out of order with respect to one another or concurrently.

CUDA source code 3310 may include a kernel definition for an example kernel "MatAdd" and a main function. Main function may be host code that executes on a host and includes a kernel call that causes kernel MatAdd to execute on a device. Kernel MatAdd can add two matrices A and B of size N×N, where N is a positive integer, and store the result in a matrix C. Main function can define a threadsPerBlock variable as 16 by 16 and a numBlocks variable as N/16 by N/16. Main function can then specify kernel call "MatAdd<<<numBlocks, threadsPerBlock>>>(A, B, C);". As per CUDA kernel launch syntax, kernel MatAdd can be executed using a grid of thread blocks having a dimension N/16 by N/16, where each thread block has a dimension of 16 by 16. Each thread block can include 256 threads, a grid can be created with enough blocks to have one thread per matrix element, and each thread in such a grid may execute kernel MatAdd to perform one pair-wise addition.

While translating CUDA source code 3310 to HIP source code 3330, CUDA to HIP translation tool 3320 may translate each kernel call in CUDA source code 3310 from CUDA kernel launch syntax to a HIP kernel launch syntax and may convert any number of other CUDA calls in source code 3310 to any number of other functionally similar HIP calls. HIP kernel launch syntax can be specified as "hipLaunchKernelGGL(KernelName, GridSize, BlockSize, SharedMemorySize, Stream, KernelArguments);". Each of KernelName, GridSize, BlockSize, ShareMemorySize, Stream, and KernelArguments can have the same meaning in HIP kernel launch syntax as in CUDA kernel launch syntax (described previously herein). Arguments SharedMemorySize and Stream can be required in HIP kernel launch syntax and can be optional in CUDA kernel launch syntax.

A portion of HIP source code 3330 can be identical to a portion of CUDA source code 3310 depicted except for a kernel call that causes kernel MatAdd to execute on a device. Kernel MatAdd may be defined in HIP source code 3330 with the same "_global_" declaration specifier with which kernel MatAdd is defined in CUDA source code 3310. A kernel call in HIP source code 3330 may be "hipLaunchKernelGGL (MatAdd, numBlocks, threadsPerBlock, 0, 0, A, B, C);", while a corresponding kernel call in CUDA source code 3310 is "MatAdd<<<numBlocks, threadsPerBlock>>>(A, B, C);".

Other implementations are contemplated and can be performed similarly to the CUDA and HIP implementations above, such as oneAPI, OpenCL, and other programming platforms. Code can be translated in any direction. For example, CUDA can be translated to HIP, and CUDA can be translated to OpenCL. SnuCL-Tr and CUCL can be used to translate OpenCL to CUDA or CUDA to OpenCL, respectively. Compiled code or intermediate representations (e.g., CUDA PTX code) can also be translated to run on other processor platforms (e.g., AMD or Intel). For example, PTX code can be translated to run on Intel or AMD processors using a translation tool, such as ZLUDA.

One or more techniques described herein can utilize a oneAPI programming model. A oneAPI programming model can refer to a programming model for interacting with various compute accelerator architectures. OneAPI may refer to an application programming interface (API) designed to interact with various compute accelerator architectures. A oneAPI programming model may utilize a DPC++ programming language. A DPC++ programming language may refer to a high-level language for data parallel programming productivity. A DPC++ programming language can be based at least in part on C and/or C++ programming languages. A oneAPI programming model can be a programming model such as, but not limited to, those developed by Intel Corporation of Santa Clara, CA.

OneAPI and/or oneAPI programming model can be utilized to interact with various accelerator, GPU, processor, and/or variations thereof, architectures. OneAPI may include a set of libraries that implement various functionalities. OneAPI may include at least a oneAPI DPC++ library, a oneAPI math kernel library, a oneAPI data analytics library, a oneAPI deep neural network library, a oneAPI collective communications library, a oneAPI threading building blocks library, a oneAPI video processing library, and/or variations thereof.

A oneAPI DPC++ library, also referred to as oneDPL, can be a library that implements algorithms and functions to accelerate DPC++ kernel programming. OneDPL may implement one or more standard template library (STL) functions. OneDPL can implement one or more parallel STL functions. OneDPL can provide a set of library classes and functions such as, but not limited to, parallel algorithms, iterators, function object classes, range-based API, and/or variations thereof. OneDPL can implement one or more classes and/or functions of a C++ standard library. OneDPL can implement one or more random number generator functions.

A oneAPI math kernel library, also referred to as oneMKL, can be a library that implements various optimized and parallelized routines for various mathematical functions and/or operations. OneMKL can implement one or more basic linear algebra subprograms (BLAS) and/or linear algebra package (LAPACK) dense linear algebra routines. OneMKL may implement one or more sparse BLAS linear algebra routines. OneMKL can implement one or more random number generators (RNGs). OneMKL may implement one or more vector mathematics (VM) routines for mathematical operations on vectors. OneMKL may implement one or more Fast Fourier Transform (FFT) functions.

A oneAPI data analytics library, also referred to as oneDAL, can include a library that implements various data analysis applications and distributed computations. OneDAL can implement various algorithms for preprocessing, transformation, analysis, modeling, validation, and decision making for data analytics, in batch, online, and distributed processing modes of computation. OneDAL can implement various C++ and/or Java APIs and various connectors to one or more data sources. OneDAL may implement DPC++ API extensions to a traditional C++ interface and enables GPU usage for various algorithms.

A oneAPI deep neural network library, also referred to as oneDNN, can include a library that implements various deep learning functions. OneDNN may implement various neural network, machine learning, and deep learning functions, algorithms, and/or variations thereof.

A oneAPI collective communications library, also referred to as oneCCL, can include a library that implements various applications for deep learning and machine learning workloads. OneCCL can be built upon lower-level communication middleware, such as, but not limited to, message passing interface (MPI) and libfabrics. OneCCL can enable a set of deep learning specific optimizations, such as, but not limited to, prioritization, persistent operations, out of order executions, and/or variations thereof. OneCCL can implement various CPU and GPU functions.

A oneAPI threading building blocks library, also referred to as oneTBB, can include a library that implements various parallelized processes for various applications. OneTBB can be utilized for task-based, shared parallel programming on a host. OneTBB may implement generic parallel algorithms. OneTBB may implement concurrent containers. OneTBB may implement a scalable memory allocator. OneTBB may implement a work-stealing task scheduler. OneTBB may implement low-level synchronization primitives. OneTBB may be compiler-independent and usable on various processors, such as, but not limited to, GPUs, PPUs, CPUs, and/or variations thereof.

A oneAPI video processing library, also referred to as oneVPL, can include a library that is utilized for accelerating video processing in one or more applications. OneVPL can implement various video decoding, encoding, and processing functions. OneVPL can implement various functions for media pipelines on CPUs, GPUs, and other accelerators. OneVPL can implement device discovery and selection in media centric and video analytics workloads. One VPL can implement API primitives for zero-copy buffer sharing.

A oneAPI programming model may utilize a DPC++ programming language. A DPC++ programming language can include a programming language that can include functionally similar versions of CUDA mechanisms to define device code and distinguish between device code and host code. A DPC++ programming language may include a subset of functionality of a CUDA programming language. One or more CUDA programming model operations may be performed using a oneAPI programming model using a DPC++ programming language.

Any application programming interface (API) described herein can be compiled into one or more instructions, operations, or any other signal by a compiler, interpreter, or other software tool. Compilation can include generating one or more machine-executable instructions, operations, or other signals from source code. An API compiled into one or more instructions, operations, or other signals, when performed, can cause one or more processors such as, but not limited to, processors described, e.g., in FIG. 18-30, or any other logic circuit further described herein to perform one or more computing operations.

In at least one embodiment, translation tools described elsewhere herein, such as, but not limited to, can include one or more circuits to translate CUDA code to cause information to be stored and to store an indication of one or more decompression algorithms to decompress said information, to cause one or more identifiers of one or more videos and one or more indications of one or more pixel interpolation algorithms to be stored, to indicate one or more decompression algorithms to be used to access one or more frames of one or more videos, to perform interpolation of two or more pixels of one or more video frames based, at least in part, on one or more frame identifiers of said one or more video frames, to indicate one or more properties of one or more pixels based, at least in part, on one or more identifiers of one or more video frames containing said one or more pixels, and to modify one or more properties of one or more pixels based, at least in part, on one or more identifiers of one or more video frames containing said one or more pixels or otherwise perform any of the operations described above or elsewhere herein to HIP, oneAPI, OpenCL, or any other language used to perform any of the operations described above or elsewhere herein. One or more circuits can be configured by software to translate CUDA code to cause information to be stored and to store an indication of one or more decompression algorithms to decompress said information, to cause one or more identifiers of one or more videos and one or more indications of one or more pixel interpolation algorithms to be stored, to indicate one or more decompression algorithms to be used to access one or more frames of one or more videos, to perform interpolation of two or more pixels of one or more video frames based, at least in part, on one or more frame identifiers of said one or more video frames, to indicate one or more properties of one or more pixels based, at least in part, on one or more identifiers of one or more video frames containing said one or more pixels, and to modify one or more properties of one or more pixels based, at least in part, on one or more identifiers of one or more video frames containing said one or more pixels or otherwise perform any of the operations described above or elsewhere hereinto HIP, oneAPI, OpenCL, or any other language used to perform any of the operations described above or elsewhere herein.

Autonomous Vehicle

Figure 34:
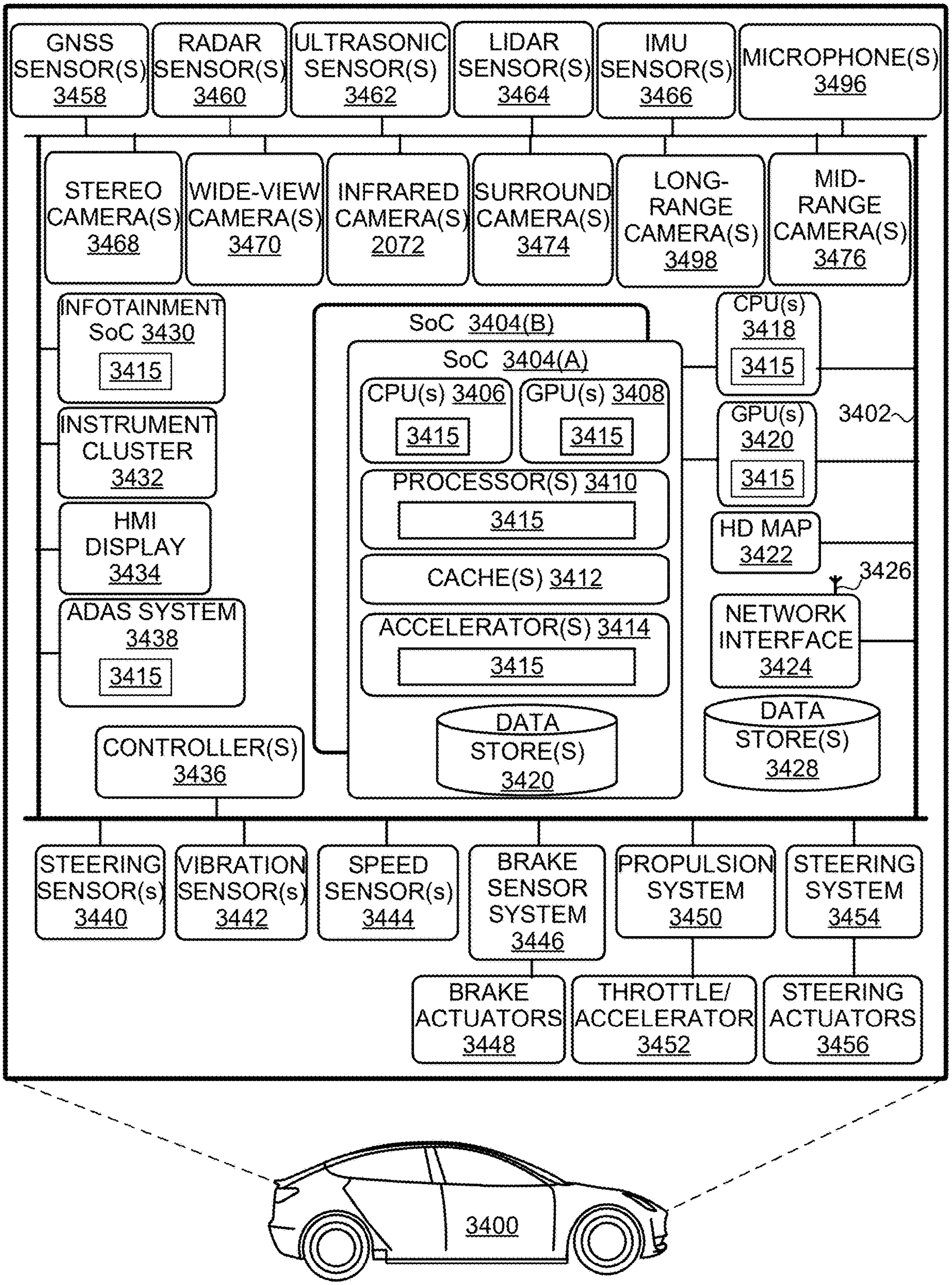
FIG. 34 illustrates an example of an autonomous vehicle and its system architecture, in accordance with at least one embodiment.

FIG. 34 illustrates an example of an autonomous vehicle 3400, in accordance with at least one embodiment. Autonomous vehicle 3400 (alternatively referred to herein as "vehicle 3400") may be a passenger vehicle, such as, but not limited to, a car, a truck, a bus, and/or another type of vehicle that accommodates one or more passengers. In at least one embodiment, vehicle 3400 may be a semi-tractor-trailer truck used for hauling cargo. Vehicle 3400 may be an airplane, robotic vehicle, or other kind of vehicle.

Autonomous vehicles may be described in terms of automation levels, defined by National Highway Traffic Safety Administration ("NHTSA"), a division of US Department of Transportation, and Society of Automotive Engineers ("SAE") "Taxonomy and Definitions for Terms Related to Driving Automation Systems for On-Road Motor Vehicles" (e.g., Standard No. J3016-201806, published on Jun. 15, 2018, Standard No. J3016-201609, published on Sep. 30, 2016, and previous and future versions of this standard). In at least one embodiment, vehicle 3400 may be capable of functionality in accordance with one or more of Level 1 through Level 5 of autonomous driving levels. For example, in at least one embodiment, vehicle 3400 may be capable of conditional automation (Level 3), high automation (Level 4), and/or full automation (Level 5), depending on embodiment.

Vehicle 3400 may include components such as, but not limited to, a chassis, a vehicle body, wheels (e.g., 2, 4, 6, 8, 18, etc.), tires, axles, and other components of a vehicle. Vehicle 3400 may include a propulsion system 3450, such as, but not limited to, an internal combustion engine, hybrid electric power plant, an all-electric engine, and/or another propulsion system type. Propulsion system 3450 may be connected to a drive train of vehicle 3400, which may include a transmission, to enable propulsion of vehicle 3400. Propulsion system 3450 may be controlled in response to receiving signals from a throttle/accelerator(s) 3452.

A steering system 3454, which may include a steering wheel, is used to steer vehicle 3400 (e.g., along a desired path or route) when propulsion system 3450 is operating (e.g., when vehicle 3400 is in motion). Steering system 3454 may receive signals from steering actuator(s) 3456. A steering wheel may be optional for full automation (Level 5) functionality. A brake sensor system 3446 may be used to operate vehicle brakes in response to receiving signals from brake actuator(s) 3448 and/or brake sensors.

Controller(s) 3436, which may include one or more system on chips ("SoCs") and/or graphics processing unit(s) ("GPU(s)"), can provide signals (e.g., representative of commands) to one or more components and/or systems of vehicle 3400. For instance, controller(s) 3436 may send signals to operate vehicle brakes via brake actuator(s) 3448, to operate steering system 3454 via steering actuator(s) 3456, to operate propulsion system 3450 via throttle/accelerator(s) 3452. Controller(s) 3436 may include one or more onboard (e.g., integrated) computing devices that process sensor signals, and output operation commands (e.g., signals representing commands) to enable autonomous driving and/or to assist a human driver in driving vehicle 3400. Controller(s) 3436 may include a first controller for autonomous driving functions, a second controller for functional safety functions, a third controller for artificial intelligence functionality (e.g., computer vision), a fourth controller for infotainment functionality, a fifth controller for redundancy in emergency conditions, and/or other controllers. A single controller may handle two or more of above functionalities, two or more controllers may handle a single functionality, and/or any combination thereof.

Controller(s) 3436 may provide signals for controlling one or more components and/or systems of vehicle 3400 in response to sensor data received from one or more sensors (e.g., sensor inputs). Sensor data may be received from, for example, global navigation satellite systems ("GNSS") sensor(s) 3458 (e.g., Global Positioning System sensor(s)), RADAR sensor(s) 3460, ultrasonic sensor(s) 3462, LIDAR sensor(s) 3464, inertial measurement unit ("IMU") sensor(s) 3466 (e.g., accelerometer(s), gyroscope(s), a magnetic compass or magnetic compasses, magnetometer(s), etc.), microphone(s) 3496, stereo camera(s) 3468, wide-view camera(s) 3470 (e.g., fisheye cameras), infrared camera(s) 3472, surround camera(s) 3474 (e.g., 360 degree cameras), long-range cameras 3498, mid-range camera(s) 3476, speed sensor(s) 3444 (e.g., for measuring speed of vehicle 3400), vibration sensor(s) 3442, steering sensor(s) 3440, brake sensor(s) (e.g., as part of brake sensor system 3446), and/or other sensor types.

One or more of controller(s) 3436 may receive inputs (e.g., represented by input data) from an instrument cluster 3432 of vehicle 3400 and provide outputs (e.g., represented by output data, display data, etc.) via a human-machine interface ("HMI") display 3434, an audible annunciator, a loudspeaker, and/or via other components of vehicle 3400. Outputs may include information such as, but not limited to, vehicle velocity, speed, time, map data (e.g., a High Definition map (not shown), location data (e.g., vehicle's 3400 location, such as, but not limited to, on a map), direction, location of other vehicles (e.g., an occupancy grid), information about objects and status of objects as perceived by controller(s) 3436, etc. For example, HMI display 3434 may display information about presence of one or more objects (e.g., a street sign, caution sign, traffic light changing, etc.), and/or information about driving maneuvers vehicle has made, is making, or will make (e.g., changing lanes now, taking exit 34B in two miles, etc.).

Each of components, features, and systems of vehicle 3400 in FIG. 34 may be connected via a bus 3402. Bus 3402 may include a CAN data interface (alternatively referred to herein as a "CAN bus"). A CAN may be a network inside vehicle 3400 used to aid in control of various features and functionality of vehicle 3400, such as, but not limited to, actuation of brakes, acceleration, braking, steering, windshield wipers, etc. Bus 3402 may be configured to have dozens or even hundreds of nodes, each with its own unique identifier (e.g., a CAN ID). Bus 3402 may be read to find steering wheel angle, ground speed, engine revolutions per minute ("RPMs"), button positions, and/or other vehicle status indicators. Bus 3402 may be a CAN bus that is ASIL B compliant.

In addition to, or alternatively from CAN, FlexRay and/or Ethernet protocols may be used. There may be any number of busses forming bus 3402, which may include zero or more CAN busses, zero or more FlexRay busses, zero or more Ethernet busses, and/or zero or more other types of busses using different protocols. Two or more busses may be used to perform different functions, and/or may be used for redundancy. For example, a first bus may be used for collision avoidance functionality and a second bus may be used for actuation control. Each bus of bus 3402 may communicate with any of components of vehicle 3400, and two or more busses of bus 3402 may communicate with corresponding components. Each of any number of system(s) on chip(s) ("SoC(s)") 3404 (such as, but not limited to, SoC 3404(A) and SoC 3404(B)), each of controller(s) 3436, and/or each computer within vehicle may have access to same input data (e.g., inputs from sensors of vehicle 3400), and may be connected to a common bus, such CAN bus.

Any number of cameras can be positioned at any choice of camera locations and fields of view for autonomous vehicle 3400 of FIG. 34A, in accordance with at least one embodiment. Cameras and respective fields of view may be one example embodiment and are not intended to be limiting. For instance, additional and/or alternative cameras may be included and/or cameras may be located at different locations on vehicle 3400.

Camera types for cameras may include digital cameras that may be adapted for use with components and/or systems of vehicle 3400. Camera(s) may operate at automotive safety integrity level ("ASIL") B and/or at another ASIL. Camera types may be capable of any image capture rate, such as, but not limited to, 60 frames per second (fps), 1220 fps, 240 fps, etc., depending on embodiment. Cameras may be capable of using rolling shutters, global shutters, another type of shutter, or a combination thereof. In at least one embodiment, color filter array may include a red clear clear clear ("RCCC") color filter array, a red clear clear blue ("RCCB") color filter array, a red blue green clear ("RBGC") color filter array, a Foveon X3 color filter array, a Bayer sensors ("RGGB") color filter array, a monochrome sensor color filter array, and/or another type of color filter array. Clear pixel cameras, such as, but not limited to, cameras with an RCCC, an RCCB, and/or an RBGC color filter array, may be used in an effort to increase light sensitivity.

One or more of camera(s) may be used to perform advanced driver assistance systems ("ADAS") functions (e.g., as part of a redundant or fail-safe design). For example, a Multi-Function Mono Camera may be installed to provide functions including lane departure warning, traffic sign assist and intelligent headlamp control. One or more of camera(s) (e.g., all cameras) may record and provide image data (e.g., video) simultaneously.

One or more cameras may be mounted in a mounting assembly, such as, but not limited to, a custom designed (three-dimensional ("3D") printed) assembly, in order to cut out stray light and reflections from within vehicle 3400 (e.g., reflections from dashboard reflected in windshield mirrors) which may interfere with camera image data capture abilities. With reference to wing-mirror mounting assemblies, wing-mirror assemblies may be custom 3D printed so that a camera mounting plate matches a shape of a wing-mirror. Camera(s) may be integrated into wing-mirrors. For side-view cameras, camera(s) may also be integrated within four pillars at each corner of a cabin.

Cameras with a field of view that include portions of an environment in front of vehicle 3400 (e.g., front-facing cameras) may be used for surround view, to help identify forward facing paths and obstacles, as well as aid in, with help of one or more of controller(s) 3436 and/or control SoCs, providing information critical to generating an occupancy grid and/or determining preferred vehicle paths. Front-facing cameras may be used to perform many similar ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as, but not limited to, traffic sign recognition.

A variety of cameras may be used in a front-facing configuration, including, for example, a monocular camera platform that includes a CMOS ("complementary metal oxide semiconductor") color imager. A wide-view camera 3470 may be used to perceive objects coming into view from a periphery (e.g., pedestrians, crossing traffic or bicycles). There may be any number (including zero) wide-view cameras 3470 on vehicle 3400. Any number of long-range camera(s) 3498 (e.g., a long-view stereo camera pair) may be used for depth-based object detection, especially for objects for which a neural network has not yet been trained. Long-range camera(s) 3498 may also be used for object detection and classification, as well as basic object tracking.

Any number of stereo camera(s) 3468 may also be included in a front-facing configuration. One or more of stereo camera(s) 3468 may include an integrated control unit comprising a scalable processing unit, which may provide a programmable logic ("FPGA") and a multi-core microprocessor with an integrated Controller Area Network ("CAN") or Ethernet interface on a single chip. Such a unit may be used to generate a 3D map of an environment of vehicle 3400, including a distance estimate for all points in an image. One or more of stereo camera(s) 3468 may include compact stereo vision sensor(s) that may include two camera lenses (one each on left and right) and an image processing chip that may measure distance from vehicle 3400 to target object and use generated information (e.g., metadata) to activate autonomous emergency braking and lane departure warning functions. Other types of stereo camera(s) 3468 may be used in addition to, or alternatively from, those described herein.

Cameras with a field of view that include portions of environment to sides of vehicle 3400 (e.g., side-view cameras) may be used for surround view, providing information used to create and update an occupancy grid, as well as to generate side impact collision warnings. For example, surround camera(s) 3474 (e.g., four surround cameras) could be positioned on vehicle 3400. Surround camera(s) 3474 may include any number and combination of wide-view cameras, fisheye camera(s), 360 degree camera(s), and/or similar cameras. For instance, four fisheye cameras may be positioned on a front, a rear, and sides of vehicle 3400. Vehicle 3400 may use three surround camera(s) 3474 (e.g., left, right, and rear), and may leverage one or more other camera(s) (e.g., a forward-facing camera) as a fourth surround-view camera.

Cameras with a field of view that include portions of an environment behind vehicle 3400 (e.g., rear-view cameras) may be used for parking assistance, surround view, rear collision warnings, and creating and updating an occupancy grid. A wide variety of cameras may be used including, but not limited to, cameras that may be also suitable as a front-facing camera(s) (e.g., long-range cameras 3498 and/or mid-range camera(s) 3476, stereo camera(s) 3468, infrared camera(s) 3472, etc.) as described herein.

Vehicle 3400 may include any number of SoCs 3404 or other processors described elsewhere herein, such as, but not limited to, processors and/or components illustrated and described for FIGS. 18-30. Each of SoCs 3404 may include central processing units ("CPU(s)") 3406, graphics processing units ("GPU(s)") 3408, processor(s) 3410, cache(s) 3412, accelerator(s) 3414, data store(s) 3416, and/or other components and features not illustrated. SoC(s) 3404 may be used to control vehicle 3400 in a variety of platforms and systems. For example, SoC(s) 3404 may be combined in a system (e.g., system of vehicle 3400) with a High Definition ("HD") map 3422 which may obtain map refreshes and/or updates via network interface 3424 from one or more servers (not shown). SoCs 3404 may include logic 3415 that can include any combination of software logic, hardware logic, and/or firmware logic to provide functionality or operations described herein, wherein logic may be, collectively or individually, embodied as circuitry that forms part of a larger system, for example, an integrated circuit (IC), system-on-chip (SoC), or one or processors (e.g., CPU, GPU).

CPU(s) 3406 may include a CPU cluster or CPU complex (alternatively referred to herein as a "CCPLEX"). CPU(s) 3406 may include multiple cores and/or level two ("L2") caches. For instance, CPU(s) 3406 may include eight cores in a coherent multi-processor configuration. CPU(s) 3406 may include four dual-core clusters where each cluster has a dedicated L2 cache (e.g., a 2 megabyte (MB) L2 cache). CPU(s) 3406 (e.g., CCPLEX) may be configured to support simultaneous cluster operations enabling any combination of clusters of CPU(s) 3406 to be active at any given time.

One or more of CPU(s) 3406 may implement power management capabilities that include one or more of following features: individual hardware blocks may be clock-gated automatically when idle to save dynamic power; each core clock may be gated when such core is not actively executing instructions due to execution of Wait for Interrupt ("WFI")/Wait for Event ("WFE") instructions; each core may be independently power-gated; each core cluster may be independently clock-gated when all cores may be clock-gated or power-gated; and/or each core cluster may be independently power-gated when all cores may be power-gated. CPU(s) 3406 may further implement an enhanced algorithm for managing power states, where allowed power states and expected wakeup times may be specified, and hardware/microcode determines which best power state to enter for core, cluster, and CCPLEX. Processing cores may support simplified power state entry sequences in software with work offloaded to microcode.

GPU(s) 3408 may include an integrated GPU (alternatively referred to herein as an "iGPU"). GPU(s) 3408 may be programmable and may be efficient for parallel workloads. GPU(s) 3408 may use an enhanced tensor instruction set. GPU(s) 3408 may include one or more streaming microprocessors, where each streaming microprocessor may include a level one ("L1") cache (e.g., an L1 cache with at least 96 KB storage capacity), and two or more streaming microprocessors may share an L2 cache (e.g., an L2 cache with a 512 KB storage capacity). GPU(s) 3408 may include at least eight streaming microprocessors. GPU(s) 3408 may use compute application programming interface(s) (API(s)). GPU(s) 3408 may use one or more parallel computing platforms and/or programming models (e.g., NVIDIA's CUDA model). Streaming microprocessors may be referred to as streaming multiprocessors ("SMs"), stream processors ("SPs"), stream processing units ("SPUs"), compute units ("CUs"), execution units ("EUs"), and/or slices, where a slice in this context can refer to a portion of processing resources in a processing unit (e.g., 16 cores, a ray tracing unit, a thread director or scheduler).

One or more of GPU(s) 3408 may be power-optimized for best performance in automotive and embedded use cases. For example, GPU(s) 3408 could be fabricated on Fin field-effect transistor ("FinFET") circuitry. Each streaming microprocessor may incorporate a number of mixed-precision processing cores partitioned into multiple blocks. For example, 64 PF32 cores and 32 FP64 cores could be partitioned into four processing blocks. Each processing block could be allocated 16 FP32 cores, 8 FP64 cores, 16 INT32 cores, two mixed-precision NVIDIA Tensor cores for deep learning matrix arithmetic, a level zero ("L0") instruction cache, a scheduler (e.g., warp scheduler) or sequencer, a dispatch unit, and/or a 64 KB register file. Streaming microprocessors may include independent parallel integer and floating-point data paths to provide for efficient execution of workloads with a mix of computation and addressing calculations. Streaming microprocessors may include independent thread scheduling capability to enable finer-grain synchronization and cooperation between parallel threads. Streaming microprocessors may include a combined L1 data cache and shared memory unit in order to improve performance while simplifying programming.

One or more of GPU(s) 3408 may include a high bandwidth memory ("HBM") and/or a 16 GB HBM2 memory subsystem to provide, in some examples, about 900 GB/second peak memory bandwidth. In addition to, or alternatively from, HBM memory, a synchronous graphics random-access memory ("SGRAM") may be used, such as, but not limited to, a graphics double data rate type five synchronous random-access memory ("GDDR5").

GPU(s) 3408 may include unified memory technology. Address translation services ("ATS") support may be used to allow GPU(s) 3408 to access CPU(s) 3406 page tables directly. When a GPU of GPU(s) 3408 memory management unit ("MMU") experiences a miss, an address translation request may be transmitted to CPU(s) 3406. In response, 2 CPU of CPU(s) 3406 may look in its page tables for a virtual-to-physical mapping for an address and transmit translation back to GPU(s) 3408. Unified memory technology may allow a single unified virtual address space for memory of both CPU(s) 3406 and GPU(s) 3408, thereby simplifying GPU(s) 3408 programming and porting of applications to GPU(s) 3408.

GPU(s) 3408 may include any number of access counters that may keep track of frequency of access of GPU(s) 3408 to memory of other processors. Access counter(s) may help ensure that memory pages may be moved to physical memory of a processor that is accessing pages most frequently, thereby improving efficiency for memory ranges shared between processors.

One or more of SoC(s) 3404 may include any number of cache(s) 3412, including those described herein. For example, cache(s) 3412 could include a level three ("L3") cache that is available to both CPU(s) 3406 and GPU(s) 3408 (e.g., that is connected to CPU(s) 3406 and GPU(s) 3408). Cache(s) 3412 may include a write-back cache that may keep track of states of lines, such as, but not limited to, by using a cache coherence protocol (e.g., MEI, MESI, MSI, etc.). A L3 cache may include 4 MB of memory or more, depending on embodiment, although smaller cache sizes may be used.

One or more of SoC(s) 3404 may include one or more accelerator(s) 3414 (e.g., hardware accelerators, software accelerators, or a combination thereof). SoC(s) 3404 may include a hardware acceleration cluster that may include optimized hardware accelerators and/or large on-chip memory. Large on-chip memory (e.g., 4 MB of SRAM), may enable a hardware acceleration cluster to accelerate neural networks and other calculations. A hardware acceleration cluster may be used to complement GPU(s) 3408 and to off-load some of tasks of GPU(s) 3408 (e.g., to free up more cycles of GPU(s) 3408 for performing other tasks). Accelerator(s) 3414 could be used for targeted workloads (e.g., perception, convolutional neural networks ("CNNs"), recurrent neural networks ("RNNs"), etc.) that may be stable enough to be amenable to acceleration. A CNN may include a region-based or regional convolutional neural networks ("RCNNs") and Fast RCNNs (e.g., as used for object detection) or other type of CNN.

Accelerator(s) 3414 (e.g., hardware acceleration cluster) may include one or more deep learning accelerator ("DLA"). DLA(s) may include one or more Tensor processing units ("TPUs") that may be configured to provide an additional ten trillion operations per second for deep learning applications and inferencing, such as TPU(s) described herein, e.g., in FIG. 28. TPUs may be accelerators configured to, and optimized for, performing image processing functions (e.g., for CNNs, RCNNs, etc.). DLA(s) may further be optimized for a specific set of neural network types and floating point operations, as well as inferencing. Design of DLA(s) may provide more performance per millimeter than a typical general-purpose GPU, and typically vastly exceeds performance of a CPU. TPU(s) may perform several functions, including a single-instance convolution function, supporting, for example, INT8, INT16, and FP16 data types for both features and weights, as well as post-processor functions. DLA(s) may quickly and efficiently execute neural networks, especially CNNs, on processed or unprocessed data for any of a variety of functions, including, for example: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

DLA(s) may perform any function of GPU(s) 3408, and by using an inference accelerator, for example, a designer may target either DLA(s) or GPU(s) 3408 for any function. For example, a designer may focus processing of CNNs and floating point operations on DLA(s) and leave other functions to GPU(s) 3408 and/or accelerator(s) 3414.

Accelerator(s) 3414 may include programmable vision accelerator ("PVA"), which may alternatively be referred to herein as a computer vision accelerator. PVA may be designed and configured to accelerate computer vision algorithms for advanced driver assistance system ("ADAS") 3438, autonomous driving, augmented reality ("AR") applications, and/or virtual reality ("VR") applications. PVA may provide a balance between performance and flexibility. For example, each PVA may include, for example, any number of reduced instruction set computer ("RISC") cores, direct memory access ("DMA"), and/or any number of vector processors.

RISC cores may interact with image sensors (e.g., image sensors of any cameras described herein), image signal processor(s), etc. Each RISC core may include any amount of memory. RISC cores may use any of a number of protocols, depending on embodiment. RISC cores may execute a real-time operating system ("RTOS"). RISC cores may be implemented using one or more integrated circuit devices, application specific integrated circuits ("ASICs"), and/or memory devices. For example, RISC cores could include an instruction cache and/or a tightly coupled RAM.

DMA may enable components of PVA to access system memory independently of CPU(s) 3406. DMA may support any number of features used to provide optimization to a PVA including supporting multi-dimensional addressing and/or circular addressing. DMA may support up to six or more dimensions of addressing, which may include block width, block height, block depth, horizontal block stepping, vertical block stepping, and/or depth stepping.

Vector processors may be programmable processors that may be designed to efficiently and flexibly execute programming for computer vision algorithms and provide signal processing capabilities. A PVA may include a PVA core and two vector processing subsystem partitions. A PVA core may include a processor subsystem, DMA engine(s) (e.g., two DMA engines), and/or other peripherals. A vector processing subsystem may operate as a primary processing engine of a PVA, and may include a vector processing unit ("VPU"), an instruction cache, and/or vector memory (e.g., "VMEM"). VPU core may include a digital signal processor such as, but not limited to, a single instruction, multiple data ("SIMD"), very long instruction word ("VLIW") digital signal processor. A combination of SIMD and VLIW may enhance throughput and speed.

Each of vector processors may include an instruction cache and may be coupled to dedicated memory. As a result, each of vector processors may be configured to execute independently of other vector processors. Vector processors that may be included in a particular PVA may be configured to employ data parallelism. For instance, plurality of vector processors included in a single PVA may execute a common computer vision algorithm, but on different regions of an image. Vector processors included in a particular PVA may simultaneously execute different computer vision algorithms, on one image, or even execute different algorithms on sequential images or portions of an image. Among other things, any number of PVAs may be included in hardware acceleration cluster and any number of vector processors may be included in each PVA. PVA may include additional error correcting code ("ECC") memory, to enhance overall system safety.

Accelerator(s) 3414 may include a computer vision network on-chip and static random-access memory ("SRAM"), for providing a high-bandwidth, low latency SRAM for accelerator(s) 3414. On-chip memory may include at least 4 MB SRAM, including, for example, eight field-configurable memory blocks, that may be accessible by both a PVA and a DLA. Each pair of memory blocks may include an advanced peripheral bus ("APB") interface, configuration circuitry, a controller, and a multiplexer. Any type of memory may be used. A PVA and a DLA may access memory via a backbone that provides a PVA and a DLA with high-speed access to memory. A backbone may include a computer vision network on-chip that interconnects a PVA and a DLA to memory (e.g., using APB).

A computer vision network on-chip may include an interface that determines, before transmission of any control signal/address/data, that both a PVA and a DLA provide ready and valid signals. An interface may provide for separate phases and separate channels for transmitting control signals/addresses/data, as well as burst-type communications for continuous data transfer. An interface may comply with International Organization for Standardization ("ISO") 26262 or International Electrotechnical Commission ("IEC") 61508 standards, although other standards and protocols may be used.

One or more of SoC(s) 3404 may include a real-time ray-tracing hardware accelerator. Real-time ray-tracing hardware accelerator may be used to quickly and efficiently determine positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses.

Accelerator(s) 3414 can have a wide array of uses for autonomous driving. A PVA may be used for key processing stages in ADAS and autonomous vehicles. A PVA's capabilities may be a good match for algorithmic domains needing predictable processing, at low power and low latency. In other words, a PVA can perform well on semi-dense or dense regular computation, even on small data sets, which might require predictable run-times with low latency and low power. In vehicle 3400, PVAs might be designed to run classic computer vision algorithms, as they can be efficient at object detection and operating on integer math. For example, a PVA is used to perform computer stereo vision. A semi-global matching-based algorithm may be used in some examples, although this is not intended to be limiting. Applications for Level 3-5 autonomous driving use motion estimation/stereo matching on-the-fly (e.g., structure from motion, pedestrian recognition, lane detection, etc.). A PVA may perform computer stereo vision functions on inputs from two monocular cameras. A PVA may be used to perform dense optical flow. For example, a PVA could process raw RADAR data (e.g., using a 4D Fast Fourier Transform) to provide processed RADAR data. A PVA is used for time of flight depth processing, by processing raw time of flight data to provide processed time of flight data, for example.

A DLA may be used to run any type of network to enhance control and driving safety, including, for example, a neural network that outputs a measure of confidence for each object detection. Confidence may be represented or interpreted as a probability, or as providing a relative "weight" of each detection compared to other detections. A confidence measure enables a system to make further decisions regarding which detections should be considered as true positive detections rather than false positive detections. A system may set a threshold value for confidence and consider only detections exceeding threshold value as true positive detections. When an automatic emergency braking ("AEB") system is used, false positive detections can cause vehicle to automatically perform emergency braking, which is obviously undesirable. Highly confident detections may be considered as triggers for AEB. a DLA may run a neural network for regressing confidence value. A neural network may take as its input at least some subset of parameters, such as, but not limited to, bounding box dimensions, ground plane estimate obtained (e.g., from another subsystem), output from IMU sensor(s) 3466 that correlates with vehicle 3400 orientation, distance, 3D location estimates of object obtained from neural network and/or other sensors (e.g., LIDAR sensor(s) 3464 or RADAR sensor(s) 3460), among others.

One or more of SoC(s) 3404 may include data store(s) 3416 (e.g., memory). Data store(s) 3416 may be on-chip memory of SoC(s) 3404, which may store neural networks to be executed on GPU(s) 3408 and/or a DLA. Data store(s) 3416 may be large enough in capacity to store multiple instances of neural networks for redundancy and safety. Data store(s) 3416 may comprise L2 or L3 cache(s).

One or more of SoC(s) 3404 may include any number of processor(s) 3410 (e.g., embedded processors). Processor(s) 3410 may include a boot and power management processor that may be a dedicated processor and subsystem to handle boot power and management functions and related security enforcement. A boot and power management processor may be a part of a boot sequence of SoC(s) 3404 and may provide runtime power management services. A boot power and management processor may provide clock and voltage programming, assistance in system low power state transitions, management of SoC(s) 3404 thermals and temperature sensors, and/or management of SoC(s) 3404 power states. Each temperature sensor may be implemented as a ring-oscillator whose output frequency is proportional to temperature, and SoC(s) 3404 may use ring-oscillators to detect temperatures of CPU(s) 3406, GPU(s) 3408, and/or accelerator(s) 3414. If temperatures may be determined to exceed a threshold, then a boot and power management processor may enter a temperature fault routine and put SoC(s) 3404 into a lower power state and/or put vehicle 3400 into a chauffeur to safe stop mode (e.g., bring vehicle 3400 to a safe stop).

Processor(s) 3410 may further include a set of embedded processors that may serve as an audio processing engine which may be an audio subsystem that enables full hardware support for multi-channel audio over multiple interfaces, and a broad and flexible range of audio I/O interfaces. An audio processing engine is a dedicated processor core with a digital signal processor with dedicated RAM.

Processor(s) 3410 may further include an always-on processor engine that may provide necessary hardware features to support low power sensor management and wake use cases. An always-on processor engine may include a processor core, a tightly coupled RAM, supporting peripherals (e.g., timers and interrupt controllers), various I/O controller peripherals, and routing logic.

Processor(s) 3410 may further include a safety cluster engine that may include a dedicated processor subsystem to handle safety management for automotive applications. A safety cluster engine may include two or more processor cores, a tightly coupled RAM, support peripherals (e.g., timers, an interrupt controller, etc.), and/or routing logic. In a safety mode, two or more cores may operate, in a lockstep mode and function as a single core with comparison logic to detect any differences between their operations. Processor(s) 3410 may further include a real-time camera engine that may include a dedicated processor subsystem for handling real-time camera management. Processor(s) 3410 may further include a high-dynamic range signal processor that may include an image signal processor that is a hardware engine that is part of a camera processing pipeline.

Processor(s) 3410 may include a video image compositor that may be a processing block (e.g., implemented on a microprocessor) that implements video post-processing functions needed by a video playback application to produce a final image for a player window. A video image compositor may perform lens distortion correction on wide-view camera(s) 3470, surround camera(s) 3474, and/or on in-cabin monitoring camera sensor(s). In-cabin monitoring camera sensor(s) may be preferably monitored by a neural network running on another instance of SoC 3404, configured to identify in cabin events and respond accordingly. An in-cabin system may perform lip reading to activate cellular service and place a phone call, dictate emails, change a vehicle's destination, activate or change a vehicle's infotainment system and settings, or provide voice-activated web surfing. Certain functions may be available to a driver when a vehicle is operating in an autonomous mode and may be disabled otherwise.

A video image compositor may include enhanced temporal noise reduction for both spatial and temporal noise reduction. For example, where motion occurs in a video, noise reduction weights spatial information appropriately, decreasing weights of information provided by adjacent frames. Where an image or portion of an image does not include motion, temporal noise reduction performed by video image compositor may use information from a previous image to reduce noise in a current image.

A video image compositor may also be configured to perform stereo rectification on input stereo lens frames. A video image compositor may further be used for user interface composition when an operating system desktop is in use, and GPU(s) 3408 may not be required to continuously render new surfaces. When GPU(s) 3408 are powered on and active doing 3D rendering, a video image compositor may be used to offload GPU(s) 3408 to improve performance and responsiveness.

One or more SoC of SoC(s) 3404 may further include a mobile industry processor interface ("MIPI") camera serial interface for receiving video and input from cameras, a high-speed interface, and/or a video input block that may be used for a camera and related pixel input functions. One or more of SoC(s) 3404 may further include an input/output controller(s) that may be controlled by software and may be used for receiving I/O signals that may be uncommitted to a specific role.

One or more SoC of SoC(s) 3404 may further include a broad range of peripheral interfaces to enable communication with peripherals, audio encoders/decoders ("codecs"), power management, and/or other devices. SoC(s) 3404 may be used to process data from cameras (e.g., connected over Gigabit Multimedia Serial Link and Ethernet channels), sensors (e.g., LIDAR sensor(s) 3464, RADAR sensor(s) 3460, etc. that may be connected over Ethernet channels), data from bus 3402 (e.g., speed of vehicle 3400, steering wheel position, etc.), data from GNSS sensor(s) 3458 (e.g., connected over a Ethernet bus or a CAN bus), etc. One or more SoC of SoC(s) 3404 may further include dedicated high-performance mass storage controllers that may include their own DMA engines, and that may be used to free CPU(s) 3406 from routine data management tasks.

SoC(s) 3404 may be an end-to-end platform with a flexible architecture that spans automation Levels 3-5, thereby providing a comprehensive functional safety architecture that leverages and makes efficient use of computer vision and ADAS techniques for diversity and redundancy, and provides a platform for a flexible, reliable driving software stack, along with deep learning tools. SoC(s) 3404 may be faster, more reliable, and even more energy-efficient and space-efficient than conventional systems. For example, accelerator(s) 3414, when combined with CPU(s) 3406, GPU(s) 3408, and data store(s) 3416, may provide for a fast, efficient platform for Level 3-5 autonomous vehicles.

Computer vision algorithms may be executed on CPUs, which may be configured using a high-level programming language, such as, but not limited to, C, to execute a wide variety of processing algorithms across a wide variety of visual data. However, CPUs may be oftentimes unable to meet performance requirements of many computer vision applications, such as, but not limited to, those related to execution time and power consumption, for example. Many CPUs may be unable to execute complex object detection algorithms in real-time, which is used in in-vehicle ADAS applications and in practical Level 3-5 autonomous vehicles.

Embodiments described herein allow for multiple neural networks to be performed simultaneously and/or sequentially, and for results to be combined together to enable Level 3-5 autonomous driving functionality. For example, a CNN executing on a DLA or a discrete GPU (e.g., GPU(s) 3420) may include text and word recognition, allowing reading and understanding of traffic signs, including signs for which a neural network has not been specifically trained. A DLA may further include a neural network that is able to identify, interpret, and provide semantic understanding of a sign, and to pass that semantic understanding to path planning modules running on a CPU Complex.

Multiple neural networks may be run simultaneously, as for Level 3, 4, or 5 driving. For example, a warning sign stating "Caution: flashing lights indicate icy conditions," along with an electric light, may be independently or collectively interpreted by several neural networks. Such warning sign itself may be identified as a traffic sign by a first deployed neural network (e.g., a neural network that has been trained), text "flashing lights indicate icy conditions" may be interpreted by a second deployed neural network, which informs a vehicle's path planning software (preferably executing on a CPU Complex) that when flashing lights may be detected, icy conditions exist. A flashing light may be identified by operating a third deployed neural network over multiple frames, informing a vehicle's path-planning software of a presence (or an absence) of flashing lights. All three neural networks may run simultaneously, such as, but not limited to, within a DLA and/or on GPU(s) 3408.

A CNN for facial recognition and vehicle owner identification may use data from camera sensors to identify presence of an authorized driver and/or owner of vehicle 3400. An always-on sensor processing engine may be used to unlock a vehicle when an owner approaches a driver door and turns on lights, and, in a security mode, to disable such vehicle when an owner leaves such vehicle. In this way, SoC(s) 3404 can provide for security against theft and/or carjacking.

A CNN for emergency vehicle detection and identification may use data from microphones 3496 to detect and identify emergency vehicle sirens. SoC(s) 3404 use a CNN for classifying environmental and urban sounds, as well as classifying visual data. A CNN running on a DLA is trained to identify a relative closing speed of an emergency vehicle (e.g., by using a Doppler effect). A CNN may also be trained to identify emergency vehicles specific to a local area in which a vehicle is operating, as identified by GNSS sensor(s) 3458. When operating in Europe, a CNN may seek to detect European sirens, and when in North America, a CNN may seek to identify only North American sirens. Once an emergency vehicle is detected, a control program may be used to execute an emergency vehicle safety routine, slowing a vehicle, pulling over to a side of a road, parking a vehicle, and/or idling a vehicle, with assistance of ultrasonic sensor(s) 3462, until emergency vehicles pass.

Vehicle 3400 may include CPU(s) 3418 (e.g., discrete CPU(s), or dCPU(s)), that may be coupled to SoC(s) 3404 via a high-speed interconnect (e.g., PCIe). CPU(s) 3418 may include an X86 processor, for example. CPU(s) 3418 may be used to perform any of a variety of functions, including arbitrating potentially inconsistent results between ADAS sensors and SoC(s) 3404, and/or monitoring status and health of controller(s) 3436 and/or an infotainment system on a chip ("infotainment SoC") 3430, for example. SoC(s)

3404 may include one or more interconnects, and an interconnect can include a peripheral component interconnect express (PCIe).

Vehicle 3400 may include GPU(s) 3420 (e.g., discrete GPU(s), or dGPU(s)), that may be coupled to SoC(s) 3404 via a high-speed interconnect (e.g., NVIDIA's NVLINK channel). GPU(s) 3420 may provide additional artificial intelligence functionality, such as, but not limited to, by executing redundant and/or different neural networks, and may be used to train and/or update neural networks based at least in part on input (e.g., sensor data) from sensors of a vehicle 3400.

Vehicle 3400 may further include network interface 3424 which may include wireless antenna(s) (e.g., one or more wireless antennas 3426 for different communication protocols, such as, but not limited to, a cellular antenna, a Bluetooth antenna, etc.). Network interface 3424 may be used to enable wireless connectivity to Internet cloud services (e.g., with server(s) and/or other network devices), with other vehicles, and/or with computing devices (e.g., client devices of passengers). To communicate with other vehicles, a direct link may be established between vehicle 3400 and another vehicle and/or an indirect link may be established (e.g., across networks and over the Internet). Direct links may be provided using a vehicle-to-vehicle communication link. A vehicle-to-vehicle communication link may provide vehicle 3400 information about vehicles in proximity to vehicle 3400 (e.g., vehicles in front of, on a side of, and/or behind vehicle 3400). Such aforementioned functionality may be part of a cooperative adaptive cruise control functionality of vehicle 3400.

Network interface 3424 may include an SoC that provides modulation and demodulation functionality and enables controller(s) 3436 to communicate over wireless networks. Network interface 3424 may include a radio frequency front-end for up-conversion from baseband to radio frequency, and down conversion from radio frequency to baseband. Frequency conversions may be performed in any technically feasible fashion. For example, frequency conversions could be performed through well-known processes, and/or using super-heterodyne processes. Radio frequency front end functionality may be provided by a separate chip. Network interfaces may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

Vehicle 3400 may further include data store(s) 3428 which may include off-chip (e.g., off SoC(s) 3404) storage. Data store(s) 3428 may include one or more storage elements including RAM, SRAM, dynamic random-access memory ("DRAM"), video random-access memory ("VRAM"), flash memory, hard disks, and/or other components and/or devices that may store at least one bit of data.

Vehicle 3400 may further include GNSS sensor(s) 3458 (e.g., GPS and/or assisted GPS sensors), to assist in mapping, perception, occupancy grid generation, and/or path planning functions. Any number of GNSS sensor(s) 3458 may be used, including, for example, a GPS using a USB connector with an Ethernet-to-Serial (e.g., RS-232) bridge.

Vehicle 3400 may further include RADAR sensor(s) 3460. RADAR sensor(s) 3460 may be used by vehicle 3400 for long-range vehicle detection, even in darkness and/or severe weather conditions. RADAR functional safety levels may be ASIL B. RADAR sensor(s) 3460 may use a CAN bus and/or bus 3402 (e.g., to transmit data generated by RADAR sensor(s) 3460) for control and to access object tracking data, with access to Ethernet channels to access raw data in some examples. A wide variety of RADAR sensor types may be used. For example, RADAR sensor(s) 3460 may be suitable for front, rear, and side RADAR use. One or more sensor of RADAR sensors(s) 3460 is a Pulse Doppler RADAR sensor.

RADAR sensor(s) 3460 may include different configurations, such as, but not limited to, long-range with narrow field of view, short-range with wide field of view, short-range side coverage, etc. Long-range RADAR may be used for adaptive cruise control functionality. Long-range RADAR systems may provide a broad field of view realized by two or more independent scans, such as, but not limited to, within a 250 m (meter) range. RADAR sensor(s) 3460 may help in distinguishing between static and moving objects, and may be used by ADAS system 3438 for emergency brake assist and forward collision warning. Sensors 3460(*s*) included in a long-range RADAR system may include monostatic multimodal RADAR with multiple (e.g., six or more) fixed RADAR antennae and a high-speed CAN and FlexRay interface. With six antennae, a central four antennae may create a focused beam pattern, designed to record vehicle's 3400 surroundings at higher speeds with minimal interference from traffic in adjacent lanes. Another two antennae may expand field of view, making it possible to quickly detect vehicles entering or leaving a lane of vehicle 3400.

Mid-range RADAR systems may include, as an example, a range of up to 160 m (front) or 80 m (rear), and a field of view of up to 42 degrees (front) or 150 degrees (rear). Short-range RADAR systems may include any number of RADAR sensor(s) 3460 designed to be installed at both ends of a rear bumper. When installed at both ends of a rear bumper, a RADAR sensor system may create two beams that constantly monitor blind spots in a rear direction and next to a vehicle. Short-range RADAR systems may be used in ADAS system 3438 for blind spot detection and/or lane change assist.

Vehicle 3400 may further include ultrasonic sensor(s) 3462. Ultrasonic sensor(s) 3462, which may be positioned at a front, a back, and/or side location of vehicle 3400, may be used for parking assist and/or to create and update an occupancy grid. A wide variety of ultrasonic sensor(s) 3462 may be used, and different ultrasonic sensor(s) 3462 may be used for different ranges of detection (e.g., 2.5 m, 4 m). Ultrasonic sensor(s) 3462 may operate at functional safety levels of ASIL B.

Vehicle 3400 may include LIDAR sensor(s) 3464. LIDAR sensor(s) 3464 may be used for object and pedestrian detection, emergency braking, collision avoidance, and/or other functions. LIDAR sensor(s) 3464 may operate at functional safety level ASIL B. Vehicle 3400 may include multiple LIDAR sensors 3464 (e.g., two, four, six, etc.) that may use an Ethernet channel (e.g., to provide data to a Gigabit Ethernet switch).

LIDAR sensor(s) 3464 may be capable of providing a list of objects and their distances for a 360-degree field of view. Commercially available LIDAR sensor(s) 3464 may have an advertised range of approximately 100 m, with an accuracy of 2 cm to 3 cm, and with support for a 100 Mbps Ethernet connection, for example. One or more non-protruding LIDAR sensors may be used. LIDAR sensor(s) 3464 may include a small device that may be embedded into a front, a rear, a side, and/or a corner location of vehicle 3400. LIDAR sensor(s) 3464, in such an embodiment, may provide up to a 120-degree horizontal and 35-degree vertical field-of-view, with a 200 m range even for low-reflectivity objects.

Front-mounted LIDAR sensor(s) 3464 may be configured for a horizontal field of view between 45 degrees and 135 degrees.

LIDAR technologies, such as, but not limited to, 3D flash LIDAR, may also be used. 3D flash LIDAR uses a flash of a laser as a transmission source, to illuminate surroundings of vehicle 3400 up to approximately 200 m. A flash LIDAR unit may include a receptor, which records laser pulse transit time and reflected light on each pixel, which in turn corresponds to a range from vehicle 3400 to objects. Flash LIDAR may allow for highly accurate and distortion-free images of surroundings to be generated with every laser flash. Four flash LIDAR sensors may be deployed, one at each side of vehicle 3400. 3D flash LIDAR systems include a solid-state 3D staring array LIDAR camera with no moving parts other than a fan (e.g., a non-scanning LIDAR device). Flash LIDAR device may use a 5 nanosecond class I (eye-safe) laser pulse per frame and may capture reflected laser light as a 3D range point cloud and co-registered intensity data.

Vehicle 3400 may further include IMU sensor(s) 3466. IMU sensor(s) 3466 may be located at a center of a rear axle of vehicle 3400. IMU sensor(s) 3466 may include, for example, accelerometer(s), magnetometer(s), gyroscope(s), a magnetic compass, magnetic compasses, and/or other sensor types. In six-axis applications, but not limited to, IMU sensor(s) 3466 may include accelerometers and gyroscopes. In nine-axis applications, but not limited to, IMU sensor(s) 3466 may include accelerometers, gyroscopes, and magnetometers.

IMU sensor(s) 3466 may be implemented as a miniature, high performance GPS-Aided Inertial Navigation System ("GPS/INS") that combines micro-electro-mechanical systems ("MEMS") inertial sensors, a high-sensitivity GPS receiver, and advanced Kalman filtering algorithms to provide estimates of position, velocity, and attitude. IMU sensor(s) 3466 may enable vehicle 3400 to estimate its heading without requiring input from a magnetic sensor by directly observing and correlating changes in velocity from a GPS to IMU sensor(s) 3466. IMU sensor(s) 3466 and GNSS sensor(s) 3458 may be combined in a single integrated unit.

Vehicle 3400 may include microphone(s) 3496 placed in and/or around vehicle 3400. Microphone(s) 3496 may be used for emergency vehicle detection and identification, among other things.

Vehicle 3400 may further include any number of camera types, including stereo camera(s) 3468, wide-view camera(s) 3470, infrared camera(s) 3472, surround camera(s) 3474, long-range camera(s) 3498, mid-range camera(s) 3476, and/or other camera types. Cameras may be used to capture image data around an entire periphery of vehicle 3400. Types of cameras used may depend on vehicle 3400. Any combination of camera types may be used to provide necessary coverage around vehicle 3400. A number of cameras deployed may differ depending on embodiment. For example, vehicle 3400 could include six cameras, seven cameras, ten cameras, twelve cameras, or another number of cameras. Cameras may support, as an example, Gigabit Multimedia Serial Link ("GMSL") and/or Gigabit Ethernet communications. Each camera might be as described with more detail previously herein.

Vehicle 3400 may further include vibration sensor(s) 3442. Vibration sensor(s) 3442 may measure vibrations of components of vehicle 3400, such as, but not limited to, axle(s). For example, changes in vibrations may indicate a change in road surfaces. When two or more vibration sensors 3442 may be used, differences between vibrations may be used to determine friction or slippage of road surface (e.g., when a difference in vibration is between a power-driven axle and a freely rotating axle).

Vehicle 3400 may include ADAS system 3438. ADAS system 3438 may include an SoC, in some examples. ADAS system 3438 may include any number and combination of an autonomous/adaptive/automatic cruise control ("ACC") system, a cooperative adaptive cruise control ("CACC") system, a forward crash warning ("FCW") system, an automatic emergency braking ("AEB") system, a lane departure warning ("LDW") system, a lane keep assist ("LKA") system, a blind spot warning ("BSW") system, a rear cross-traffic warning ("RCTW") system, a collision warning ("CW") system, a lane centering ("LC") system, and/or other systems, features, and/or functionality.

ACC system may use RADAR sensor(s) 3460, LIDAR sensor(s) 3464, and/or any number of camera(s). ACC system may include a longitudinal ACC system and/or a lateral ACC system. A longitudinal ACC system monitors and controls distance to another vehicle immediately ahead of vehicle 3400 and automatically adjusts speed of vehicle 3400 to maintain a safe distance from vehicles ahead. A lateral ACC system performs distance keeping, and advises vehicle 3400 to change lanes when necessary. A lateral ACC is related to other ADAS applications, such as, but not limited to, LC and CW.

A CACC system uses information from other vehicles that may be received via network interface 3424 and/or wireless antenna(s) 3426 from other vehicles via a wireless link, or indirectly, over a network connection (e.g., over the Internet). Direct links may be provided by a vehicle-to-vehicle ("V2V") communication link, while indirect links may be provided by an infrastructure-to-vehicle ("I2V") communication link. In general, V2V communication provides information about immediately preceding vehicles (e.g., vehicles immediately ahead of and in same lane as vehicle 3400), while I2V communication provides information about traffic further ahead. A CACC system may include either or both I2V and V2V information sources. Given information of vehicles ahead of vehicle 3400, a CACC system may be more reliable and it has potential to improve traffic flow smoothness and reduce congestion on road.

An FCW system is designed to alert a driver to a hazard, so that such driver may take corrective action. An FCW system uses a front-facing camera and/or RADAR sensor(s) 3460, coupled to a dedicated processor, DSP, FPGA, and/or ASIC, that is electrically coupled to provide driver feedback, such as, but not limited to, a display, speaker, and/or vibrating component. An FCW system may provide a warning, such as, but not limited to, in form of a sound, visual warning, vibration and/or a quick brake pulse.

An AEB system detects an impending forward collision with another vehicle or other object, and may automatically apply brakes if a driver does not take corrective action within a specified time or distance parameter. AEB system may use front-facing camera(s) and/or RADAR sensor(s) 3460, coupled to a dedicated processor, DSP, FPGA, and/or ASIC. When an AEB system detects a hazard, it will typically first alert a driver to take corrective action to avoid collision and, if that driver does not take corrective action, that AEB system may automatically apply brakes in an effort to prevent, or at least mitigate, an impact of a predicted collision. An AEB system may include techniques such as, but not limited to, dynamic brake support and/or crash imminent braking.

An LDW system provides visual, audible, and/or tactile warnings, such as, but not limited to, steering wheel or seat vibrations, to alert driver when vehicle 3400 crosses lane markings. An LDW system does not activate when a driver indicates an intentional lane departure, such as, but not limited to, by activating a turn signal. An LDW system may use front-side facing cameras, coupled to a dedicated processor, DSP, FPGA, and/or ASIC, that is electrically coupled to provide driver feedback, such as, but not limited to, a display, speaker, and/or vibrating component. An LKA system is a variation of an LDW system. An LKA system provides steering input or braking to correct vehicle 3400 if vehicle 3400 starts to exit its lane.

A BSW system detects and warns a driver of vehicles in an automobile's blind spot. A BSW system may provide a visual, audible, and/or tactile alert to indicate that merging or changing lanes is unsafe. A BSW system may provide an additional warning when a driver uses a turn signal. A BSW system may use rear-side facing camera(s) and/or RADAR sensor(s) 3460, coupled to a dedicated processor, DSP, FPGA, and/or ASIC, that is electrically coupled to driver feedback, such as, but not limited to, a display, speaker, and/or vibrating component.

An RCTW system may provide visual, audible, and/or tactile notification when an object is detected outside a rear-camera range when vehicle 3400 is backing up. An RCTW system includes an AEB system to ensure that vehicle brakes may be applied to avoid a crash. An RCTW system may use one or more rear-facing RADAR sensor(s) 3460, coupled to a dedicated processor, DSP, FPGA, and/or ASIC, that is electrically coupled to provide driver feedback, such as, but not limited to, a display, speaker, and/or vibrating component.

Conventional ADAS systems may be prone to false positive results which may be annoying and distracting to a driver, but typically may not be catastrophic, because conventional ADAS systems alert a driver and allow that driver to decide whether a safety condition truly exists and act accordingly. Vehicle 3400 itself decides, in case of conflicting results, whether to heed result from a primary computer or a secondary computer (e.g., a first controller or a second controller of controllers 3436). For example, ADAS system 3438 may be a backup and/or secondary computer for providing perception information to a backup computer rationality module. A backup computer rationality monitor may run redundant diverse software on hardware components to detect faults in perception and dynamic driving tasks. Outputs from ADAS system 3438 may be provided to a supervisory MCU. If outputs from a primary computer and outputs from a secondary computer conflict, a supervisory MCU can determine how to reconcile conflict to ensure safe operation.

A primary computer may be configured to provide a supervisory MCU with a confidence score, indicating that primary computer's confidence in a chosen result. If that confidence score exceeds a threshold, that supervisory MCU may follow that primary computer's direction, regardless of whether that secondary computer provides a conflicting or inconsistent result. Where a confidence score does not meet a threshold, and where primary and secondary computers indicate different results (e.g., a conflict), a supervisory MCU may arbitrate between computers to determine an appropriate outcome.

A supervisory MCU may be configured to run a neural network(s) that is trained and configured to determine, based at least in part on outputs from a primary computer and outputs from a secondary computer, conditions under which that secondary computer provides false alarms. Neural network(s) in a supervisory MCU may learn when a secondary computer's output may be trusted, and when it cannot. For example, when that secondary computer is a RADAR-based FCW system, a neural network(s) in that supervisory MCU may learn when an FCW system is identifying metallic objects that may not be, in fact, hazards, such as, but not limited to, a drainage grate or manhole cover that triggers an alarm. When a secondary computer is a camera-based LDW system, a neural network in a supervisory MCU may learn to override LDW when bicyclists or pedestrians may be present and a lane departure is, in fact, a safest maneuver. A supervisory MCU may include at least one of a DLA or a GPU suitable for running neural network(s) with associated memory. A supervisory MCU may comprise and/or be included as a component of SoC(s) 3404.

ADAS system 3438 may include a secondary computer that performs ADAS functionality using traditional rules of computer vision, and that secondary computer may use classic computer vision rules (if-then), and presence of a neural network(s) in a supervisory MCU may improve reliability, safety and performance. For example, diverse implementation and intentional non-identity makes an overall system more fault-tolerant, especially to faults caused by software (or software-hardware interface) functionality. For example, if there is a software bug or error in software running on a primary computer, and non-identical software code running on a secondary computer provides a consistent overall result, then a supervisory MCU may have greater confidence that an overall result is correct, and a bug in software or hardware on that primary computer is not causing a material error.

An output of ADAS system 3438 may be fed into a primary computer's perception block and/or a primary computer's dynamic driving task block. For example, if ADAS system 3438 indicates a forward crash warning due to an object immediately ahead, a perception block may use this information when identifying objects. A secondary computer may have its own neural network that is trained and thus reduces a risk of false positives, as described herein.

Vehicle 3400 may further include infotainment SoC 3430 (e.g., an in-vehicle infotainment system (IVI)). Although illustrated and described as an SoC, infotainment system SoC 3430, may not be an SoC, and may include two or more discrete components. Infotainment SoC 3430 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, WiFi, etc.), and/or information services (e.g., navigation systems, rear-parking assistance, a radio data system, vehicle related information such as, but not limited to, fuel level, total distance covered, brake fuel level, oil level, door open/close, air filter information, etc.) to vehicle 3400. For example, infotainment SoC 3430 could include radios, disk players, navigation systems, video players, USB and Bluetooth connectivity, carputers, in-car entertainment, WiFi, steering wheel audio controls, hands free voice control, a heads-up display ("HUD"), HMI display 3434, a telematics device, a control panel (e.g., for controlling and/or interacting with various components, features, and/or systems), and/or other components. Infotainment SoC 3430 may further be used to provide information (e.g., visual and/or audible) to user(s) of vehicle 3400, such as, but not limited to, information from ADAS system 3438, autonomous driving information such as, but not limited to, planned vehicle maneuvers, trajectories, surrounding environment information (e.g., intersection information, vehicle information, road information, etc.), and/or other information.

Infotainment SoC 3430 may include any amount and type of GPU functionality. Infotainment SoC 3430 may communicate over bus 3402 with other devices, systems, and/or components of vehicle 3400. Infotainment SoC 3430 may be coupled to a supervisory MCU such that a GPU of an infotainment system may perform some self-driving functions in event that primary controller(s) 3436 (e.g., primary and/or backup computers of vehicle 3400) fail. Infotainment SoC 3430 may put vehicle 3400 into a chauffeur to safe stop mode, as described herein.

Vehicle 3400 may further include instrument cluster 3432 (e.g., a digital dash, an electronic instrument cluster, a digital instrument panel, etc.). Instrument cluster 3432 may include a controller and/or supercomputer (e.g., a discrete controller or supercomputer). Instrument cluster 3432 may include any number and combination of a set of instrumentation such as, but not limited to, a speedometer, fuel level, oil pressure, tachometer, odometer, turn indicators, gearshift position indicator, seat belt warning light(s), parking-brake warning light(s), engine-malfunction light(s), supplemental restraint system (e.g., airbag) information, lighting controls, safety system controls, navigation information, etc. Information may be displayed and/or shared among infotainment SoC 3430 and instrument cluster 3432. Instrument cluster 3432 may be included as part of infotainment SoC 3430, or vice versa.

System may include server(s), network(s), and any number and type of vehicles, including vehicle 3400. Server(s) may include a plurality of GPUs, PCIe switches, and/or CPUs. GPUs, CPUs, and PCIe switches may be interconnected with high-speed interconnects such as, but not limited to, for example, NVLink interfaces developed by NVIDIA and/or PCIe connections. GPUs can be connected via any interconnects, such as NVLink and/or NVSwitch SoC, and GPUs and PCIe switches can be, for example, connected via PCIe interconnects. Each of server(s) may include any number of GPUs, CPUs, and/or PCIe switches, in any combination. For example, server(s) could each include eight, sixteen, thirty-two, and/or more GPUs.

Server(s) may receive, over network(s) and from vehicles, image data representative of images showing unexpected or changed road conditions, such as, but not limited to, recently commenced road-work. Server(s) may transmit, over network(s) and to vehicles, neural networks, updated or otherwise, and/or map information, including information regarding traffic and road conditions. Updates to map information may include updates for HD map, such as, but not limited to, information regarding construction sites, potholes, detours, flooding, and/or other obstructions. Neural networks, and/or map information may have resulted from new training and/or experiences represented in data received from any number of vehicles in an environment, and/or based at least in part on training performed at a data center (e.g., using server(s) and/or other servers).

Server(s) may be used to train machine learning models (e.g., neural networks) based at least in part on training data. Training data may be generated by vehicles, and/or may be generated in a simulation (e.g., using a game engine). Any amount of training data can be tagged (e.g., where associated neural network benefits from supervised learning) and/or undergoes other pre-processing. Any amount of training data may not be tagged and/or pre-processed (e.g., where associated neural network does not require supervised learning). Once machine learning models are trained, machine learning models may be used by vehicles (e.g., transmitted to vehicles over network(s)), and/or machine learning models may be used by server(s) to remotely monitor vehicles.

Server(s) may receive data from vehicles and apply data to up-to-date real-time neural networks for real-time intelligent inferencing. Server(s) may include deep-learning supercomputers and/or dedicated AI computers powered by GPU(s), such as, but not limited to, a DGX and DGX Station machines developed by NVIDIA. Alternatively, server(s) may include deep learning infrastructure that uses CPU-powered data centers.

Deep-learning infrastructure of server(s) may be capable of fast, real-time inferencing, and may use that capability to evaluate and verify health of processors, software, and/or associated hardware in vehicle 3400. For example, deep-learning infrastructure may receive periodic updates from vehicle 3400, such as, but not limited to, a sequence of images and/or objects that vehicle 3400 has located in that sequence of images (e.g., via computer vision and/or other machine learning object classification techniques). Deep-learning infrastructure may run its own neural network to identify objects and compare them with objects identified by vehicle 3400 and, if results do not match and deep-learning infrastructure concludes that AI in vehicle 3400 is malfunctioning, then server(s) may transmit a signal to vehicle instructing a fail-safe computer of vehicle 3400 to assume control, notify passengers, and complete a safe parking maneuver.

Server(s) may include GPU(s) and one or more programmable inference accelerators (e.g., NVIDIA's TensorRT 3 devices). A combination of GPU-powered servers and inference acceleration may make real-time responsiveness possible. Where performance is less critical, servers powered by CPUs, FPGAs, and other processors may be used for inferencing.

In at least one embodiment, autonomous vehicle 3400 described elsewhere herein, can include one or more circuits to cause information to be stored and to store an indication of one or more decompression algorithms to decompress said information, to cause one or more identifiers of one or more videos and one or more indications of one or more pixel interpolation algorithms to be stored, to indicate one or more decompression algorithms to be used to access one or more frames of one or more videos, to perform interpolation of two or more pixels of one or more video frames based, at least in part, on one or more frame identifiers of said one or more video frames, to indicate one or more properties of one or more pixels based, at least in part, on one or more identifiers of one or more video frames containing said one or more pixels, and to modify one or more properties of one or more pixels based, at least in part, on one or more identifiers of one or more video frames containing said one or more pixels or otherwise perform any of the operations described above or elsewhere herein or otherwise perform any of the operations described above or elsewhere herein. One or more circuits in autonomous vehicle 3400 can be configured by software, e.g., programming platforms described herein, to cause information to be stored and to store an indication of one or more decompression algorithms to decompress said information, to cause one or more identifiers of one or more videos and one or more indications of one or more pixel interpolation algorithms to be stored, to indicate one or more decompression algorithms to be used to access one or more frames of one or more videos, to perform interpolation of two or more pixels of one or more video frames based, at least in part, on one or more frame identifiers of said one or more video frames, to indicate one or more properties of one or more pixels based, at least in part, on one or more identifiers of one or more video frames containing said one or more pixels, and to modify one or more properties of one or more pixels based, at least in part, on one or more identifiers of one or more video frames containing said one or more pixels or otherwise perform any of the operations described above or elsewhere herein or otherwise perform any of the operations described above or elsewhere herein.

Cloud and Web-Based Services

The following description sets forth, without limitation, cloud-based and/or web-based services and/or systems that can be used to cause information to be stored and to store an indication of one or more decompression algorithms to decompress said information, to cause one or more identifiers of one or more videos and one or more indications of one or more pixel interpolation algorithms to be stored, to indicate one or more decompression algorithms to be used to access one or more frames of one or more videos, to perform interpolation of two or more pixels of one or more video frames based, at least in part, on one or more frame identifiers of said one or more video frames, to indicate one or more properties of one or more pixels based, at least in part, on one or more identifiers of one or more video frames containing said one or more pixels, and to modify one or more properties of one or more pixels based, at least in part, on one or more identifiers of one or more video frames containing said one or more pixels or otherwise perform any of the operations described above or elsewhere herein or otherwise perform some or all of processes, operations and/or and techniques described elsewhere herein. cloud-based and/or web-based services and/or systems can be configured by software to cause information to be stored and to store an indication of one or more decompression algorithms to decompress said information, to cause one or more identifiers of one or more videos and one or more indications of one or more pixel interpolation algorithms to be stored, to indicate one or more decompression algorithms to be used to access one or more frames of one or more videos, to perform interpolation of two or more pixels of one or more video frames based, at least in part, on one or more frame identifiers of said one or more video frames, to indicate one or more properties of one or more pixels based, at least in part, on one or more identifiers of one or more video frames containing said one or more pixels, and to modify one or more properties of one or more pixels based, at least in part, on one or more identifiers of one or more video frames containing said one or more pixels or otherwise perform any of the operations described above or elsewhere herein or otherwise perform any of the operations described above or elsewhere herein.

Cloud computing can include a style of computing in which dynamically scalable and often virtualized resources are provided as a service over the Internet. Users need not have knowledge of, expertise in, or control over technology infrastructure, which can be referred to as "in the cloud," that supports them. Cloud computing may incorporate infrastructure as a service, platform as a service, software as a service, and other variations that have a common theme of reliance on the Internet for satisfying computing needs of users. A typical cloud deployment, such as in a private cloud (e.g., enterprise network), or a data center (DC) in a public cloud (e.g., Internet) can include thousands of servers (or alternatively, VMs), hundreds of Ethernet, Fiber Channel or Fiber Channel over Ethernet (FCoE) ports, switching and storage infrastructure, etc. A cloud can also include network services infrastructure like IPsec VPN hubs, firewalls, load balancers, wide area network (WAN) optimizers etc. Remote subscribers can access cloud applications and services securely by connecting via a VPN tunnel, such as an IPsec VPN tunnel.

Cloud computing may include a model for enabling convenient, on-demand network access to a shared pool of configurable computing resources (e.g., networks, servers, storage, applications, and services) that can be rapidly provisioned and released with minimal management effort or service provider interaction.

Cloud computing may be characterized by on-demand self-service, in which a consumer can unilaterally provision computing capabilities, such as server time and network storage, as needed automatically without requiring human inter-action with each service's provider. Cloud computing may be characterized by broad network access, in which capabilities are available over a network and accessed through standard mechanisms that promote use by heterogeneous thin or thick client platforms (e.g., mobile phones, laptops, and PDAs). Cloud computing may be characterized by resource pooling, in which a provider's computing resources are pooled to serve multiple consumers using a multi-tenant model, with different physical and virtual resources dynamically as-signed and reassigned according to consumer demand. In at least one embodiment, there is a sense of location independence in that a customer generally has no control or knowledge over an exact location of provided resources, but may be able to specify location at a higher level of abstraction (e.g., country, state, or datacenter). Examples of resources include storage, processing, memory, network bandwidth, and virtual machines. Cloud computing may be characterized by rapid elasticity, in which capabilities can be rapidly and elastically provisioned, in some cases automatically, to quickly scale out and rapidly released to quickly scale in. In at least one embodiment, to a consumer, capabilities available for provisioning often appear to be unlimited and can be purchased in any quantity at any time. Cloud computing may be characterized by measured service, in which cloud systems automatically control and optimize resource use by leveraging a metering capability at some level of abstraction appropriate to a type of service (e.g., storage, processing, bandwidth, and active user accounts). Resource usage can be monitored, controlled, and reported providing transparency for both a provider and consumer of a utilized service.

Cloud computing may be associated with various services. Cloud Software as a Service (SaaS) may refer to as service in which a capability provided to a consumer is to use a provider's applications running on a cloud infrastructure. Applications can be accessible from various client devices through a thin client interface such as a web browser (e.g., web-based email). In at least one embodiment, consumer does not manage or control underlying cloud infrastructure including network, servers, operating systems, storage, or even individual application capabilities, with a possible exception of limited user-specific application configuration settings.

Cloud Platform as a Service (PaaS) may refer to a service in which a capability provided to consumer is to deploy onto cloud infrastructure consumer-created or acquired applications created using programming languages and tools supported by a provider. In at least one embodiment, a consumer does not manage or control underlying cloud infrastructure including networks, servers, operating systems, or storage, but has control over deployed applications and possibly application hosting environment configurations.

Cloud Infrastructure as a Service (IaaS) may refer to a service in which a capability provided to a consumer is to provision processing, storage, networks, and other fundamental computing resources where a consumer is able to deploy and run arbitrary software, which can include operating systems and applications. In at least one embodiment, consumer does not manage or control underlying cloud infrastructure, but has control over operating systems, storage, deployed applications, and possibly limited control of select networking components (e.g., host firewalls).

Cloud computing may be deployed in various ways. A private cloud may refer to a cloud infrastructure that is operated solely for an organization. A private cloud may be managed by an organization or a third party and may exist on-premises or off-premises. A community cloud may refer to a cloud infrastructure that is shared by several organizations and supports a specific community that has shared concerns (e.g., mission, security requirements, policy, and compliance considerations). A community cloud may be managed by organizations or a third party and may exist on-premises or off-premises. A public cloud may refer to a cloud infrastructure that is made available to a general public or a large industry group and is owned by an organization providing cloud services. A hybrid cloud may refer to a cloud infrastructure that is a composition of two or more clouds (private, community, or public) that remain unique entities, but are bound together by standardized or proprietary technology that enables data and application portability (e.g., cloud bursting for load-balancing between clouds). A cloud computing environment is service oriented with a focus on statelessness, low coupling, modularity, and semantic interoperability.

Logic and Neural Network Training and Deployment

The following FIGURES set forth, without limitation, examples of logic and artificial intelligence-based systems that can be used to implement functionality and/or operations described herein.

FIGS. 35A and 35B illustrate logic 3515 which, as described elsewhere herein, can be used in one or more devices or systems (e.g., such as any of the processors (e.g., any processor in FIG. 18-30), data centers, cloud or web-based services described herein) to perform operations such as, but not limited to, those discussed herein, in accordance with at least one embodiment. Logic can refer to any combination of software logic, hardware logic, and/or firmware logic to provide functionality and/or operations described herein, wherein logic may be, collectively or individually, embodied as circuitry that forms part of a larger system, for example, an integrated circuit (IC), an application-specific integrated circuit (ASIC), a field programmable array (FPGA), system-on-chip (SoC), or one or processors (e.g., CPU, GPU). Logic 3515 illustrated in FIGS. 35A and 35B may be used in conjunction with an application-specific integrated circuit ("ASIC"), such as, but not limited to, a TensorFlow® Processing Unit from Google, an inference processing unit (IPU) from Graphcore™, or a Nervana® (e.g., "Lake Crest") processor from Intel Corp. Logic 3515 illustrated in FIGS. 35A and 35B may be used in conjunction with central processing unit ("CPU") hardware, graphics processing unit ("GPU") hardware or other hardware, such as, but not limited to, field programmable gate arrays ("FPGAs").

Logic 3515 can be used to perform inferencing and/or training operations associated with one or more embodiments. Logic 3515 may be inference and/or training logic. In at least one embodiment, FIG. 35A illustrates inference and/or training logic 3515 used to perform inferencing and/or training operations associated with one or more embodiments. Inference and/or training logic 3515 may include code and/or data storage 3501 to store forward and/or output weight and/or input/output data, and/or other parameters to configure neurons or layers of a neural network trained and/or used for inferencing in aspects of one or more embodiments. Training logic 3515 may include, or be coupled to code and/or data storage 3501 to store graph code or other software to control timing and/or order, in which weight and/or other parameter information is to be loaded to configure, logic, including integer and/or floating point units (collectively, arithmetic logic units (ALUs). Code, such as, but not limited to, graph code, can load weight or other parameter information into processor ALUs based on an architecture of a neural network to which such code corresponds. Code and/or data storage 3501 can store weight parameters and/or input/output data of each layer of a neural network trained or used in conjunction with one or more embodiments during forward propagation of input/output data and/or weight parameters during training and/or inferencing using aspects of one or more embodiments. Any portion of code and/or data storage 3501 may be included with other on-chip or off-chip data storage, including a processor's L1, L2, or L3 cache or system memory.

Any portion of code and/or data storage 3501 may be internal or external to one or more processors or other hardware logic devices or circuits. Code and/or code and/or data storage 3501 may be cache memory, dynamic randomly addressable memory ("DRAM"), static randomly addressable memory ("SRAM"), non-volatile memory (e.g., flash memory), or other storage. A choice of whether code and/or code and/or data storage 3501 is internal or external to a processor, for example, or comprising DRAM, SRAM, flash or some other storage type may depend on available storage on-chip versus off-chip, latency requirements of training and/or inferencing functions being performed, batch size of data used in inferencing and/or training of a neural network, or some combination of these factors.

Inference and/or training logic 3515 may include a code and/or data storage 3505 to store backward and/or output weight and/or input/output data corresponding to neurons or layers of a neural network trained and/or used for inferencing in aspects of one or more embodiments. Code and/or data storage 3505 can store weight parameters and/or input/output data of each layer of a neural network trained or used in conjunction with one or more embodiments during backward propagation of input/output data and/or weight parameters during training and/or inferencing using aspects of one or more embodiments. Training logic 3515 may include, or be coupled to code and/or data storage 3505 to store graph code or other software to control timing and/or order, in which weight and/or other parameter information is to be loaded to configure, logic, including integer and/or floating point units (collectively, arithmetic logic units (ALUs).

Code, such as, but not limited to, graph code, may cause loading of weight or other parameter information into processor ALUs based on an architecture of a neural network to which such code corresponds. Any portion of code and/or data storage 3505 may be included with other on-chip or off-chip data storage, including a processor's L1, L2, or L3 cache or system memory. Any portion of code and/or data storage 3505 may be internal or external to one or more processors or other hardware logic devices or circuits. Code and/or data storage 3505 may be cache memory, DRAM, SRAM, non-volatile memory (e.g., flash memory), or other storage. A choice of whether code and/or data storage 3505 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

Code and/or data storage 3501 and code and/or data storage 3505 may be separate storage structures. Code and/or data storage 3501 and code and/or data storage 3505 may be a combined storage structure. Code and/or data storage 3501 and code and/or data storage 3505 may be partially combined and partially separate. Any portion of code and/or data storage 3501 and code and/or data storage 3505 may be included with other on-chip or off-chip data storage, including a processor's L1, L2, or L3 cache or system memory.

Inference and/or training logic 3515 may include one or more arithmetic logic unit(s) ("ALU(s)") 3510, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 3520 that may be functions of input/output and/or weight parameter data stored in code and/or data storage 3501 and/or code and/or data storage 3505. Activations stored in activation storage 3520 may be generated according to linear algebraic and or matrix-based mathematics performed by ALU(s) 3510 in response to performing instructions or other code, wherein weight values stored in code and/or data storage 3505 and/or data storage 3501 may be used as operands along with other values, such as, but not limited to, bias values, gradient information, momentum values, or other parameters or hyperparameters, any or all of which may be stored in code and/or data storage 3505 or code and/or data storage 3501 or another storage on or off-chip.

ALU(s) 3510 can be included within one or more processors or other hardware logic devices or circuits, whereas in another embodiment, ALU(s) 3510 may be external to a processor or other hardware logic device or circuit that uses them (e.g., a co-processor). ALUs 3510 may be included within a processor's execution units or otherwise within a bank of ALUs accessible by a processor's execution units either within same processor or distributed between different processors of different types (e.g., central processing units, graphics processing units, fixed function units, etc.). Code and/or data storage 3501, code and/or data storage 3505, and activation storage 3520 may share a processor or other hardware logic device or circuit, whereas in another embodiment, they may be in different processors or other hardware logic devices or circuits, or some combination of same and different processors or other hardware logic devices or circuits. Any portion of activation storage 3520 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

Activation storage 3520 may be cache memory, DRAM, SRAM, non-volatile memory (e.g., flash memory), or other storage. Activation storage 3520 may be completely or partially within or external to one or more processors or other logical circuits. A choice of whether activation storage 3520 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 3515 illustrated in FIG. 35A may be used in conjunction with an application-specific integrated circuit ("ASIC"), such as, but not limited to, a TensorFlow® Processing Unit from Google, an inference processing unit (IPU) from Graphcore™, or a Nervana® (e.g., "Lake Crest") processor from Intel Corp. In at least one embodiment, inference and/or training logic 3515 illustrated in FIG. 35A may be used in conjunction with central processing unit ("CPU") hardware, graphics processing unit ("GPU") hardware or other hardware, such as, but not limited to, field programmable gate arrays ("FPGAs").

FIG. 35B illustrates inference and/or training logic 3515, in accordance with at least one embodiment. Inference and/or training logic 3515 may include hardware logic in which computational resources may be dedicated or otherwise exclusively used in conjunction with weight values or other information corresponding to one or more layers of neurons within a neural network. Inference and/or training logic 3515 illustrated in FIG. 35B may be used in conjunction with an application-specific integrated circuit (ASIC), such as, but not limited to, TensorFlow® Processing Unit from Google, an inference processing unit (IPU) from Graphcore™, or a Nervana® (e.g., "Lake Crest") processor from Intel Corp. Inference and/or training logic 3515 illustrated in FIG. 35B may be used in conjunction with central processing unit (CPU) hardware, graphics processing unit (GPU) hardware or other hardware, such as, but not limited to, field programmable gate arrays (FPGAs). Inference and/or training logic 3515 can include code and/or data storage 3501 and code and/or data storage 3505, which may be used to store code (e.g., graph code), weight values and/or other information, including bias values, gradient information, momentum values, and/or other parameter or hyperparameter information. In FIG. 35B, for example, each of code and/or data storage 3501 and code and/or data storage 3505 is associated with a dedicated computational resource, such as, but not limited to, computational hardware 3502 and computational hardware 3506, respectively. Each of computational hardware 3502 and computational hardware 3506 can include one or more ALUs that perform mathematical functions, such as, but not limited to, linear algebraic functions, only on information stored in code and/or data storage 3501 and code and/or data storage 3505, respectively, result of which is stored in activation storage 3520.

Each of code and/or data storage 3501 and 3505 and corresponding computational hardware 3502 and 3506, respectively, correspond to different layers of a neural network, such that resulting activation from one storage/computational pair 3501/3502 of code and/or data storage 3501 and computational hardware 3502 is provided as an input to a next storage/computational pair 3505/3506 of code and/or data storage 3505 and computational hardware 3506, in order to mirror a conceptual organization of a neural network. Each of storage/computational pairs 3501/3502 and 3505/3506 may correspond to more than one neural network layer. Additional storage/computation pairs (not shown) subsequent to or in parallel with storage/computation pairs 3501/3502 and 3505/3506 may be included in inference and/or training logic 3515.

In at least one embodiment, logic 3515 described elsewhere herein, can include one or more circuits to cause information to be stored and to store an indication of one or more decompression algorithms to decompress said information, to cause one or more identifiers of one or more videos and one or more indications of one or more pixel interpolation algorithms to be stored, to indicate one or more decompression algorithms to be used to access one or more frames of one or more videos, to perform interpolation of two or more pixels of one or more video frames based, at least in part, on one or more frame identifiers of said one or more video frames, to indicate one or more properties of one or more pixels based, at least in part, on one or more identifiers of one or more video frames containing said one or more pixels, and to modify one or more properties of one or more pixels based, at least in part, on one or more identifiers of one or more video frames containing said one or more pixels or otherwise perform any of the operations described above or elsewhere herein or otherwise perform any of the operations described above or elsewhere herein. One or more circuits in logic 3515 can be configured by software described herein, to cause information to be stored and to store an indication of one or more decompression algorithms to decompress said information, to cause one or more identifiers of one or more videos and one or more indications of one or more pixel interpolation algorithms to be stored, to indicate one or more decompression algorithms to be used to access one or more frames of one or more videos, to perform interpolation of two or more pixels of one or more video frames based, at least in part, on one or more frame identifiers of said one or more video frames, to indicate one or more properties of one or more pixels based, at least in part, on one or more identifiers of one or more video frames containing said one or more pixels, and to modify one or more properties of one or more pixels based, at least in part, on one or more identifiers of one or more video frames containing said one or more pixels or otherwise perform any of the operations described above or elsewhere herein or otherwise perform any of the operations described above or elsewhere herein.

Figure 35C:
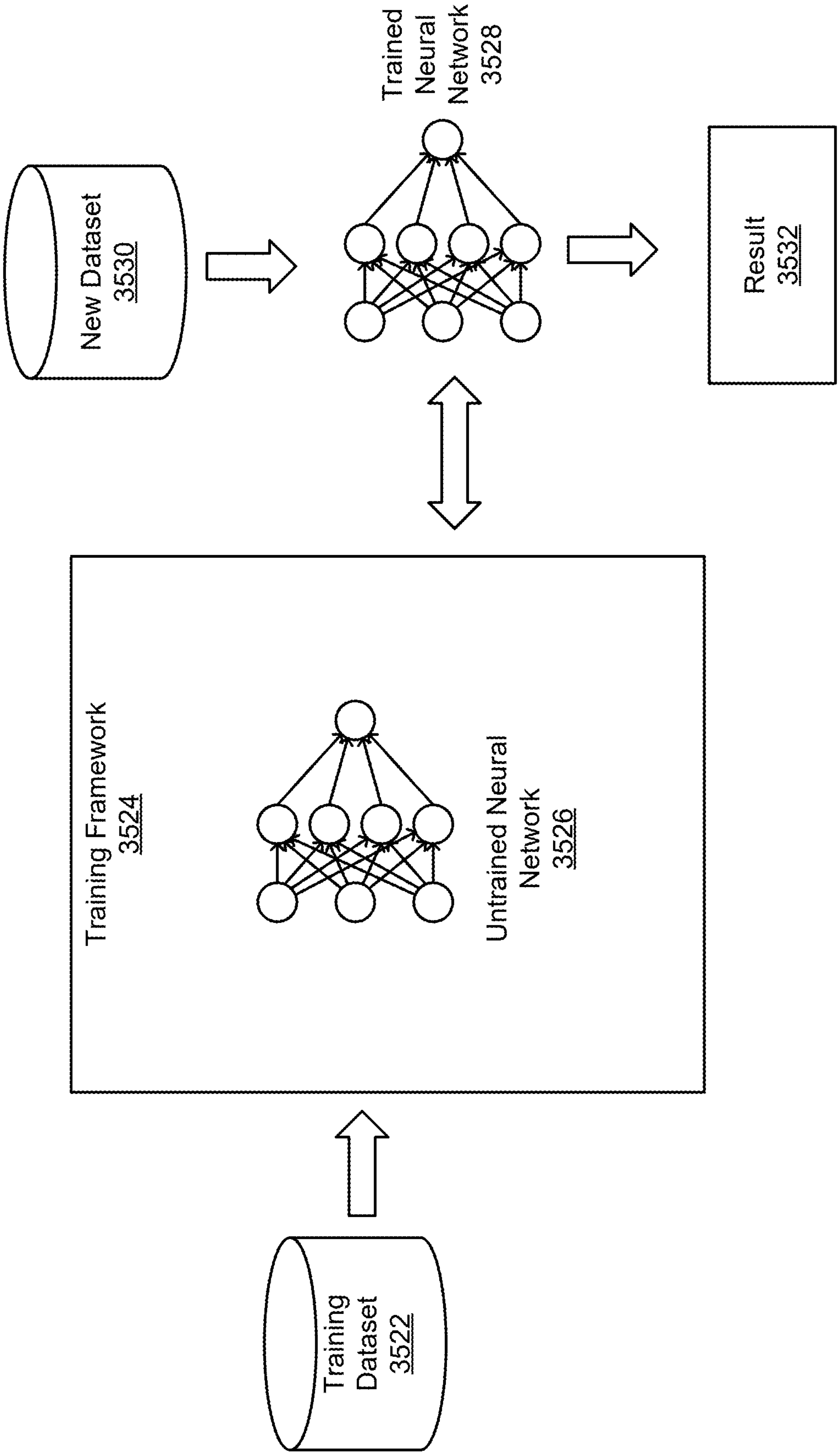
FIG. 35C illustrates training and deployment of a neural network, in accordance with at least one embodiment.

FIG. 35C illustrates training and deployment of a deep neural network, in accordance with at least one embodiment. An untrained neural network 3526 can be trained using a training dataset 3522. Training framework 3524 can be a PyTorch framework, and/or a training framework 3504 can include a TensorFlow, Boost, Caffe, Microsoft Cognitive Toolkit/CNTK, MXNet, Chainer, Keras, Deeplearning4j, or other training framework. Training framework 3524 can train an untrained neural network 3526 and enables it to be trained using processing resources described herein to generate a trained neural network 3528. Weights may be chosen randomly or by pre-training using a deep belief network. Training may be performed in either a supervised, partially supervised, or unsupervised manner.

Untrained neural network 3526 can be trained using supervised learning, wherein training dataset 3522 includes an input paired with a desired output for an input, or where training dataset 3522 includes input having a known output and an output of neural network 3526 is manually graded. Untrained neural network 3526 can be trained in a supervised manner and processes inputs from training dataset 3522 and compares resulting outputs against a set of expected or desired outputs. Errors can then be propagated back through untrained neural network 3526. Training framework 3524 can adjust weights that control untrained neural network 3526. Training framework 3524 can include tools to monitor how well untrained neural network 3526 is converging towards a model, such as, but not limited to, trained neural network 3528, suitable to generating correct answers, such as, but not limited to, in result 3532, based on input data such as, but not limited to, a new dataset 3530. Training framework 3524 can train untrained neural network 3526 repeatedly while adjust weights to refine an output of untrained neural network 3526 using a loss function and adjustment algorithm, such as, but not limited to, stochastic gradient descent. Training framework 3524 can train untrained neural network 3526 until untrained neural network 3526 achieves a desired accuracy. Trained neural network 3528 can then be deployed to implement any number of machine learning operations.

Untrained neural network 3526 can be trained using unsupervised learning, wherein untrained neural network 3526 attempts to train itself using unlabeled data. Unsupervised learning training dataset 3522 can include input data without any associated output data or "ground truth" data. Untrained neural network 3526 can learn groupings within training dataset 3522 and can determine how individual inputs may be related to untrained dataset 3522. Unsupervised training can be used to generate a self-organizing map in trained neural network 3528 capable of performing operations useful in reducing dimensionality of new dataset 3530. Unsupervised training can also be used to perform anomaly detection, which allows identification of data points in new dataset 3530 that deviate from normal patterns of new dataset 3530.

Semi-supervised learning may be used, which is a technique in which in training dataset 3522 includes a mix of labeled and unlabeled data. Training framework 3524 may be used to perform incremental learning, such as, but not limited to, through transferred learning techniques. Incremental learning can enable trained neural network 3528 to adapt to new dataset 3530 without forgetting knowledge instilled within trained neural network 3528 during initial training.

Training framework 3524 can include a framework processed in connection with a software development toolkit such as, but not limited to, an OpenVINO (Open Visual Inference and Neural network Optimization) toolkit. An OpenVINO toolkit can include a toolkit such as, but not limited to, those developed by Intel Corporation of Santa Clara, CA.

OpenVINO can include a toolkit for facilitating development of applications, specifically neural network applications, for various tasks and operations, such as, but not limited to, human vision emulation, speech recognition, natural language processing, recommendation systems, and/or variations thereof. OpenVINO can support neural networks such as, but not limited to, convolutional neural networks (CNNs), recurrent and/or attention-based neural networks, and/or various other neural network models. OpenVINO can support various software libraries such as, but not limited to, OpenCV, OpenCL, and/or variations thereof.

OpenVINO can support neural network models for various tasks and operations, such as, but not limited to, classification, segmentation, object detection, face recognition, speech recognition, pose estimation (e.g., humans and/or objects), monocular depth estimation, image inpainting, style transfer, action recognition, colorization, and/or variations thereof.

OpenVINO can include one or more software tools and/or modules for model optimization, also referred to as a model optimizer. A model optimizer can include a command line tool that facilitates transitions between training and deployment of neural network models. A model optimizer may optimize neural network models for execution on various devices and/or processing units, such as, but not limited to, a GPU, CPU, PPU, GPGPU, and/or variations thereof. A model optimizer can generate an internal representation of a model, and can optimize said model to generate an intermediate representation. A model optimizer may reduce a number of layers of a model. A model optimizer can remove layers of a model that may be utilized for training. A model optimizer may perform various neural network operations, such as, but not limited to, modifying inputs to a model (e.g., resizing inputs to a model), modifying a size of inputs of a model (e.g., modifying a batch size of a model), modifying a model structure (e.g., modifying layers of a model), normalization, standardization, quantization (e.g., converting weights of a model from a first representation, such as, but not limited to, floating point, to a second representation, such as, but not limited to, integer), and/or variations thereof.

OpenVINO can include one or more software libraries for inferencing, also referred to as an inference engine. An inference engine can include a C++ library, or any suitable programming language library. An inference engine can be utilized to infer input data. An inference engine may implement various classes to infer input data and generate one or more results. An inference engine can implement one or more API functions to process an intermediate representation, set input and/or output formats, and/or execute a model on one or more devices.

OpenVINO may provide various abilities for heterogeneous execution of one or more neural network models. Heterogeneous execution, or heterogeneous computing, can refer to one or more computing processes and/or systems that utilize one or more types of processors and/or cores. OpenVINO can provide various software functions to execute a program on one or more devices. OpenVINO may provide various software functions to execute a program and/or portions of a program on different devices. OpenVINO may provide various software functions to, for example, run a first portion of code on a CPU and a second portion of code on a GPU and/or FPGA. OpenVINO may provide various software functions to execute one or more layers of a neural network on one or more devices (e.g., a first set of layers on a first device, such as, but not limited to, a GPU, and a second set of layers on a second device, such as, but not limited to, a CPU).

OpenVINO can include various functionality similar to functionalities associated with a CUDA programming model, such as, but not limited to, various neural network model operations associated with frameworks such as, but not limited to, TensorFlow, PyTorch, and/or variations thereof. One or more CUDA programming model operations may be performed using OpenVINO. Various systems, methods, and/or techniques described herein may be implemented using Open VINO.

In at least one embodiment, one or more circuits can be used to cause one or more neural networks and training frameworks described elsewhere herein to cause information to be stored and to store an indication of one or more decompression algorithms to decompress said information, to cause one or more identifiers of one or more videos and one or more indications of one or more pixel interpolation algorithms to be stored, to indicate one or more decompression algorithms to be used to access one or more frames of one or more videos, to perform interpolation of two or more pixels of one or more video frames based, at least in part, on one or more frame identifiers of said one or more video frames, to indicate one or more properties of one or more pixels based, at least in part, on one or more identifiers of one or more video frames containing said one or more pixels, and to modify one or more properties of one or more pixels based, at least in part, on one or more identifiers of one or more video frames containing said one or more pixels or otherwise perform any of the operations described above or elsewhere herein or otherwise perform any of the operations described above or elsewhere herein. One or more neural networks and training frameworks can be configured by software to cause information to be stored and to store an indication of one or more decompression algorithms to decompress said information, to cause one or more identifiers of one or more videos and one or more indications of one or more pixel interpolation algorithms to be stored, to indicate one or more decompression algorithms to be used to access one or more frames of one or more videos, to perform interpolation of two or more pixels of one or more video frames based, at least in part, on one or more frame identifiers of said one or more video frames, to indicate one or more properties of one or more pixels based, at least in part, on one or more identifiers of one or more video frames containing said one or more pixels, and to modify one or more properties of one or more pixels based, at least in part, on one or more identifiers of one or more video frames containing said one or more pixels or otherwise perform any of the operations described above or elsewhere herein or otherwise perform any of the operations described above or elsewhere herein.

At least one embodiment of the disclosure can be described in view of the following clauses:

1. A processor, comprising: one or more circuits to perform an application programming interface (API) to cause one or more identifiers of one or more videos and one or more indications of one or more pixel interpolation algorithms to be stored.
2. The processor of clause 1, wherein the one or more interpolation algorithms are to be used by one or more other APIs to read pixel data from one or more frames of the one or more videos.
3. The processor of clause 1 or 2, wherein the one or more identifiers of the one or more videos are information to identify storage locations allocated to store the one or more videos.
4. The processor of any of clauses 1-3, wherein the one or more circuits are to further perform the API to associate the one or more identifiers of the one or more videos with the one or more indications of the one or more pixel interpolation algorithms.
5. The processor of clauses 1-4, wherein each of the one or more videos is compressed.
6. The processor of clauses 1-5, wherein the one or more circuits are to further perform the API to specify a range of frames in a compressed video to be accessed by one or more other APIs.
7. The processor of clauses 1-6, wherein the API is to be invoked by a program being performed on a graphics processing unit (GPU).
8. A method comprising: performing an application programming interface (API) to cause one or more identifiers of one or more videos and one or more indications of one or more pixel interpolation algorithms to be stored.
9. The method of clause 7, wherein the one or more interpolation algorithms are to be used by one or more other APIs to read pixel data from one or more frames in a compressed video.

10. The method of clause 7 or 8, wherein the one or more identifiers of the one or more videos are information to identify memory allocated to store the one or more videos.
11. The method of any of clauses 7-9, further comprising performing the API to associate the one or more identifiers of the one or more videos with the one or more indications of the one or more pixel interpolation algorithms.
12. The method of any of clauses 7-10, wherein each of the one or more videos is compressed.
13. The method of any of clauses 7-11, further comprising performing the API to specify a range of frames in a compressed video to be accessed by one or more other APIs.
14 The method of claim 8, wherein the API is to be invoked by a program being performed on a graphics processing unit (GPU).
15. A system comprising: one or more processors to perform an instruction to perform an application programming interface (API) to cause one or more identifiers of one or more videos and one or more indications of one or more pixel interpolation algorithms to be stored.
16. The system of clause 15, wherein the one or more interpolation algorithms are to be used by one or more other APIs to read pixel data from one or more frames in a compressed video.
17. The system of clause 15 or 16, wherein the one or more identifiers of the one or more videos are information to identify memory allocated to store the one or more videos.
18. The system of any of clauses 15-17, wherein the one or more processors are to further perform the API to associate the one or more identifiers of the one or more videos with the one or more indications of the one or more pixel interpolation algorithms.
19. The system of any of clauses 15-18, wherein each of the one or more videos is compressed.
20. The system of any of clauses 15-19, wherein the one or more processors are to further perform the API to specify a range of frames in a compressed video to be accessed by one or more other APIs.

As will be apparent to one of ordinary skill in the art, other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Use of "may" and/or "can" is intended to indicate by way of example without limiting any particular embodiment or component or other function described above, below, or elsewhere herein. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as, but not limited to, phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). Number of items in a plurality can be at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. A process such as, but not limited to, those processes described herein (or variations and/or combinations thereof) can be performed under control of one or more computer systems configured with executable instructions and is implemented as code (e.g., executable instructions, one or more computer programs or one or more applications) executing collectively on one or more processors, by hardware or combinations thereof. Code can be stored on a computer-readable storage medium, for example, in form of a computer program comprising a plurality of instructions executable by one or more processors. A computer-readable storage medium can be a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. Code (e.g., executable code or source code) can be stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media can include multiple non-transitory computer-readable storage media and one or more of individual non-transitory storage media of multiple non-transitory computer-readable storage media lack all of code while multiple non-transitory computer-readable storage media collectively store all of code. Executable instructions can be executed such that different instructions are executed by different processors—for example, a non-transitory computer-readable storage medium store instructions and a main central processing unit ("CPU") executes some of instructions while a graphics processing unit ("GPU") executes other instructions. Different components of a computer system can have separate processors and different processors execute different subsets of instructions.

An arithmetic logic unit can include a set of combinational logic circuitry that takes one or more inputs to produce a result. An arithmetic logic unit can be used by a processor to implement mathematical operation such as, but not limited to, addition, subtraction, or multiplication. An arithmetic logic unit is used to implement logical operations such as, but not limited to, logical AND/OR or XOR. An arithmetic logic unit can be stateless, and made from physical switching components such as, but not limited to, semiconductor transistors arranged to form logical gates. An arithmetic logic unit may operate internally as a stateful logic circuit with an associated clock. An arithmetic logic unit may be constructed as an asynchronous logic circuit with an internal state not maintained in an associated register set. An arithmetic logic unit can be used by a processor to combine operands stored in one or more registers of the processor and produce an output that can be stored by the processor in another register or a memory location.

As a result of processing an instruction retrieved by the processor, the processor may present one or more inputs or operands to an arithmetic logic unit, causing the arithmetic logic unit to produce a result based at least in part on an instruction code provided to inputs of the arithmetic logic unit. The instruction codes provided by the processor to the ALU may be based at least in part on the instruction executed by the processor. Combinational logic in the ALU may process the inputs and produces an output which is placed on a bus within the processor. A processor can select a destination register, memory location, output device, or output storage location on the output bus so that clocking the processor causes the results produced by the ALU to be sent to the desired location.

In the scope of this application, the term arithmetic logic unit, or ALU, is used to refer to any computational logic circuit that processes operands to produce a result. For example, in the present document, the term ALU can refer to a floating point unit, a DSP, a tensor core, a shader core, a coprocessor, or a CPU.

One or more components of systems and/or processors disclosed above can communicate with one or more CPUs, ASICs, GPUs, FPGAs, or other hardware, circuitry, or integrated circuit components that include, e.g., an upscaler or upsampler to upscale an image, an image blender or image blender component to blend, mix, or add images together, a sampler to sample an image (e.g., as part of a DSP), a neural network circuit that is configured to perform an upscaler to upscale an image (e.g., from a low resolution image to a high resolution image), or other hardware to modify or generate an image, frame, or video to adjust its resolution, size, or pixels; one or more components of systems and/or processors disclosed above can use components described in this disclosure to perform methods, operations, or instructions that generate or modify an image.

Computer systems can be configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or example language (e.g., "such as, but not limited to,") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as, but not limited to, "processing," "computing," "calculating," "determining," or like, refer to action and/or processes of a computer or computing system, or similar electronic computing device, that manipulate and/or transform data represented as physical, such as, but not limited to, electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as, but not limited to, tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

References may be made to obtaining, acquiring, receiving, or inputting analog or digital data into a subsystem, computer system, or computer-implemented machine. Processes of obtaining, acquiring, receiving, or inputting analog and digital data can be accomplished in a variety of ways such as, but not limited to, by receiving data as a parameter of a function call or a call to an application programming interface. Processes of obtaining, acquiring, receiving, or inputting analog or digital data can be accomplished by transferring data via a serial or parallel interface. Processes of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example implementations of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as example forms of implementing the claims.

What is claimed is:

1. One or more processors, comprising circuitry to:

receive an application programming interface (API) call; and in response to receipt of the API call, cause one or more identifiers of one or more videos and one or more indications of one or more pixel interpolation algorithms to be stored, wherein the one or more identifiers of the one or more videos and the one or more indications of the one or more pixel interpolation algorithms are provided as one or more input parameters of the API call.

2. The one or more processors of claim 1, wherein the one or more pixel interpolation algorithms are to be used by one or more other APIs to read pixel data from one or more frames of the one or more videos.

3. The one or more processors of claim 1, wherein the one or more identifiers of the one or more videos are information to identify storage locations allocated to store the one or more videos.

4. The one or more processors of claim 1, wherein the circuitry is to further execute the API to associate the one or more identifiers of the one or more videos with the one or more indications of the one or more pixel interpolation algorithms.

5. The one or more processors of claim 1, wherein each of the one or more videos is compressed.

6. The one or more processors of claim 1, wherein the circuitry is to further execute the API to specify a range of frames in a compressed video to be accessed by one or more other APIs.

7. The one or more processors of claim 1, wherein the API is to be invoked by a program being performed on a graphics processing unit (GPU).

8. A method comprising:

receiving an application programming interface (API) call; and in response to receipt of the API call, causing one or more identifiers of one or more videos and one or more indications of one or more pixel interpolation algorithms to be stored, wherein the one or more identifiers of the one or more videos and the one or more indications of the one or more pixel interpolation algorithms are provided as one or more input parameters of the API call.

9. The method of claim 8, wherein the one or more pixel interpolation algorithms are used by one or more other APIs that read pixel data from one or more frames in a compressed video.

10. The method of claim 8, wherein the one or more identifiers of the one or more videos are information identifying memory allocated to store the one or more videos.

11. The method of claim 8, further comprising associating the one or more identifiers of the one or more videos with the one or more indications of the one or more pixel interpolation algorithms.

12. The method of claim 8, wherein each of the one or more videos is compressed.

13. The method of claim 8, wherein the API call includes input information that specifies a range of frames in a compressed video to be accessed by one or more other APIs.

14. The method of claim 8, wherein the API call is invoked by a program being performed on a graphics processing unit (GPU).

15. A system comprising: one or more processors to:

receive an application programming interface (API) call; and in response to the API call, cause one or more identifiers of one or more videos and one or more indications of one or more pixel interpolation algorithms to be stored, wherein the one or more identifiers of the one or more videos and the one or more indications of the one or more pixel interpolation algorithms are provided as one or more input parameters of the API call.

16. The system of claim 15, wherein the one or more pixel interpolation algorithms are to be used by one or more other APIs to read pixel data from one or more frames in a compressed video.

17. The system of claim 15, wherein the one or more identifiers of the one or more videos are information to identify memory allocated to store the one or more videos.

18. The system of claim 15, wherein the one or more processors are to further associate the one or more identifiers of the one or more videos with the one or more indications of the one or more pixel interpolation algorithms.

19. The system of claim 15, wherein each of the one or more videos is compressed.

20. The system of claim 15, wherein the one or more processors are to further specify a range of frames in a compressed video to be accessed by one or more other APIs.

* * * * *